(12) United States Patent  
Matsushima et al.

(10) Patent No.: US 7,386,381 B2
(45) Date of Patent: Jun. 10, 2008

(54) METHOD AND APPARATUS OF CONTROLLING ACCELERATION/DECELERATION OF A VEHICLE

(75) Inventors: Hirohide Matsushima, Kobe (JP); Yoichi Jinja, Osaka (JP); Daisuke Kawai, Akashi (JP); Ryo Suzuki, Kobe (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 649 days.

(21) Appl. No.: 11/102,451

(22) Filed: Apr. 8, 2005

(65) Prior Publication Data
US 2005/0234624 A1  Oct. 20, 2005

(30) Foreign Application Priority Data
Apr. 9, 2004 (JP) .............................. 2004-115694
Dec. 13, 2004 (JP) .............................. 2004-359969

(51) Int. Cl.
*G06F 7/00* (2006.01)
(52) U.S. Cl. .................. 701/51; 701/54; 701/70; 477/37; 477/80
(58) Field of Classification Search ................ 701/51, 701/52, 54, 70, 84, 110; 477/37, 34, 79, 477/80
See application file for complete search history.

(56) References Cited
U.S. PATENT DOCUMENTS
7,086,978 B2 *  8/2006  Aikawa et al. ................. 475/5

FOREIGN PATENT DOCUMENTS
JP  05-057363  3/1993
JP  2003-065196  3/2003
JP  2003-343408  12/2003

* cited by examiner

*Primary Examiner*—Gertrude Arthur Jeangla
(74) *Attorney, Agent, or Firm*—Alleman Hall McCoy Russell & Tuttle LLP

(57) ABSTRACT

A method of reducing at least one of a contact speed and a transmitting torque between power transmission members, when a slack between the power transmission members in a power transmission path from a drive source to a wheel is apparently gone upon an acceleration or deceleration of the drive source or the wheel. The method includes the steps of detecting an information relating to a rotational speed of an input shaft of a controlled section in the power transmission path, the controlled section being defined as to be reduced in the at least one of the contact speed and the transmitting torque, calculating a relative rotational position between the input shaft and an output shaft of the controlled section based on the detected information relating to the rotational speed of the input shaft, and accelerating or decelerating at least one of the input shaft and the output shaft so as to reduce the at least one of the contact speed and the transmitting torque between the power transmission members based on the calculated relative rotational position.

45 Claims, 75 Drawing Sheets

| Instruction Value | Detection Data |
|---|---|
| Deceleration/Acceleration Start Timing | Input Shaft/Output Shaft Relative Rotational Position |
| Amount of Deceleration/ Acceleration | Input Shaft/Output Shaft<br><br>• Relative Rotational Position<br>• Rotational Speed Difference<br>• Increase/Decrease Rate (Derivative Value) of Rotational Speed Difference<br>• Rotational Speed<br>• Increase/Decrease Rate (Derivative Value) of Rotational Speed<br><br>Throttle<br><br>• Throttle Opening<br>• Increase/Decrease Rate (Derivative Value) of Throttle Opening |
| Deceleration/Acceleration End Timing | |

Control of The Invention

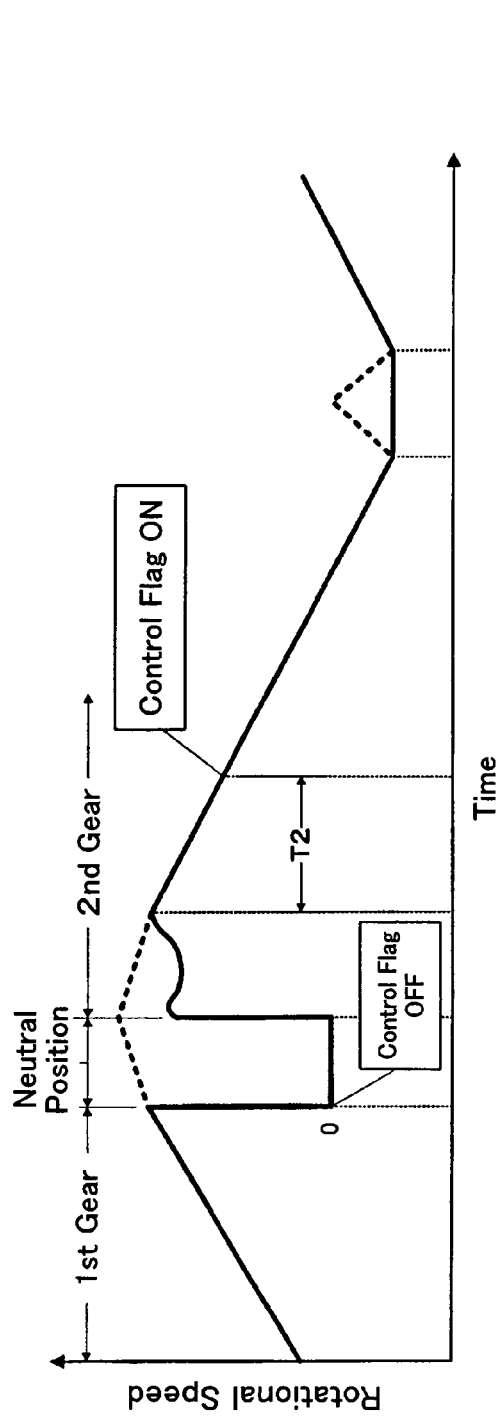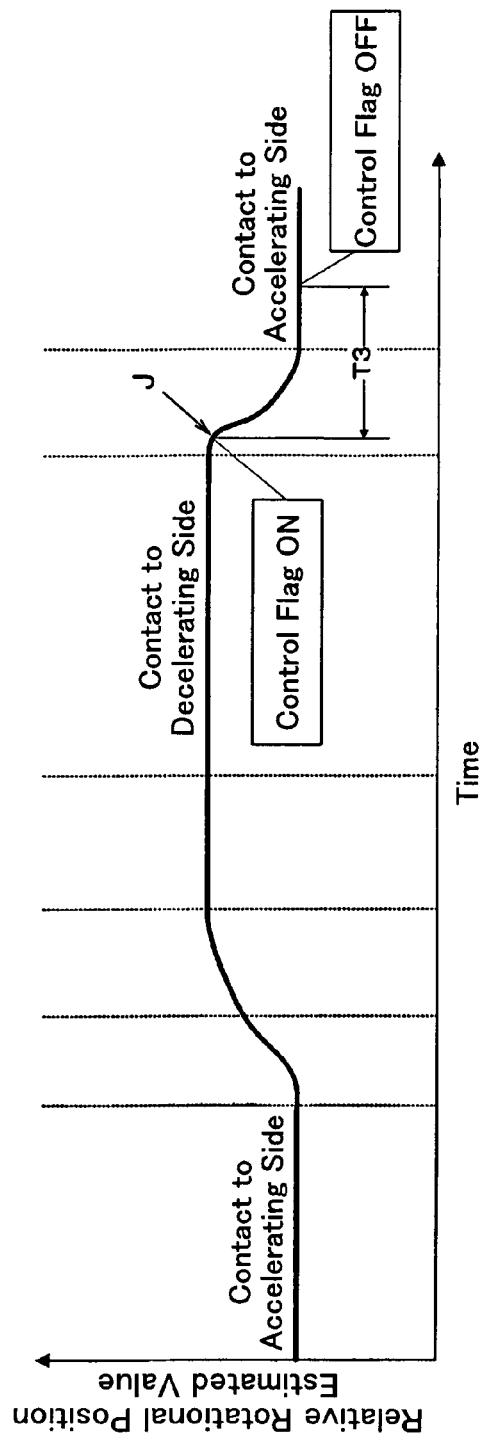
FIG. 33A
FIG. 33B

METHOD AND APPARATUS OF CONTROLLING ACCELERATION/DECELERATION OF A VEHICLE

TECHNICAL FIELD

The present invention relates to a method of reducing a contact speed and/or transmitting torque between power transmission members in the power transmission path from a drive source to a wheel, when a slack between the power transmission members is apparently gone upon an acceleration or deceleration of the drive source or the wheel, and to an apparatus carrying out the method and the vehicle being equipped with the apparatus.

BACKGROUND OF THE INVENTION

Typically, a vehicle having a drive source includes various power transmission members, such as mating gears, a dog clutch including a dog teeth and a dog hole, a chain and a sprocket, and mating splines in the power transmission path from the drive source to a wheel. Each of these power transmission members engages with other adjacent power transmission members with a predetermined slack. Apparently, this slack does not exist during steady power transmitting condition. However, by changing a rotational speed of the drive source or applying an engine brake, a rotational speed difference occurs between a power transmission member upstream in the power transmission path and another adjacent power transmission member downstream in the power transmitting path. Thereby, contact surfaces of these power transmission members depart from each other temporarily within a range of the slack. The departed power transmission members, eventually, re-contact with each other, but this time, with contact surfaces on the opposite direction of the slack. If the re-contact speed and/or transmitting torque at the time of re-contact is relatively large, an operator/passenger of the vehicle may feel an unpleasant shock transmitted throughout the entire body of the vehicle.

To address the problem, for example, Utility Model Publication Unexamined No. H5-57363 discloses a method of reducing the transmitting torque between the power transmission members by controlling an ignition based on a throttle opening of an internal combustion engine which is the drive source. However, in such control based on the throttle opening, since a retard compensation is performed irrespective of a change in torque of the internal combustion engine, the retard compensation is not carried out at a suitable timing. Therefore, another problem in which an acceleration performance falls arises.

Accordingly, Patent Publication Unexamined No. 2003-65196 and Patent Publication Unexamined No. 2003-343408 disclose a method of reducing the transmitting torque between the power transmission members by calculating a degree of acceleration/deceleration of one of the power transmission members based on a rate of increase/decrease (derivative value) in the rotational speed of the power transmission member, and controlling an ignition based on the degree of acceleration/deceleration when the degree of acceleration/deceleration exceeds a predetermined value. However, such control does not operate when the degree of acceleration/deceleration is relatively small.

BRIEF SUMMARY OF THE INVENTION

The present invention addresses the above-mentioned conditions and, thus, provides an improved method and apparatus of controlling the re-contact speed and/or the transmission torque at the time of re-contact between power transmission members in a power transmission path from a drive source to a wheel of a vehicle, when accelerating/decelerating the vehicle.

According to one aspect of the invention, the method of reducing at least one of a contact speed and a transmitting torque between power transmission members, when a slack between the power transmission members in a power transmission path from a drive source to a wheel is apparently gone upon an acceleration or deceleration of the drive source or the wheel. The method comprises the steps of detecting an information relating to a rotational speed of an input shaft of a controlled section in the power transmission path, the controlled section being defined as to be reduced in the at least one of the contact speed and the transmitting torque, calculating a relative rotational position between the input shaft and an output shaft of the controlled section based on the detected information relating to the rotational speed of the input shaft, and accelerating or decelerating at least one of the input shaft and the output shaft so as to reduce the at least one of the contact speed and the transmitting torque between the power transmission members based on the calculated relative rotational position.

According to another aspect of the invention, the apparatus for reducing at least one of a contact speed and a transmitting torque between power transmission members, when a slack between the power transmission members in a power transmission path from a drive source to a wheel is apparently gone upon an acceleration or deceleration of the drive source or the wheel. The apparatus comprises an input shaft sensor configured to detect an information relating to a rotational speed of an input shaft of a controlled section in the power transmission path, the controlled section being defined as to be reduced in the at least one of the contact speed and the transmitting torque, a relative rotational position calculating module configured to calculate a relative rotational position between the input shaft and an output shaft of the controlled section based on the information relating to the rotational speed of the input shaft detected by the input shaft sensor, and an accelerating/decelerating module configured to accelerate or decelerate at least one of the input shaft and the output shaft so as to reduce the at least one of the contact speed and the transmitting torque between the power transmission members based on the relative rotational position calculated by the relative rotational position calculating module.

According to still another aspect of the invention, the vehicle comprises an apparatus for reducing at least one of a contact speed and a transmitting torque between power transmission members, when a slack between the power transmission members in a power transmission path from a drive source to a wheel is apparently gone upon an acceleration or deceleration of the drive source or the wheel. The apparatus includes an input shaft sensor configured to detect an information relating to a rotational speed of an input shaft of a controlled section in the power transmission path, the controlled section being defined as to be reduced in the at least one of the contact speed and the transmitting torque, a relative rotational position calculating module configured to calculate a relative rotational position between the input shaft and an output shaft of the controlled section based on the information relating to the rotational speed of the input shaft detected by the input shaft sensor, and an accelerating/decelerating module configured to accelerate or decelerate at least one of the input shaft and the output shaft so as to reduce the at least one of the contact speed and the transmitting torque between the power transmission members based on the relative rotational position calculated by the relative rotational position calculating module.

The vehicle is equipped with the drive source and arbitrary number of wheels such as a motorcycle, a four-wheel vehicle, etc. In the power transmission path of the vehicle from the drive source to the wheel, there typically exists a slack between the power transmission members (each of the power transmission members typically include a rotational shaft). In the method of controlling the re-contact described above, the information relating to the rotational speed of the rotational shaft of one of the power transmission members on the drive source side (i.e., the input shaft of the controlled section) is detected.

Here, the power transmission members with the slack to be controlled may be selected from any power transmission members which are engaged to each other, in the power transmission path. This section to which the slack thereof is controlled by the control is defined as the controlled section. When paying attention to the controlled section, the total amount of the slack never changes, however, an upstream-side slack increases while a downstream-side slack decreases, and vice versa, depending on acceleration and deceleration of at least one of the power transmission members, and directions of rotation of the power transmission members.

The power transmission members includes any gears, dog clutches, a sprocket and a chain, splines, and a coupling damper, in the power transmission path. Therefore, if a slack between two mating gears (i.e., a backlash of the gears) are to be controlled, a rotational shaft of the upstream-side gear is defined as the input shaft of the controlled section, and the rotational shaft of the downstream-side gear is defined as the output shaft of the controlled section. In addition if each of the gears are spline-fitted on the respective rotational shaft, a slack between the gear and the respective rotational shaft may be included in the slack to be controlled. As used herein, the term "slack" includes backlash.

The information relating to the shaft rotational speed (e.g., the rotational speed of the input shaft) may be detected using various well-known shaft rotational speed detecting devices. The detection value may be directly, the rotational speed of the rotational shaft, or other related information, such as a rate of increase/decrease in the rotational speed (i.e., a derivative value), an integration value of the rotational speeds, and a difference value of the rotational speeds, etc.

A relative rotational position between the input shaft and the output shaft of the controlled section is calculated based on the information relating to the rotational speed of the input shaft (e.g., a change in the rotational speed of the input shaft). Typically, in a steady traveling state of the vehicle, the input shaft and the output shaft are synchronized in rotation, and the relative rotational position between them remains unchanged. Thus, for example, if the rotational speed of the input shaft is changed from this steady traveling state, the rotational speed of the output shaft remains approximately unchanged while the movement of the input shaft and the output shaft is within a range of the slack. Therefore, it may be possible to assume the rotational speed of the output shaft is the same as the rotational speed of the input shaft when the power transmission members are departed from each other.

Since the total amount of the slack is never changed, it is possible to measure the amount beforehand. Thus, the contact speed and/or the transmitting torque (and/or a contact timing) between the power transmission members may be calculated based on the relative rotational speed or the relative rotational position calculated as mentioned above, and the rotational speed of the input shaft. Therefore, an acceleration/deceleration shock transmitted through the entire vehicle can be reduced, and discomfort given to an operator/passenger may also be reduced by accelerating or decelerating at least one of the input shaft and the output shaft so that the contact speed and/or the transmitting torque between the power transmission members calculated as above becomes less.

The relative rotational position between the input shaft and the output shaft is calculated only from the information relating to the rotational speed of the input shaft. As described above, this may be realized by estimating the information relating to the rotational speed of the output shaft based on the information relating to the rotational speed of the input shaft, and calculating the relative rotational position based on the information relating to the rotational speeds of both the input shaft and the output shaft. Instead of estimating the information relating to the rotational speed of the output shaft, the rotational speed may be detected directly.

Further, at least one of the input shaft and the output shaft is accelerated or decelerated based on the relative rotational position between the input shaft and the output shaft. Instead of this configuration, for example, the relative rotational speed between the input shaft and the output shaft may be calculated based on the information relating to the rotational speed of the input shaft which is detected, and the at least one of the input shaft and the output shaft may be accelerated or decelerated based on both the relative rotational speed and the relative rotational position so that the contact speed and/or the transmitting torque between the power transmission members become smaller. This configuration also achieves similar effects as that of the independent use of the relative rotational position as described above.

Since the amount of the slack may be measured beforehand, it is possible to re-contact the power transmission members in any desired pattern if the relative rotational position or the relative rotational position and the relative rotational speed between the power transmission members are obtained. The re-contact pattern may include information such as start timing of acceleration or deceleration of at least one of the input shaft and the output shaft. This is because the start timing is at least necessary if the time range of the acceleration/deceleration pattern is fixed.

In order to reliably make the re-contact speed and/or the transmitting torque between the power transmission members smaller by knowing the re-contact timing more precisely, it is possible to further determine an end timing of acceleration or deceleration, or a continuation time or an amount of the continuation of acceleration or deceleration from the start timing (the determined result typically is a control instruction value), and to terminate the acceleration or the deceleration at the re-contact timing of the power transmission members. The rate of the acceleration or the deceleration may be constant during the continuation of the acceleration or the deceleration. The rate of the acceleration or the deceleration may be variable so that the relative rotational speed between the power transmission members is zero at the time of re-contact between the power transmission members.

As the drive source, an internal combustion engine, an electric motor, etc. may be used. If an internal combustion engine of forced-ignition type is used, it may be possible to control the deceleration/acceleration by carrying out a retard/advance of an ignition timing. The acceleration/deceleration may also be controlled by adjusting an amount of fuel supply to the engine. Further, the acceleration/deceleration may be controlled by adjusting an amount of intake through a throttle or a bypass valve of the engine.

Instead, if an electric motor is used as the drive source, it may be possible to control the acceleration/deceleration by adjusting a supply current to the electric motor. Alternatively, it is possible to couple an accelerating/decelerating device with the input shaft and/or the output shaft of the controlled section, and to control the acceleration/deceleration by the accelerating/decelerating device independently from the drive source, or a combination of the accelerating/decelerating device and the drive source. As the accelerating/decelerating device, any types of power generating devices, frictional resistance generating devices, etc. which is capable of accelerating/decelerating the input shaft and/or the output shaft, or a combination of these devices may be used.

The above and further objects and features of the invention will more fully be apparent from the following detailed description with accompanying drawings.

BRIEF DESCRIPTION OF THE SEVERAL VIEWS OF THE DRAWINGS

FIG. 3 is a table showing examples of control instruction values and detection data for calculating the instruction values, used for a control logic in the control module shown in FIG. 2;

FIG. 33A is a graph for explaining a function of the control apparatus according to the 8th Embodiment shown in FIG. 32, showing a change in rotational speeds of the input shaft and the output shaft when shifting of gears through a neutral position;

FIG. 33B is a corresponding graph of FIG. 33A, showing a change in a relative rotational position estimated value;

DETAILED DESCRIPTION OF THE INVENTION

The present invention will now be described in detail referring to the accompanying drawings illustrating the embodiments thereof.

Figure 1:
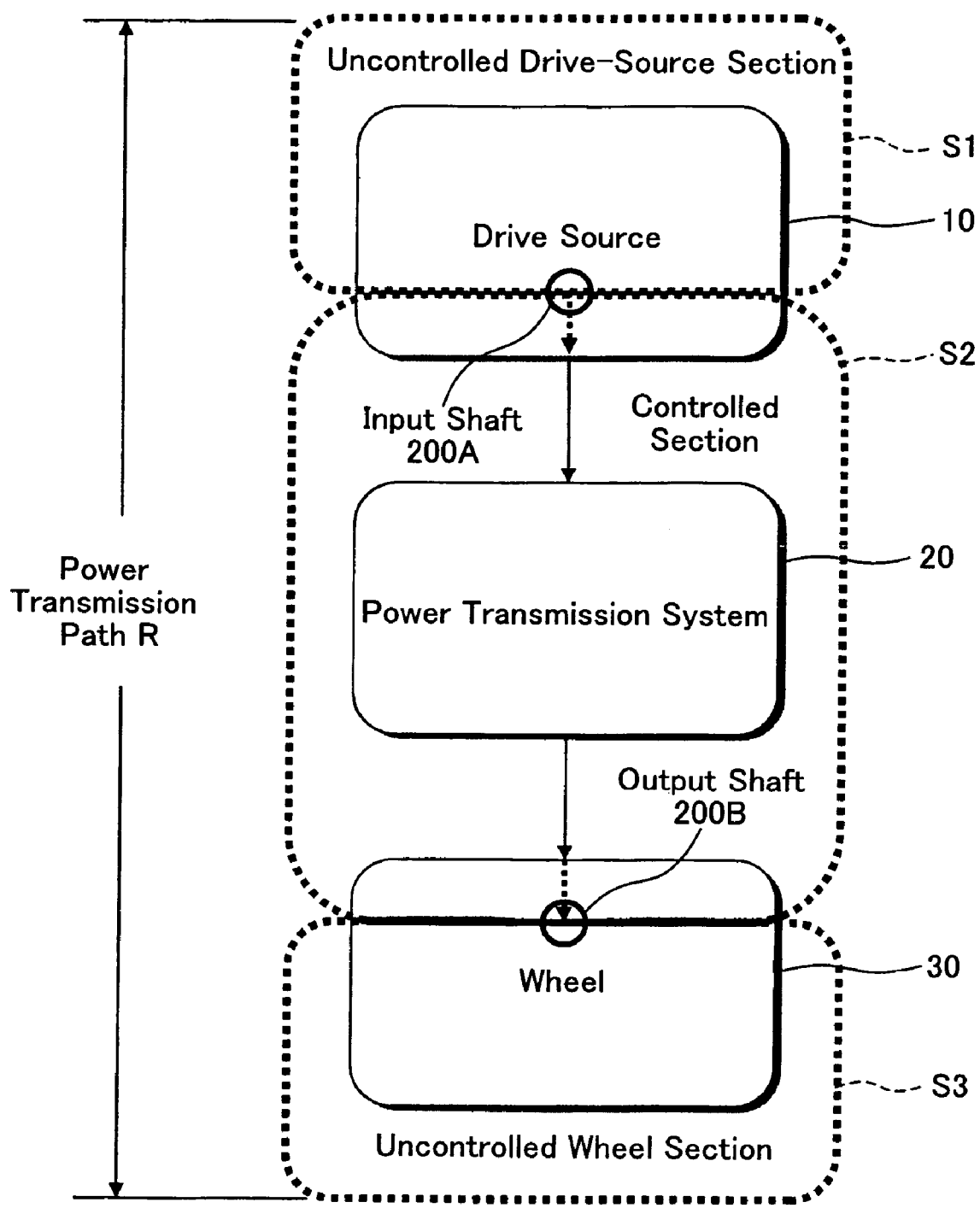
FIG. 1 is a conceptual diagram for explaining a power transmission path from a drive source to a wheel of a vehicle which includes the drive source according to an embodiment of the present invention, and a range which the present invention intends to control.
Figure 6:
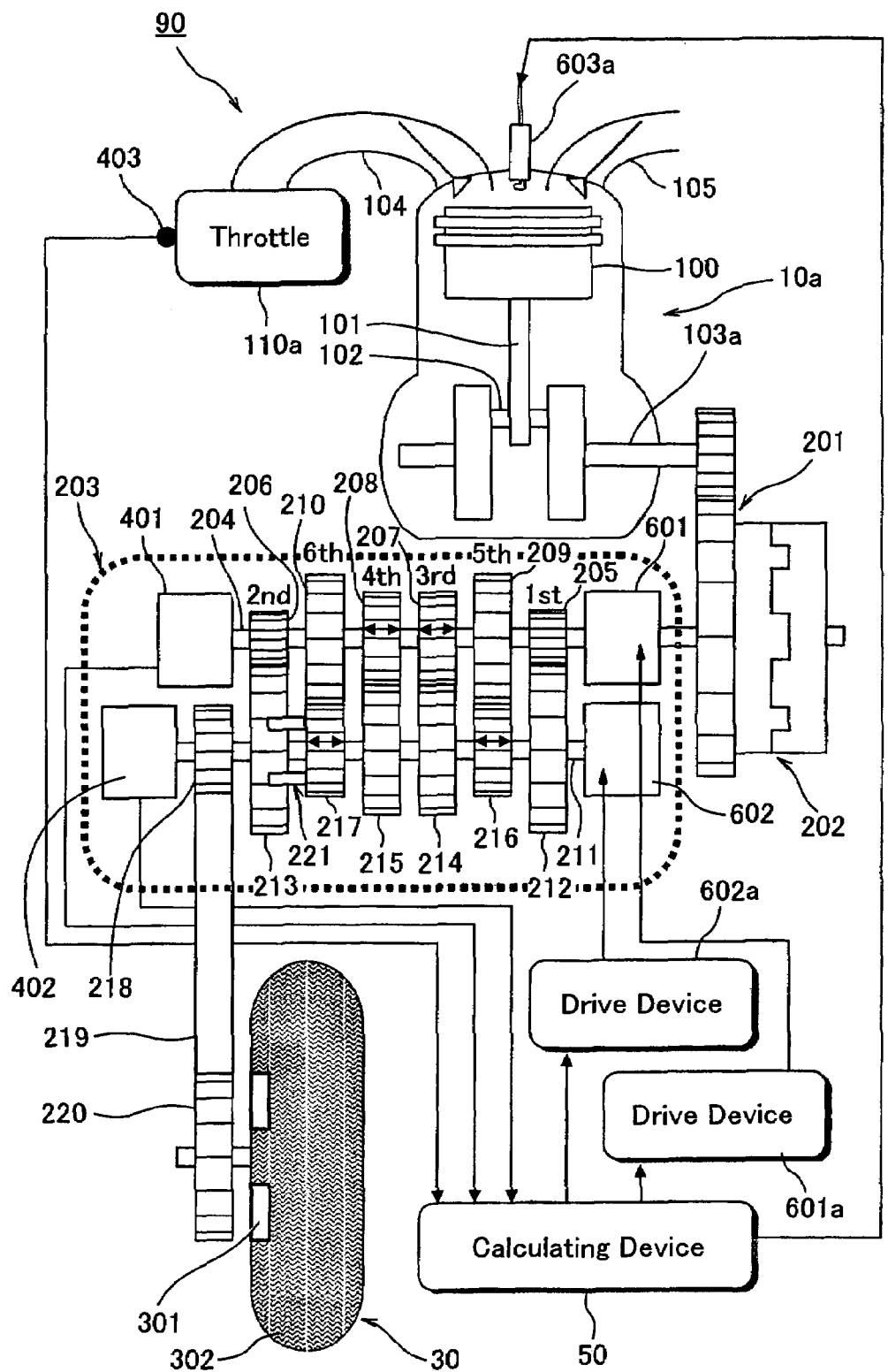
FIG. 6 is a block diagram showing a 1st Embodiment, in which the control apparatus according to the present invention is applied to a vehicle which is equipped with an internal combustion engine of forced-ignition type as the drive source.
Figure 13:
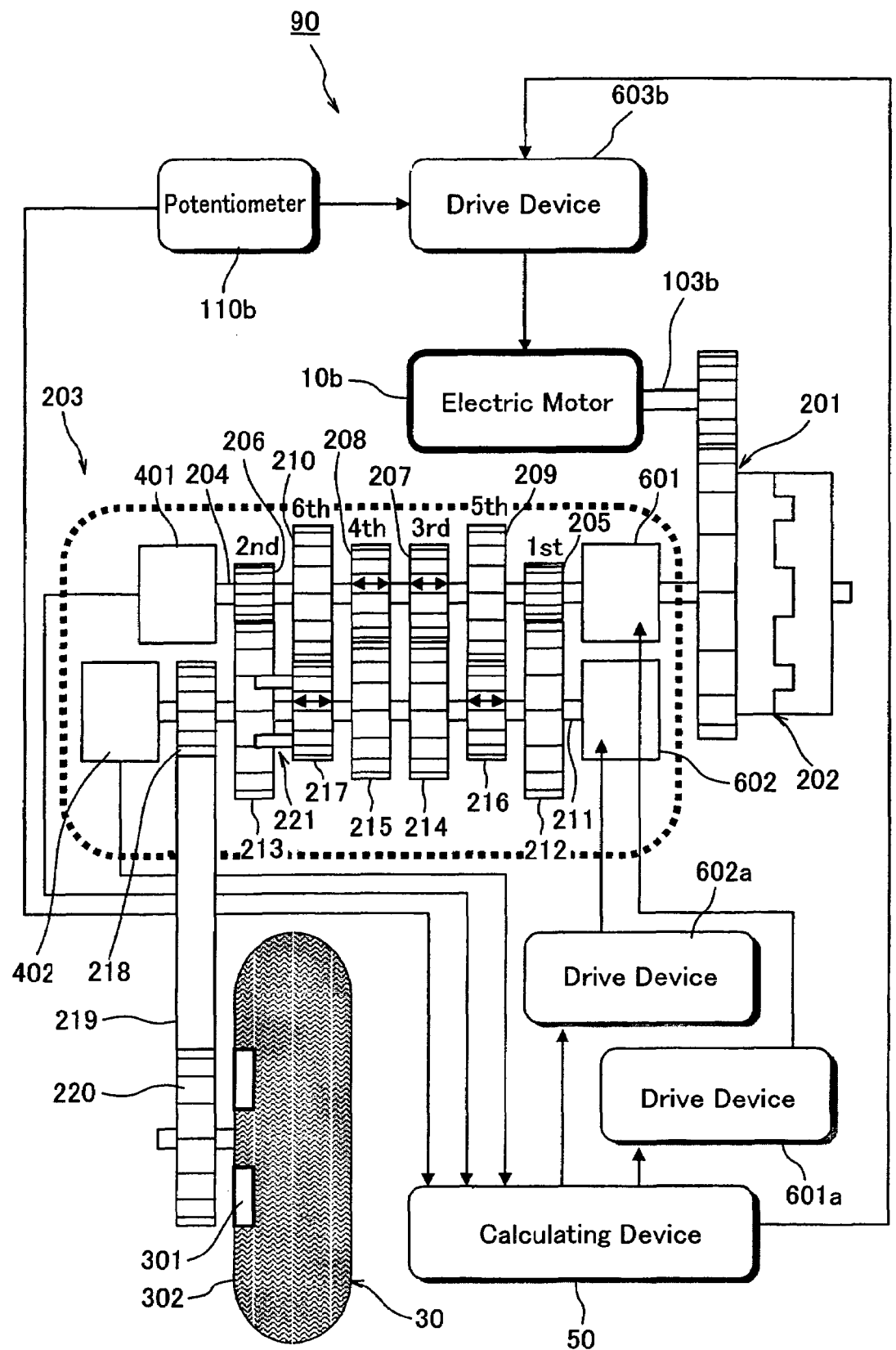
FIG. 13 is a block diagram showing a 2nd Embodiment in which the control apparatus according to the present invention is applied to a vehicle which is equipped with an electric motor as the drive source.

FIG. 1 is a conceptual diagram showing a section of a vehicle which a control according to an embodiment of the present invention intends to control (i.e., a controlled section S2). The vehicle includes a power transmission system 20 having various power transmission members in a power transmission path R from the drive source 10 to a wheel 30 which typically is a drive wheel. The power transmission system 20 may include a transmission device such as shown in FIGS. 6 and 13.

Various mechanical slack exists in such the power transmission path R. For example, such a slack includes a backlash between mating transmission gears in the transmission device, a slack between a rotational shaft and a transmission gear which is spline-coupled to the rotational shaft, a slack between a dog tooth and a dog hole in a dog clutch, a slack in the chain itself, a slack of a coupling damper, etc. Moreover, if the drive source 10 is an internal combustion engine, the slack includes a slack between a crankshaft and an output gear spline-coupled thereto. Furthermore, in the wheel 30, the slack includes a slack between a chain extended from the transmission device and a sprocket of an axle, a slack of a coupling damper holding the wheel, etc.

In this way, the "controlled section S2" having the slack (backlash) may include arbitrary section in the power transmission path R, while the slack typically being recognizable as a relative rotation between an input shaft 200A and an output shaft 200B of the controlled section S2. In this embodiment to facilitate the explanation, as for sections of the power transmission path R other than the controlled section S2, a section of the drive source 10 is designated as an "uncontrolled drive-source section S1", and a section of the wheel 30 is designated as a "uncontrolled wheel section S3 (substantially, it is a tire portion excluding a wheel portion)."

Figure 2:
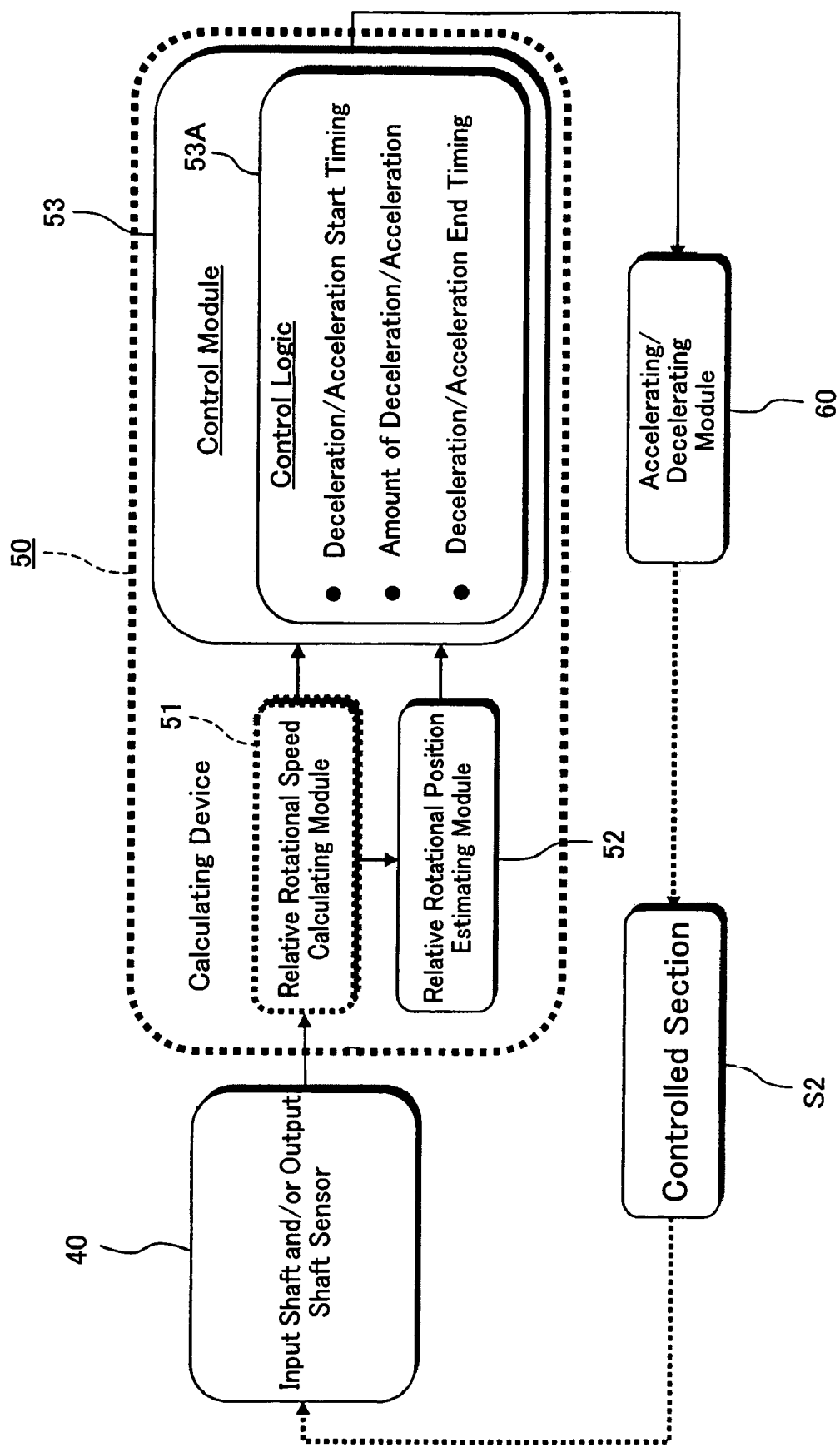
FIG. 2 is a block diagram showing a conceptual configuration of a control apparatus of the vehicle according to the embodiment of the present invention.

FIG. 2 is a conceptual block diagram showing a control apparatus according to the embodiment shown in FIG. 1. The control apparatus includes an input shaft and/or output shaft sensor 40 configured to detect an information relating to rotational speed(s) of the input shaft 200A and/or output shaft 200B of the controlled section S2, a calculating device 50, and an accelerating/decelerating module 60.

The input shaft and/or output shaft sensor 40 includes at least one of an input shaft sensor 401 (see FIGS. 6 and 13) configured to detect the information relating to the rotational speed of the input shaft 200A and an output shaft sensor 402 (see FIGS. 6 and 13) configured to detect the information relating to the rotational speed of the output shaft 200B. The input and output sensors may be various types of sensors which may be selected according to what is needed as a control instruction value set in a control logic 53A for a control module 53 (described later) as shown in FIG. 2.

For example, as shown in FIG. 3, the sensors may be configured to detect the rotational speed of the input shaft 200A and/or the output shaft 200B, a relative rotational position, an increase/decrease rate of the rotational speed (derivative value of the rotational speed), and a rotational speed difference. Further, the sensors may be sensors which are capable of detecting a throttle opening (see FIGS. 6 and 13), and an increase/decrease rate thereof (a derivative value of the throttle opening), etc., as an indirect data of the information relating to the rotational speed of the input shaft 200A.

Referring back to FIG. 2, the calculating device 50 further includes a relative rotational position estimating module 52 and the control module 53, and may further include a relative rotational speed calculating module 51, depending on the configuration of the control apparatus, such as type of the input shaft and/or output shaft sensor 40.

The calculating device 50 is configured to calculate at least the relative rotational position between the input shaft 200A and the output shaft 200B of the controlled section S2 by the relative rotational position estimating module 52. However, if the calculating device 50 includes the relative rotational speed calculating module 51 as shown with a dotted frame in FIG. 2, the relative rotational position estimating module 52 is configured to calculate a relative rotational position based on the relative rotational speeds of the input shaft 200A and the output shaft 200B calculated by the relative rotational speed calculating module 51.

According to the control logic 53A as mentioned above, the control module 53 calculates a deceleration/acceleration start timing, and an amount of deceleration/acceleration, and/or a deceleration/acceleration end timing, based on the relative rotational position transmitted from the relative rotational position estimating module 52, or based on the relative rotational speed transmitted from a relative rotational speed calculating module 51 in addition to the relative rotational position. Then, the control module 53 outputs an operational instruction (e.g., a deceleration/acceleration instruction value) to the accelerating/decelerating module 60 based on the calculation.

The accelerating/decelerating module 60 is configured to accelerate/decelerate rotation(s) of an output shaft of the drive source 10 and/or the input shaft 200A and/or the output shaft 200B, so that a re-contact speed between the power transmission members in the controlled section S2 and/or a power transmitting torque at the time of re-contact is reduced.

Figure 4:
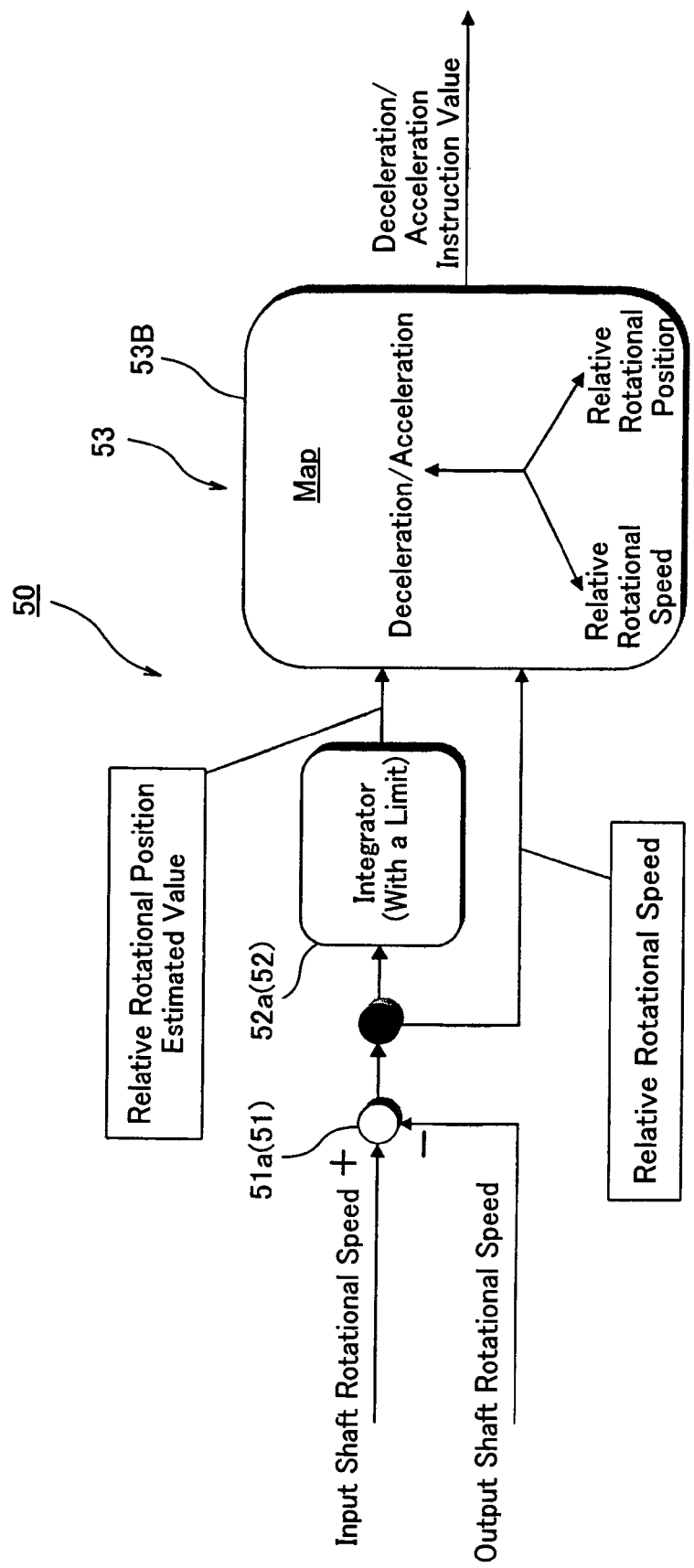
FIG. 4 is a control block diagram showing an example of a calculating device shown in FIG. 2.

FIG. 4 is a control block diagram showing a detailed example of the calculating device 50 shown in FIG. 2. In FIG. 4, the calculating device 50 is configured to include both the input shaft sensor and the output shaft sensor (see FIG. 3), and each sensor detects the rotational speed of the input shaft 200A and the rotational speed of the output shaft 200B, respectively. In FIG. 4, the relative rotational speed calculating module 51 (see FIG. 2) is shown as a differentiator 51a. The differentiator 51a is configured to calculate a difference between the input shaft rotational speed and the output shaft rotational speed (i.e., a relative rotational speed). The calculated relative rotational speed is transmitted to the control module 53, and also transmitted to the relative rotational position estimating module 52, which includes an integrator 52a in this embodiment. The integrator 52a estimates a relative rotational position by integrating the relative rotational speeds. The estimated relative rotational position is transmitted to the control module 53.

The control module 53 typically includes a map 53B which is used by the control logic 53A (see FIG. 2) as mentioned above. The map 53B stores the instruction value (deceleration/acceleration instruction value) corresponding to the relative rotational speed and the relative rotational position. Specifically, as shown in FIG. 3, the map 53B stores the deceleration/acceleration start timing corresponding to the relative rotational position. The map 53B further stores the amount of deceleration/acceleration and/or the deceleration/acceleration end timing corresponding to a relative rotational position between the input shaft and the output shaft, an input shaft rotational speed and/or an output shaft rotational speed, an increase/decrease rate (a derivative value) of the input shaft rotational speed and/or the output shaft rotational speed, a rotational speed difference between the input shaft rotational speed and the output shaft rotational speed, an increase/decrease rate (a derivative value) of the rotational speed difference between the input shaft rotational speed and the output shaft rotational speed, a throttle opening, an increase/decrease rate (a derivative value) of the throttle opening, etc.

The control module 53 calculates a deceleration/acceleration instruction value with reference to the map 53B, based on the relative rotational speed transmitted from the differentiator 51a and the relative rotational position estimated value transmitted from the integrator 52a, and outputs the calculated deceleration/acceleration instruction value to the accelerating/decelerating module 60 (see FIG. 2).

Typically, the total amount of the slack is invariable and, thus, it can be obtained beforehand. It may be desirable to constitute the integrator 52a (which is an example of the relative rotational position estimating module 52) with an integrator having an integration limit so that the integration value of the integrator 52a is restricted to a value corresponding to such amount of the slack and does not become an impossible instruction value. Moreover, a dead band may be added to an input portion of the integrator 52a so that integration may not be carried out when the relative rotational speed is very small.

In this embodiment, it is configured that the deceleration/acceleration instruction values over various relative rotational speeds and various relative rotational positions are calculated off-line and stored in the map 53B. However, for example, a predetermined simulation model (see FIGS. 40-42) may be provided in the control module 53, and the control module 53 may calculate the deceleration/acceleration instruction value in real time according to the simulation model.

Figure 5:
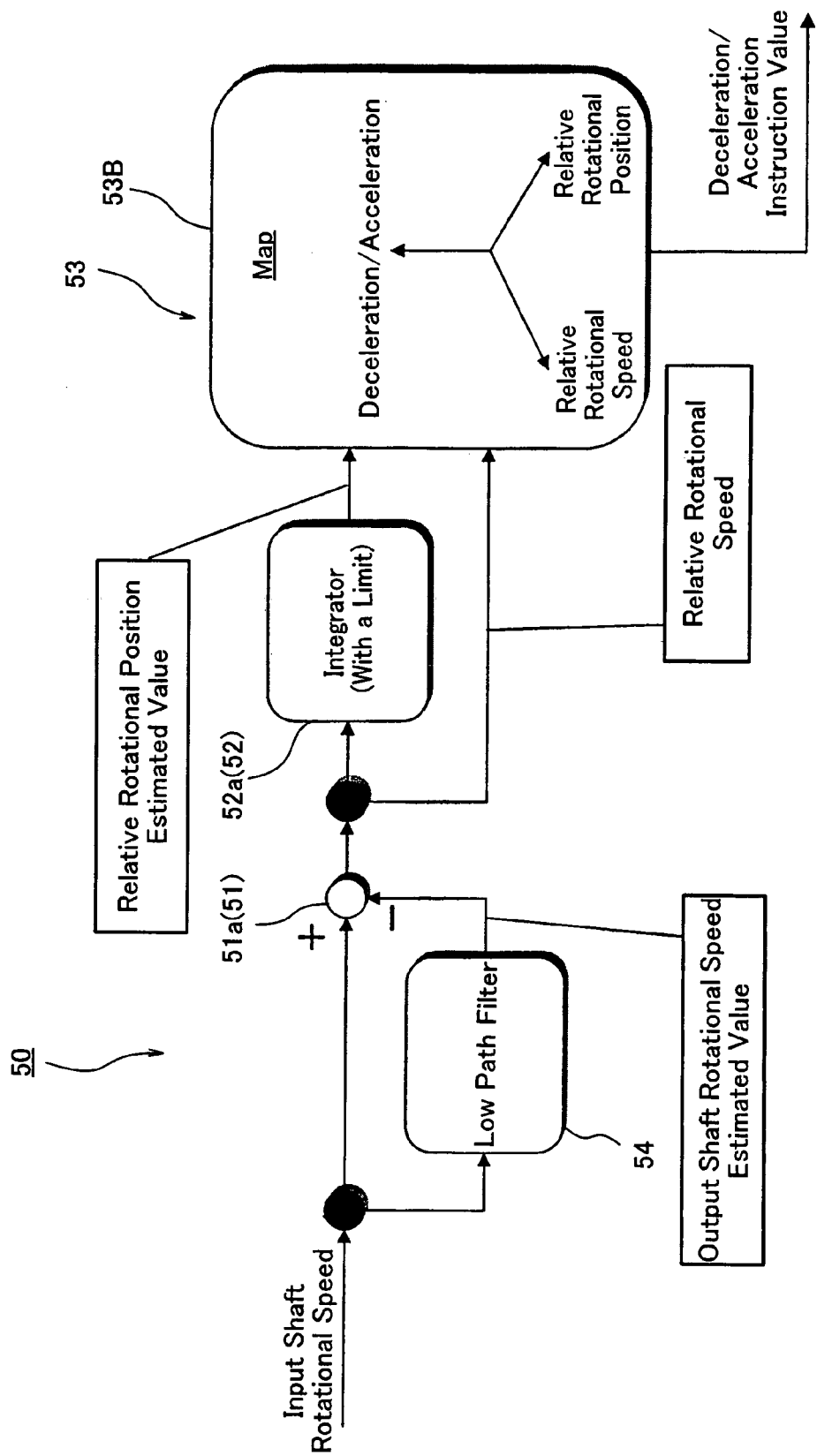
FIG. 5 is a control block diagram showing an example when using a value estimated from an input shaft rotational speed, as an output shaft rotational speed in the control system shown in FIG. 4.

If the calculating device 50 is not provided with an output shaft sensor as mentioned above, instead, the calculating device 50 may include a low-path filter 54 as shown in FIG. 5. The input shaft rotational speed which is given from the input shaft sensor (see FIG. 2) is transmitted to a differentiator 51a. The input shaft rotational speed is also transmitted to the low-path filter 54. Preferably, the low-path filter 54 may be of a large time constant so as to estimate the output shaft rotational speed from the input shaft rotational speed. The time constant of the low-path filter is selected from a range of 1-10 msec. The output shaft rotational speed estimated value which may be calculated by the low-path filter 54 is transmitted to the differentiator 51a, in the same manner as a detection is made for the output shaft rotational speed. Since the rest of the configurations and functions are similar to the embodiment shown in FIG. 4, similar reference numerals are assigned to similar portions and, thus, the explanation thereof is omitted.

1ST EMBODIMENT

FIG. 6 is a block diagram showing an example in which the calculating device 50 as shown in FIG. 4 is applied to a vehicle 90 which is equipped with an internal combustion engine 10a of forced-ignition type as the drive source 10. In FIG. 6, although the internal combustion engine 10a is shown as a reciprocal type internal combustion engine of a single cylinder, any other types of internal combustion engines may be utilized.

Typically, the internal combustion engine 10a includes a connecting rod 101. A lower end portion of the connecting rod 101 is coupled to a crank pin 102. A crankshaft 103a which continues from the crank pin 102 is connected with a clutch 202 through a primary transmission 201. The primary transmission 201 is coupled to a main shaft 204 which is an input shaft of the transmission device 203 with the clutch 202 therebetween.

Inside the transmission device 203, the main shaft 204 is provided with an input shaft accelerating/decelerating device 601, 1st-6th gears 205-210, and an input shaft sensor 401, from the side of the clutch 202. Also inside the transmission device 203, a drive shaft 211 which is an output shaft of the transmission device 203 is arranged in parallel with the main shaft 204. The drive shaft 211 is provided with an output shaft accelerating/decelerating device 602, 1st-6th gears 212-217, a drive sprocket 218, and an output shaft sensor 402, from the side of the clutch 202. In FIG. 6, the 1st-6th gears 205-210 on the main shaft 204 are always in a state in which they are mating with the 1st-6th gears 212-217 on the drive shaft 211, respectively.

The disposed locations of the input shaft sensor 401, the output shaft sensor 402, the input shaft accelerating/decelerating device 601, and the output shaft accelerating/decelerating device 602 may not be limited to the above configuration shown in FIG. 6. For example, if the main shaft 204 and the drive shaft 211 are the input shaft and the output shaft of the controlled section, respectively, those sensors 401, 402 and devices 601, 602 may be disposed in the arbitrary locations on the respective shaft.

The drive sprocket 218 is connected with the driven sprocket 220 through a chain 219. A secondary transmission device is constituted by the drive sprocket 218, the chain 219, and the driven sprocket 220. The driven sprocket 220 is coupled to a tire 302 through a coupling damper 301 provided inside the wheel 30.

In FIG. 6, a state in which the 2nd gear 213 and the 6th gear 217 on the drive shaft 211 are connected each other through a dog clutch 221 is shown.

A linear movement of the piston 100 generated by combustion of the internal combustion engine 10a is transformed into a rotational movement of the crankshaft 103a by the connecting rod 101, the crank pin 102, and the crankshaft 103a. The rotational movement is transmitted to the main shaft 204 through the primary transmission 201 and the clutch 202. Subsequently, the rotational force is transmitted to the drive shaft 211 through a combination of the 1st-6th gears 205-210 on the main shaft 204 and the 1st-6th gears 212-217 on the drive shaft 211 depending on the selected gear position. The rotational force is further transmitted to the drive sprocket 218, the chain 219, and the driven sprocket 220 in this order and, then, drives the wheel 30 (and the tire 302).

If the internal combustion engine 10a is not generating power, the rotational force from the tire 302 may be transmitted in the reversed direction along the power transmission path, to rotate the crankshaft 103a and, then, to move the piston 100, in the reversed manner.

In FIG. 6, the transmission device 203 surrounded with a thick dotted line is the controlled section. The input shaft sensor 401 is configured to detect a rotational speed of the main shaft 204 which is an input shaft and to transmit the detection result to the calculating device 50. The output shaft sensor 402 is configured to detect a rotational speed of the drive shaft 211 which is an output shaft and to transmit the detection result to the calculating device 50.

The throttle 110a (a throttle valve or throttle body) provided in an air-intake passage 104 of the internal combustion engine 10a is provided with a throttle opening sensor 403. The throttle opening sensor 403 is configured to detect a throttle opening and to transmit the detection result to the calculating device 50. A reference numeral 105 indicates an exhaust passage of the internal combustion engine 10a.

The calculating device 50 is connected with the input shaft accelerating/decelerating device 601 through a drive device 601a. The input shaft accelerating/decelerating device 601 is configured to accelerate/decelerate a rotation of the main shaft 204 which is an input shaft. The calculating device 50 is also connected with the output shaft accelerating/decelerating device 602 through a drive device 602*a*. The output shaft accelerating/decelerating device 602 is configured to accelerate/decelerate rotation of the drive shaft 211 which is an output shaft.

In this embodiment, the input shaft accelerating/decelerating device 601 and the output shaft accelerating/decelerating device 602 are electric motors, however, they may be any other actuators. If only one of the acceleration or deceleration is needed, it may also be possible to adopt an accelerator or a brake, for example. The calculating device 50 is also connected with a spark plug 603*a* of the internal combustion engine 10*a*.

The calculating device 50 performs a control according to the present invention based on the detection results respectively transmitted from the input shaft sensor 401, the output shaft sensor 402, and the throttle opening sensor 403. The control according to the present invention may include carrying out of a deceleration/acceleration of the input shaft accelerating/decelerating device 601 and the output shaft accelerating/decelerating device 602 by a current control, and the retard/advance (corresponding to deceleration/acceleration) of the internal combustion engine 10*a* by an ignition control of the spark plug 603*a*.

As mentioned above, the transmission device 203 surrounded with a thick dotted line in FIG. 6 is the controlled section in this embodiment. More particularly, a slack of the dog clutch 221 in the transmission device 203 will be focused hereafter and explained in detail as one example.

Figure 7A:
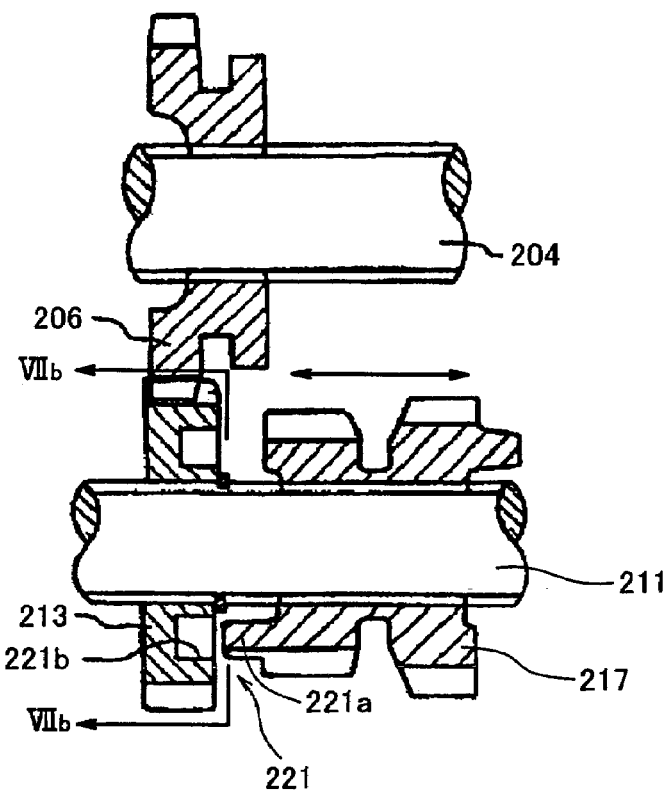
FIG. 7A is a sectional view showing an example of slack in a transmission device shown in FIG. 6.
Figure 7B:
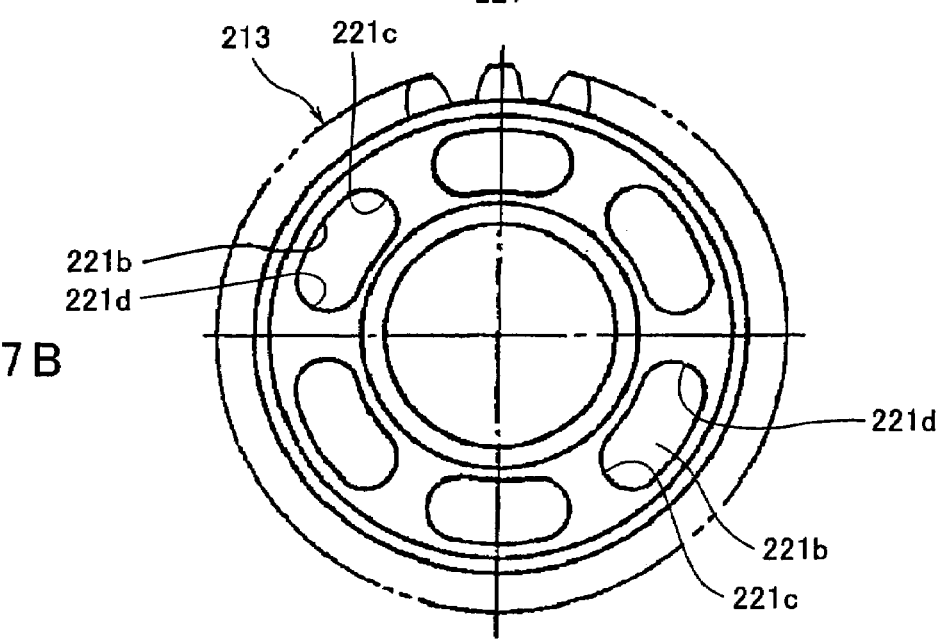
FIG. 7B is a VIIb-VIIb view of FIG. 7A.

FIG. 7A is a sectional view showing a configuration of the dog clutch 221 of FIG. 6, and FIG. 7B is a VIIb-VIIb view of FIG. 7A. In this embodiment, a power transmission is carried out through the 2nd gears 206, 213. The 2nd gear 206 is spline-coupled to the main shaft 204 so as to be axially movable. The 2nd gear 213, which mates with the 2nd gear 206, is loose-fitted onto the drive shaft 211 so that an axial movement thereof is restricted but rotation around the drive shaft 211 is free. The 6th gear 217 on the drive shaft 211 adjacent the 2nd gear 206 is spline-coupled to the drive shaft 211 so as to be axially movable, similar to the 2nd gear 206.

Typically, one of the transmission gears adjacent each other on the same shaft (here, the 2nd gear 213 and the 6th gear 217) is provided with a plurality of dog teeth 221*a* which protrude toward the adjacent gear on one side. As shown in FIG. 7A, the dog teeth 221*a* are formed on the 6th gear 217 and, typically, six in number may be provided in the circumferential direction on the opposing surface with the adjacent gear. On the other hand, corresponding dog holes 221*b* of the same number are typically formed on the adjacent gear (here, the 2nd gear 213), in the positions corresponding to dog teeth 221*a*.

The rotational force of the main shaft 204 is transmitted to the 2nd gear 206 which is spline-coupled to the main shaft 204. The 2nd gear 206 transmits its rotation to the 2nd gear 213 on the drive shaft 211 which mates with the 2nd gear 206, with a rotation speed according to the gear ratio therebetween. In a state in which the dog teeth 221*a* of the 6th gear 217 are not engaged with the dog holes 221*b* of the 2nd gear 213 as shown in FIG. 7A, the 2nd gear 213 only freely rotates around the drive shaft 211, and does not transmit the rotation to the drive shaft 211. In this embodiment, when the 6th gear 217 which is spline-coupled to the same drive shaft 211 engages the dog teeth 221*a* with the dog holes 221*b* of the 2nd gear 213, the rotation of the 2nd gear 213 is transmitted to the drive shaft 211 through the 6th gear 217 and, thus, it shifts gear into the 2nd gear position.

The operation of the 6th gear 217 is performed by a transmission operation mechanism which typically includes a shift fork (not illustrated).

Although only the example of the 2nd gear has been described in this embodiment, the same is true for other transmission gears. Thus, in this embodiment, transmission gears which are spline-coupled to the respective shaft are shown with arrows of the left and right directions in FIG. 6, and explanation of the function is therefore omitted. Typically, the dog holes 221*b* are slightly larger than the dog teeth 221*a* so that they easily engage with each other, thereby providing a slack therebetween. Within the slack, each of the dog teeth 221*a* is movable in the rotational direction inside the dog holes 221*b*, when they are engaged.

Also referring to FIG. 6, for example, if the vehicle 90 is in a steady traveling state with a constant traveling speed after acceleration, a power generated by the internal combustion engine 10*a* is transmitted from upstream to downstream in the power transmission path, and rotates the tire 302. At this time, each of the dog teeth 221*a* of the 6th gear 217 is in contact with one end portion 221*c* of the dog hole 221*b* of the 2nd gear 213 in the rotational direction.

As may be seen from FIG. 7B, the dog tooth 221*a* moves between the one end portion 221*c* and the other end portion 221*d*. The state in which one-side surfaces of the dog tooth 221*a* and dog hole 221*b* after acceleration of the vehicle but before deceleration is in contact with each other is defined as a "contact (state) to accelerating side" or "accelerating side contact state." In this case, the one end portion 221*c* is the one-side surface of the dog hole 221*b*.

From this state, for example, when the throttle 110*a* is closed and the vehicle 90 decelerates by an engine brake, each dog tooth 221*a* of the 6th gear 217 separates from the one dog hole end portion 221*c* of the dog holes 221*b* of the corresponding 2nd gear 213, and moves toward the opposing other dog hole end portion 221*d* in a rotational direction, which range of the movement correspond to an amount of the slack between the dog teeth 221*a* and the dog holes 221*b*. In due course, each of the dog teeth 221*a* re-contacts with the respective dog hole end portion 221*d* on the other side of the dog hole 221*b*, with the rotational speed difference (that is, a relative rotational speed) between the 2nd gear 213 and the 6th gear 217 at the time. This state in which the other-side surfaces of the dog tooth 221*a* and dog hole 221*b* after deceleration of the vehicle but before acceleration is in contact with each other is defined as a "contact (state) to decelerating side" or "decelerating side contact state."

A shock at the time of re-contact depends on the relative rotational speed and the transmitting torque at the time of re-contact. The shock is transmitted throughout the vehicle as a deceleration shock, and brings an operator/passenger discomfort.

Further from the above decelerating state, if the vehicle accelerates by opening the throttle 110*a*, a rotational speed of the crankshaft 103*a* of the internal combustion engine 10*a* increases and, then, the rotational speed of the 2nd gear 213 also increases as described above. Thus, a rotational speed difference is again generated between the 2nd gear 213 and the 6th gear 217. Then, the dog teeth 221*a* of the 6th gear 217 separate from the other dog hole end portion 221*d* of the dog holes 221*b* of the corresponding 2nd gear 213, and move back toward the original dog hole end portion 221*c*. In due course, the dog teeth 221*a* re-contact with the original dog hole end portion 221*c*, with the rotational speed difference (that is, a relative rotational speed) between the 2nd gear 213 and the 6th gear 217 at the time. A shock at the time of re-contact depends on the relative rotational speed and the transmitting torque at the time of re-contact. The shock is transmitted throughout the vehicle as an acceleration shock, and brings an operator/passenger discomfort.

In this embodiment, an acceleration and deceleration shock are reduced by making the relative rotational speed and/or the transmitting torque at the time of re-contact as small as possible. The rotational speed of the 2nd gear 213 may be calculated by detecting the rotational speed of the 2nd gear 206 on the main shaft 204, which mates with the 2nd gear 213. The rotational speed of the 2nd gear 206 is detected by the input shaft sensor 401. The rotational speed is multiplied by a gear ratio between the 2nd gear 213 and the 2nd gear 206. In addition, the rotational speed of the 6th gear 217 may be detected by the output shaft sensor 402 as the rotational speed of the drive shaft 211.

The detected rotational speeds of the 2nd gear 213 (or the 2nd gear 206) and the 6th gear 217 are transmitted to the calculating device 50. The calculating device 50 calculates the rotational speed of the 2nd gear 213 from the rotational speed of the 2nd gear 206, if necessary, and then calculates a rotational speed difference between the 2nd gear 213 and the 6th gear 217 (that is, a relative rotational speed). The calculating device 50 estimates a relative rotational position between the 2nd gear 213 and the 6th gear 217 by integrating the relative rotational speeds.

The definite amount of the slack (that is, the amount of movement of the dog teeth 221a in the dog holes 221b in the rotational direction) may be measured beforehand. Such information is stored in a memory (not illustrated) in the calculating device 50, for example.

Thereby, the calculating device 50 calculates a timing of re-contact between the dog teeth 221a and the dog holes 221b, and a relative rotational speed at the time of re-contact, based on the relative rotational speed and the relative rotational position. When the relative rotational speed is not changed or at least can be assumed as such throughout from separation to the re-contact of the dog teeth 221a and the dog holes 221b (transition), the relative rotational speed at the time of re-contact may also be assumed as the relative rotational speed at the time of detection.

However, if it is further decelerated or the throttle is opened during the transition, the relative rotational speed changes. Thus, it may be configured to detect an amount of the deceleration, a throttle opening, etc. to compensate the timing of re-contact and the relative rotational speed at the time of re-contact calculated as mentioned above, in order to calculate the relative rotational speed at the time of re-contact more precisely. Although only the throttle opening sensor 403 is disclosed in FIG. 6, a sensor configured to detect an amount of the deceleration of the vehicle 90 may also be utilized instead of the throttle opening sensor 403.

In correspondence with the timing of re-contact and the relative rotational speed at the time of re-contact which may be calculated as described above, the calculating device 50 determines a retard/advance start timing, an amount of retard/advance, and a retard/advance end time of the ignition device of the engine (corresponding to the deceleration/acceleration start timing, the amount of the deceleration/acceleration, the deceleration/acceleration end timing, as shown in FIG. 3, respectively), and controls an ignition timing of the spark plug 603a by controlling a power supply to the ignition coil (not illustrated).

The calculating device 50 may help to ease the deceleration shock by increasing the rotational speed or the transmission torque at the time of re-contact upon the timing at which the deceleration shock is expected. Likewise, the calculating device 50 may also help to ease the acceleration shock by decreasing the rotational speed or the transmission torque at the time of re-contact upon the timing at which the acceleration shock is expected.

Similarly, the calculating device 50 may also be configured to adjust the current supplied to the accelerating/decelerating devices 601, 602 by controlling the drive devices 601a and 602a based on the determined, deceleration/acceleration start timing, amount of the deceleration/acceleration, deceleration/acceleration end timing, etc., instead of the ignition control as described above. Especially in this case, since the control of both the main shaft 204 which is an input shaft and the drive shaft 211 which is an output shaft are possible, a better control response may be realized.

In this embodiment, for the sake of simplicity, it is configured such that the timing of re-contact and the relative rotational speed at the time of re-contact are obtained separately. However instead, as described above the deceleration/acceleration start timing, the amount of deceleration/acceleration, the deceleration/acceleration end timing, etc. corresponding to the relative rotational speed and the relative rotational position which are being detected may be provided as a map (refer to FIG. 3 or FIG. 5). Further instead, operational equations may be used to achieve similar functions and effects.

In this embodiment, as shown in FIG. 6, it has been described as a control which particularly concerns the slack inside the transmission device 203, that is, more particularly concerns the slack of the dog clutch. This control may also be applied to a backlash between the transmission gears being mated, and a slack of splines between the transmission gears and the shaft, etc. Further, the control may be applied to, for example, a slack in the primary transmission device 201, a slack between the chain 219 and the drive sprockets 218, 220, a slack of the chain 219, a slack of the coupling damper 301, etc. and, thus, to any slacks in the power transmission path. Once the intended slack is selected, an input shaft/output shaft sensor and an accelerating/decelerating device are arranged in positions corresponding to the slack.

Figure 8A:
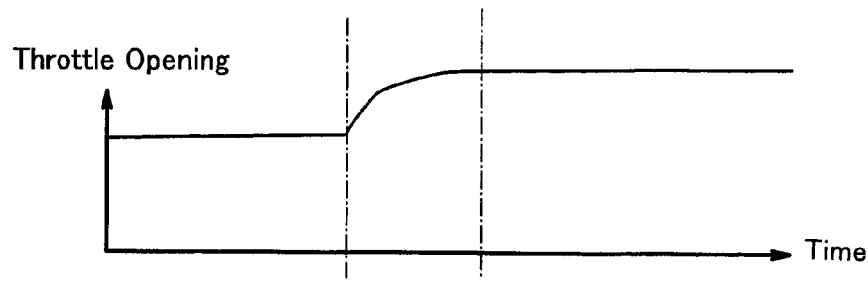
FIG. 8A is a graph for explaining effects of the control according to a method of the 1st Embodiment of the present invention, showing a change in a throttle opening on y-axis with respect to time on x-axis.
Figure 8B:
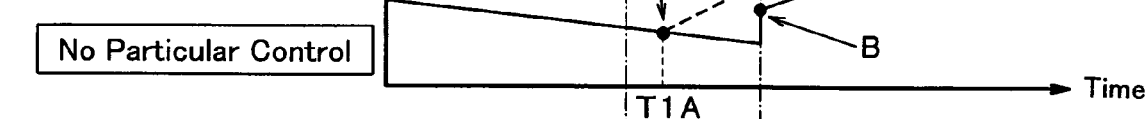
FIG. 8B is a corresponding graph of FIG. 8A, showing a change in rotational speeds of the input shaft and the output shaft when a particular control is not carried out.
Figure 8C:
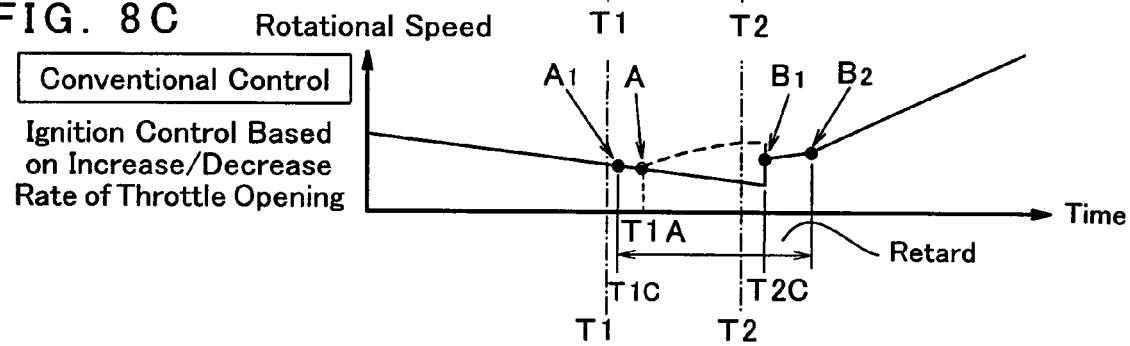
FIG. 8C is a corresponding graph of FIG. 8A, showing a change in rotational speeds of the input shaft and the output shaft when a conventional ignition retard control based on an increase/decrease rate of throttle opening is carried out.
Figure 8D:
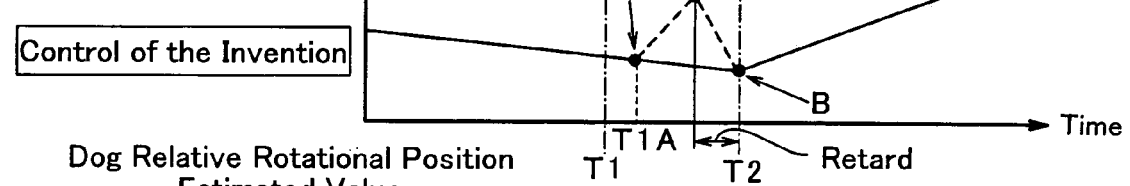
FIG. 8D is a corresponding graph of FIG. 8A, showing a change in rotational speeds of the input shaft and the output shaft when a control according to the present invention is carried out.
Figure 8E:
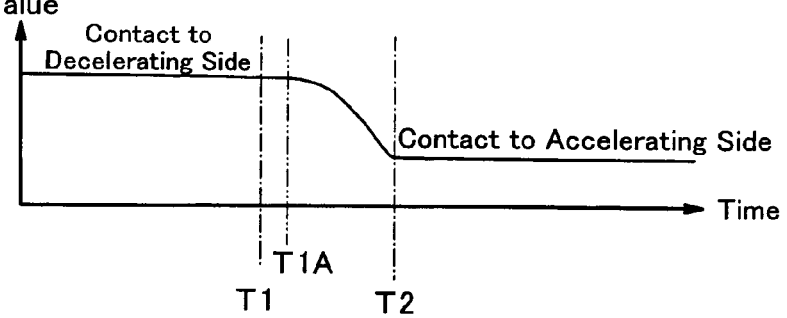
FIG. 8E is a corresponding graph of FIG. 8A, showing a change in an estimated value of a dog relative rotational position.

Next, effects of the control according to the 1st Embodiment of the present invention will be explained referring to FIGS. 8A-8E. FIG. 8A is a graph for showing a change in the throttle opening on y-axis with respect to time on x-axis. FIG. 8B is a corresponding graph of FIG. 8A, showing a change in the rotational speeds of the input shaft and the output shaft, when a particular control is not carried out. FIG. 8C is a corresponding graph of FIG. 8A, showing a change in the rotational speeds of the input shaft and the output shaft when a conventional ignition retard control based on an increase/decrease rate of throttle opening is carried out. FIG. 8D is a corresponding graph of FIG. 8A, showing a change in the rotational speeds of the input shaft and the output shaft when the control according to this embodiment is carried out. FIG. 8E is a corresponding graph of FIG. 8A, showing a change in an estimated value of a dog relative rotational position (corresponding to the estimated value of the relative rotational position).

Here, a condition in which the vehicle is accelerated by opening the throttle from being decelerating is assumed. A time sequential change in the rotational speeds of the input shaft and the output shaft by each control under this condition will be explained hereinbelow.

In this example, a constant deceleration is performed up to a time T1, and as the change in the throttle opening is shown in FIG. 8A, the throttle is opened so as to accelerate the input shaft from the time T1. Further, as the change in the dog clutch relative rotational position estimated value is shown in FIG. 8E, the dog clutch begins to move within the range of slack from the decelerating side at a time T1A which is slightly later than the time T1, and the dog clutch re-contacts with the accelerating side at a time T2.

As a change in the rotational speed when a particular control is not carried out is shown in FIG. 8B, both the rotational speeds of the input shaft and the output shaft are decreasing first and, only the input shaft rotational speed (shown with a dotted line in FIG. 8B) begins to increase in connection with the opening of the throttle from the time T1A (at a point A). Then, the input shaft rotational speed decreases in accordance with the re-contact at the time T2 and, contrary at the same time, the output shaft rotational speed increases (at a point B), and the rotational speeds of both the input shaft and the output shaft increase together thereafter.

Next, rotational speeds under the conventional control are shown in FIG. 8C. At the beginning, the rotational speeds of the input shaft and the output shaft decrease together until the time T1A, similar to when no particular control is carried out as mentioned above. Then, the conventional ignition retard control is performed from the time TIC which is earlier than the time T1A (at a point A1). However, the start timing of the control is too early, and the increase in the input shaft rotational speed (shown with a dotted line in FIG. 8C) is too slow. Thus, the re-contact begins at a time T2C which is later than the time T2. In this condition, since it takes too much time until the completion of re-contact, the increase in the rotational speeds of both the input shaft and the output shaft become too late (at a point B2). In addition, the shock at the time T2C remains (at a point B1).

Next, rotational speeds under the control according to the present invention (particular in this case, a deceleration control) is shown in FIG. 8D. At the beginning, the rotational speeds of the input shaft and the output shaft decrease until the time T1A, similar to those of the conventional control described above, yet the control according to the present invention is not started at the time T1A. Upon the opening the throttle from the time T1A, only the input shaft rotational speed (shown with a dotted line in FIG. 8D) begins increasing, similar to when no particular control is carried out (at the point A). However, later, the control according to the present invention which is based on the dog relative rotational position estimated value is started (at a point C). This control decreases the input shaft rotational speed so that there is almost no relative rotational speed between the input shaft and the output shaft at the completion of re-contact (at the point B). In order to shorten the time necessary for the control, the point C may be set as late as possible so that the point C is closer to the point B, and after the point C, braking may be applied so as to rapidly decrease the input shaft rotational speed.

The deceleration control is defined as a control of the input shaft to decelerate so that the rotational speed of the input shaft matches with the rotational speed of the output shaft. Contrary, an acceleration control is defined as a control of the input shaft to accelerate so that the rotational speed of the input shaft matches with the rotational speed of the output shaft.

Figure 9A:
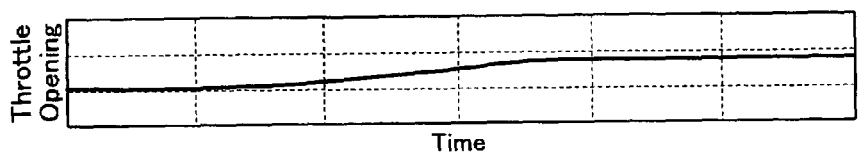
FIG. 9A is a graph showing results of a chassis test when no particular control such as of the present invention is carried out, showing a change in a throttle opening on y-axis with respect to time on x-axis.
Figure 9B:
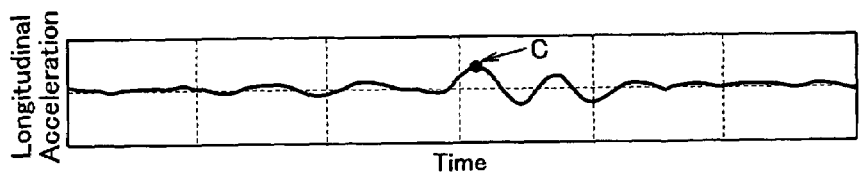
FIG. 9B is a corresponding graph of FIG. 9A, showing a change in a longitudinal acceleration of the vehicle body.
Figure 9C:
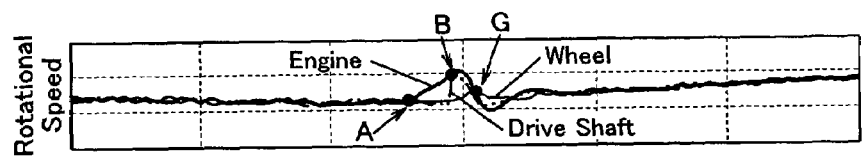
FIG. 9C is a corresponding graph of FIG. 9A, showing a change in a rotational speed (where the thick line indicates an engine speed (i.e., an input shaft rotational speed), the two-dot chain line indicates a converted value of a rotational speed of a drive shaft (i.e., an output shaft rotational speed) so as to be equivalent to the engine speed considering the gear ratio, and the thin line indicates a converted value of a rotational speed of a wheel so as to be equivalent to the engine speed considering the gear ratio, respectively)
Figure 9D:
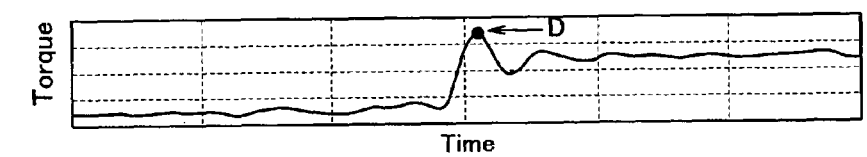
FIG. 9D is a corresponding graph of FIG. 9A, showing a change in a torque of the drive shaft.
Figure 9E:
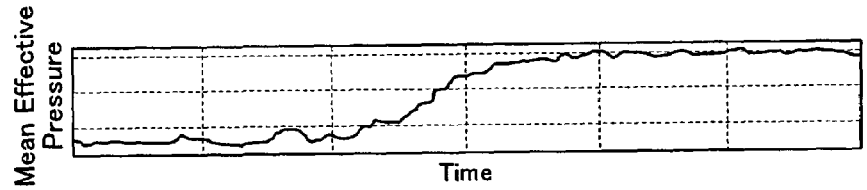
FIG. 9E is a corresponding graph of FIG. 9A, showing a change in an average effective pressure in an internal combustion engine cylinder (here, the internal combustion engine is of four-cylinder, and the average effective pressure is an average value of four cylinders)
Figure 9F:
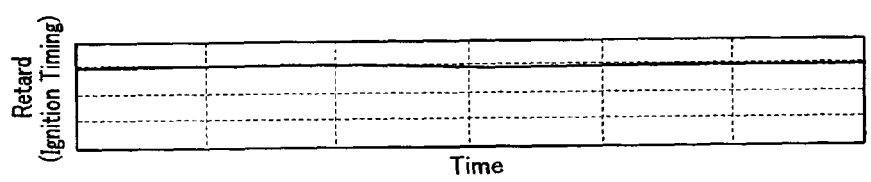
FIG. 9F is a corresponding graph of FIG. 9A, showing a change in an ignition retard amount.
Figure 9G:
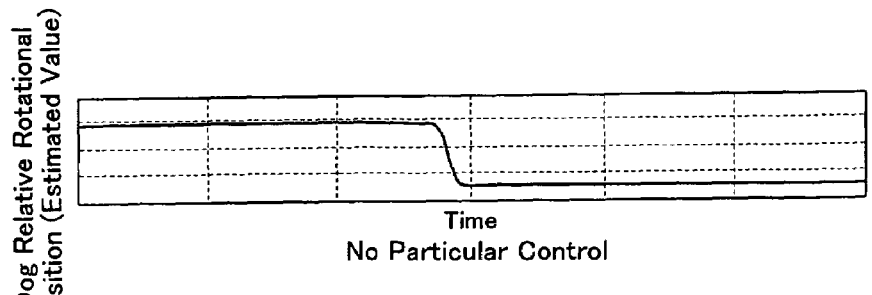
FIG. 9G is a corresponding graph of FIG. 9A, showing a change in a dog relative rotational position (estimated value)

Next, results of a chassis test when no particular control is carried out will be explained referring to FIGS. 9A-9G. FIG. 9A is a graph showing a change in the throttle opening on y-axis with respect to time on x-axis. FIG. 9B is a corresponding graph of FIG. 9A, showing a change in a longitudinal acceleration of the vehicle body. FIG. 9C is a corresponding graph of FIG. 9A, showing a change in rotational speeds. In FIG. 9C, a thick line indicates an engine speed (i.e., an input shaft rotational speed), a two-dot chain line indicates a converted value of a rotational speed of the drive shaft (i.e., an output shaft rotational speed) so as to be equivalent to the engine speed considering the gear ratio, and a thin line indicates a converted value of a rotational speed of a wheel so as to be equivalent to the engine speed considering the gear ratio. FIG. 9D is a corresponding graph of FIG. 9A, showing a change in a torque of the drive shaft. FIG. 9E is a corresponding graph of FIG. 9A, showing a change in an average effective pressure in an internal combustion engine cylinder. Here, the internal combustion engine is four-cylinder, and the average effective pressure is an average value of four cylinders. FIG. 9F is a corresponding graph of FIG. 9A, showing a change in an ignition retard amount. FIG. 9G is a corresponding graph of FIG. 9A, showing a change in a dog relative rotational position (estimated value).

In this test, time sequential changes of each data when accelerating the vehicle by opening the throttle are measured. As shown in FIGS. 9A and 9C, following the opening of the throttle, the engine speed (that is, the input shaft rotational speed) begins to increase (at a point A). After that, the rotational speed of the drive shaft (that is, the output shaft rotational speed) also increases rapidly upon the re-contact of the dog clutch and, thus, the re-contact is completed (at a point B). As shown in FIGS. 9B and 9D, it can be seen that peaks arise to the longitudinal acceleration and the torque of the drive shaft and, thus, an acceleration shock is occurred (at points C and D). In addition to this, as shown in FIG. 9C, it can be seen that an acceleration shock is occurred also to the wheel (at a point G).

FIGS. 10A-10G are graphs showing results of a chassis test when the control according to the present invention is carried out. Other test conditions and data parameters and a manner of displaying the graph are the same as that of FIGS. 9A-9G in which no particular control is carried out. Thus, detailed explanations thereof will be omitted.

Figure 10A:
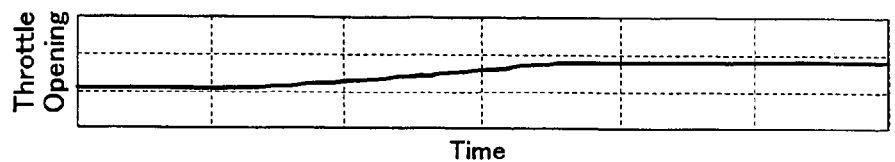
FIG. 10A is a graph showing results of the chassis test when the control according to the 1st Embodiment of the present invention is carried out, showing a change in a throttle opening on y-axis with respect to time on x-axis.
Figure 10B:
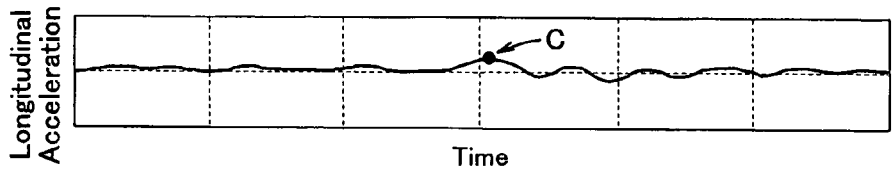
FIG. 10B is a corresponding graph of FIG. 10A, showing a change in a longitudinal acceleration of the vehicle body.
Figure 10C:
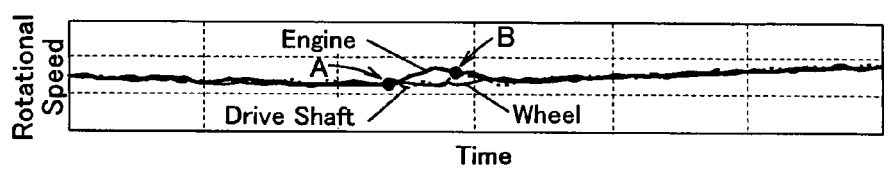
FIG. 10C is a corresponding graph of FIG. 10A, showing a change in a rotational speed (where the thick line indicates an engine speed (i.e., an input shaft rotational speed), the two-dot chain line indicates a converted value of a rotational speed of a drive shaft (i.e., an output shaft rotational speed) so as to be equivalent to the engine speed considering the gear ratio, and the thin line indicates a converted value of a rotational speed of a wheel so as to be equivalent to the engine speed considering the gear ratio, respectively)
Figure 10D:
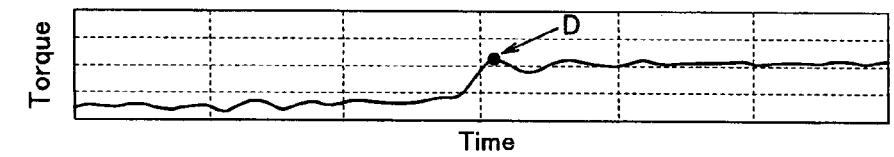
FIG. 10D is a corresponding graph of FIG. 10A, showing a change in a torque of the drive shaft.
Figure 10E:
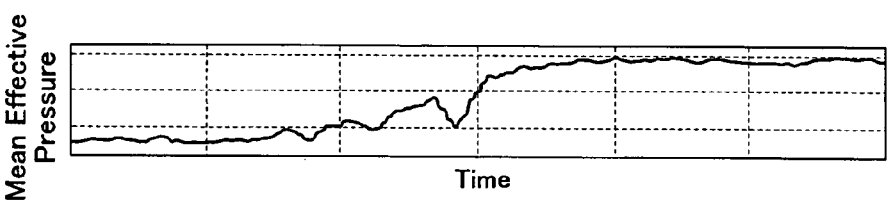
FIG. 10E is a corresponding graph of FIG. 10A, showing a change in an average effective pressure in an internal combustion engine cylinder (here, the internal combustion engine is of four-cylinder, and average effective pressure is an average value of four cylinders)
Figure 10F:
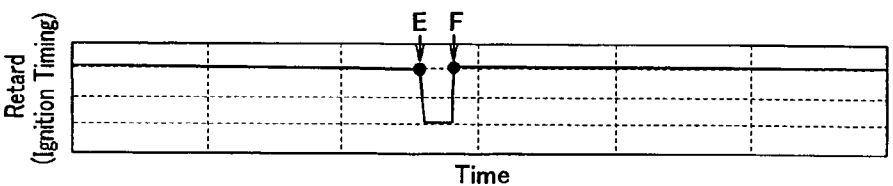
FIG. 10F is a corresponding graph of FIG. 10A, showing a change in an ignition retard amount.
Figure 10G:
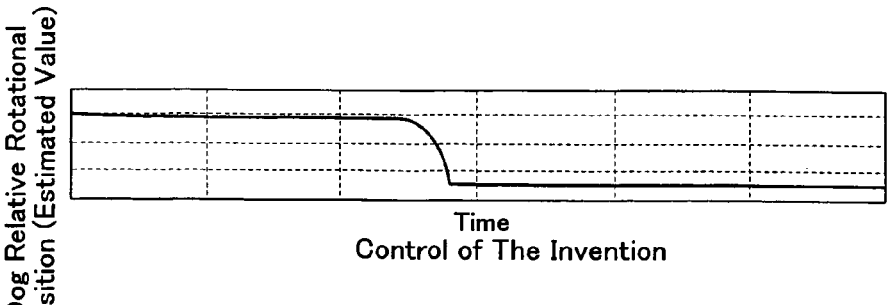
FIG. 10G is a corresponding graph of FIG. 10A, showing a change in a dog relative rotational position (estimated value)

When the control according to the present invention is carried out, as shown in FIGS. 10A and 10C, following the opening of the throttle, the engine speed (that is, the input shaft rotational speed) begins to increase (at a point A). Then, the control is started at a point E of FIG. 10F, when the dog relative rotational position (estimated value) begins to shift as shown in FIG. 10G The control is ended in a relatively short time from the start of the control (at a point F). According to the control, the relative rotational speed of the dog clutch become small when the timings of the points F and B are matched, that is, when the dog clutch re-contacts as shown in FIG. 10G (at the point F in FIG. 10F). In addition, as shown in FIG. 10E, the average effective pressure at this point is also small. As shown in FIGS. 10B and 10D, it can be seen that no large peak is occurred to the longitudinal acceleration and the torque of the drive shaft and, thus, the acceleration shock is reduced (at points C and D). As shown in FIG. 10C, the acceleration shock of the wheel is also reduced and a recognizable peak is no longer seen. Moreover, the time from the acceleration start point at which the throttle is begun to open (at a point A) until the start of the acceleration of the drive shaft (output shaft) after the dog clutch re-contacts (at a point B) is also shortened compared with the conventional control (FIG. 8B), and an increasing in the acceleration time lag is reduced.

Figure 11A:
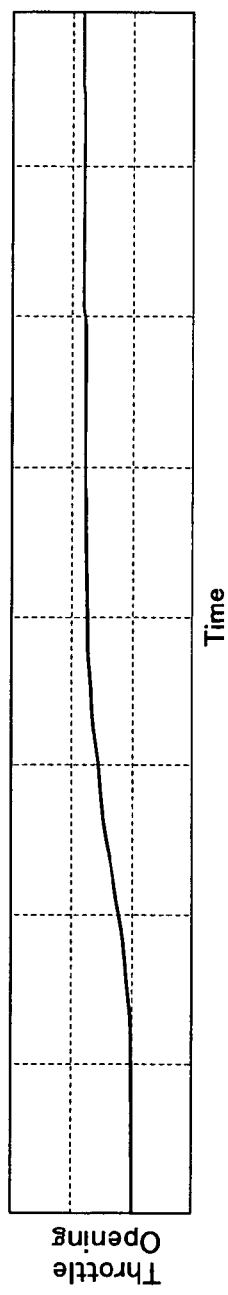
FIG. 11A is a graph showing results of a real vehicle run test when no particular control such as of the present invention is carried out, showing a change in a throttle opening on y-axis with respect to time on x-axis.
Figure 11B:
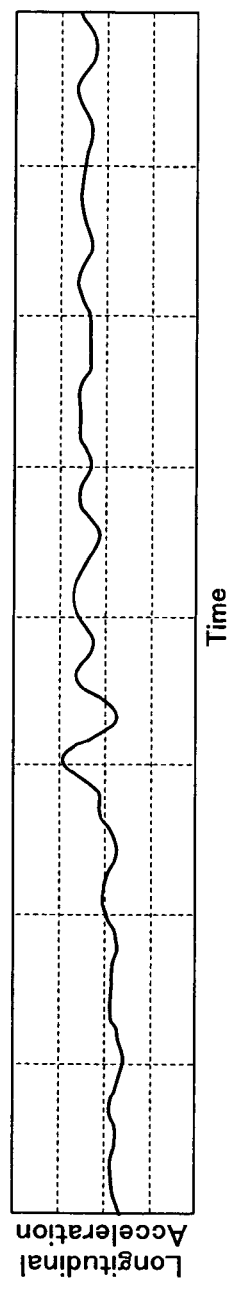
FIG. 11B is a corresponding graph of FIG. 11A, showing a change in a longitudinal acceleration of the vehicle body.
Figure 11C:
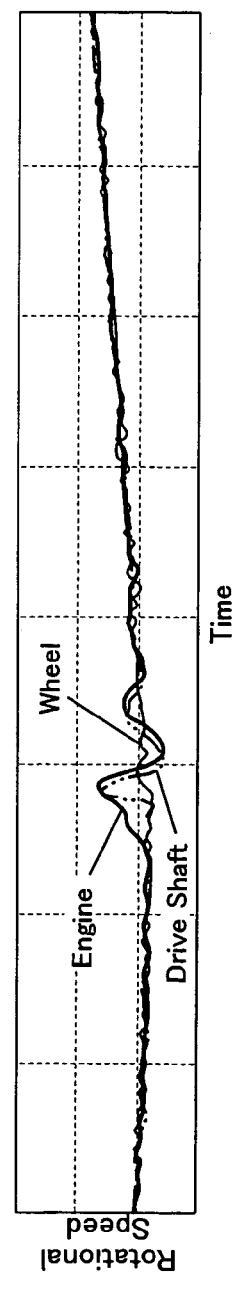
FIG. 11C is a corresponding graph of FIG. 11A, showing a change in a rotational speed (where the thick line indicates an engine speed (i.e., an input shaft rotational speed), the two-dot chain line indicates a converted value of a rotational speed of a drive shaft (i.e., an output shaft rotational speed) so as to be equivalent to the engine speed considering the gear ratio, and the thin line indicates a converted value of a rotational speed of a wheel so as to be equivalent to the engine speed considering the gear ratio, respectively)
Figure 11D:
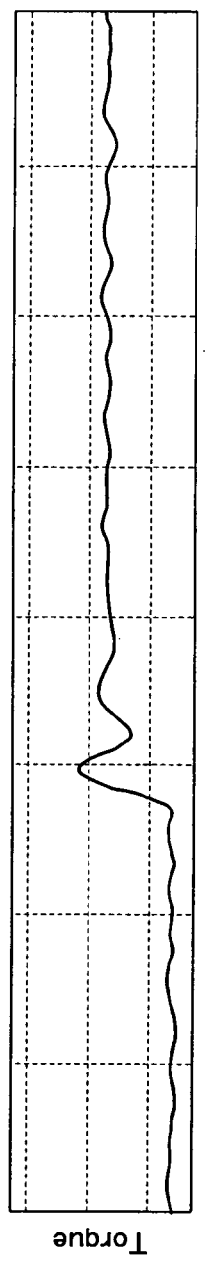
FIG. 11D is a corresponding graph of FIG. 11A, showing a change in a torque of the drive shaft.

Next, results of a real vehicle run test will be explained referring to FIGS. 11A-11D which are graphs showing results of a test when no particular control is carried out. FIG. 11A is a graph showing a change in a throttle opening on y-axis with respect to time on x-axis. FIG. 11B is a corresponding graph of FIG. 11A, showing a change in a longitudinal acceleration of the vehicle body. FIG. 11C is a corresponding graph of FIG. 11A, showing a change in rotational speeds. In FIG. 11A, a thick line indicates an engine speed (i.e., an input shaft rotational speed), a two-dot chain line indicates a converted value of a rotational speed of the drive shaft (i.e., an output shaft rotational speed) so as to be equivalent to the engine speed considering the gear ratio, and a thin line indicates a converted value of a rotational speed of a wheel so as to be equivalent to the engine speed considering the gear ratio. FIG. 11D is a corresponding graph of FIG. 11A, showing a change in a torque of the drive shaft.

Also in the test, a time sequential change in each data when accelerating the vehicle by opening the throttle is measured. As shown in FIGS. 11B and 11D, similar to the chassis test, it shows large peaks both for the longitudinal acceleration of the vehicle body and the torque of the drive shaft (output shaft) and, thus, shows a large acceleration shock.

FIGS. 12A-12D are graphs showing results of the real vehicle run test when the control according to the present invention is carried out. Other test conditions and data parameters and a manner of displaying the graph are the same as that of FIGS. 11A-11D in which no particular control is carried out. Thus, detailed explanations thereof will be omitted.

Figure 12A:
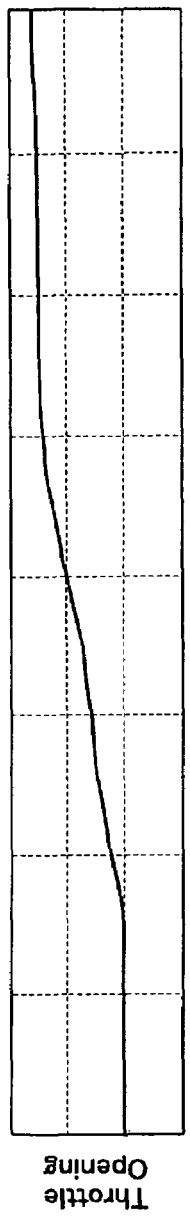
FIG. 12A is a graph showing the results of a real vehicle run test when the control according to the 1st Embodiment of the present invention is carried out, showing a change in a throttle opening on y-axis with respect to time on x-axis.
Figure 12B:
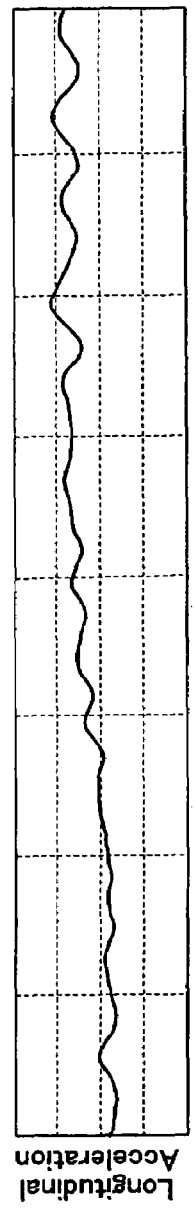
FIG. 12B is a corresponding graph of FIG. 12A, showing a change in a longitudinal acceleration of the vehicle body.
Figure 12C:
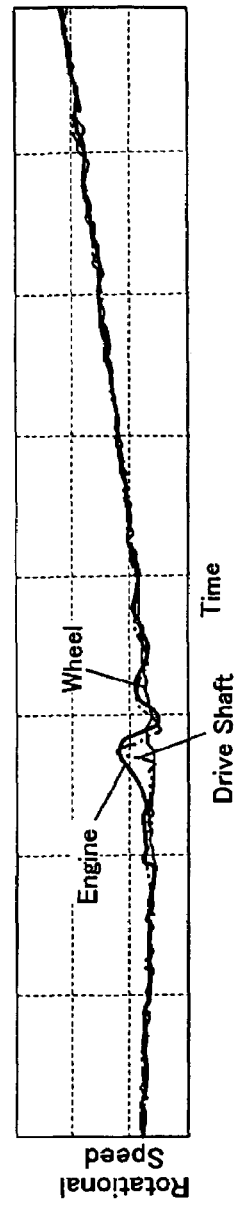
FIG. 12C is a corresponding graph of FIG. 12A, showing a change in a rotational speed (where the thick line indicates an engine speed (i.e., an input shaft rotational speed), the two-dot chain line indicates a converted value of a rotational speed of a drive shaft (i.e., an output shaft rotational speed) so as to be equivalent to the engine speed considering the gear ratio, and the thin line indicates a converted value of a rotational speed of a wheel so as to be equivalent to the engine speed considering the gear ratio, respectively)
Figure 12D:
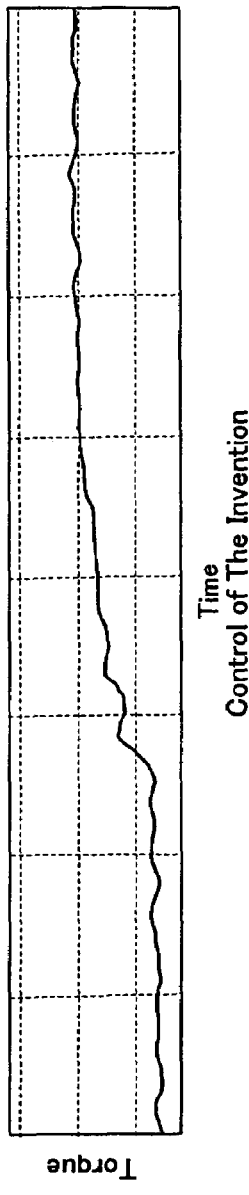
FIG. 12D is a corresponding graph of FIG. 12A, showing a change in a torque of the drive shaft.

When the control according to the present invention is carried out, as shown in FIGS. 12B and 12D, similar to the chassis test, it shows peaks for both the longitudinal acceleration of the vehicle body and the torque of the drive shaft (output shaft) and, thus, shows that a smooth acceleration is realized.

2ND EMBODIMENT

FIG. 13 is a block diagram showing an example in which the calculating device 50 as shown in FIG. 4 is applied to the vehicle 90 which is equipped with an electric motor 10b as the drive source 10. The electric motor 10b is connected with the clutch 202 through the primary transmission 201 at one end of the motor output shaft 103b. Further downstream configuration of the power transmission path is similar to the 1st Embodiment shown in FIG. 6 and, therefore, explanations of the other configurations and functions thereof will be omitted with similar reference numerals being designated to similar portions.

Also in this embodiment, the transmission device 203 surrounded with a thick dotted line in FIG. 13 is designated as the controlled section. The input shaft sensor 401 detects a rotational speed of the main shaft 204 which is the input shaft of the controlled section and transmits a detection result to the calculating device 50. The output shaft sensor 402 detects a rotational speed of the drive shaft 211 which is the output shaft of the controlled section and transmits a detection result to the calculating device 50.

The electric motor 10b is provided with a potentiometer 110b which is configured to adjust supply current to the electric motor 10b by giving an instruction to the drive device 603b. In addition, the potentiometer 110b transmits an information corresponding to the supply current to the calculating device 50.

The calculating device 50 is connected with the input shaft accelerating/decelerating device 601 which accelerates/decelerates the rotation of the main shaft 204 (which is the input shaft) through the drive device 601a. The calculating device 50 is connected with the output shaft accelerating/decelerating device 602 which accelerates/decelerates the rotation of the drive shaft 211 (which is the output shaft) through the drive device 602a. In this embodiment, the input shaft accelerating/decelerating device 601 and the output shaft accelerating/decelerating device 602 are electric motors, but any other actuators may be utilized. If only one of acceleration or deceleration is intended, for example, an accelerator, a brake, etc. may be utilized. The calculating device 50 is also connected with the drive device 603b configured to adjust a current supply to the electric motor 10b which is the drive source 10.

The calculating device 50 performs the control according to the present invention based on the detection results given from the input shaft sensor 401 and the output shaft sensor 402, and the information corresponding to the supply current from the potentiometer 110b. The calculating device 50 carries out a deceleration/acceleration of the input shaft and the output shaft by controlling current to the input shaft accelerating/decelerating device 601 and the output shaft accelerating/decelerating device 602, as well as a deceleration/acceleration of the motor 10b by controlling current to the drive device 603b.

Also referring to FIGS. 7A and 7B, for example, if the vehicle 90 are in a steady traveling state (for example, traveling at a constant speed), a power generated by the electric motor 10b is transmitted in the power transmission path as mentioned above from upstream to downstream, and rotates the tire 302. At this time, for example, the dog teeth 221a of the 6th gear 217 are in contact with the one-end portions (for example, the dog hole end-portions 221c in FIG. 7B on the accelerating side) in the rotational direction of the dog holes 221b of the corresponding 2nd gear 213.

From this state, for example, when the drive device 603b detects a deceleration instruction from the potentiometer 110b, the electric motor 10b generates a torque in the deceleration direction. Then, as the vehicle 90 decelerates, each of the dog teeth 221a of the 6th gear 217 separates from the acceleration-side dog hole end portion 221c of the respective dog hole 221b of the corresponding 2nd gear 213, and moves in the rotational direction within the dog hole 221b to the other dog hole end portion 221d on the opposite side, that is decelerating side. In due course, the dog tooth 221a re-contacts with the other, deceleration-side dog hole end portion 221d with a rotational speed difference (that is, a relative rotational speed) between the 2nd gear 213 and the 6th gear 217 at the time of re-contact. A shock of the re-contact is determined by the relative rotational speed and the transmitting torque at the time of re-contact. This shock is transmitted throughout the vehicle 90 as a deceleration shock and, thus, it gives an operator/passenger discomfort.

Further from the decelerating state mentioned above, the drive device 603b detects an acceleration instruction from the potentiometer 110b and when it accelerates, the rotational speed of the output shaft 103b of the electric motor 10b increases, and the rotational speed of the 2nd gear 213 also increases. Thereby, again, a rotational speed difference is occurred between the 2nd gear 213 and the 6th gear 217, and this time, each of the dog teeth 221a of the 6th gear 217 separates from the other, deceleration-side dog hole end portion 221d of each of the dog holes 221b of the corresponding 2nd gear 213, moves toward the original, acceleration-side dog hole end portion 221c of each of the dog holes 221b on the opposite direction, and re-contacts with a rotational speed difference (that is, a relative rotational speed) between the 2nd gear 213 and the 6th gear 217 at the time of re-contact. This shock at the time of re-contact is also determined by the relative rotational speed and the transmitting torque at the time of re-contact. The shock is transmitted throughout the vehicle 90 as an acceleration shock and, thus, gives an operator/passenger discomfort.

In this embodiment, the rotational speed of the 2nd gear 206 on the main shaft 204, which mates with the 2nd gear 213, may be detected by the input shaft sensor 401. The rotational speed of the 2nd gear 206 may be converted to the rotational speed of the 2nd gear 213 by multiplying it by the gear ratio between the 2nd gears 213 and 206. On the other hand, the rotational speed of the 6th gear 217 may be detected by the output shaft sensor 402 as the rotational speed of the drive shaft 211.

The detected rotational speeds of the 2nd gear 213 (or the 2nd gear 206) and the 6th gear 217 are transmitted to the calculating device 50. The calculating device 50 calculates a rotational speed of the 2nd gear 213 from the rotational speed of the 2nd gear 206 if necessary and, after that, it calculates a rotational speed difference between the 2nd gear 213 and the 6th gear 217 (that is, a relative rotational speed). The calculating device 50 estimates a relative rotational position between the 2nd gear 213 and the 6th gear 217 by integrating the relative rotational speeds.

The amount of the slack (that is, the amount of movement of the dog teeth 221a in the dog holes 221b in the rotational direction) may be determined beforehand. Such information may be stored in a memory (not illustrated), for example, in the calculating device 50. Thereby, the calculating device 50 calculates a timing of re-contact of the dog teeth 221a with the dog holes 221b and a relative rotational speed at that time of re-contact, based on the relative rotational speed and the relative rotational position. If the relative rotational speed does not change or is assumed such between the separation and the re-contact of the dog teeth 221a and the dog holes 221b, the relative rotational speed at the time of re-contact may be assumed the same as the relative rotational speed at the time of detection. However, in the meantime, if a further deceleration is made or the drive device 603b is detecting an acceleration instruction from the potentiometer 110b, the relative rotational speed changes. In order to calculate a relative rotational speed at the time of re-contact more precisely, an amount of deceleration, a potentiometer value, etc., may be further detected and the timing of re-contact and the relative rotational speed at the time of re-contact calculated as mentioned above may be compensated based on the detection values. In FIG. 13, similar to the 1st Embodiment, although the potentiometer 110b is disclosed, any types of sensors configured to detect the amount of deceleration or acceleration of the vehicle 90 may also be utilized, instead.

Based on the timing of re-contact and the relative rotational speed at the time of re-contact calculated as described above, the calculating device 50 determines the deceleration/acceleration start timing, the amount of deceleration/acceleration, the deceleration/acceleration end timing, etc. The calculating device 50 controls the rotational speed and/or the transmission torque of the output shaft of the electric motor 10b by controlling, for example, a power supply to the electric motor 10b from the drive device 603b. When a deceleration shock is expected, the calculating device 50 increases the rotational speed or the transmission torque at the time of re-contact to reduce the deceleration shock. On the other hand, when an acceleration shock is expected, the calculating device 50 decreases the rotational speed or the transmission torque at the time of re-contact to reduce the acceleration shock.

Moreover, not only a control of the electric motor 10b which is the drive source 10, the calculating device 50 may also control the drive devices 601a and 602a based on the determined deceleration/acceleration start timing, amount of deceleration/acceleration, deceleration/acceleration end timing, etc., and may adjust a power supply to the accelerating/decelerating devices 601 and 602. In this case, especially since a control of both the main shaft 204 which is the input shaft and the drive shaft 211 which is the output shaft, more rapid response of the control may be realized.

In this example, for convenience of explanation, it is configured so that the timing of re-contact and the relative rotational speed at the time of re-contact are obtained separately. However, as mentioned above, the deceleration/acceleration start timing, the amount of deceleration/acceleration, the deceleration/acceleration end timing, etc. corresponding to the relative rotational speed and the relative rotational position which are to be detected may be provided as a map (referring to FIGS. 3-5) beforehand. Instead of the map, an operational equation may be utilized to obtain similar functions and effects.

3RD EMBODIMENT

Figure 14:
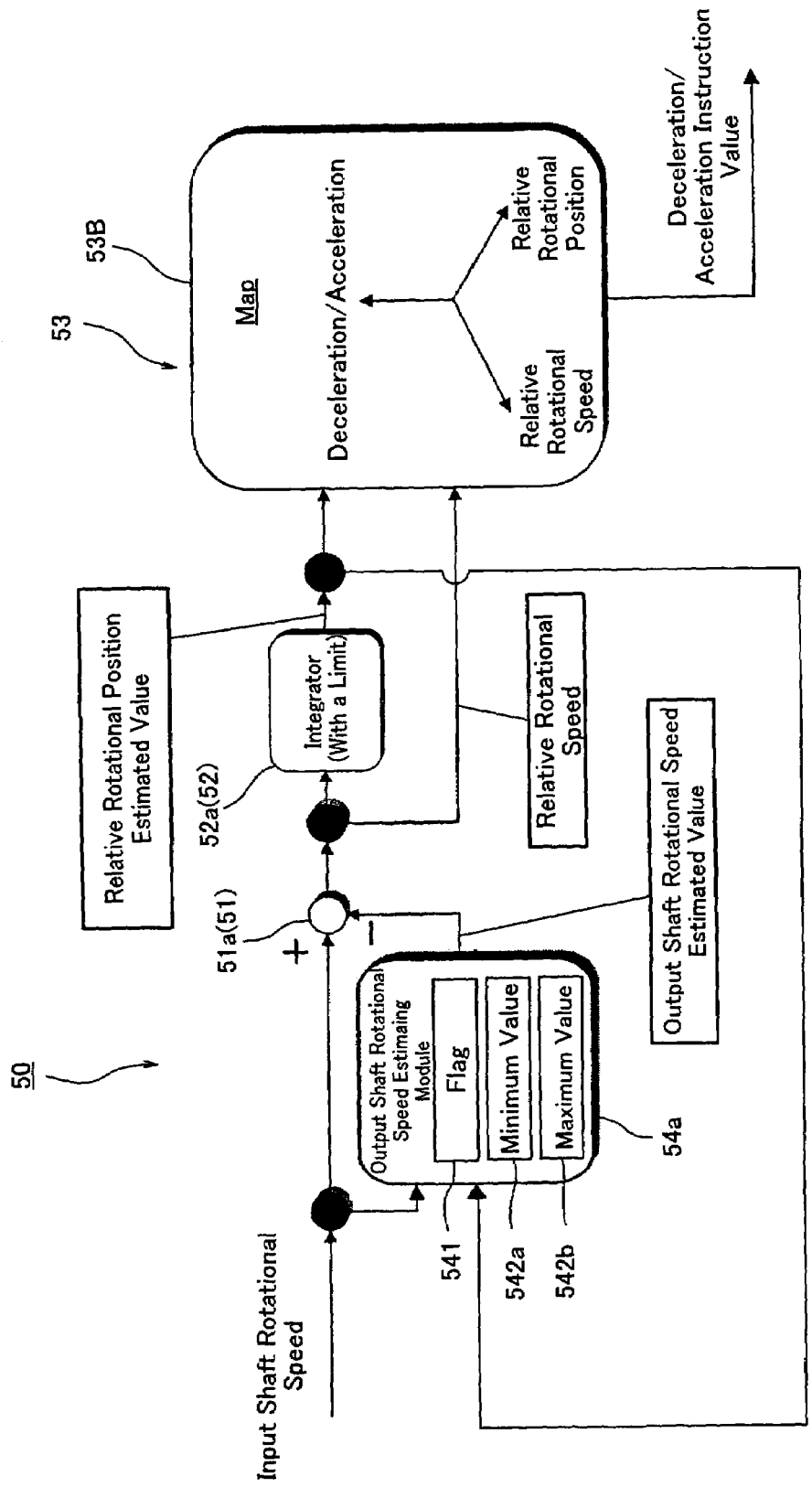
FIG. 14 is a control block diagram showing a 3rd Embodiment of the control apparatus according to the present invention, and shows another example of the calculating device when using a value estimated from the input shaft rotational speed shown in FIG. 5.

As shown in FIG. 14, the calculating device 50 according to this embodiment includes an output shaft rotational speed estimating module 54a as one example of the output shaft estimating module, instead of the low-path filter 54 shown in FIG. 5. With this configuration, a less delayed, precise estimation is possible as compared with the case where the low-path filter 54 is used. The output shaft rotational speed estimating module 54a estimates an output shaft rotational speed based on the input shaft rotational speed which is being inputted, and transmits the estimated output shaft rotational speed to the differentiator 51a as the relative rotational speed calculating module 51. Moreover, the output shaft rotational speed estimating module 54a is configured so that a relative rotational position estimated value outputted from the integrator 52a as the relative rotational position estimating module 52 is inputted into the output shaft rotational speed estimating module 54a.

Since other configurations and functions are similar to that of the example shown in FIG. 5, explanations thereof will be omitted while similar reference numerals being assigned to similar portions.

In this embodiment, the output shaft rotational speed estimating module 54a includes memory areas 541, 542a, and 542b which store a flag, a minimum value, and a maximum value, respectively. The flag memory area 541 is to assist the output shaft rotational speed estimating module 54a for an easy determination whether the controlled section S2 is in the accelerating side contact state or in the decelerating side contact state. In this embodiment, the determination by the output shaft rotational speed estimating module 54a is based on the relative rotational position estimated value which is estimated by the integrator 52a.

As described above, the accelerating side contact state is defined as a state in which a slack between the power transmission members of the controlled section S2 is apparently gone so that the power transmission members are in contact each other when the rotation of the input shaft 200A accelerates in one rotational direction with respect to the rotation of the output shaft 200B. On the other hand, the decelerating side contact state is defined as a state in which the slack between the power transmission members of the controlled section S2 is apparently gone so that the power transmission members are in contact each other when the rotation of the input shaft 200A decelerates in the one direction with respect to the rotation of the output shaft 200B, which is a reversed contact state of the accelerating side contact state.

Figure 15A:
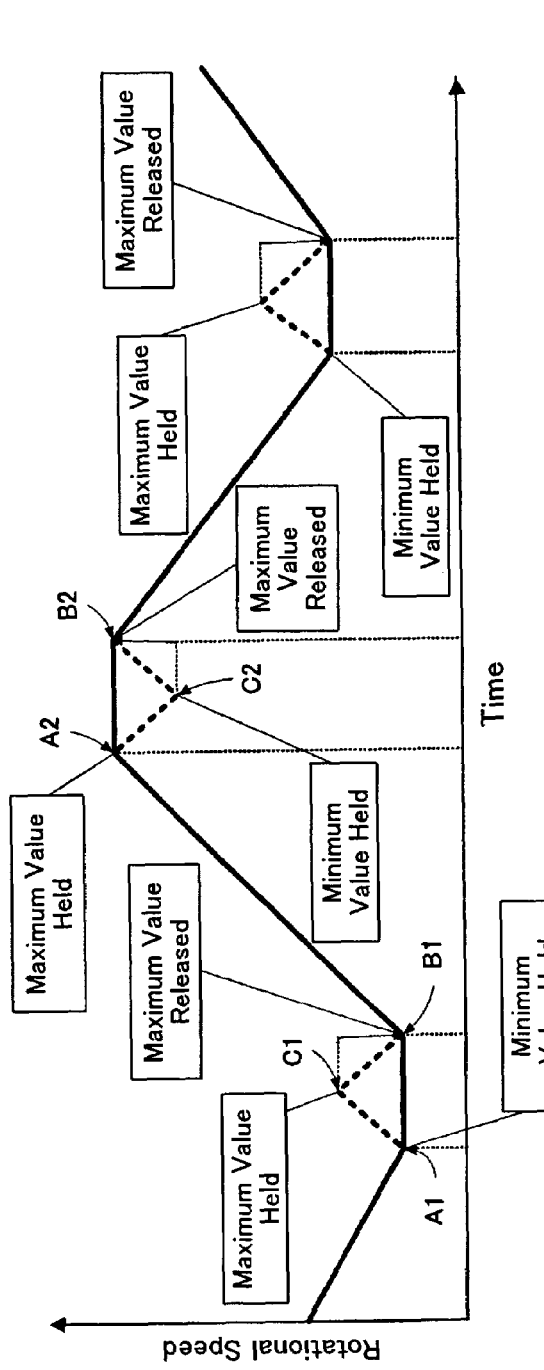
FIG. 15A is a graph for explaining a function of a control apparatus according to the 3rd Embodiment shown in FIG. 14, showing a change in rotational speeds of the input shaft and the output shaft on y-axis with respect to time on x-axis.

As shown in FIG. 15A, when the input shaft rotational speed is increased at a point A1 from a decelerating state in which the input shaft rotational speed and the output shaft rotational speed are decreased together while they are being the same speed, the rotational speed of only the input shaft (shown with a dotted line) increases from this point, and the rotational speed of the output shaft (shown with a solid line) does not increase. In fact, as also shown in FIG. 8D, the output shaft rotational speed is supposed to be continuously decreasing even after the point A1. However, here, in order to simplify the drawing, the output shaft rotational speed is shown as keeping a constant rotational speed during the time. If the relative rotational speed is occurred between the input shaft rotational speed and the output shaft rotational speed, the deceleration control according to the present invention is started (at a point C1) and, then, the input shaft rotational speed is decreased. Then, at the completion of re-contact, it becomes in a state in which the relative rotational speed between the input shaft and the output shaft (at a point B1), and the output shaft rotational speed follows the input shaft rotational speed so that both start increasing.

Similarly, when the input shaft rotational speed is shifted to a deceleration state from an acceleration state (point A2), the rotational speed of the input shaft shown with a dotted line decreases. At this time, the rotational speed of the output shaft shown with a solid line decreases a little, however, here, the output rotational speed is shown as maintaining a constant speed for simplifying the drawing. Thus, if the relative rotational speed is occurred between the input shaft rotational speed and the output shaft rotational speed, the acceleration control according to the present invention is started (at a point C2), the input shaft rotational speed increases. Then, it becomes in a state in which there is almost no relative rotational speed between the input shaft and the output shaft at the completion of re-contact (at a point B2). Then, the output shaft rotational speed follows the input shaft rotational speed, and the both begin decreasing.

After that, when it shifts again to an acceleration, it will be the same operation as that of the transition from a deceleration to an acceleration.

Figure 15B:
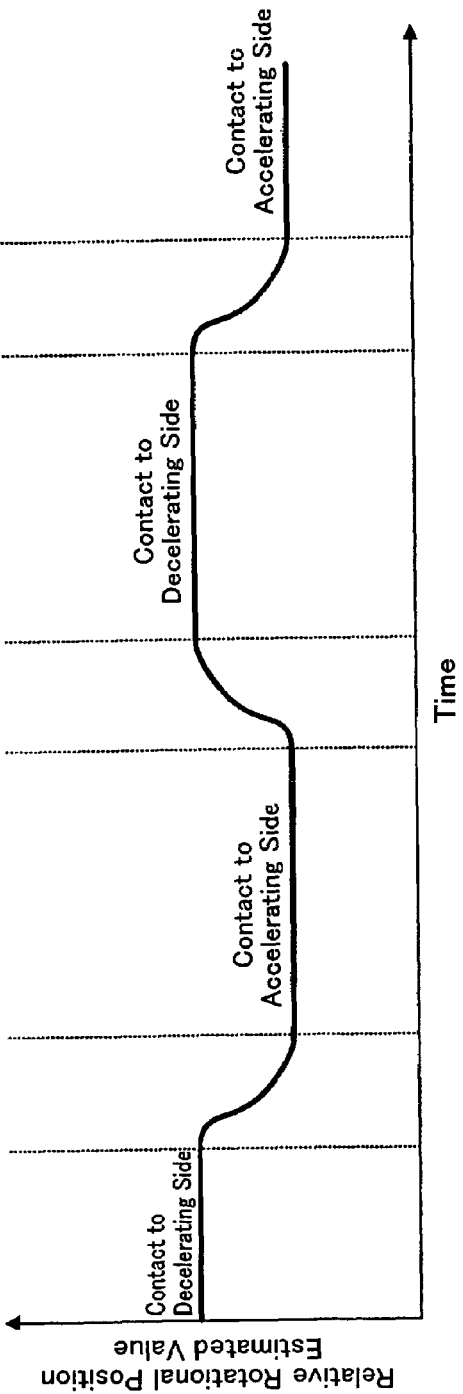
FIG. 15B is a corresponding graph of FIG. 15A, showing a change in a relative rotational position estimated value.

On the other hand, at this time, an integration operation is started after the occurrence of the relative rotational speed, such as after the points A1 and A2, by integrating the input shaft rotational speeds by the integrator 52a. Then, as shown in FIG. 15B, the relative rotational position estimated value begins shifting from the decelerating side contact state to the accelerating side contact state, or from the accelerating side contact state to the decelerating side contact state. As shown by the points B1 and B2, the integration value reaches a bottom (an integrator limit) and maintains a constant value with a state in which there is, again, almost no relative rotational speed. That is, this state is the decelerating side contact state or the accelerating side contact state, respectively.

In this embodiment, the output shaft rotational speed estimating module 54a stands a flag indicating either state in the flag memory area 541, based on the information indicating that it is in the decelerating side contact state or the accelerating side contact state transmitted from the integrator 52a. This flag is to facilitate the following operation of the output shaft rotational speed estimating module 54a. However, instead of the flag, it may be configured so that the determination is made directly based on the relative rotational position estimated value transmitted from the integrator 52a.

Figure 16:
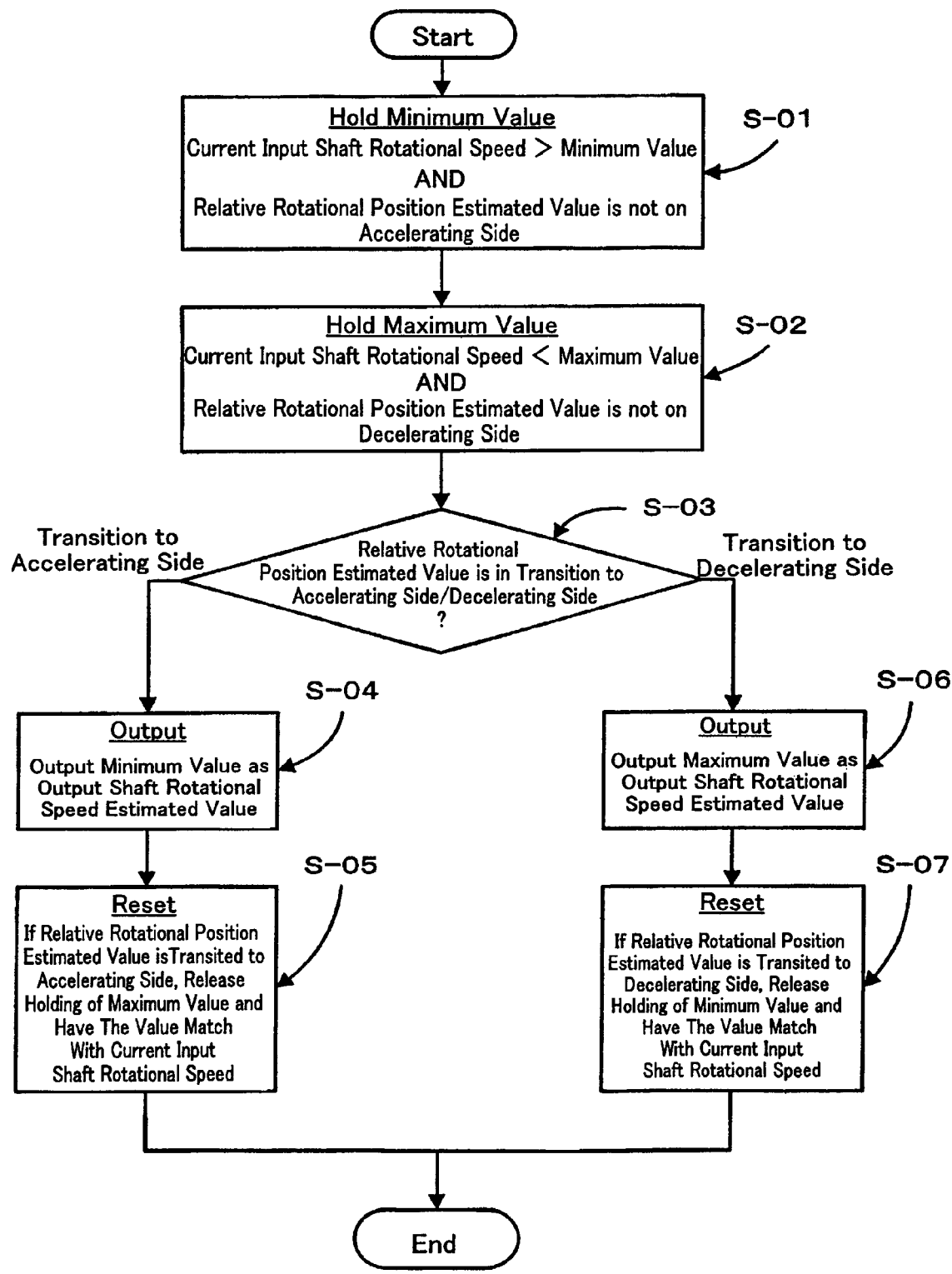
FIG. 16 is a flowchart for explaining an operation of the output shaft rotational speed estimating module of the control apparatus according to the 3rd Embodiment shown in FIG. 14.

Next, an output shaft rotational speed estimating operation of the output shaft rotational speed estimating module 54a will be explained, referring to a flowchart of FIG. 16. First, the output shaft rotational speed estimating module 54a performs a Minimum Value Holding Process (Step S-01). The Minimum Value Holding Process is to hold a minimum value stored in the minimum value memory area 542a when an inputted input shaft rotational speed is greater than the minimum value stored in the minimum value memory area 542a, and when a flag stored in the flag memory area 541 is not in an accelerating side contact state, or otherwise, to store a current input shaft rotational speed as a new minimum value in the minimum value memory area 542a.

Then, similarly, the output shaft rotational speed estimating module 54a performs a Maximum Value Holding Process (Step S-02). The Maximum Value Holding Process is to hold a maximum value stored in the maximum value memory area 542b when an inputted input shaft rotational speed is less than the maximum stored in the maximum value memory area 542b, and when a flag stored in the flag memory area 541 is not in a decelerating side contact state, or otherwise, to store a current input shaft rotational speed as a new maximum value in the maximum value memory area 542b.

Next, the output shaft rotational speed estimating module 54a determines whether it is in a transition to the accelerating side contact state or in a transition to the decelerating side contact state, based on the relative rotational position estimated value transmitted from the integrator 52a (Step S-03). If it is in a transition to the accelerating side contact state, the output shaft rotational speed estimating module 54a outputs the minimum value stored in the minimum value memory area 542a as the output shaft rotational speed estimated value (Step S-04). When the flag stored in the flag memory area 541 is shifted to the accelerating side contact state, the output shaft rotational speed estimating module 54a releases the holding of the unused maximum value stored in the maximum value memory area 542b (reset). Then, the output shaft rotational speed estimating module 54a makes so that the present input rotational speed and the output shaft rotational speed estimated value become the same value (Step S-05), and terminates the routine.

On the other hand, in Step S-03, if it is in a transition to a decelerating side contact state, the output shaft rotational speed estimating module 54a outputs the maximum value stored in the maximum value memory area 542b as an output shaft rotational speed estimated value (Step S-06). When the flag stored in the flag memory area 541 is shifted to the decelerating side contact state, the output shaft rotational speed estimating module 54a releases the holding of the unused minimum value stored in the minimum value memory area 542a (reset), makes so that the present input rotational speed and the output shaft rotational speed estimated value become the same value (Step S-07), and terminates the routine.

Referring back to FIGS. 15A and 15B, by the above operation of the output shaft rotational speed estimating module 54a, when the relative rotational speed is occurred at the point A1, the minimum peak value at this point is newly stored as the minimum value since it does not meet the conditions of the Minimum Value Holding Process. Immediately after this, the current input shaft rotational speed becomes greater than the stored minimum value, and since it is not in either state of a decelerating side contact state or an accelerating side contact state, it meets the conditions of the Minimum Value Holding Process. Thus, the input shaft rotational speed at the point A1 continues being held as the minimum value. And at this point, since it is in a transition to the accelerating side contact state from the decelerating side contact state, the minimum value being held is outputted as an output shaft rotational speed estimated value.

Then, at the time that the deceleration control according to the present invention is started, that is, at the point C1, the input shaft rotational speed begins decreasing. Thus, the maximum peak value at this point does not meet the conditions of the Maximum Value Holding Process, and is newly stored as the maximum value. Immediately after this, the current input shaft rotational speed becomes less than the stored maximum value, and since it is not in either state of the decelerating side contact state or the accelerating side contact state, it meets the conditions of the Maximum Value Holding Process, and the input shaft rotational speed at the point C1 continues being held as the maximum value. However, at this point, since it is still in a transition to the accelerating side contact state from the decelerating side contact state, the maximum value being held is not outputted as an output shaft rotational speed estimated value, and the minimum value continues to be outputted as an output shaft rotational speed estimated value.

At the time that the deceleration control according to the present invention is terminated, that is, at the point B1, since a relative rotational position estimated value becomes in the accelerating side contact state, the maximum value which is not used by the output process of Step S-06 is released, the holding (reset) and, therefore, the input shaft rotational speed and the output shaft rotational speed become the same value.

Similarly, at a point A2, when a relative rotational speed is occurred, the maximum peak value at this point is newly stored as the maximum value since it does not meet the conditions of the Maximum Value Holding Process. Immediately after this, the current input shaft rotational speed becomes less than the stored maximum value, and since it is not in either state of the decelerating side contact state or the accelerating side contact state, it meets the conditions of the Maximum Value Holding Process and, thus, the input shaft rotational speed at the point A2 continues being held as the maximum value. At this point, since it is in a transition to the decelerating side contact state from the accelerating side contact state, the maximum value being held is outputted as an output shaft rotational speed estimated value.

Then, at the time that the acceleration control according to the present invention is started, that is, at the point C2, the input shaft rotational speed begins increasing. The minimum peak value at this point does not meet the conditions of the Minimum Value Holding Process and, thus, it is newly stored as the minimum value. Immediately after this, the current input shaft rotational speed becomes greater than the stored minimum value, and since it is not in either state of the decelerating side contact state or the accelerating side contact state, it meets the conditions of the Minimum Value Holding Process and, thus, the input shaft rotational speed at the point C2 continues being held as the minimum value. However, at this point, since it is still in a transition to the decelerating side contact state from the accelerating side contact state, the minimum value being held is not outputted as an output shaft rotational speed estimated value, and the above maximum value continues to be outputted as an output shaft rotational speed estimated value.

Then, at the time that the acceleration control according to the present invention is ended, that is, at the point B2, since the relative rotational position estimated value becomes in the decelerating side contact state, the minimum value which is not used by the output process of Step S-04 is released from hold (reset). Therefore, the input shaft rotational speed and the output shaft rotational speed become the same value.

4TH EMBODIMENT

In the 3rd Embodiment above, it is configured so that both the minimum value and the maximum value are held to correspond to both acceleration and deceleration. In this 4th Embodiment, it is configured so that only the minimum value is held for simplification of a computer program. For this reason, at the time of deceleration which this configuration does not cover, it estimates that the output shaft rotational speed is the same as the input shaft rotational speed, and it compulsorily determines that the relative rotational position estimated value is shifted to the decelerating side contact state from the accelerating side contact state, after a predetermined time. This will be explained in detail hereinafter.

Figure 17:
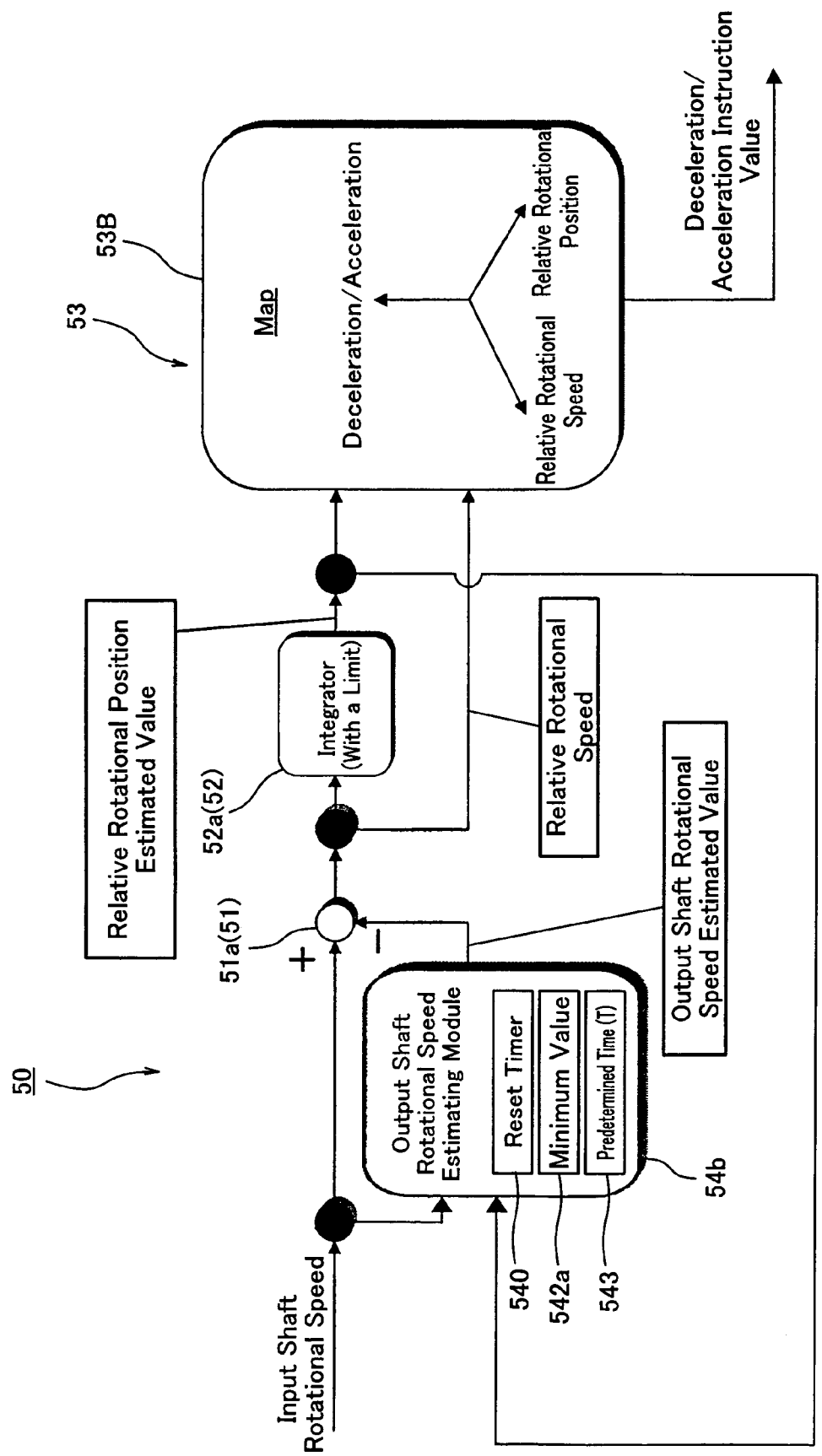
FIG. 17 is a control block diagram showing a 4th Embodiment of the control apparatus according to the present invention, and shows still another example of the calculating device when using a value estimated from the input shaft rotational speed shown in FIG. 5.

As shown in FIG. 17, the output shaft rotational speed estimating module 54$b$ as another example of the output shaft estimating module includes a reset timer 540, and memory areas 542$a$ and 543 which store a minimum value and a predetermined time T, respectively. The reset timer 540 counts the predetermined time T stored in the time memory area 543, and it is used in order to reset (invert) the relative rotational position estimated value of the integrator 52$a$ to the decelerating side contact state from the accelerating side contact state after a lapse of the predetermined time T. Since other configurations and functions are similar to the 3rd Embodiment shown in FIG. 14, similar reference numerals are assigned to similar portions and, thus, the explanation thereof is omitted.

Figures 18A, 18B:
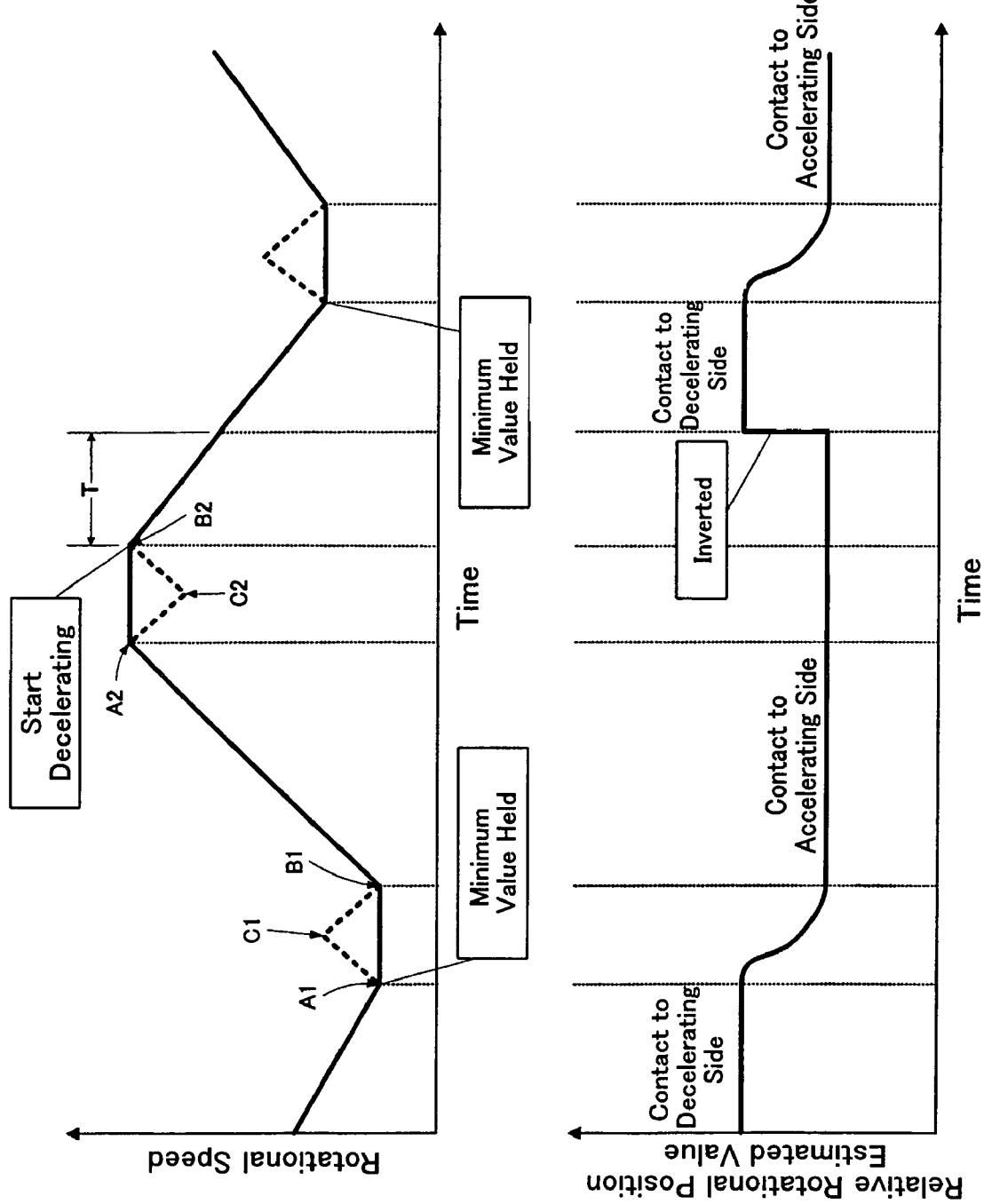
FIG. 18A is a graph for explaining a function of a control apparatus according to the 4th Embodiment shown in FIG. 17, showing a change in rotational speeds of the input shaft and the output shaft.
FIG. 18B is a corresponding graph of FIG. 18A, showing a change in a relative rotational position estimated value.

FIG. 18A shows a state where the input shaft rotational speed is changed similar to that of the 3rd Embodiment shown in FIG. 15A.

Figure 19:
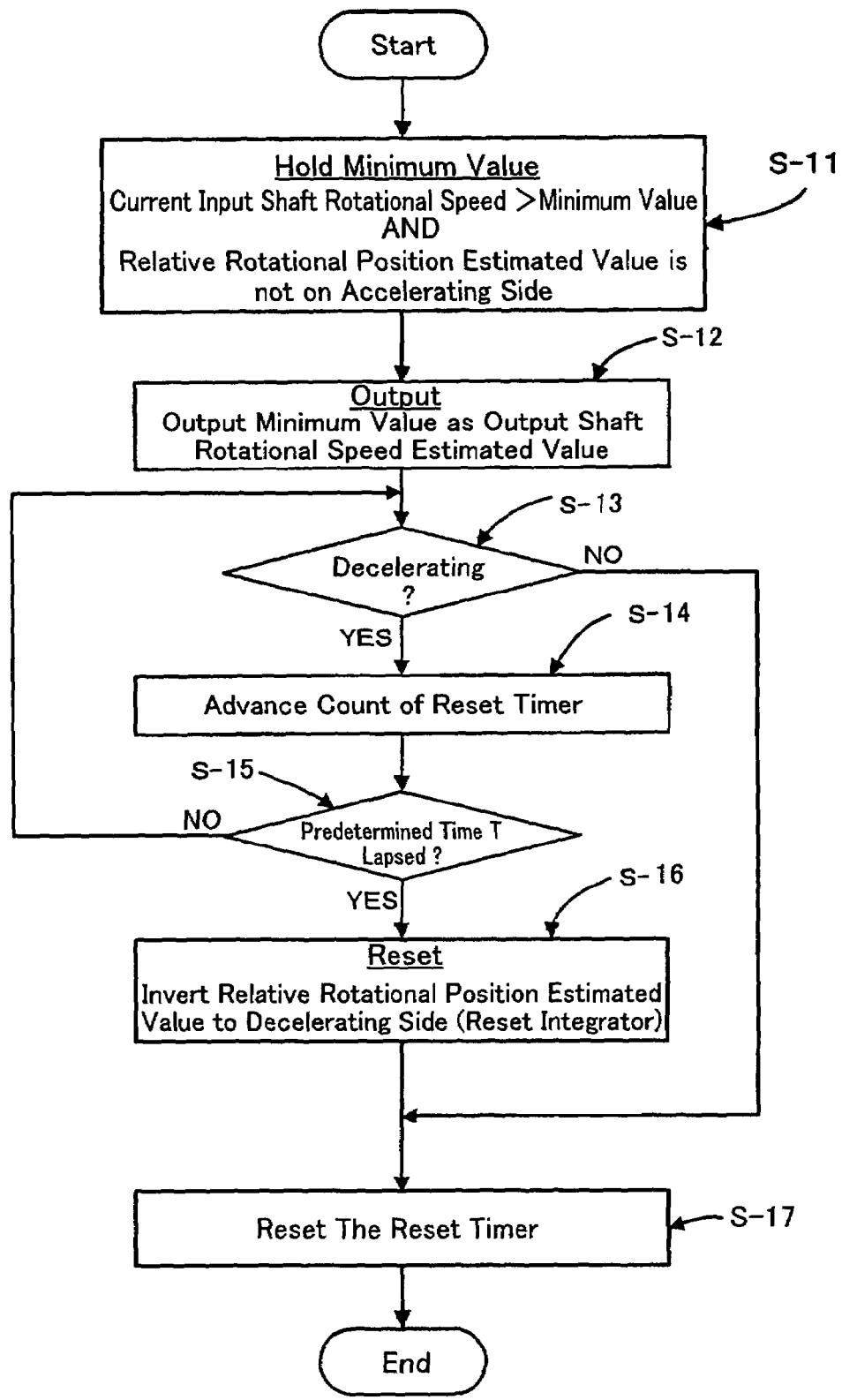
FIG. 19 is a flowchart for explaining an operation of the output shaft rotational speed estimating module of the control apparatus according to the 4th Embodiment shown in FIG. 17.

Next, an output shaft rotational speed estimating operation of the output shaft rotational speed estimating module 54$b$ will be explained, referring to a flowchart of FIG. 19. First, the output shaft rotational speed estimating module 54$b$ performs a Minimum Value Holding Process similar to the 3rd Embodiment (Step S-11). Similar to the 3rd Embodiment, the Minimum Value Holding Process is to hold a minimum value stored in the minimum value memory area 542$a$ when an inputted current input shaft rotational speed is greater than the minimum value stored in the minimum value memory area 542$a$, and when a relative rotational position estimated value is not on the accelerating side, or otherwise, to store a current input shaft rotational speed as a new minimum value in the minimum value memory area 542$a$.

Then, the output shaft rotational speed estimating module 54$b$ outputs the minimum value stored in the minimum value memory area 542$a$ as the output shaft rotational speed estimated value (Step S-12).

After Step S-12, the output shaft rotational speed estimating module 54$b$ determines whether the input shaft rotational speed which has been inputted is under deceleration (Step S-13). If it is not under deceleration ("NO" in Step S-13), the output shaft rotational speed estimating module 54$b$ resets the reset timer 540 (Step S-17), and terminates the routine.

On the other hand, if it is under deceleration ("YES" in Step S-13), the output shaft rotational speed estimating module 54b advances the count of the reset timer 540 (Step S-14). The output shaft rotational speed estimating module 54b determines whether the count of the reset timer 540 lapses the predetermined time T stored in the time memory area 543 (Step S-15). If the predetermined time T is not lapsed ("NO" in Step S-15), the output shaft rotational speed estimating module 54b repeats the routine from Step S-13.

On the other hand, if the predetermined time T is lapsed ("YES" in Step S-15), the output shaft rotational speed estimating module 54b resets the integrator 52a by forcing the relative rotational position estimated value of the integrator 52a reversed from the accelerating side contact state to the decelerating side contact state (Step S-16) and, further, resets the reset timer 540 (Step S-17), and terminates the routine.

By the above operation of the output shaft rotational speed estimating module 54b, as shown in FIGS. 18A and 18B, when the relative rotational speed is occurred at the point A1, the minimum peak value at this point is newly stored as the minimum value since it does not meet the conditions of the Minimum Value Holding Process. Immediately after this, the current input shaft rotational speed becomes greater than the stored minimum value, and it meets the conditions of the Minimum Value Holding Process since the relative rotational position estimated value is not on the accelerating side. The input shaft rotational speed at the point A1 is held on as the minimum value.

Then, at the time that the deceleration control according to the present invention is started, that is, at the point C1, the input shaft rotational speed begins to decrease. In due course, at the time that the deceleration control according to the present invention is terminated, that is, at the point B1, the relative rotational position estimated value becomes in the accelerating side contact state.

Similarly, at the point A2, the current input shaft rotational speed should become less than the maximum value, and the relative rotational position estimated value should not be on the decelerating side, immediately after the relative rotational speed is occurred. However, the input shaft rotational speed at the point A2 is not held as the maximum value similar to the 3rd Embodiment above. Thus, at this point, the output shaft rotational speed estimating module 54b outputs the output shaft rotational speed as the same value as the input shaft rotational speed, and the relative rotational position estimated value calculated by the integrator 52a does not change from the accelerating side contact state.

Therefore, in order to make the actual relative rotational position and the estimated value thereof to be the same value, by this routine, it detects that the input shaft rotational speed is continued decelerating, and when a sufficient continuation of the deceleration time is detected, it determines that the relative rotational position is shifted to the decelerating side contact state from the accelerating side contact state.

Specifically, for example, although the deceleration continuation time is counted also from the point A2, it is determined that it is not sufficient continuation of the deceleration time since it is shifted to an acceleration by the acceleration control according to the present invention at the point C2. Thus, the predetermined time T typically is set so that it is longer enough than such a deceleration time. When the deceleration is continued as exceeding the predetermined time T, by the count of the deceleration continuation time from the point B2, the relative rotational position estimated value of the integrator 52a is reversed from the accelerating side contact state to the decelerating side contact state.

5TH EMBODIMENT

In the 4th Embodiment above, it is configured so that only the minimum value is held. On the contrary in the this 5th Embodiment, it is configured so that only maximum value is held. For this reason, at the time of acceleration which cannot be covered by the maximum value, it is configured to estimate that an output shaft rotational speed is the same as the input shaft rotational speed. It is also configured to mandatorily recognize that the relative rotational position estimated value is shifted to the accelerating side contact state from the decelerating side contact state after a predetermined time. This will be explained in detail hereafter.

Figure 20:
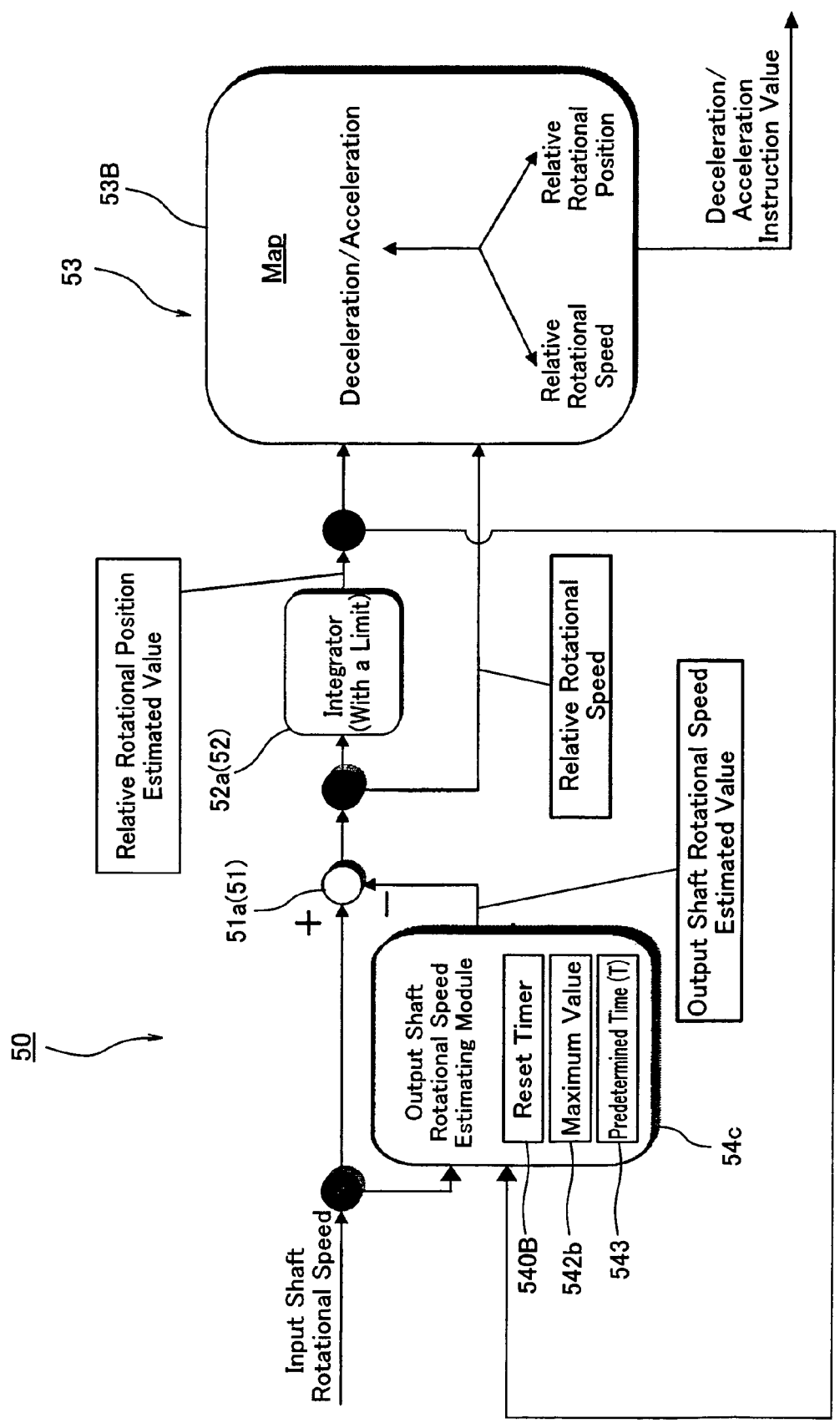
FIG. 20 is a control block diagram showing a 5th Embodiment of the control apparatus according to the present invention, and shows still another example of the calculating device when using a value estimated from the input shaft rotational speed shown in FIG. 5.

As shown in FIG. 20, the output shaft rotational speed estimating module 54c as still another example of the output shaft estimating module includes a reset timer 540B, and memory areas 542b and 543 which store a predetermined time T and a maximum value, respectively. The reset timer 540B is utilized such that it counts the predetermined time T stored in the time memory area 543 similar to the 4th Embodiment above, and the relative rotational position estimated value of the integrator 52a is reset (inverted) from the decelerating side contact state to the accelerating side contact state after a lapse of the predetermined time T. Since other configurations and functions are similar to that of the 4th Embodiment shown in FIG. 17, similar reference numerals are assigned to similar portions and, thus, the explanation thereof is omitted.

Figure 21A:
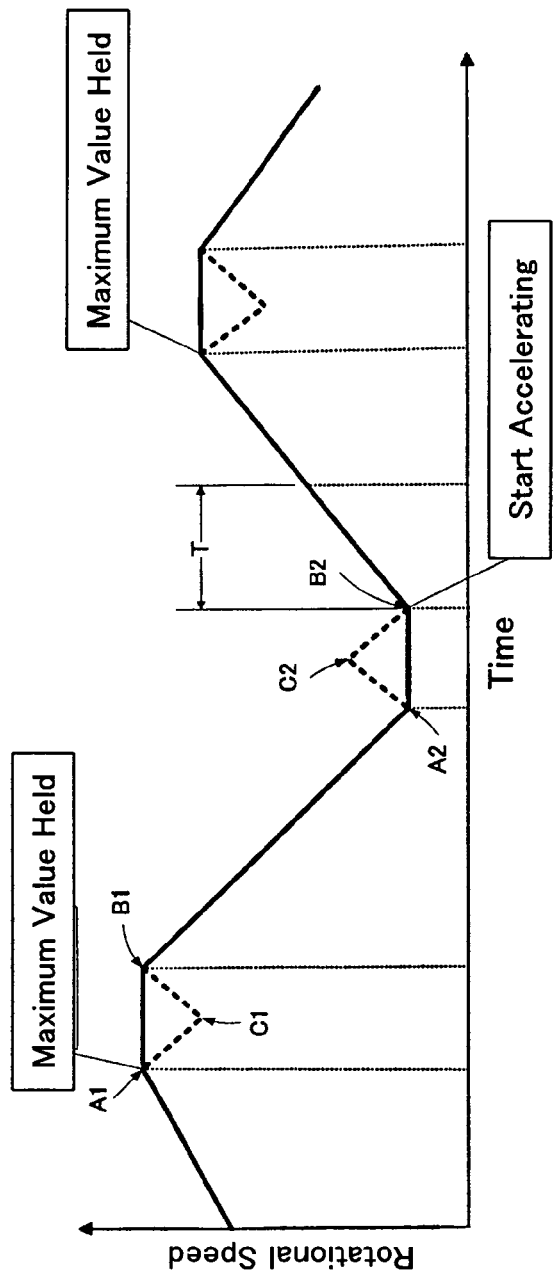
FIG. 21A is a graph for explaining a function of a control apparatus according to the 5th Embodiment shown in FIG. 20, showing a change in rotational speeds of the input shaft and the output shaft.

FIG. 21A shows a state where the input shaft rotational speed is changed as similar to the 4th Embodiment shown in FIG. 18A.

Figure 22:
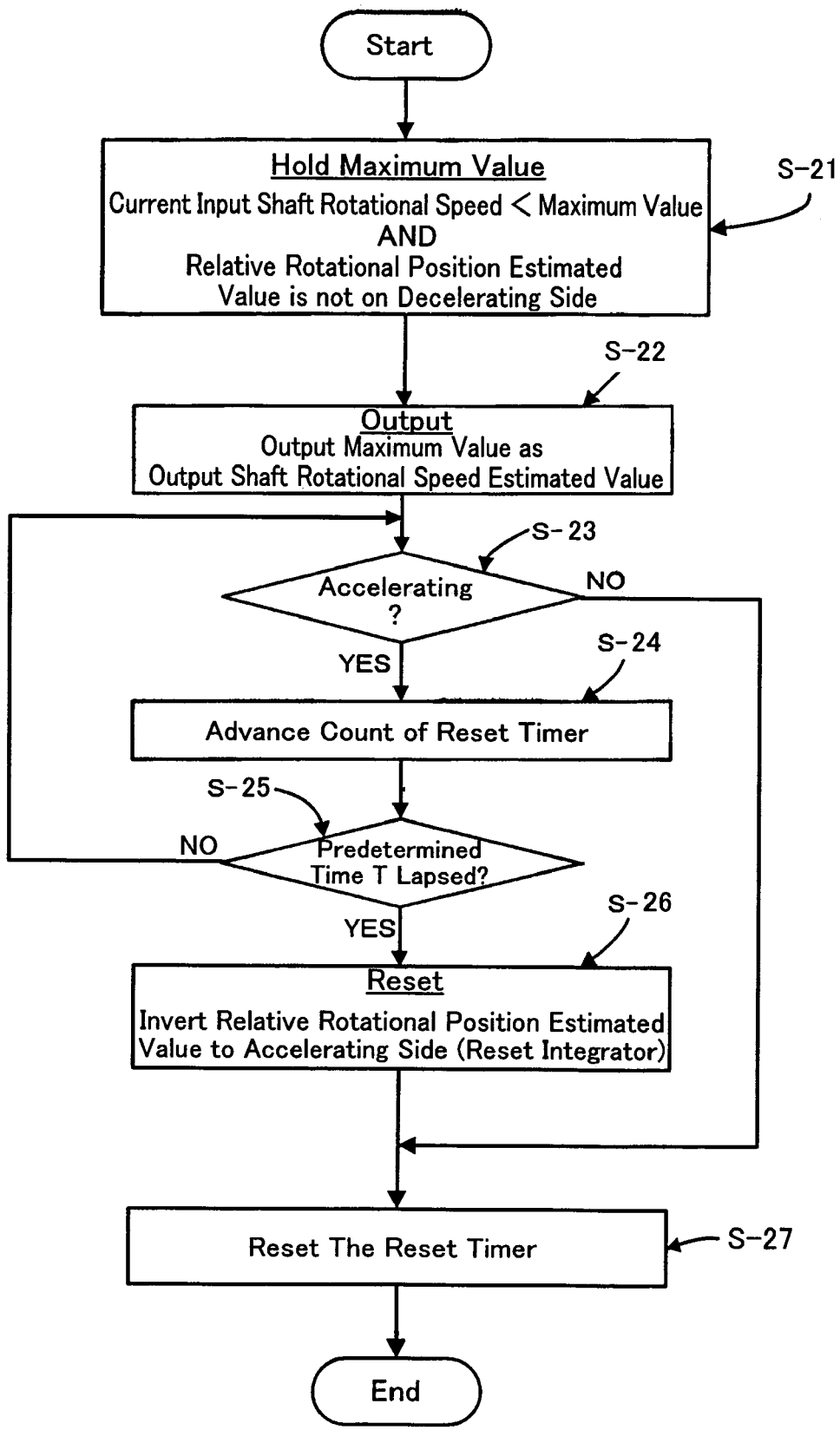
FIG. 22 is a flowchart for explaining an operation of the output shaft rotational speed estimating module of the control apparatus according to the 5th Embodiment shown in FIG. 20.

Next, an output shaft rotational speed estimating operation of the output shaft rotational speed estimating module 54c will be explained, referring to a flowchart of FIG. 22. First, the output shaft rotational speed estimating module 54c performs a Maximum Value Holding Process similar to the 4th Embodiment (Step S-21). Contrary to the 4th Embodiment, the Maximum Value Holding Process is to hold a maximum value stored in the maximum value memory area 542b when an inputted current input shaft rotational speed is less than the maximum value stored in the maximum value memory area 542b, and when a relative rotational position estimated value is not on a decelerating side, or otherwise, to store a current input shaft rotational speed as a new maximum value in the maximum value memory area 542b.

Then, the output shaft rotational speed estimating module 54c outputs the maximum value stored in the maximum value memory area 542b as an output shaft rotational speed estimated value (Step S-22).

After Step S-22, the output shaft rotational speed estimating module 54c determines whether the input shaft rotational speed which has been inputted is under acceleration (Step S-23). If it is not under acceleration ("NO" in Step S-23), the output shaft rotational speed estimating module 54c resets and the reset timer 540B (Step S-27), and terminates the routine.

On the other hand, if it is under acceleration ("YES" in Step S-23), the output shaft rotational speed estimating module 54c advances the count of the reset timer 540B (Step S-24). The output shaft rotational speed estimating module 54c determines whether the count of the reset timer 540B lapses the predetermined time T stored in the time memory area 543 (Step S-25). If the predetermined time T is not lapsed ("NO" in Step S-25), routine is repeated from Step S-23.

On the other hand, if the predetermined time T is lapsed ("YES" in Step S-25), the output shaft rotational speed estimating module 54c resets the integrator 52a by forcing the relative rotational position estimated value of the integrator 52a reversed from the decelerating side contact state to the accelerating side contact state (Step S-26) and, further, resets the reset timer 540B (Step S-27), and terminates the routine.

Figure 21B:
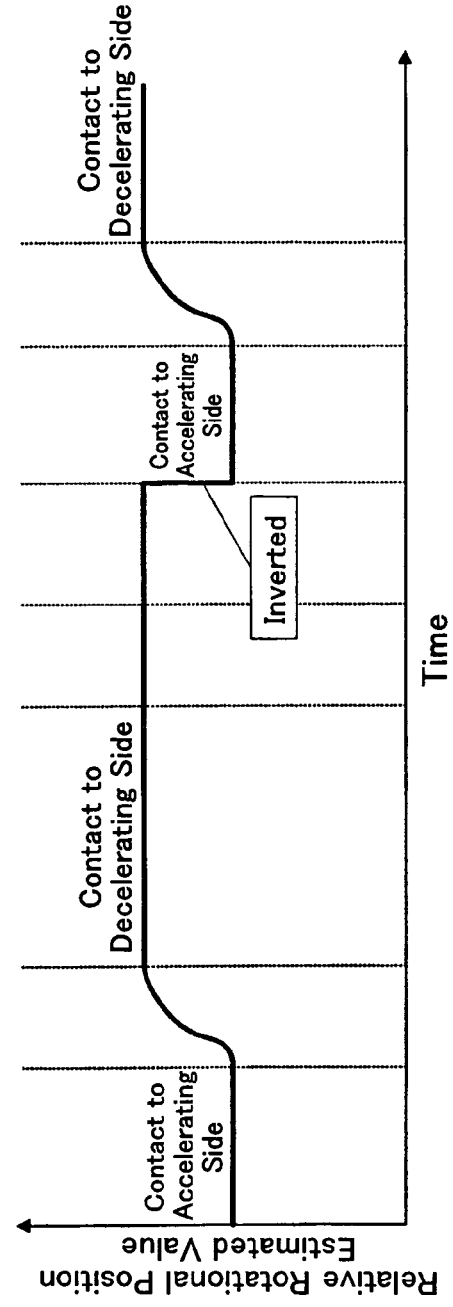
FIG. 21B is a corresponding graph of FIG. 21A, showing a change in a relative rotational position estimated value.

By the above operation of the output shaft rotational speed estimating module 54c, as shown in FIGS. 21A and 21B, when the relative rotational speed is occurred at a point A1, the maximum peak value at this point is newly stored as the maximum value since it does not meet the conditions of the Maximum Value Holding Process. Immediately after this, the current input shaft rotational speed becomes less than the stored maximum value, and it meets the conditions of the Maximum Value Holding Process since the relative rotational position estimated value is not on the decelerating side. The input shaft rotational speed at the point A1 is held on as the maximum value.

Then, at the time that the acceleration control according to the present invention is started, that is, at a point C1, the input shaft rotational speed begins to increase. In due course, at the time that the acceleration control according to the present invention is terminated, that is, at the point B1, the relative rotational position estimated value become in the decelerating side contact state.

Similarly, at a point A2, the current input shaft rotational speed should become greater than the minimum value, and the relative rotational position estimated value should not be on the accelerating side, immediately after the relative rotational speed is occurred. However, the input shaft rotational speed at the point A2 is not held as the minimum value similar to the 3rd Embodiment above. Thus, at this point, the output shaft rotational speed estimating module 54c outputs the output shaft rotational speed as the same value as the input shaft rotational speed, and the relative rotational position estimated value calculated by the integrator 52a does not change from the decelerating side contact state.

Therefore, in order to make the actual relative rotational position and the estimated value thereof to be the same value, by the routine, it detects that the input shaft rotational speed is continued accelerating, and when a sufficient continuation of the acceleration time is detected, it determines that the relative rotational position shifted to the accelerating side contact state from the decelerating side contact state.

Specifically, for example, although the acceleration continuation time is counted also from the point A2, it is determined that it is not sufficient continuation of the acceleration time since it is shifted to a deceleration by the deceleration control according to the present invention at a point C2. Thus, the predetermined time T typically is set so that it is longer enough than such an acceleration time. When the acceleration is continued exceeding the predetermined time T, by the count of the acceleration continuation time from the point B2, the relative rotational position estimated value of the integrator 52a is reversed from the decelerating side contact state to the accelerating side contact state.

6TH EMBODIMENT

Figures 23A, 23B, 23C:
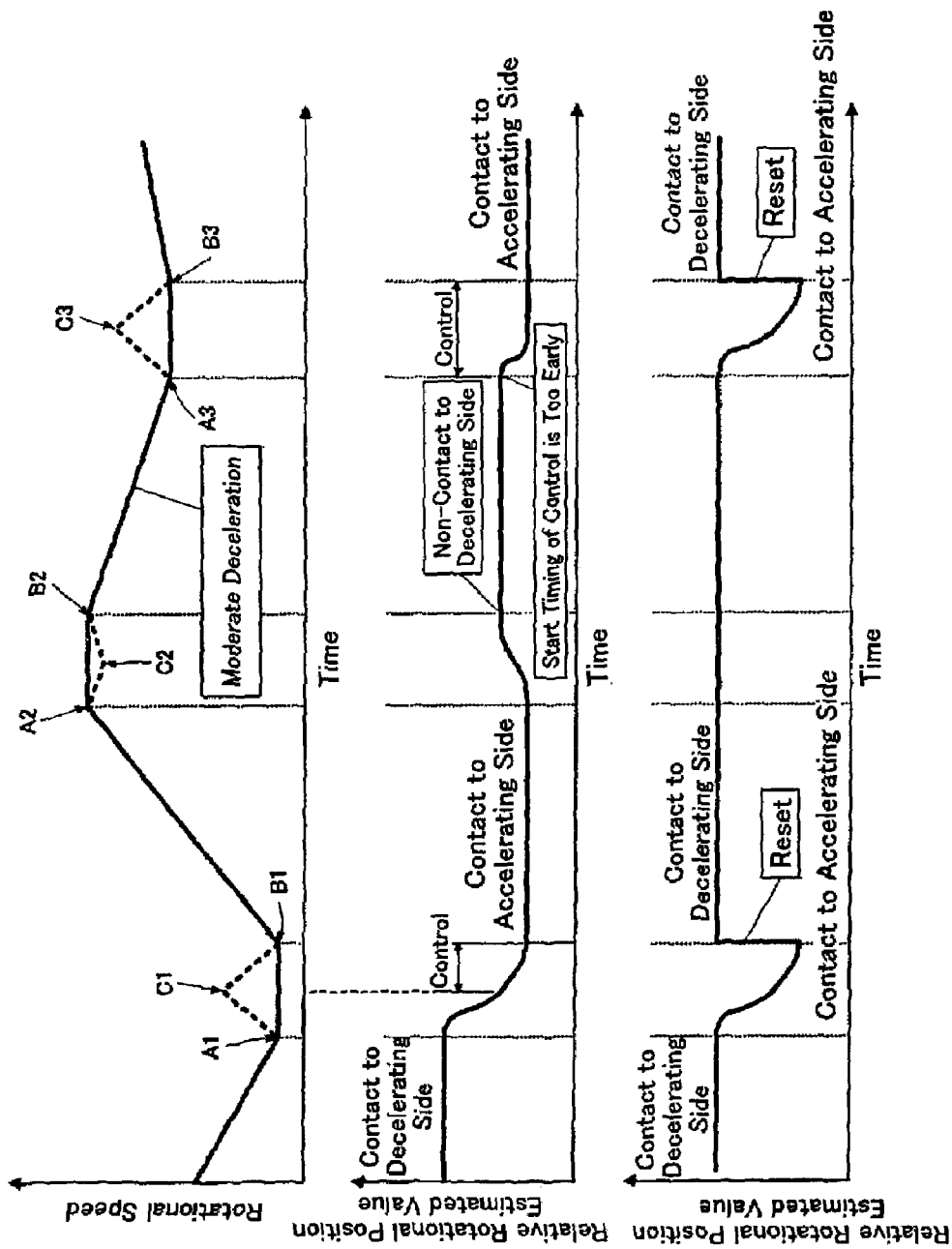
FIG. 23A is a graph for explaining a function of a control apparatus according to a 6th Embodiment, showing a change in rotational speeds of the input shaft and an output shaft during a moderate deceleration on y-axis with respect to time on x-axis.
FIG. 23B is a corresponding graph of FIG. 23A, showing a change in a relative rotational position estimated value during the control according to the 1st Embodiment.
FIG. 23C is a corresponding graph of FIG. 23A, showing a change in a relative rotational position estimated value during the control according to the 6th Embodiment.

For example, as shown in FIGS. 23A and 23B, when the input shaft rotational speed is turned to a relatively large acceleration from a point A1 in the configuration shown in FIG. 4 or FIG. 5, a relatively large relative rotational speed is occurred between the input shaft rotational speed and the output shaft rotational speed. Therefore, the integration value of the integrator 52a decreases (in this embodiment, it is configured such that the integration value is decreased when the input shaft rotational speed is greater than the output shaft rotational speed, and vice versa). Then, the relative rotational position estimated value shifts to the accelerating side contact state from the decelerating side contact state, while the deceleration control according to the present invention being performed.

Further, for example, when the input shaft rotational speed is turned to a moderate deceleration from a point A2, a small relative rotational speed occurs between the input shaft rotational speed and the output shaft rotational speed. Thus, the integration value does not increase greatly, due to a dead band of the integrator 52a, and the acceleration control may end before the relative rotational position estimated value is completely shifted to the decelerating side contact state from the accelerating side contact state. This results in an estimation error of the relative rotational position because in fact at this time, the relative rotational position should have shifted to the decelerating side contact state.

While in this state, for example, if the input shaft rotational speed is again turned to an acceleration from a point A3, the control module 53 immediately starts the deceleration control since the relative rotational position estimated value is already between the decelerating side contact state and the accelerating side contact state. Thereby, the relative rotational position estimated value shifts to the accelerating side contact state in a relatively short time, irrespective of the relative rotational speed. Then, the deceleration control may not be performed normally since the control module 53 incorrectly recognizes that the relative rotational position estimated value is already shifted to the accelerating side contact state.

In this embodiment, as shown in FIG. 23C, it may be configured such that the relative rotational position is forced to be, for example, in the decelerating side contact state. In this configuration, even if the relative rotational position is shifted to the accelerating side contact state due to the deceleration control, it is again compulsorily returned to the decelerating side contact state when the input shaft rotational speed and the output shaft rotational speed are equal.

Figure 24:
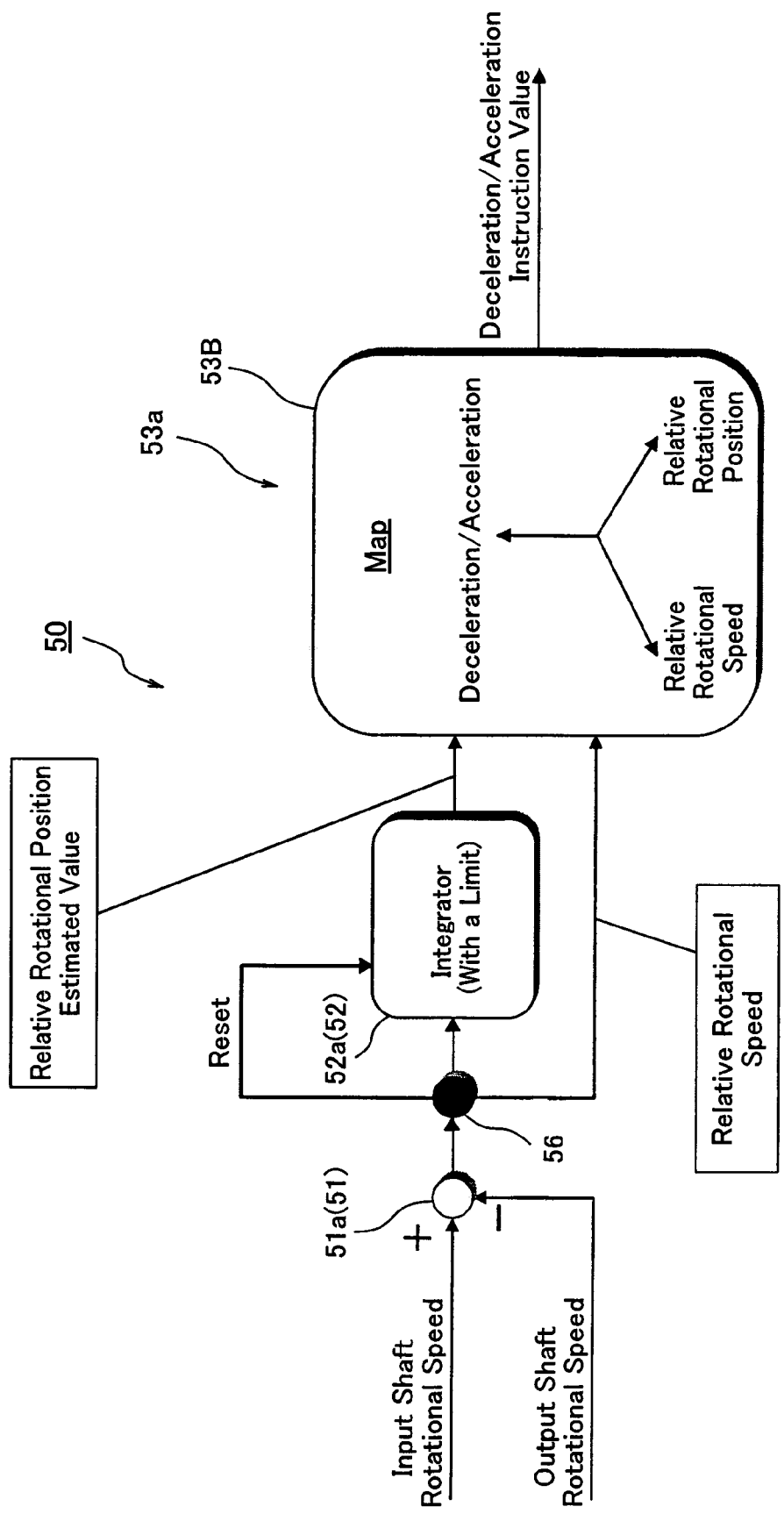
FIG. 24 is a control block diagram showing a configuration of the calculating device of the control apparatus according to the 6th Embodiment shown in FIG. 23C, and shows an example of the calculating device when using detection values of both the input shaft rotational speed and the output shaft rotational speed as shown in FIG. 4.
Figure 25:
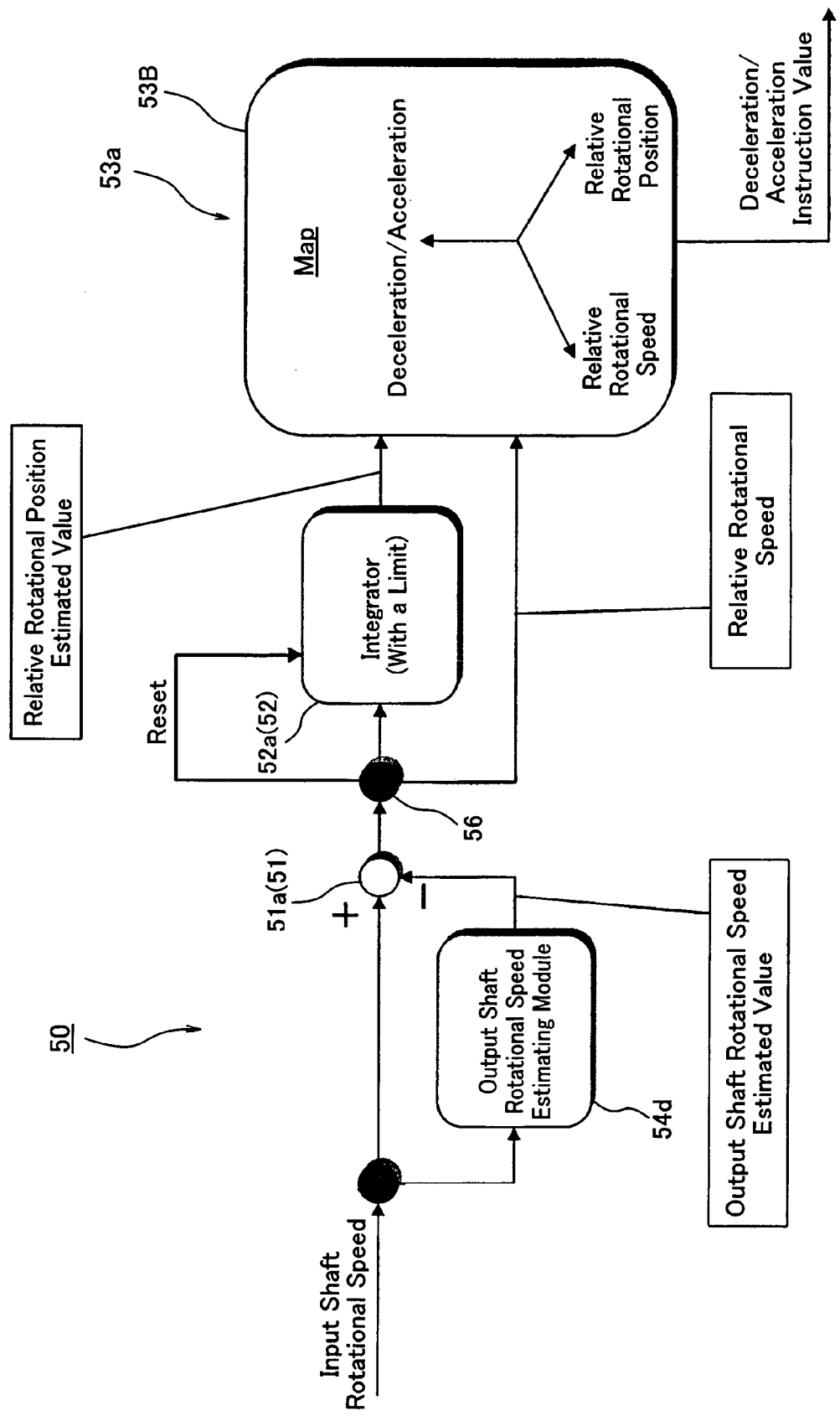
FIG. 25 is a control block diagram showing another configuration of the calculating device of the control apparatus according to the 6th Embodiment shown in FIG. 23C, and shows an example of the calculating device when using a value estimated from the input shaft rotational speed shown in FIG. 5.

To achieve the above function, as shown in FIG. 24 and FIG. 25, the branch module 56 is connected with the integrator 52a so that it is possible to reset the integration value of the integrator 52a. The branch module 56 is provided between the differentiator 51a, and the integrator 52a and the control module 53a. Since other configurations and functions are similar to that of the 1st Embodiment shown in FIG. 4 or FIG. 5, similar reference numerals are assigned to similar portions and, thus, the explanation thereof is omitted.

Figure 26:
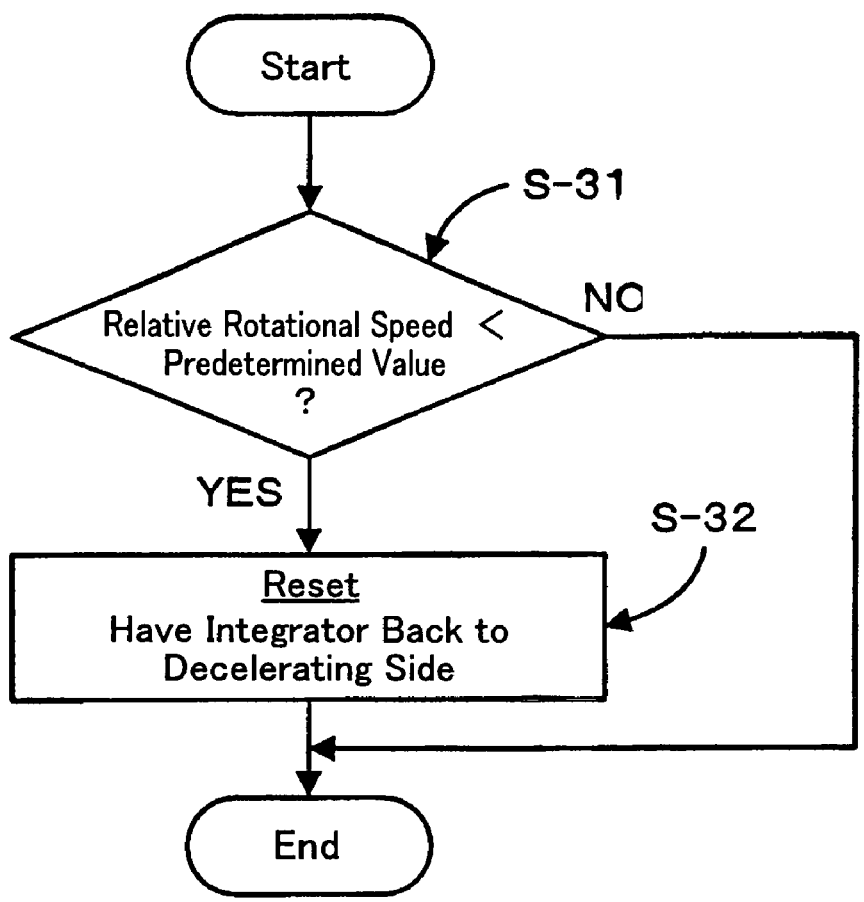
FIG. 26 is a flowchart for explaining an operation of the control module of the calculating device according to the 6th Embodiment shown in FIGS. 24 and 25.

Referring to a flowchart of FIG. 26, in this embodiment, the branch module 56 monitors the relative rotational speed being inputted and, first, it determines whether the relative rotational speed becomes less than a predetermined value (Step S-31). Although there are typically a positive value and a negative value for the relative speed, the expression used herein "a relative speed is less than a predetermined value" is defined as "an absolute value of the relative speed is less than the predetermined value." Moreover, the expression used herein "a relative speed is greater than a predetermined value" is defined as "an absolute value of the relative speed is greater than the predetermined value." The predetermined value is set as a value to cancel, for example, a detection error of a sensor. When it becomes less than the predetermined value ("YES" in Step S-31), the branch module 56 performs a Reset Process so that the integrator 52a is returned to the decelerating side (Step S-32), and terminates the routine. On the other hand, when it becomes greater than the predetermined value ("NO" in Step S-31), the branch module 56 terminates the routine.

In this embodiment, a moderate deceleration has been described. Instead, on the contrary, assuming a moderate acceleration, it may be configured such that the relative rotational position estimated value is forced in the accelerating side contact state, and forced to return to the accelerating side by the Reset Process. Since this process is obvious for those skilled in the art, the detailed explanation is omitted herein.

7TH EMBODIMENT

Figure 27A:
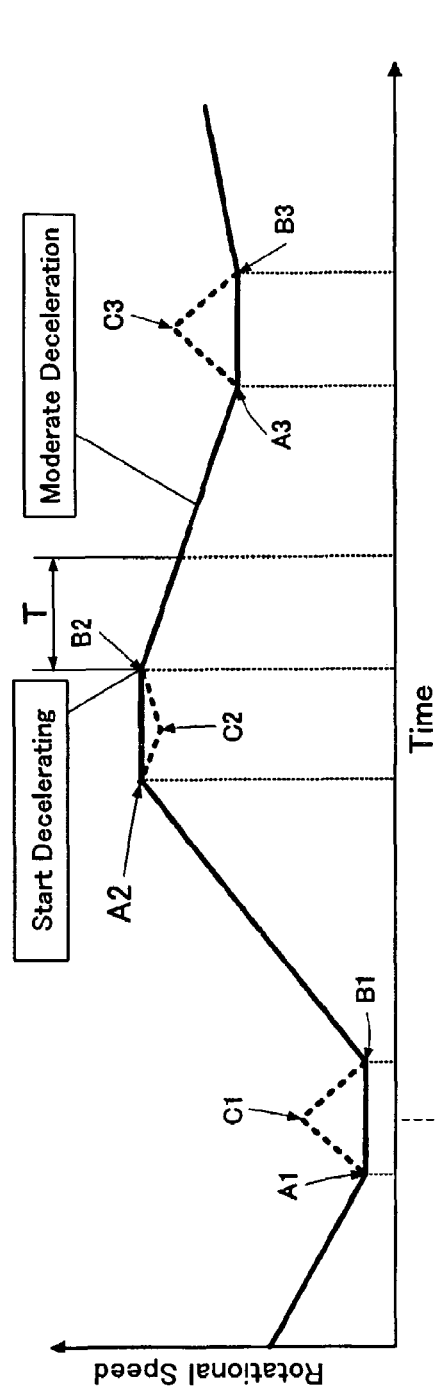
FIG. 27A is a graph for explaining a function of a control apparatus according to a 7th Embodiment, showing a change in rotational speeds of the input shaft and the output shaft during a moderate deceleration on y-axis with respect to time on x-axis.
Figure 27B:
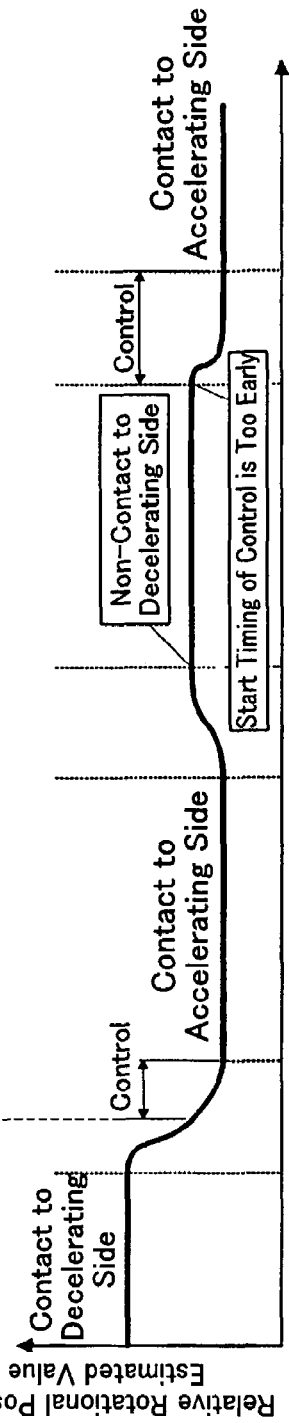
FIG. 27B is a corresponding graph of FIG. 27A, and shows a relative rotational position estimated value during the control according to the 1st Embodiment.

For example, as shown in FIGS. 27A and 27B, when the input shaft rotational speed is turned to a relatively large acceleration from a point A1 in the configuration shown in FIG. 4 or FIG. 5, a relatively large relative rotational speed occurs between the input shaft rotational speed and the output shaft rotational speed. Therefore, the integration value of the integrator 52a decreases (in this embodiment, it is configured such that the integration value is decreased when the input shaft rotational speed is greater than the output shaft rotational speed, and vice versa). Then, the relative rotational position estimated value shifts to the accelerating side contact state from the decelerating side contact state, while the deceleration control according to the present invention is performed.

Further, for example, when the input shaft rotational speed is turned to a moderate deceleration from a point A2, a small relative rotational speed occurs between the input shaft rotational speed and the output shaft rotational speed. Thus, the integration value does not increase greatly, due to a dead band of the integrator 52a, and the acceleration control may end before the relative rotational position estimated value is completely shifted to the decelerating side contact state from the accelerating side contact state. This results in an estimation error of the relative rotational position because in fact at this time, the relative rotational position should have shifted to the decelerating side contact state.

While in this state, for example, if the input shaft rotational speed is again turned to an acceleration from a point A3, the control module 53 immediately starts the deceleration control since the relative rotational position estimated value is already between the decelerating side contact state and the accelerating side contact state. Thereby, the relative rotational position estimated value shifts to the accelerating side contact state in a relatively short time, irrespective of the relative rotational speed Then, the deceleration control may not be performed normally since the control module 53 incorrectly recognizes that the relative rotational position estimated value is already shifted to the accelerating side contact state.

Figure 27C:
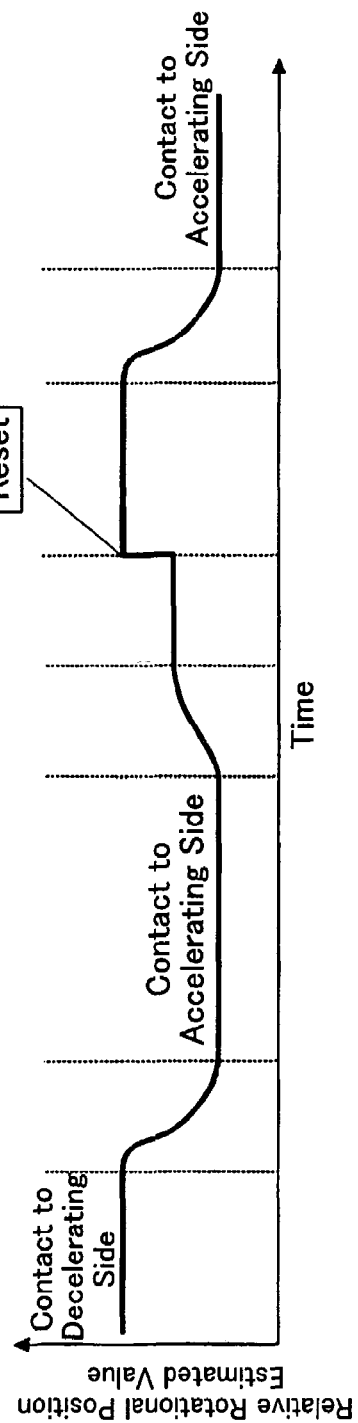
FIG. 27C is a corresponding graph of FIG. 27A, and shows a relative rotational position estimated value during the control according to the 7th Embodiment.

In this embodiment, as shown in FIG. 27C, it may be configured such that the relative rotational position which did not become in the decelerating side contact state by the moderate deceleration is compulsorily returned to the decelerating side contact state after a predetermined time T from the start of the deceleration.

Figure 28:
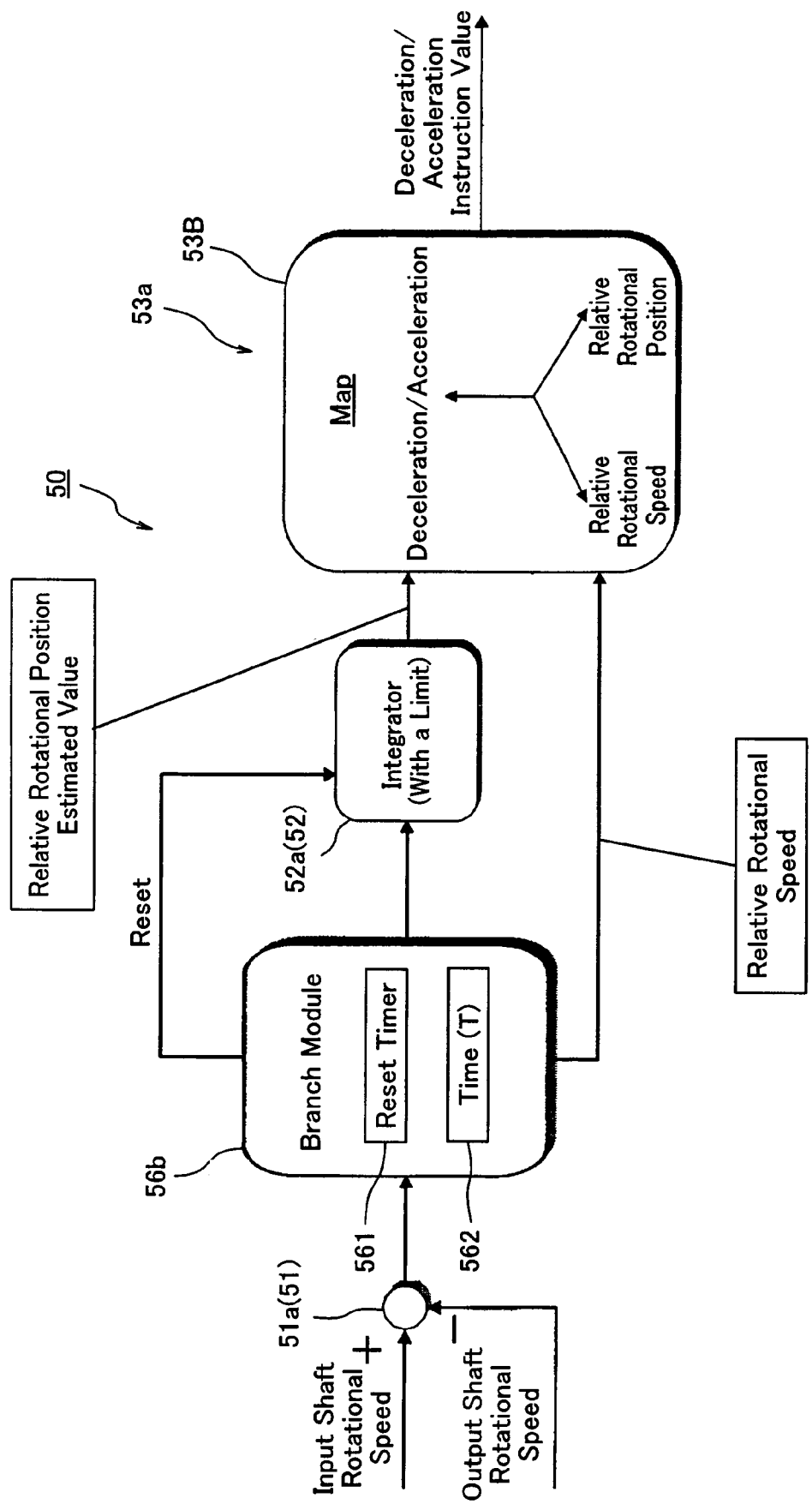
FIG. 28 is a control block diagram showing a configuration of the calculating device of the control apparatus according to the 7th Embodiment shown in FIG. 27C, and shows an example of the calculating device when using detection values of both the input shaft rotational speed and the output shaft rotational speed as shown in FIG. 4.
Figure 29:
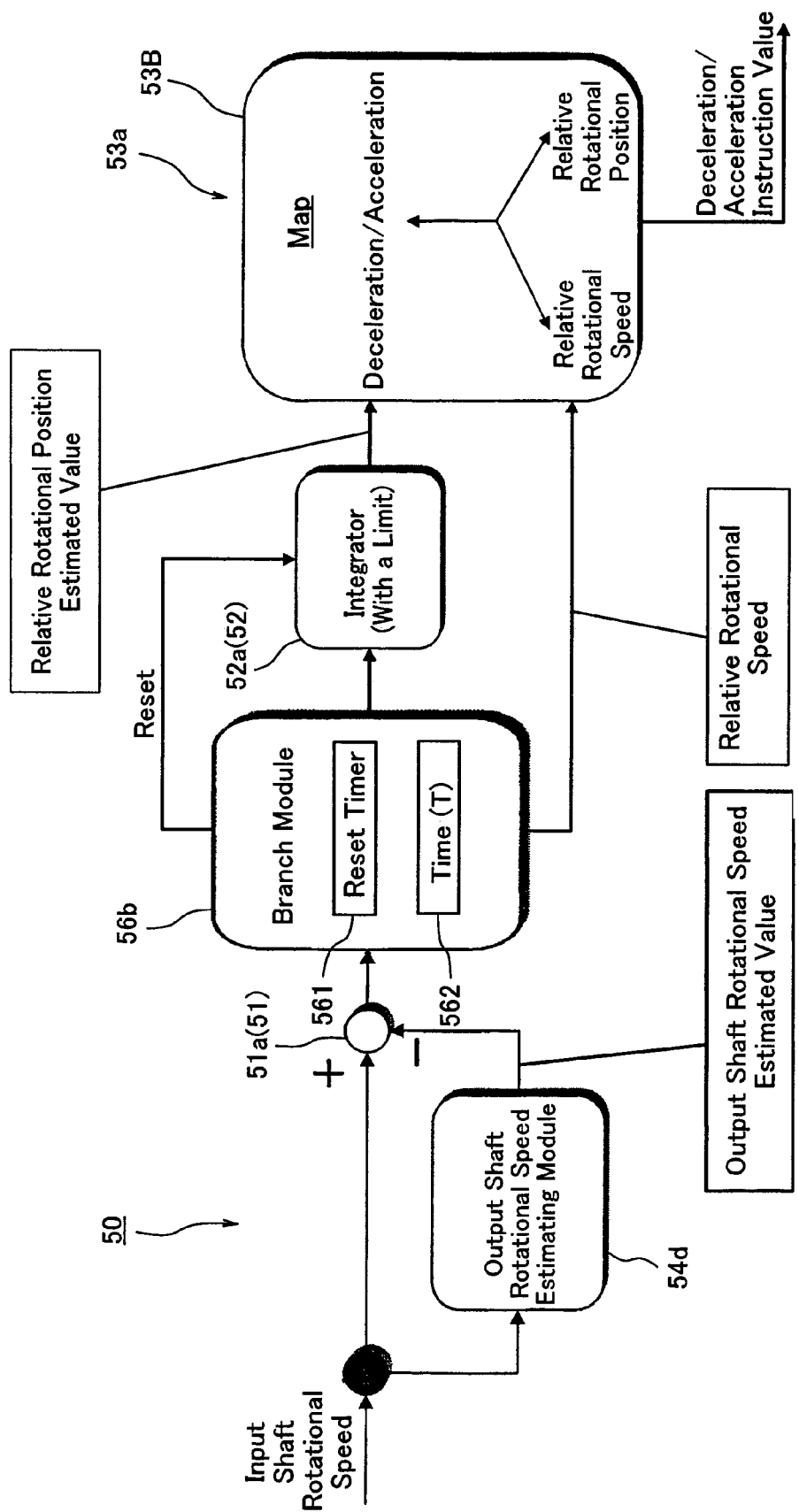
FIG. 29 is a control block diagram showing another configuration of the calculating device of the control apparatus according to the 7th Embodiment shown in FIG. 27C, and shows an example of the calculating device when using a value estimated from the input shaft rotational speed shown in FIG. 5.

To achieve the above function, as shown in FIG. 28 and FIG. 29, the branch module 56b is connected with the integrator 52a so that it is possible to reset the integration value of the integrator 52a. The branch module 56b is provided between the differentiator 51a, and the integrator 52a and the control module 53a, and includes a reset timer 561 and a memory area 562 configured to store the predetermined time T. The reset timer 561 is utilized such that it counts the predetermined time T stored in the time memory area 562, and the relative rotational position estimated value of the integrator 52a is reset (shifted) from the accelerating side contact state to the decelerating side contact state after a lapse of the predetermined time T. Since other configurations and functions are similar to that of the 1st Embodiment shown in FIG. 4 or FIG. 5, similar reference numerals are assigned to similar portions and, thus, the explanation thereof is omitted.

Figure 30:
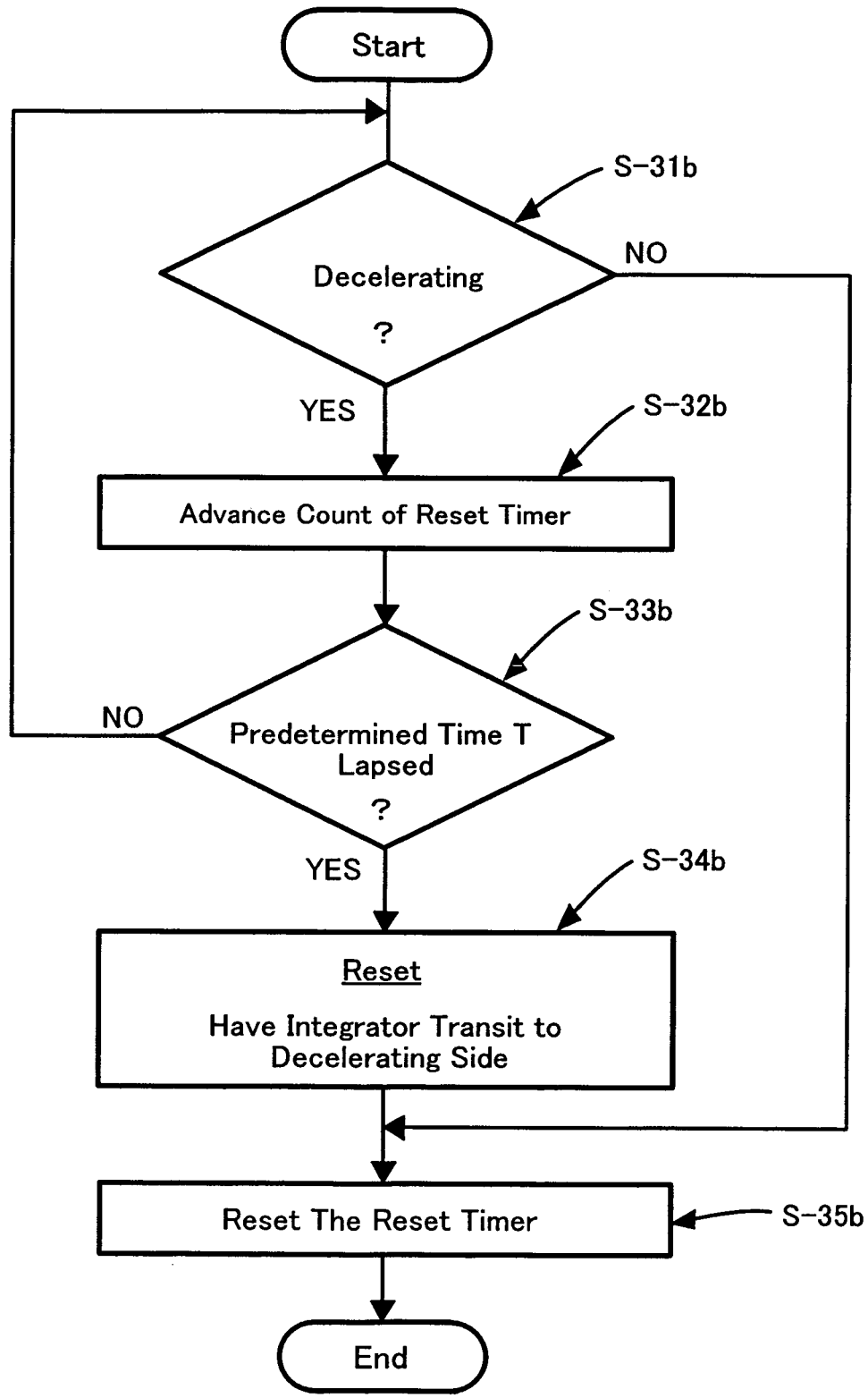
FIG. 30 is a flowchart for explaining an operation of the control module of the calculating device according to the 7th Embodiment shown in FIGS. 28 and 29.

Referring to a flowchart of FIG. 30, first, the branch module 56b determines whether the input shaft rotational speed which has been inputted is under deceleration (Step S-31b). If it is not under deceleration ("NO" in Step S-31b), the branch module 56b resets the reset timer 561 (Step S-35b), and terminates the routine.

On the other hand, if it is under deceleration ("YES" in Step S-31b), the branch module 56b advances the count of the reset timer 561 (Step S-32b). The branch module 56b determines whether the count of the reset timer 561 lapses the predetermined time T stored in the time memory area 562 (Step S-33b). If the predetermined time T is not lapsed ("NO" in Step S-33b), the routine is repeated from Step S-31b.

On the other hand, if the predetermined time T is lapsed ("YES" in Step S-33b), the branch module 56b performs the Reset Process so that the relative rotational position estimated value of the integrator 52a is completely shifted to the decelerating side contact state (Step S-34b), further, resets the reset timer 561 (Step S-35b), and terminates the routine.

In this embodiment, a moderate deceleration has been described. Instead, on the contrary, assuming a moderate acceleration, it may be configured such that the relative rotational position estimated value is forced in the accelerating side contact state, and forced to shift to the accelerating side by the Reset Process. Since this process is known to those skilled in the art, the detailed explanation is omitted herein.

8TH EMBODIMENT

Figure 31:
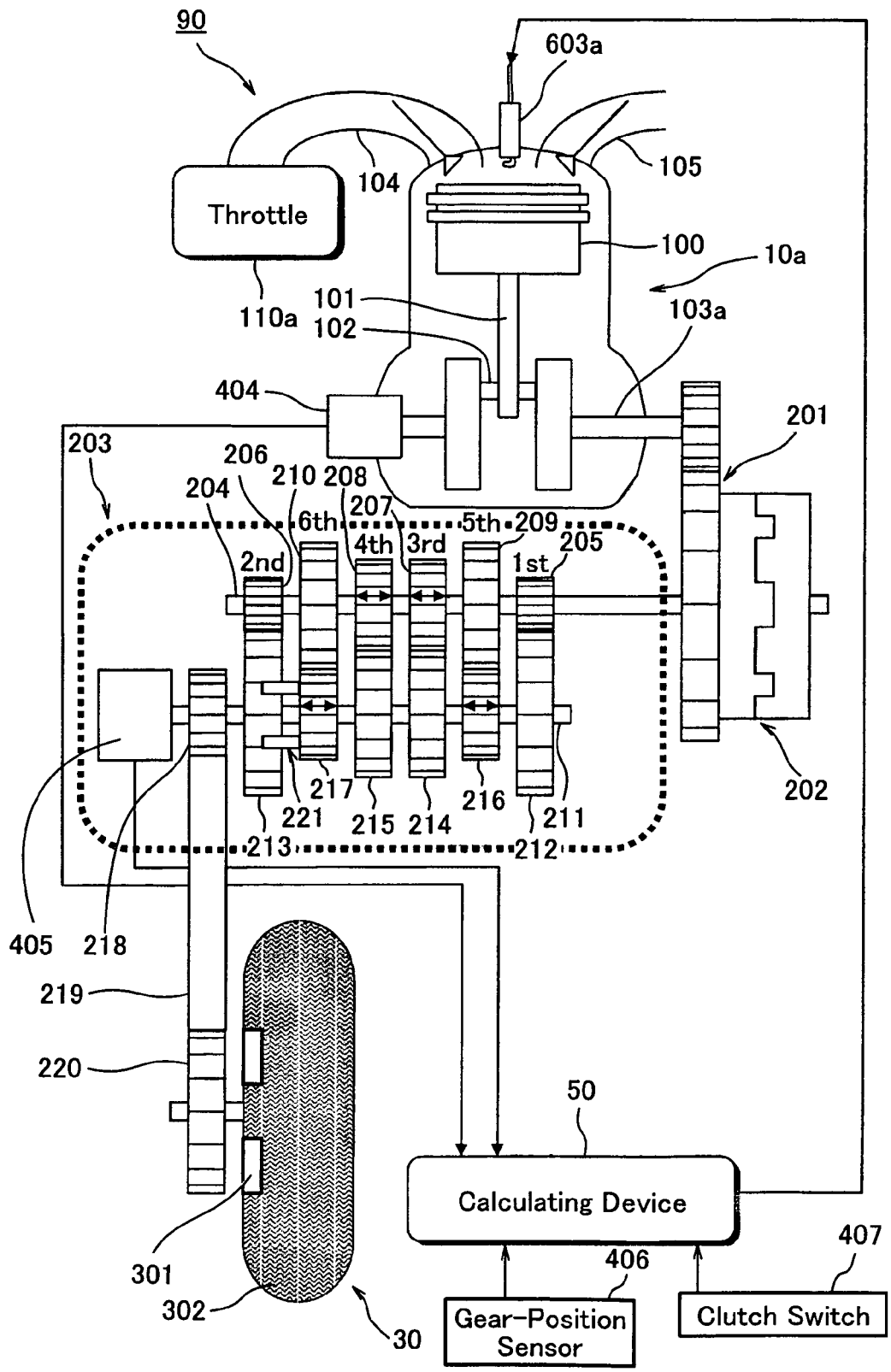
FIG. 31 is a block diagram showing 8th through 11th Embodiments in which the control apparatus according to the present invention is applied to a vehicle which is equipped with an internal combustion engine of forced-ignition type as the drive source.

FIG. 31 is a block diagram showing another example in which the calculating device 50 as shown in FIG. 4 is applied to a vehicle 90 equipped with an internal combustion engine 10a of forced-ignition type as the drive source 10. In this embodiment, an input shaft sensor (shown by a reference numeral 404) is not provided on the main shaft 204, but instead, it is disposed in a position which is separated from the output shaft sensor 405 provided on the drive shaft 211 with a clutch 202 being intervened, in the power transmission path. Further in this embodiment, it is configured such that the acceleration/deceleration control according to the present invention is performed only by an ignition control of the internal combustion engine 10a.

Although the internal combustion engine 10a is shown as a reciprocal internal combustion engine of a single cylinder in FIG. 31, it may be any other types of internal combustion engines in this embodiment.

The internal combustion engine 10a includes a connecting rod 101. The lower end of the connecting rod 101 is coupled to a crank pin 102. One end of a crankshaft 103a which extends successively from the crank pin 102 is connected with a clutch 202 through a primary transmission 201. The input shaft sensor 404 is provided at the other end of the crankshaft 103*a*, and is configured to detect a rotational speed of the crankshaft 103*a*, that is, an engine speed.

The primary transmission 201 is coupled to a main shaft 204 which is an input shaft of a transmission device 203, through the clutch 202. Inside of the transmission device 203, 1st-6th gears 205-210 are arranged on the main shaft 204 from the clutch 202 side. Also in the transmission device 203, a drive shaft 211 which is an output shaft of the transmission device 203 is disposed in parallel with the main shaft 204. On the drive shaft 211, 1st-6th gears 212-217, a drive sprocket 218, and an output shaft sensor 405 are arranged from the clutch 202 side.

In this embodiment, the 1st-6th gears 205-210 on the main shaft 204 and the 1st-6th gears 212-217 on the drive shaft 211 are always in a state in which they mate each other, respectively.

The drive sprocket 218 is connected with a driven sprocket 220 through a chain 219. A secondary transmission device includes the drive sprocket 218, the chain 219, and the driven sprocket 220. The driven sprocket 220 is coupled to a tire 302 through a coupling damper 301 formed inside the wheel 30.

FIG. 31 shows a state in which the 2nd gear 213 and the 6th gear 217 on the drive shaft 211 are connected through the dog clutch 221, for an illustration purpose. A linear movement of the piston 100 generated by combustion of the internal combustion engine 10*a* is converted into a rotational movement of the crankshaft 103*a* by the connecting rod 101, the crank pin 102, and the crankshaft 103*a*. The converted rotational movement is inputted into the main shaft 204 through the primary transmission 201 and the clutch 202. Then, the rotation is transmitted to the drive shaft 211 through one of the combinations of the 1st-6th gears 205-210 on the main shaft 204 and the 1st-6th gears 212-217 on the drive shaft 211 depending on a transmission ratio therebetween selected. The rotation of the drive shaft 211 is transmitted through the drive sprocket 218, the chain 219, and the driven sprocket 220 in this order and, thus, drives the wheel 30 (and the tire 302). If the internal combustion engine 10*a* is not generating a power, a rotation of the tire 302 may rotate the crankshaft 103*a* through the power transmission path in the opposite direction and, then, it moves the piston 100.

In this embodiment, a section of the transmission path from the crankshaft 103*a* to the drive shaft 211 is selected as the controlled section. The input shaft sensor 404 detects the rotational speed of the crankshaft 103*a* which is the input shaft, and transmits a detection result to the calculating device 50. The output shaft sensor 405 detects the rotational speed of the drive shaft 211 which is the output shaft, and transmits a detection result to the calculating device 50.

The calculating device 50 is connected with a spark plug 603 of the internal combustion engine 10*a* as the input shaft accelerating/decelerating module. The calculating device 50 performs the acceleration/deceleration control according to the present invention based on the detection results transmitted from the input shaft sensor 404 and the output shaft sensor 405, respectively so that it performs a retard/advance (a deceleration/acceleration) of the internal combustion engine 10*a* by an ignition control of the spark plug 603*a*.

Moreover, in this embodiment, the calculating device 50 is connected with the gear-position sensor 406 which is the neutral detecting module. The gear-position sensor 406 detects which gear the transmission is shifted or whether it is in the neutral position, and transmits the detection result to the calculating device 50. The calculating device 50 is configured so that it inhibits or permits the output of the deceleration/acceleration instruction value, in accordance with the detection result (which is an ignition instruction, etc., to the spark plug 603*a*, in this case).

Other configurations and functions are similar to the embodiment of FIG. 6, similar reference numerals are assigned to similar portions and, thus, the explanation thereof is omitted.

Figure 32:
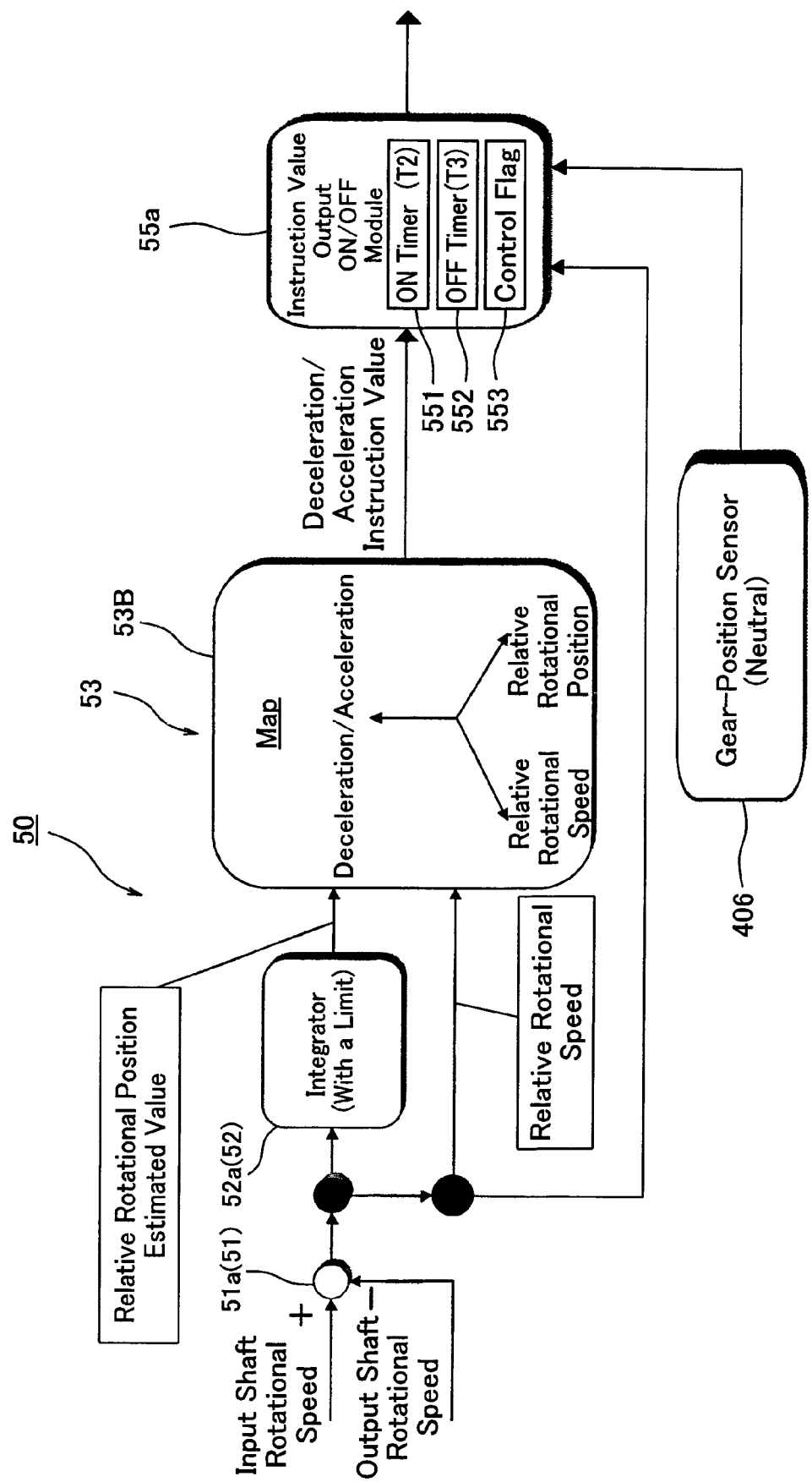
FIG. 32 is a control block diagram showing a configuration of the calculating device of the control apparatus according to the 8th Embodiment, and shows an example of the calculating device when using detection values of both the input shaft rotational speed and the output shaft rotational speed as shown in FIG. 4.

FIG. 32 is a control block diagram showing an example of the detailed configuration of the calculating device 50 shown in FIG. 31. In this embodiment, the calculating device 50 includes a differentiator 51*a* as the relative rotational speed calculating module 51, an integrator 52*a* as the relative rotational position estimating module 52, a control module 53, and an instruction value output ON/OFF module 55*a* as the acceleration/deceleration adjusting module.

The differentiator 51*a* is provided with both the input shaft rotational speed from the input shaft sensor 404 and the output shaft rotational speed from the output shaft sensor 405. The differentiator 51*a* calculates a difference between the input shaft rotational speed and the output shaft rotational speed (that is, a relative rotational speed). The calculated relative rotational speed is transmitted to the control module 53 as well as to the integrator 52*a*. The integrator 52*a* estimates a relative rotational position by integrating the relative rotational speeds. The estimated relative rotational position is transmitted to the control module 53.

The control module 53 includes a map 53B (see FIG. 3) which is used by the control logic 53A mentioned above. The map 53B typically stores deceleration/acceleration instruction values corresponding to the relative rotational speeds and the relative rotational positions. The control module 53 calculates a deceleration/acceleration instruction value with reference to the map 53B based on the relative rotational speed transmitted from the differentiator 51*a* and the relative rotational position estimated value transmitted from the integrator 52*a*. Then, the control module 53 outputs the calculated deceleration/acceleration instruction value through the instruction value output ON/OFF module 55*a* typically to an appropriate drive device of the spark plug 603*a* which is the accelerating/decelerating module 60 (see FIG. 2).

In addition to the deceleration/acceleration instruction value from the control module 53, the detection result indicating whether it is in the neutral position from the gear-position sensor 406 and the relative rotational speed calculated by the differentiator 51*a* as mentioned above are transmitted to the instruction value output ON/OFF module 55*a*.

The instruction value output ON/OFF module 55*a* includes an ON-timer 551, an OFF-timer 552, and a control flag memory area 553 configured to store a control flag.

FIGS. 33A and 33B show an assumption in which a gear shift is made from the 1st gear to the 2nd gear through the neutral position.

As shown in FIG. 33A, an engine speed, that is, the rotational speed of the crankshaft 103*a* which is the input shaft is increased by opening the throttle 110*a* with the gear position being in the 1st gear. Then, when the gear is put into the neutral position before it is shifted to the 2nd gear, it is possible to detect an output shaft rotational speed by the output shaft sensor 405. However, since the behavior of the output shaft rotational speed is unknown, the acceleration control according to the present invention may become unstable if the control is carried out upon the occurrence of the relative rotational speed with respect to the input shaft rotational speed. In this embodiment, it is configured so that the instruction value output ON/OFF module 55a filters the deceleration/acceleration instruction value being outputted from the control module 53 when the gear is in the neutral position, even if a relative rotational speed difference occurs.

Typically, if the control flag stored in the control flag memory area 553 is ON, the instruction value output ON/OFF module 55a allows the deceleration/acceleration instruction value transmitted from the control module 53 to pass therethrough. On the other hand if the control flag is OFF, the instruction value output ON/OFF module 55a does not allow the deceleration/acceleration instruction value to pass therethrough.

Figure 34:
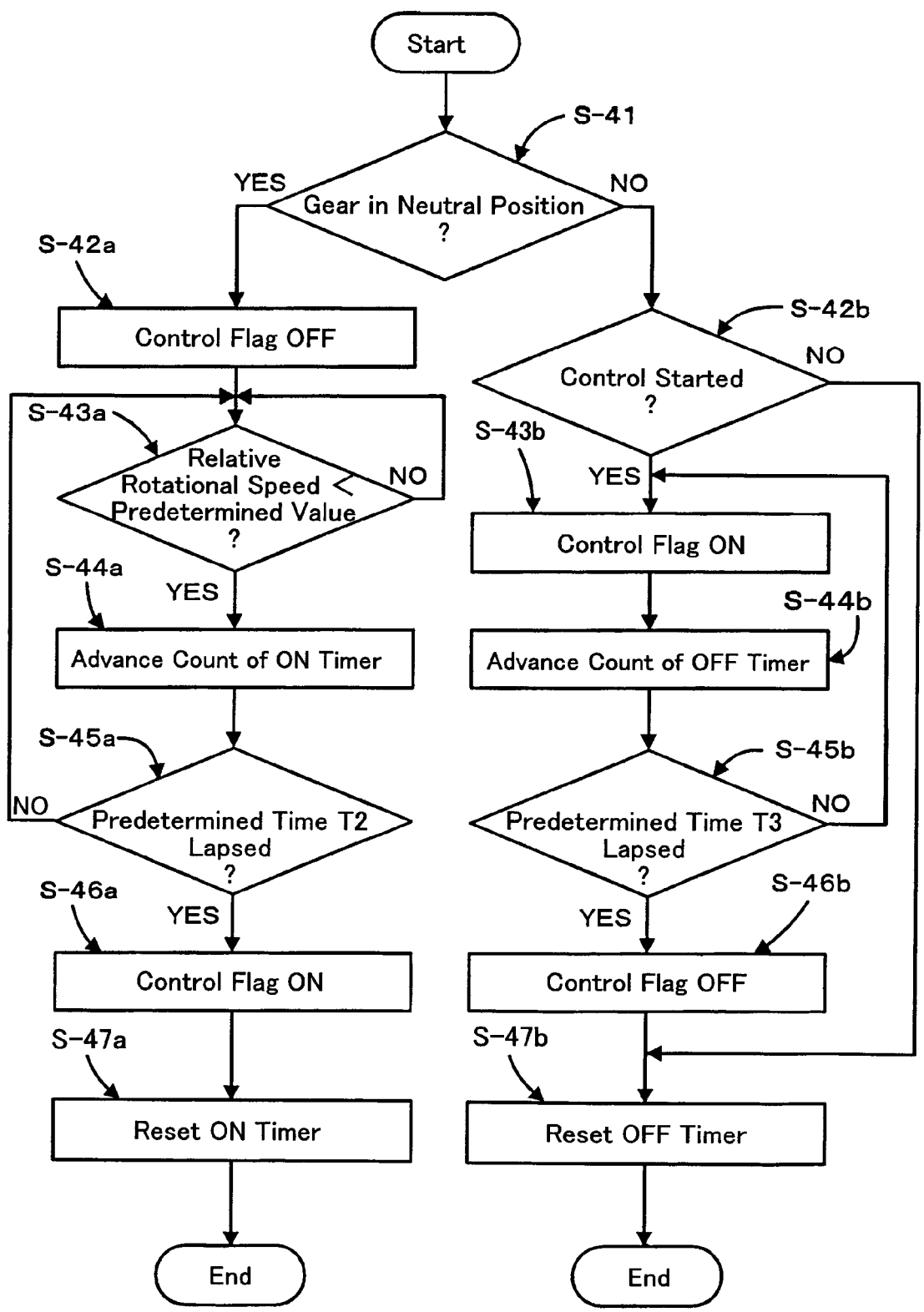
FIG. 34 is a flowchart for explaining an operation of the instruction value output ON/OFF module of the calculating device according to the 8th Embodiment shown in FIG. 32.

Next, an operation of the instruction value output ON/OFF module 55a will be explained referring to a flowchart of FIG. 34. The instruction value output ON/OFF module 55a operates upon an input of the deceleration/acceleration instruction value from the control module 53 and, then, determines whether the gear is in the neutral position based on the information transmitted from the gear-position sensor 406 (Step S-41).

If the gear is in the neutral position ("YES" in Step S-41), the instruction value output ON/OFF module 55a sets the control flag stored in the control flag memory area 553 to OFF (Step S-42a). Then, the instruction value output ON/OFF module 55a determines whether the relative rotational speed transmitted from the differentiator 51a is less than a predetermined value (Step S-43a). If the relative rotational speed is greater than the predetermined value ("NO" in Step S-43a), the instruction value output ON/OFF module 55a repeats this Step S-43a. On the other hand, if the relative rotational speed is less than the predetermined value ("YES" in Step S-43a), the instruction value output ON/OFF module 55a advances the count of the ON-timer 551 (Step S-44a). Then, the instruction value output ON/OFF module 55a determines whether the count of the ON-timer 551 lapses a predetermined time T2 (Step S-45a). If the predetermined time T2 is not lapsed ("NO" in Step S-45a), the instruction value output ON/OFF module 55a repeats the routine from Step S-43a. On the other hand, if the predetermined time T2 is lapsed ("YES" in Step S-45a), the instruction value output ON/OFF module 55a sets the control flag stored in the control flag memory area 553 to ON (Step S-46a), resets the ON-timer 551 (Step S-47a), and terminates the routine.

On the other hand, in Step S-41, if the gear is not in the neutral position ("NO" in Step S-41), the instruction value output ON/OFF module 55a determines whether the acceleration/deceleration control according to the present invention is started based upon the output of the deceleration/acceleration instruction value from the control module 53 (Step S-42b). If the acceleration/deceleration control according to the present invention is not started ("NO" in Step S-42b), the instruction value output ON/OFF module 55a resets the OFF-timer (Step S-47b) and, then, terminates the routine.

On the other hand, if the acceleration/deceleration control according to the present invention is started ("YES" in Step S-42b), the instruction value output ON/OFF module 55a sets the control flag stored in the control flag memory area 553 to ON (Step S-43b). Then, the instruction value output ON/OFF module 55a advances the count of the OFF-timer 552 (Step S-44b), and determines whether the count of the OFF-timer 552 lapses the predetermined time T3 (Step S-45b). If the predetermined time T3 is not lapsed ("NO" in Step S-45b), the instruction value output ON/OFF module 55a repeats the routine from Step S-43b. On the other hand, if the predetermined time T3 is lapsed ("YES" in Step S-45b), the instruction value output ON/OFF module 55a sets the control flag stored in the control flag memory area 553 to OFF (Step S-46b), resets the OFF-timer 552 (Step S-47b), and terminates the routine.

By the above operation of the instruction value output ON/OFF module 55a, as shown in FIGS. 33A and 33B, an engine speed, that is, the rotational speed of the crankshaft 103a which is the input shaft is increased by opening the throttle 110a with the gear position being in the 1 st gear. Then, if the gear is put into the neutral position before it is shifted to the 2nd gear, the output shaft rotational speed may be detected by the output shaft sensor 405. However, since the behavior of the output shaft rotational speed is unknown, the instruction value output ON/OFF module 55a turns the control flag to OFF even if the relative rotational speed is occurred with respect to the input shaft rotational speed, and does not allow the deceleration/acceleration instruction value to pass therethrough. When the gear is in the neutral position, the gear on the main shaft 204 is not operably connected with the respective gear on the drive shaft 211 which is the output shaft and, thus, there is no reliability in the value which the output shaft sensor 405 detects. Therefore, in this embodiment, the output shaft rotational speed at this point is determined as a zero value, and it is shown such in FIG. 33A.

Then, when the gear is shifted into the 2nd gear from the neutral position, the gear goes through a half-clutch state and, then, goes into the 2nd gear. In this transition state (i.e., the half-clutch state), as shown in FIG. 33B, it is also unknown whether the relative rotational position is shifted to the decelerating side contact state from the accelerating side contact state.

However, when the input shaft rotational speed is decelerated after the gear is shifted into the 2nd gear, in due course, the relative rotational position should be shifted to the decelerating side contact state and, then, the output shaft rotational speed is outputted from the output shaft sensor 405 with a normal value. Thus, the output shaft rotational speed and the input shaft rotational speed become the same value. Therefore, the instruction value output ON/OFF module 55a determines this condition by the relative rotational speed being less than the predetermined value, and starts the ON-timer 551 from this point for counting the predetermined time T2. When the predetermined time T2 which corresponds to a time necessary for shifting to the decelerating side contact state passes, the control flag is again returned to ON, and the instruction value output ON/OFF module 55a begins to allow the deceleration/acceleration instruction value to pass therethrough.

Then, when the input shaft rotational speed is turned to an acceleration, a relative rotational speed difference occurs between the output shaft rotational speed, and the normal deceleration control according to the present invention is performed as mentioned above.

Further in this embodiment, as shown in FIG. 33B, after the deceleration control according to the present invention is started (at a point J), it is determined that the power transmission members are in transition to the accelerating side contact state to re-contact, and the control flag is forced to be ON as shown in FIG. 33B, even though it is already in the ON-state after the lapse of the predetermined time T2 so that the deceleration control is assured for the following acceleration of the input shaft. Further, the control flag is maintained in the ON-state during the predetermined time T3, even if the relative rotational position estimated value is shifted to the accelerating side contact state, to continue assuring the deceleration control. Then, after the predetermined time T3, the control flag is turned to OFF so that the acceleration control is now performed.

9TH EMBODIMENT

Figure 35:
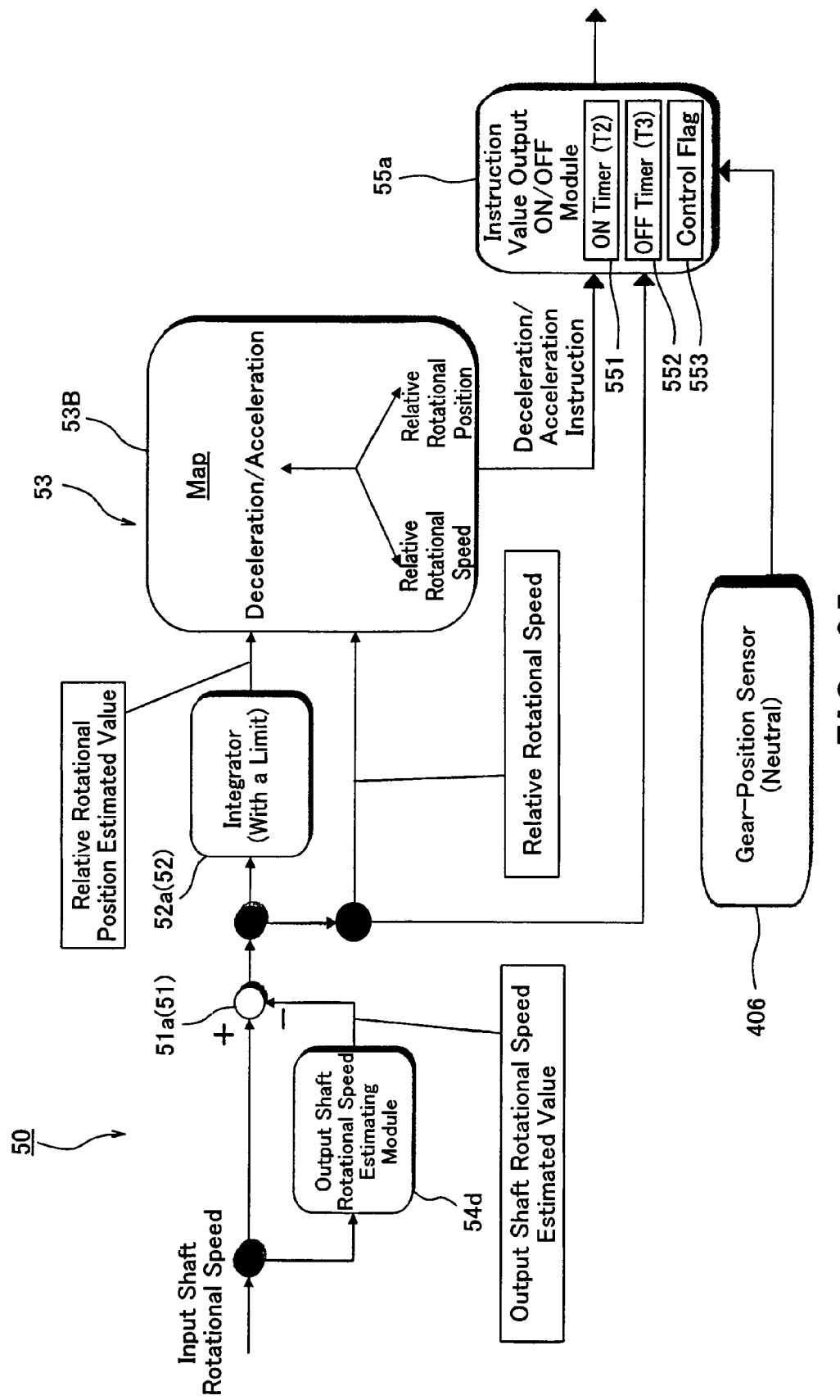
FIG. 35 is a control block diagram showing a configuration of the calculating device of the control apparatus according to the 9th Embodiment, and shows an example in which the configuration of the 8th Embodiment is applied to the calculating device when using a value estimated from the input shaft rotational speed as shown in FIG. 5.

Although a configuration to detect an output shaft rotational speed by the output shaft sensor has been described in the above 8th Embodiment, it is also applicable to a configuration which estimates the output shaft rotational speed from the input shaft rotational speed as shown in FIG. 35 (similar to the configuration in FIG. 5). Therefore, similar reference numerals are assigned to similar portions, and further explanations of other configurations and functions thereof will be omitted.

10TH EMBODIMENT

Figure 37A:
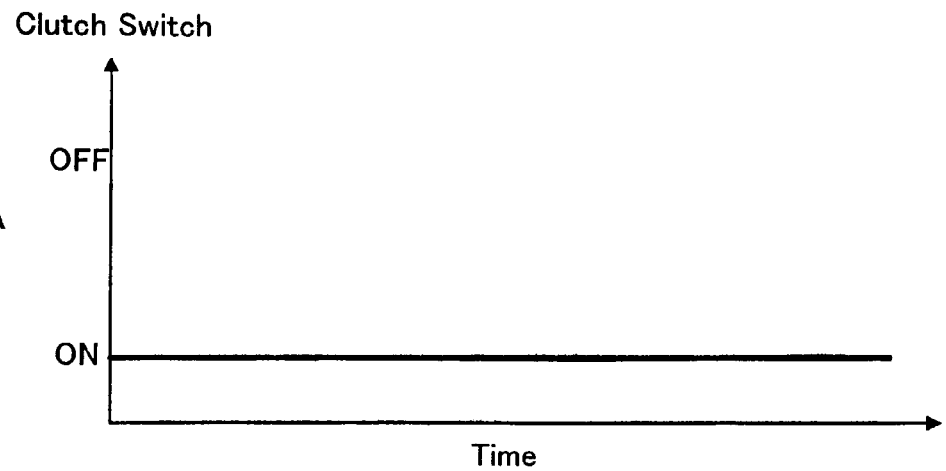
FIG. 37A is a graph for explaining a function of the control apparatus according to the 10th Embodiment shown in FIG. 36, and shows an ON/OFF-state of a clutch on y-axis with respect to time on x-axis.
Figure 37B:
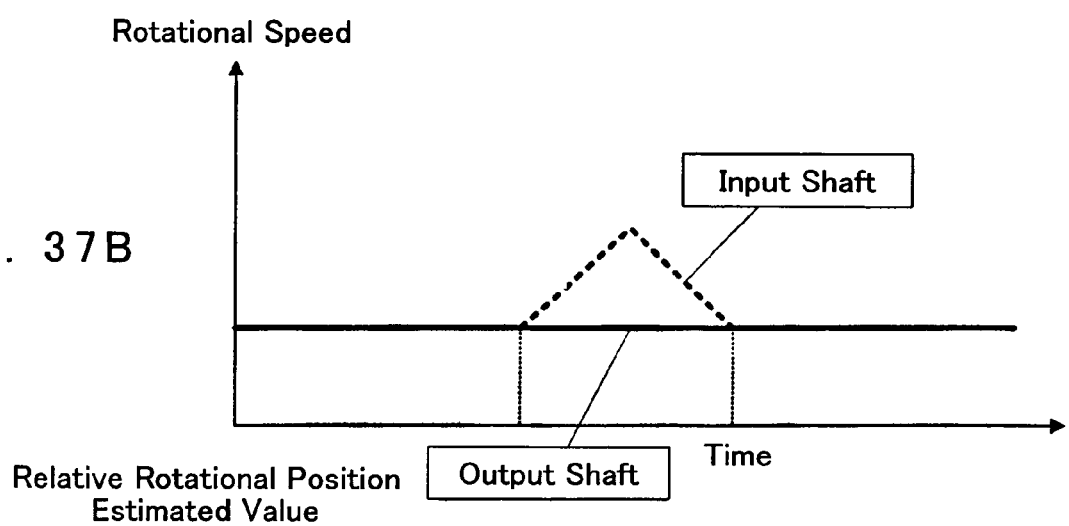
FIG. 37B is a corresponding graph of FIG. 37A, showing a change in rotational speeds of the input shaft and the output shaft in the state in which the clutch is disconnected.
Figure 37C:
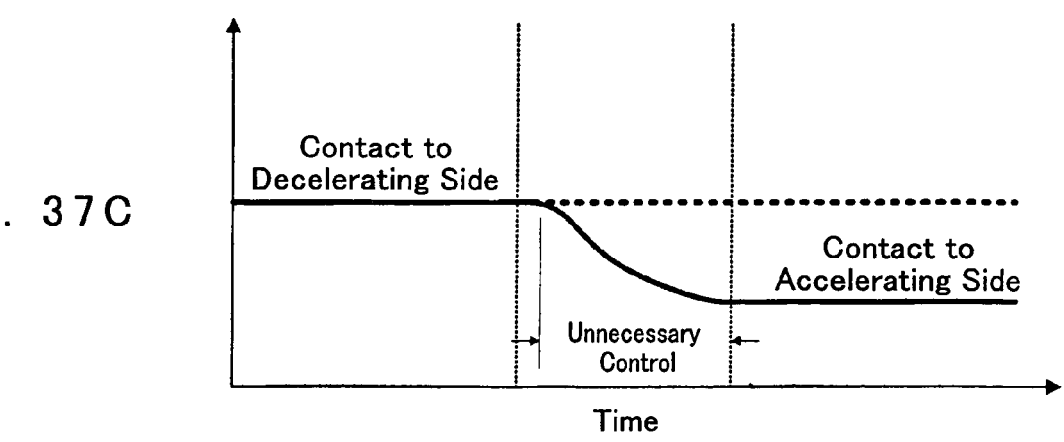
FIG. 37C is a corresponding graph of FIG. 37A, showing a change in a relative rotational position estimated value.

For example, in the configuration as shown in FIG. 31, as shown in FIG. 37A or 37C, when the engine speed, that is, the rotational speed of the crankshaft 103a which is the input shaft, is increased by opening the throttle 110a, while the clutch being disconnected (i.e., the clutch switch 407 as the clutch connection/disconnection detecting module is in the ON-state), the output shaft rotational speed does not change. However, a relative rotational speed also occurs in this case between the input shaft rotational speed and the output shaft rotational speed and, thus based on this, the deceleration control according to the present invention (in this case, the control is an unintentional or unnecessary control) is carried out. Then, as shown with a solid line FIG. 37C, the relative rotational position estimated value is shifted from the decelerating side contact state to the accelerating side contact state, unlike an actual relative rotational position.

In this embodiment, when the clutch is disconnected (that is, when the clutch switch 407 is ON) even if the relative rotational speed difference occurs, it is configured so that the instruction value output ON/OFF module 55b (see FIG. 36) as the acceleration/deceleration adjusting module filters the deceleration/acceleration instruction value outputted from the control module 53.

Figure 36:
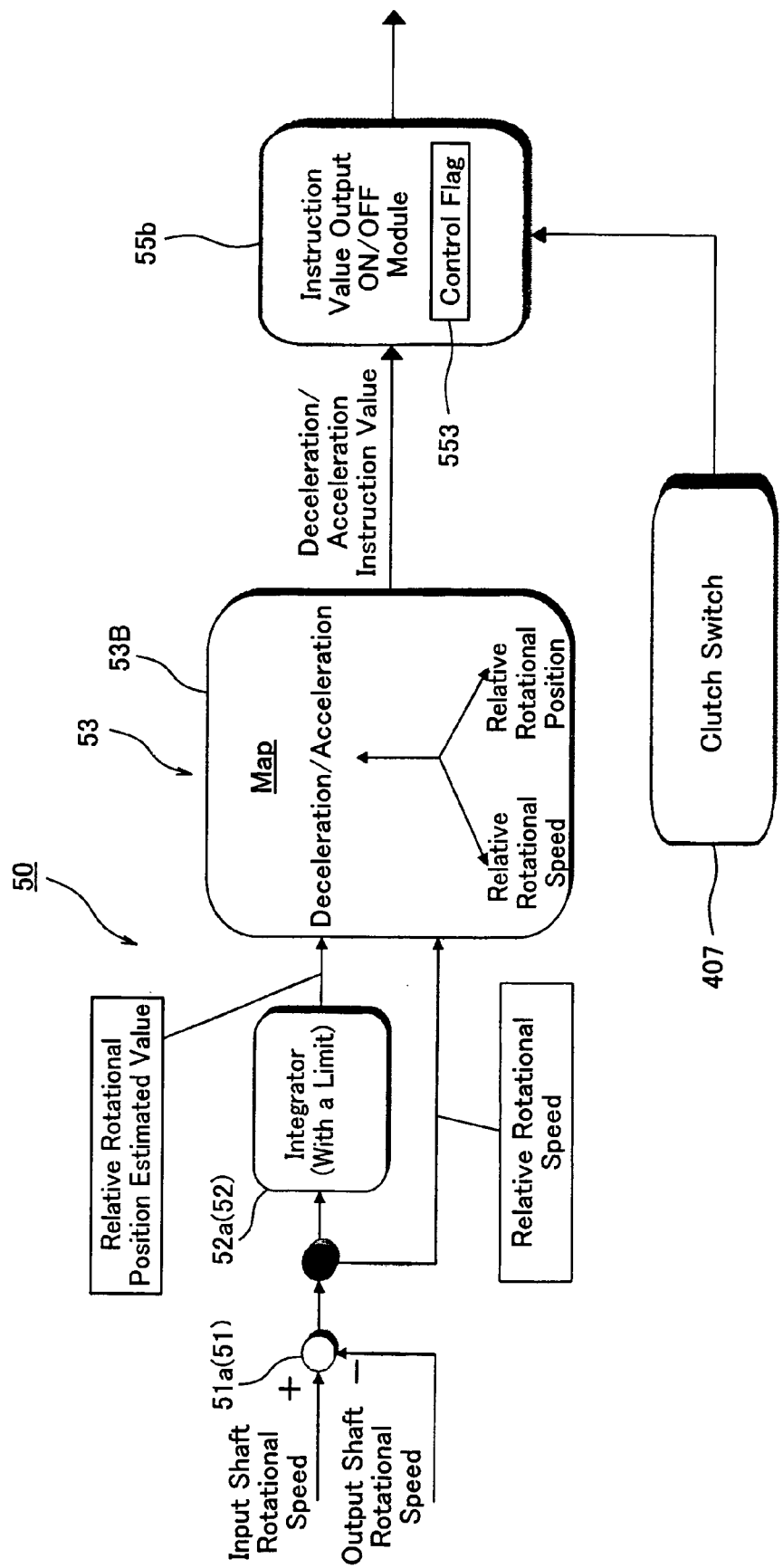
FIG. 36 is a control block diagram showing a configuration of the calculating device of the control apparatus according to the 10th Embodiment, and shows an example of the calculating device when using detection values of both the input shaft rotational speed and the output shaft rotational speed as shown in FIG. 4.

As shown in FIG. 36, the calculating device 50 according to this embodiment includes a differentiator 51a as the relative rotational speed calculating module 51, an integrator 52a as the relative rotational position estimating module 52, a control module 53, and an instruction value output ON/OFF module 55b.

The differentiator 51a is provided with both the input shaft rotational speed from the input shaft sensor 404 and the output shaft rotational speed from the output shaft sensor 405. The differentiator 51a calculates a difference between the input shaft rotational speed and the output shaft rotational speed (that is, a relative rotational speed). The calculated relative rotational speed is transmitted to the control module 53 as well as to the integrator 52a. The integrator 52a estimates a relative rotational position by integrating the relative rotational speeds. The estimated relative rotational position is transmitted to the control module 53.

The control module 53 includes a map 53B which is utilized by the control logic 53A (see FIG. 2). The map 53B (see FIG. 3) typically stores deceleration/acceleration instruction values corresponding to the relative rotational speeds and the relative rotational positions. The control module 53 calculates a deceleration/acceleration instruction value based on the relative rotational speed transmitted from the differentiator 51a and the relative rotational position estimated value transmitted from the integrator 52a with reference to the map 53B. The control module 53 outputs the calculated deceleration/acceleration instruction value through the instruction value output ON/OFF module 55b to the drive device of the spark plug 603a (for example, see FIG. 31) which is the accelerating/decelerating module 60 (see FIG. 2).

Besides the deceleration/acceleration instruction value from the control module 53 mentioned above, the instruction value output ON/OFF module 55b is provided with a detection result from the clutch switch 407 indicating that the clutch 202 is connected (the clutch switch 407 is OFF) or is disconnected (the clutch switch 407 is ON). The instruction value output ON/OFF module 55b includes a control flag memory area 553 configured to store a control flag.

Specifically, the instruction value output ON/OFF module 55b passes the deceleration/acceleration instruction value transmitted from the control module 53 therethrough if the control flag stored in the control flag memory area 553 is ON, and does not allow the deceleration/acceleration instruction value to pass therethrough, if the control flag is OFF.

Figure 38:
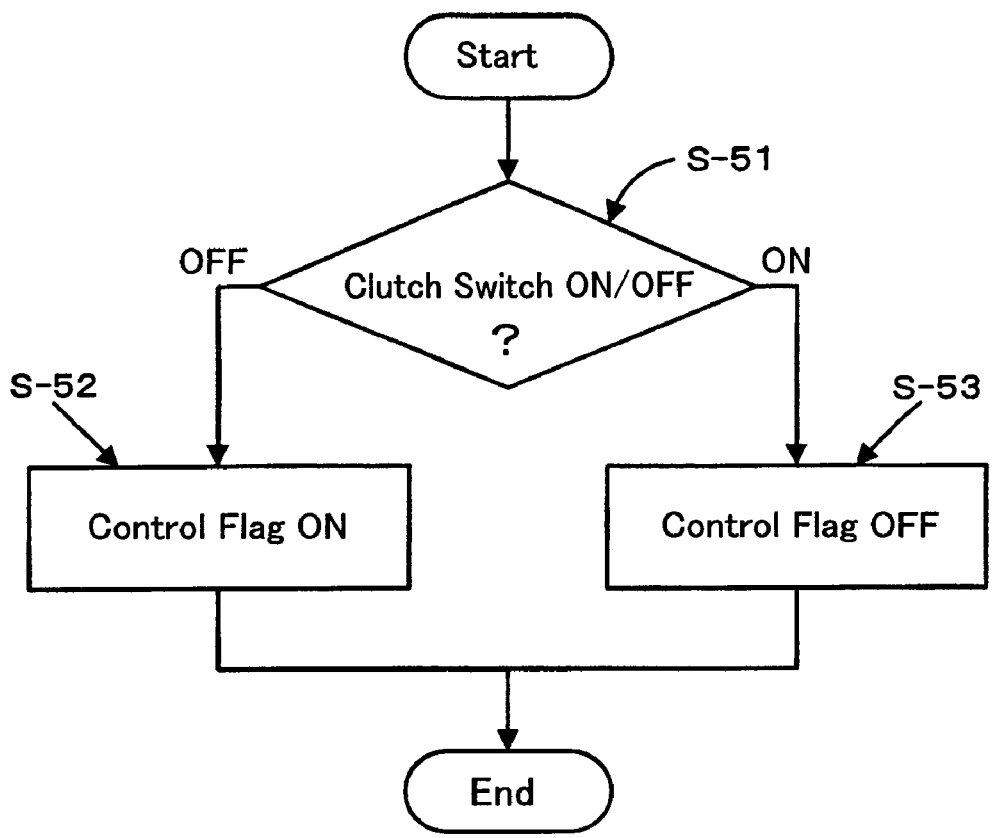
FIG. 38 is a flowchart for explaining an operation of the instruction value output ON/OFF module of the calculating device according to the 10th Embodiment shown in FIG. 36.

Next, an operation of the instruction value output ON/OFF module 55b will be explained referring to a flowchart of FIG. 38. The instruction value output ON/OFF module 55b operates upon an input of the deceleration/acceleration instruction value from the control module 53. First, the instruction value output ON/OFF module 55b determines whether the clutch switch 407 is in either an ON-state or an OFF-state based on the information transmitted from the clutch switch 407 (Step S-51).

If the clutch switch 407 is in the OFF-state ("OFF" in Step S-51), the instruction value output ON/OFF module 55b sets the control flag stored in the control flag memory area 553 to ON (Step S-52), and terminates the routine.

On the other hand, if the clutch switch 407 is in the ON-state ("ON" in Step S-51), the instruction value output ON/OFF module 55b sets the control flag stored in the control flag memory area 553 to OFF (Step S-53), and terminates the routine.

By the above operation of the instruction value output ON/OFF module 55b, as shown in FIG. 37C, when the clutch switch 407 is in the ON-state, even if the relative rotational speed is occurred between the input shaft rotational speed and the output shaft rotational speed, the deceleration control according to the present invention is not performed based on this. As shown with a dotted line in FIG. 37C, the relative rotational position estimated value is maintained in the decelerating side contact state so that it become the same value as an actual relative rotational position.

11TH EMBODIMENT

Figure 39:
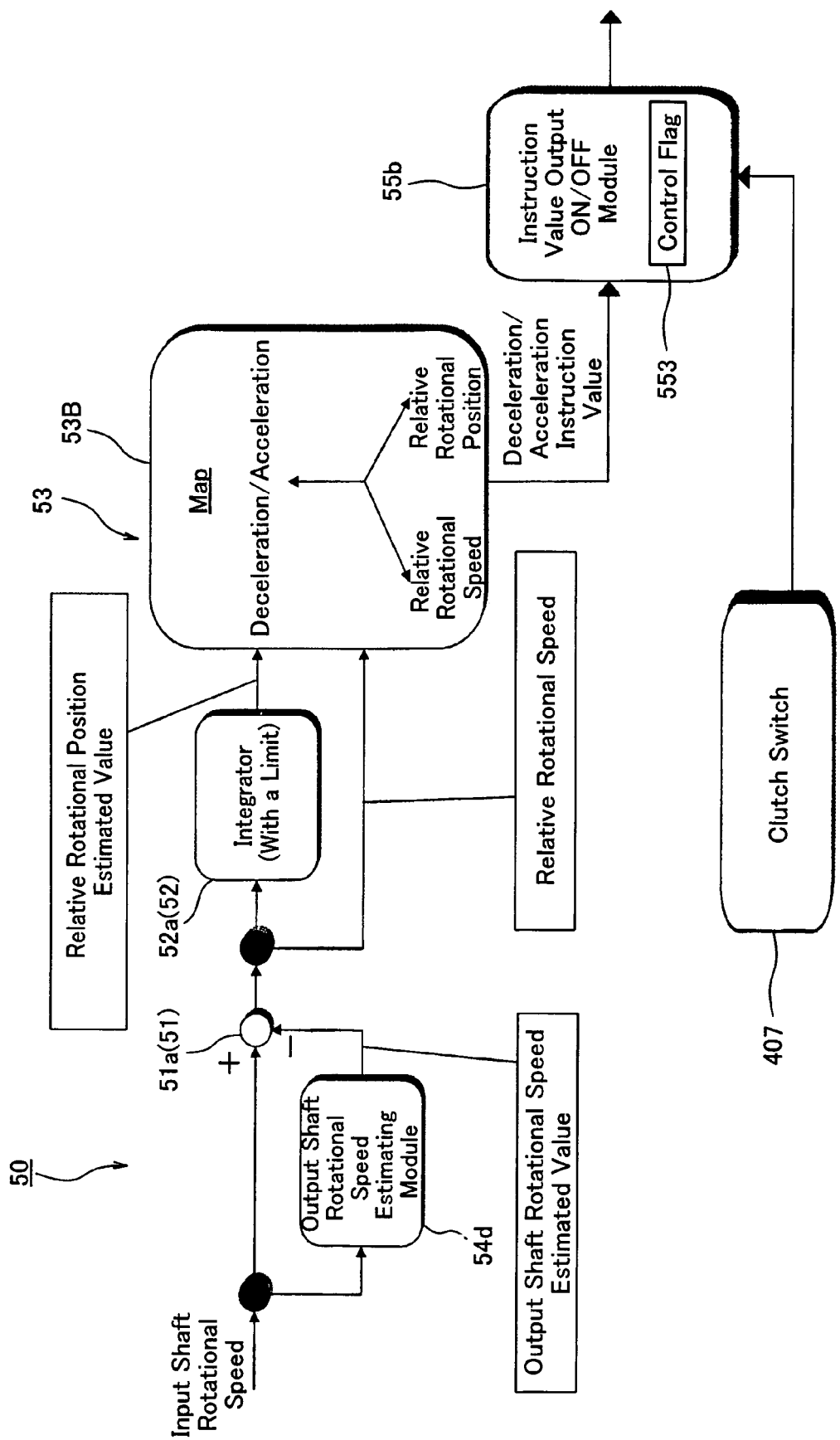
FIG. 39 is a control block diagram showing a configuration of the calculating device of the control apparatus according to the 11th Embodiment, and shows an example in which the configuration of the 10th Embodiment is applied to the calculating device when using a value estimated from the input shaft rotational speed as shown in FIG. 5.

Although a configuration to detect an output shaft rotational speed by the output shaft sensor has been described in the above 10th Embodiment, it is also applicable to a configuration which estimates the output shaft rotational speed from the input shaft rotational speed as shown in FIG. 39 (similar to the configuration in FIG. 5). Therefore, similar reference numerals are assigned to similar portions, and further explanations of other configurations and functions thereof will be omitted.

12TH EMBODIMENT

Figure 40:
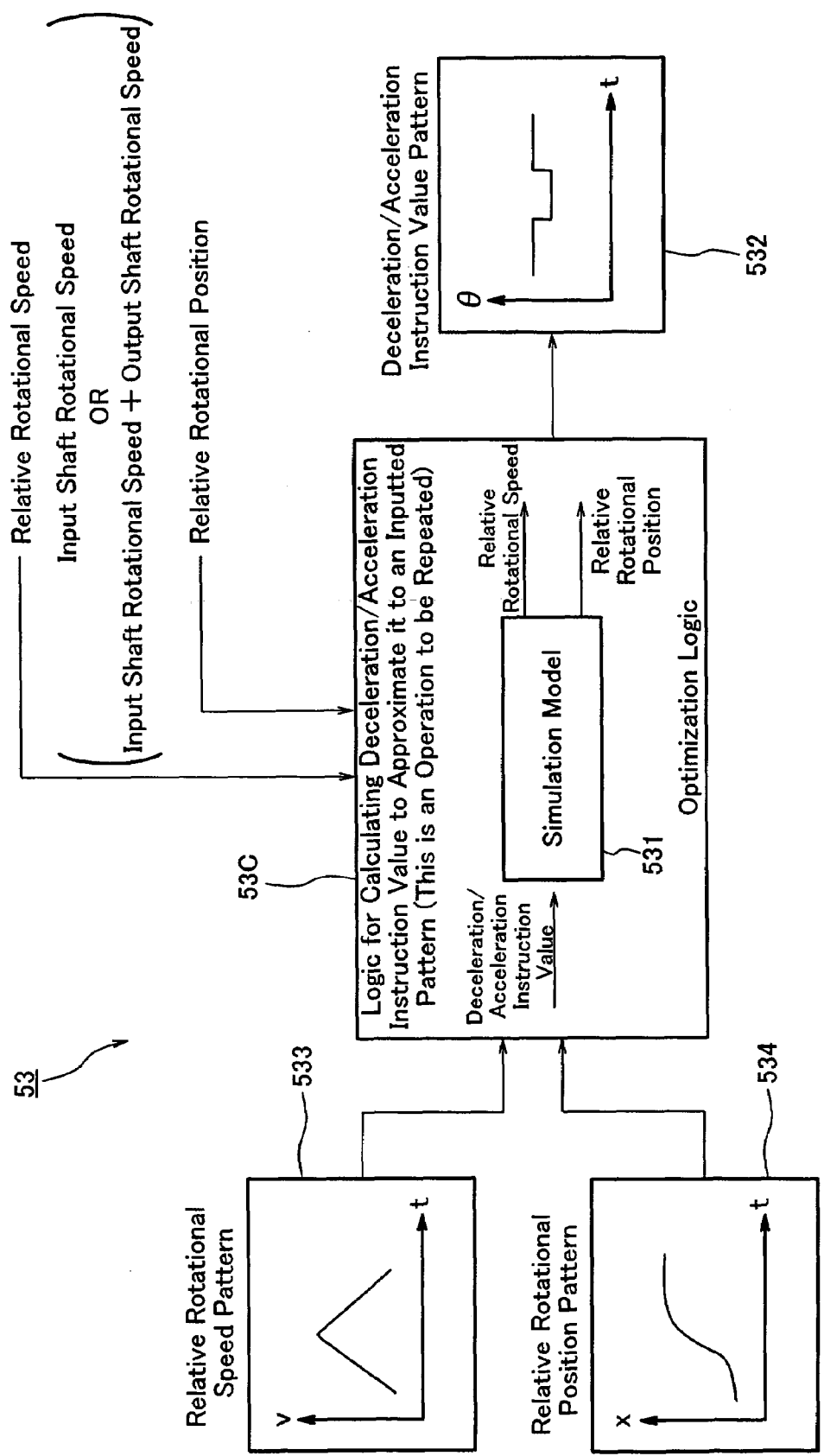
FIG. 40 is a control block diagram showing a configuration of a control module of the control apparatus according to a 12th Embodiment in which the control module includes a simulation model therein.

In FIGS. 4-5, 14, 17, 20, 24-25, 32, 35-36, and 39, they are configured so that the deceleration/acceleration instruction values over various relative rotational speeds and various relative rotational positions are calculated off-line beforehand and stored in the map 53B. However, in this embodiment, as shown in FIG. 40, it is configured so that a predetermined simulation model 531 is given in the control module 53 and the deceleration/acceleration instruction value is calculated on real time.

The control module 53 includes, other than the above-mentioned simulation model 531, an optimization logic 53C, a deceleration/acceleration instruction value pattern 532, a relative rotational speed pattern 533, and a relative rotational position pattern 534.

Figure 41:
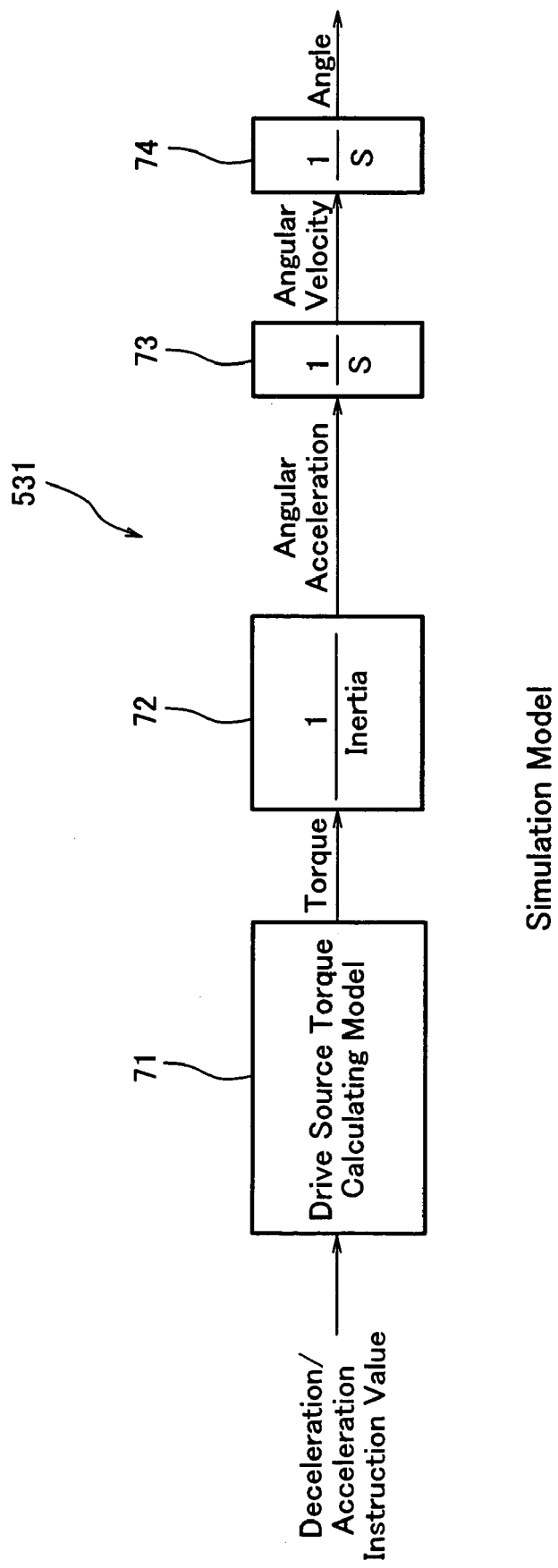
FIG. 41 is a control block diagram showing a concrete example of the configuration of the simulation model within the control module shown in FIG. 40.
Figure 42:
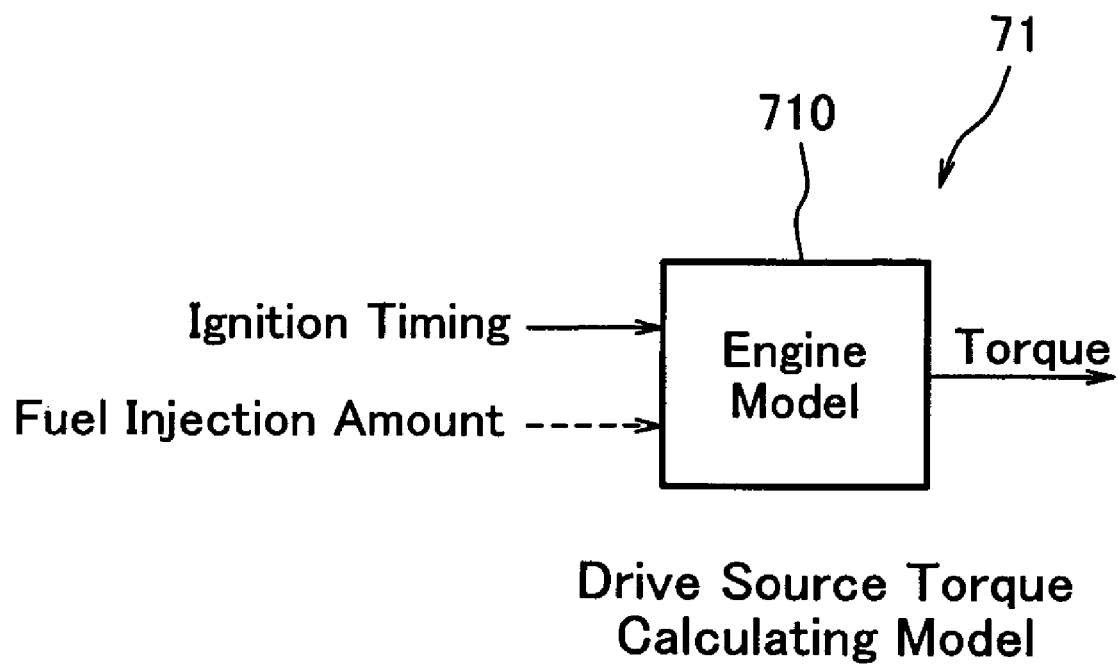
FIG. 42 is a control block diagram showing a concrete example of the configuration of a drive source torque calculating model within the simulation model shown in FIG. 41.

As shown in FIG. 41, the simulation model 531 includes a drive source torque calculating model 71, an angular acceleration calculating module 72, and integrators 73 and 74. The drive source torque calculating model 71 includes an engine model 710, as shown in FIG. 42.

The engine model 710 is a control model of the drive source, and it is configured to output the torque generated in accordance with the input of the deceleration/acceleration instruction value. This drive source may be an internal combustion engine or an electric motor. In this embodiment, it is described that the drive source is an internal combustion engine, for convenience of explanation. When it is applied to an internal combustion engine, it may be a configuration that an ignition timing is inputted as a deceleration/acceleration instruction value, as also shown in FIG. 42. Moreover in addition to the ignition timing, an amount of fuel injection may be inputted as the deceleration/acceleration instruction value.

Return to FIG. 41, the torque which is outputted from the drive source torque calculating model 71 as mentioned above is transmitted to the angular acceleration calculating module 72, and is divided by an inertia and, thus, an angular acceleration is obtained. This inertia is an inertia of a portion which generates the torque, and if it is an internal combustion engine, the portion may be an inertia of the crankshaft 103a (see FIG. 6, FIG. 31, etc.). The angular acceleration outputted from the angular acceleration calculating module 72 is integrated twice by the integrators 73 and 74 and, thus, an operation angle of the crankshaft (that is, the torque generating portion) corresponding to the deceleration/acceleration instruction value is obtained.

Return to FIG. 40, the relative rotational speed pattern 533 and the relative rotational position pattern 534 store various patterns of the relative rotational speed and the relative rotational position, respectively. An arbitrary pattern may be inputted beforehand in the deceleration/acceleration instruction value pattern 532 as an initial value. As mentioned above, the respective relative rotational speed and relative rotational position are calculated by the simulation model 531, with an input of the deceleration/acceleration instruction value pattern 532. The optimization logic 53C calculates repeatedly so that the relative rotational speed and the relative rotational position which are calculated approach the patterns of the relative rotational speed and the relative rotational position stored in the relative rotational speed pattern 533 and the relative rotational position pattern 534, respectively and, thus, it optimizes the deceleration/acceleration instruction value pattern 532.

The above optimization operation is carried out off-line and configured to calculate the deceleration/acceleration instruction value based on the relative rotational speed pattern 533 and the relative rotational position pattern 534, and an actual relative rotational speed and an actual relative rotational position.

At this time, as an actual relative rotational speed, the relative rotational speed may be directly detected, or may be calculated from the input shaft rotational speed and the output shaft rotational speed which are detected, or may be calculated from the input shaft rotational speed and the output shaft rotational speed which are estimated from the input shaft rotational speed. Similarly, the relative rotational position may be an actually detected value, or may be an estimated value as described in the other embodiments.

Moreover, the calculation of the deceleration/acceleration instruction value may be performed one at a time in real time, or based on an input data at a predetermined time, it may be an estimation of a pattern until the predetermined time later.

13TH EMBODIMENT

Figure 43:
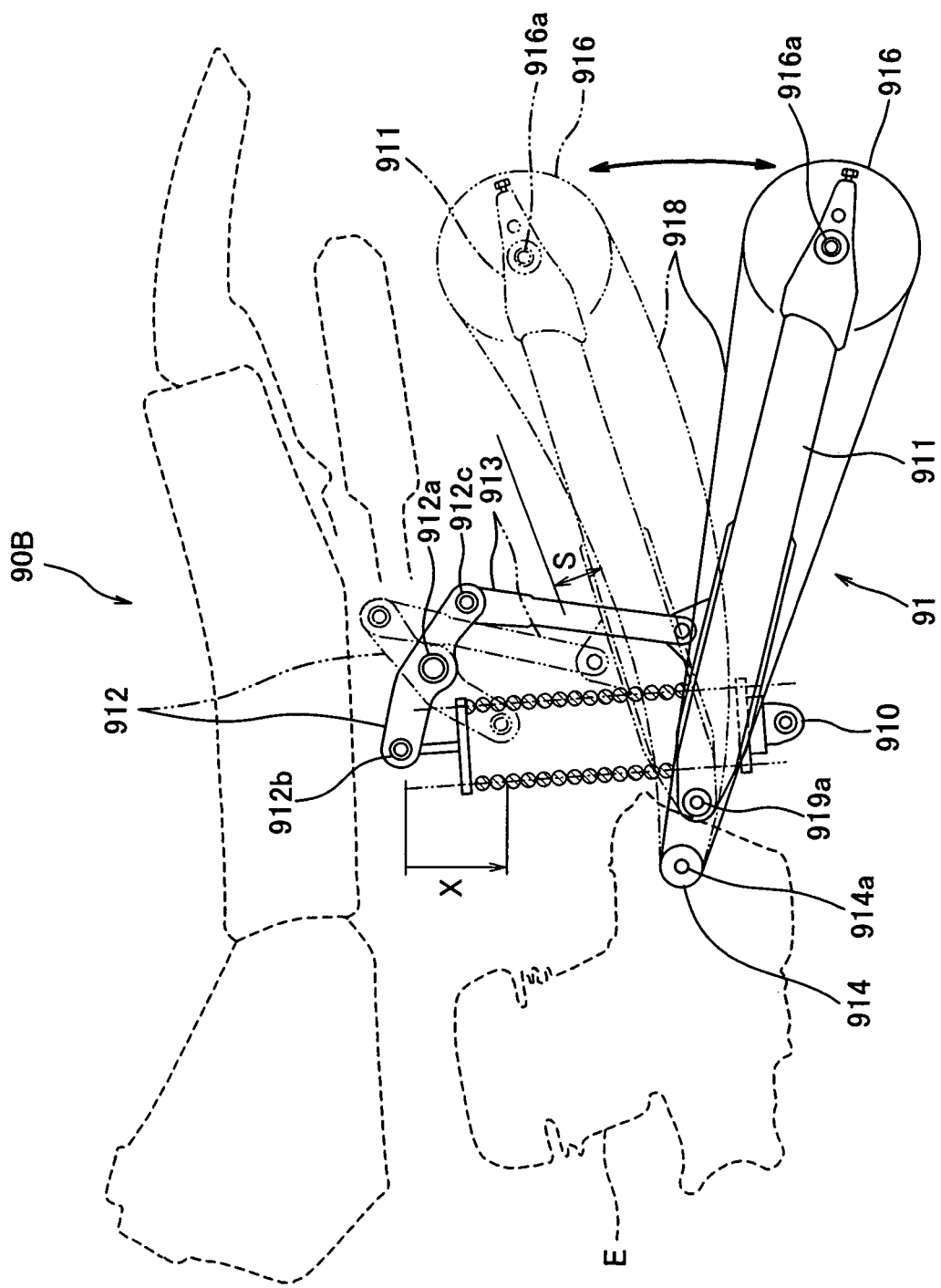
FIG. 43 is a schematic view showing a suspension mechanism of the vehicle to which the control apparatus according to a 13th Embodiment is applied, with a mono-suspension mechanism of an off-road-type motorcycle being shown as an example.

FIG. 43 is a mimetic diagram showing a suspension mechanism of the vehicle. In FIG. 43, a mono-suspension mechanism of an off-road motorcycle is shown as an example.

In this embodiment, the mono-suspension mechanism includes a swing arm 911 extended rearward, and pivotable around a horizontal shaft 919a provided in a body frame (not shown) behind the internal combustion engine E as the drive source. The mono-suspension mechanism includes a horizontal shaft 916a provided in a rear end portion of the swing arm 911. A driven sprocket 916 and a rear wheel (not shown) are coaxially attached to the horizontal shaft 916a.

In this embodiment, although the internal combustion engine E of forced-ignition type has been described as an example of the drive source, the principle of this embodiment is similarly applicable to a vehicle which equips an electric motor as the drive source.

A chain 918 is installed around a drive sprocket 914 attached to a drive shaft 914a of the internal combustion engine E, and the driven sprocket 916 mentioned above, so that a rotation of the drive shaft 914a is transmitted to the rear wheel. In this embodiment, an example of the chain drive is shown. Similarly, this embodiment may be applied to a belt drive.

Behind the horizontal shaft 919a, a suspension unit 910 extends approximately in the vertical direction. This suspension unit 910 includes a spring-damper mechanism, and is supported so as to be pivotable in the front-and-rear direction by the vehicle body frame at a lower end portion thereof.

From the halfway of the swing arm 911, a link arm 913 extends upwardly. The link arm 913 is coupled to the swing arm 911 at a lower end portion thereof, pivotably in the front-and rear direction.

A cushion lever 912 is pivotably provided around a horizontal shaft 912a fixed to the body frame. The cushion lever 912 extends the front-and-rear direction, and the front end portion thereof is pivotably coupled to an upper end portion of the suspension unit 910 through a horizontal shaft 912b, and the rear end portion thereof is pivotably coupled to an upper end portion of the link arm 913 through a horizontal shaft 912c.

The mono-suspension mechanism of this embodiment is configured as the above. The swing arm 911 which supports the rear wheel at the rear end portion is pressed down by the cushion unit 910 with a biasing force of a spring, through the link arm 913 and the cushion lever 912. Thus, the cushion unit 910 prevents a subduction of the rear wheel with a resistance of a damper inside, and improves a road following capability.

In such a mono-suspension mechanism, typically, the horizontal shaft 919a which pivotably supports the front end portion of the swing arm 911 is positioned between the drive sprockets 914 and the driven sprockets 916 with the chain 911 installed around. An amount of slack of the chain 918 changes in accordance with the pivoting movement of the swing arm 911. For example in this example, the chain 918 tends to become more slacked as the swing arm 911 is rotated upward.

Therefore, in this embodiment, it is provided with a suspension displacement sensor 40B (see FIG. 44) configured to detect this amount of slack S, as a displacement in the axial direction of the cushion unit 910, i.e., as a suspension displacement X (downward made to be positive in sign of the displacement in FIG. 43).

Figure 44:
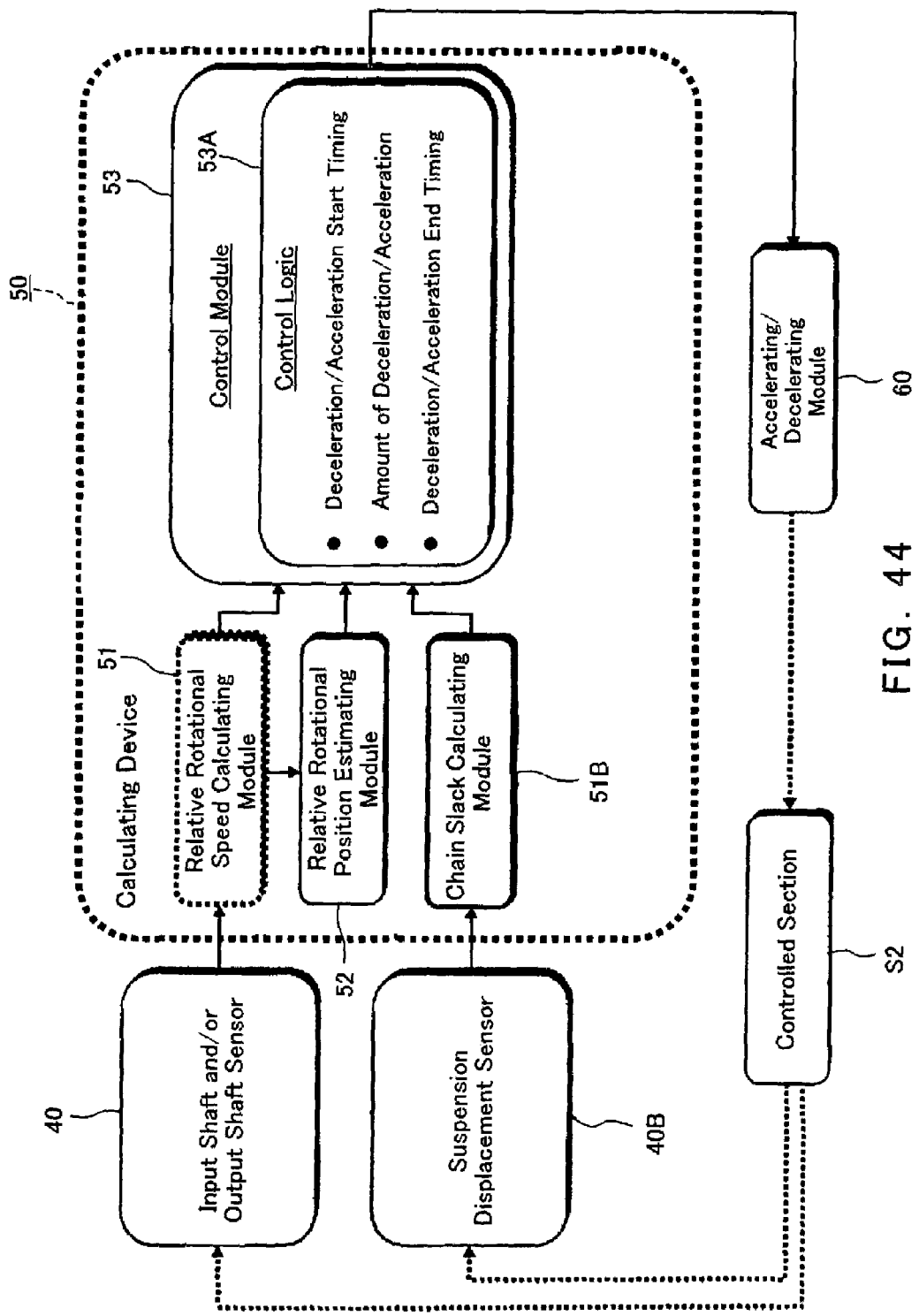
FIG. 44 is a block diagram showing a conceptual configuration of a control apparatus at the time of acceleration/deceleration of the vehicle according to the 13th Embodiment.

FIG. 44 is a schematic block diagram of the control apparatus according to this embodiment. The control apparatus according to this embodiment includes the input shaft and/or output shaft sensor 40, the calculating device 50, and the accelerating/decelerating module 60 which are the same as the ones shown in FIG. 2. The control apparatus also includes the suspension displacement sensor 40B.

The calculating device 50 includes the relative rotational position estimating module 52, the chain slack calculating module 51B, and the control module 53. The calculating device 50 may further include a relative rotational speed calculating module 51, depending on the configuration of the control apparatus which includes the input shaft and/or output shaft sensor 40 mentioned above. The calculating device 50 calculates at least the relative rotational position between the input shaft 200A and the output shaft 200B of the controlled section S2, by the relative rotational position estimating module 52. If the calculating device 50 includes the relative rotational speed calculating module 51, the relative rotational position estimating module 52 calculates a relative rotational position based on the relative rotational speed between the input shaft 200A and the output shaft 200B calculated by the relative rotational speed calculating module 51. The chain slack calculating module 511B calculates an amount of slack S of the chain 918 based on a suspension displacement X transmitted from a suspension displacement sensor 40B.

Following the control logic 53A (see FIG. 2) mentioned above, the control module 53 calculates a deceleration/acceleration start timing, an amount of deceleration/acceleration, and/or a deceleration/acceleration end timing, based on the relative rotational position transmitted from the relative rotational position estimating module 52, or the relative rotational speed transmitted from the relative rotational speed calculating module 51, and an amount of slack S in the chain 918 transmitted from the chain slack calculating module 511B in addition to the relative rotational position. The control module 53 outputs an operational instruction (i.e., a deceleration/acceleration instruction value) to the accelerating/decelerating module 60 based on the calculation. That is, in this embodiment, it outputs a deceleration/acceleration instruction value for performing an ignition control of the internal combustion engine E.

Other configurations and functions are similar to that of what is shown in FIG. 2, and explanations thereof will be omitted while similar reference numerals being assigned to similar portions.

14TH EMBODIMENT

Figure 45A:
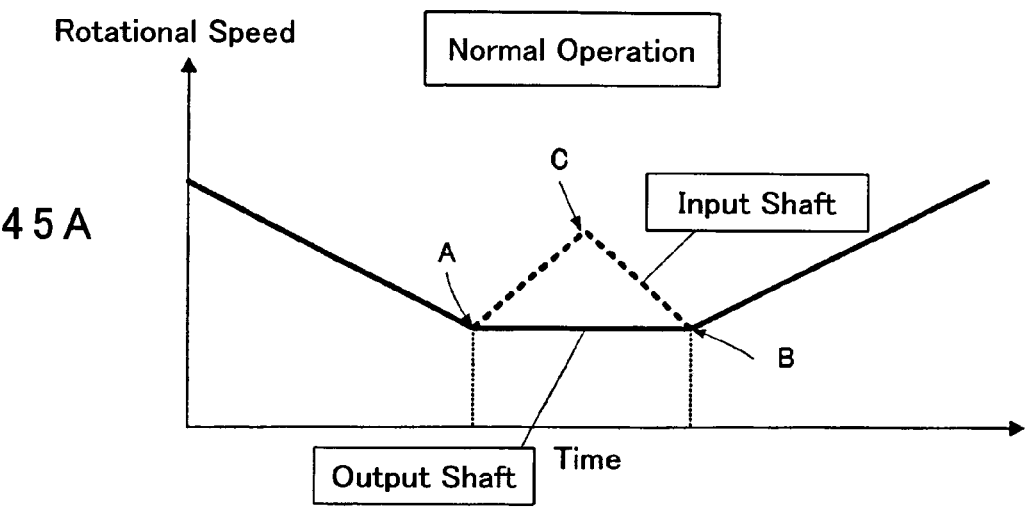
FIG. 45A is a graph for explaining a function of a control apparatus according to a 14th Embodiment, showing a change in rotational speeds of the input shaft and the output shaft when a transition of the input shaft rotational speed from normal deceleration to acceleration takes place.
Figure 45B:
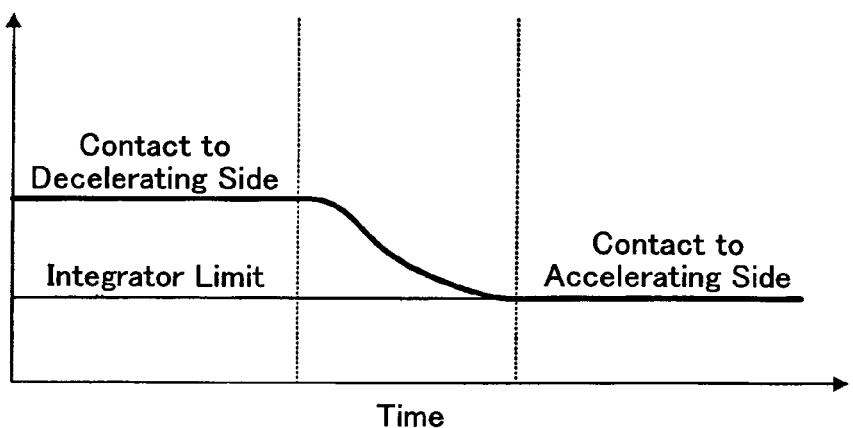
FIG. 45B is a corresponding graph of FIG. 45A, showing a change in a relative rotational position estimated value.

FIG. 45A is a graph showing a time sequential relationship between the input shaft rotational speed and the output shaft rotational speed, when the input shaft rotational speed is turned from normal deceleration to acceleration. FIG. 45B is a graph showing a time sequential change in the relative rotational position estimated value corresponding to the graph of FIG. 45A.

As shown in FIG. 45A, when the input shaft is decelerating, the output shaft follows and becomes the same rotational speed. When the input shaft is turned to acceleration (at a point A), a relative rotational speed is occurred between the input shaft rotational speed (shown with a dotted line in FIG. 45A) and the output shaft rotational speed (shown with a solid line FIG. 45A). When the relative rotational speed is occurred, the relative rotational position estimated value estimated by the integrator based on the relative rotational speed shifts to the accelerating side contact state from the decelerating side contact state. At the start of the transition, the deceleration control according to the present invention is performed (at a point C). Accordingly, the input shaft rotational speed which is turned to an acceleration is decelerated so that the input shaft rotational speed and the output shaft rotational speed become the same value. At the same moment, as shown in FIG. 45B, the relative rotational position estimated value shifts to the accelerating side contact state from the decelerating side contact state (at a point B).

Figure 46A:
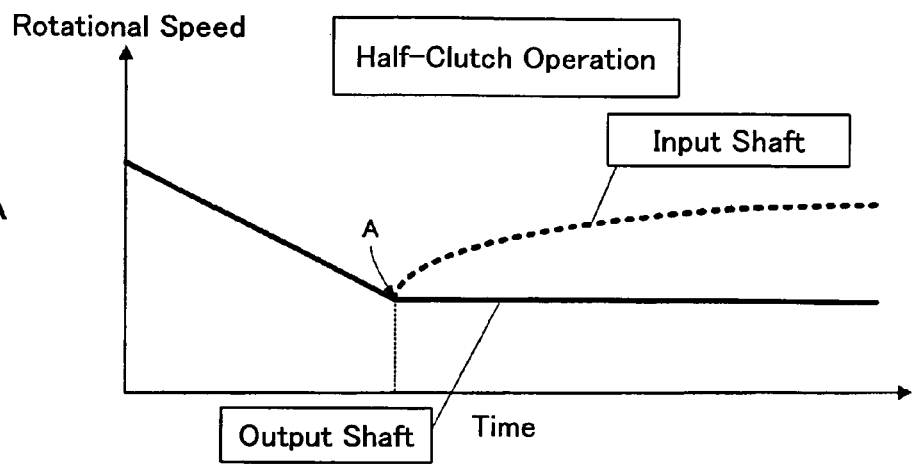
FIG. 46A is a graph for explaining a function of a control apparatus according to the 14th Embodiment, showing a change in rotational speeds of the input shaft and the output shaft when a transition of the input shaft rotational speed from deceleration to acceleration during a half-clutch operation takes place.
Figure 46B:
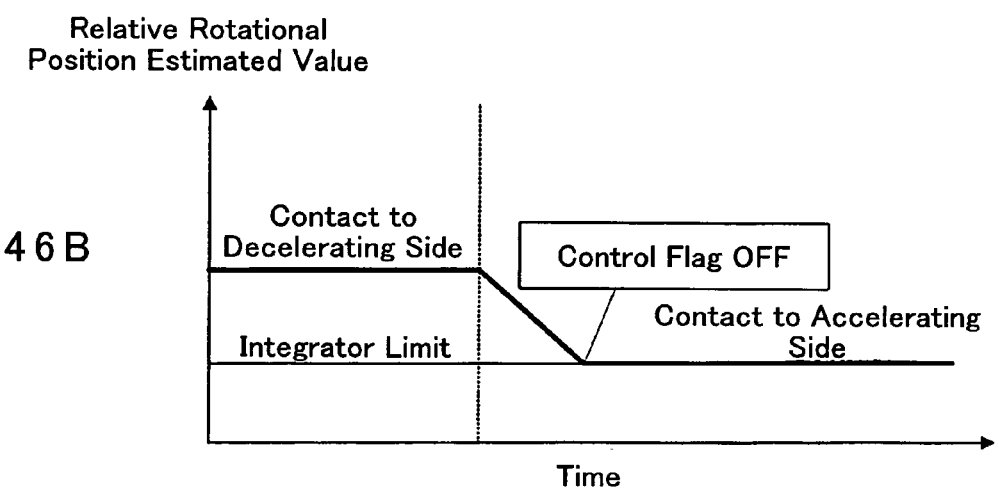
FIG. 46B is a corresponding graph of FIG. 46A, showing a change in a relative rotational position estimated value.

However, as shown in FIG. 46A, when a half-clutch operation is carried out from the point A and the operation is continued, a relative rotational speed is occurred between the input shaft rotational speed (shown with a dotted line in FIG. 46A) and the output shaft rotational speed (shown with a solid line FIG. 46A). Therefore, the deceleration control according to the present invention may continue performed. On the other hand, since the integration value by the integrator (i.e., the relative rotational position estimated value) continues generating a relatively large relative rotational speed, it shifts to the accelerating side contact state from the decelerating side contact state immediately, and is saturated. That is, it reaches to the limit of the integrator (an integrator limit or integration limit). Other than the half-clutch operation, the relative rotational speed may be occurred when the clutch is completely disconnected, depending on a throttle operation.

Accordingly, in this embodiment, a continuous execution of the deceleration control is prevented at the time of, for example, a half-clutch operation, which is undetectable by the existing clutch switch (refer to FIG. 36 and FIG. 39), by turning the control flag to OFF when the relative rotational position estimated value shifts to the accelerating side contact state. In this embodiment, only the deceleration control has been described, however, the same is true for the acceleration control.

Figure 47:
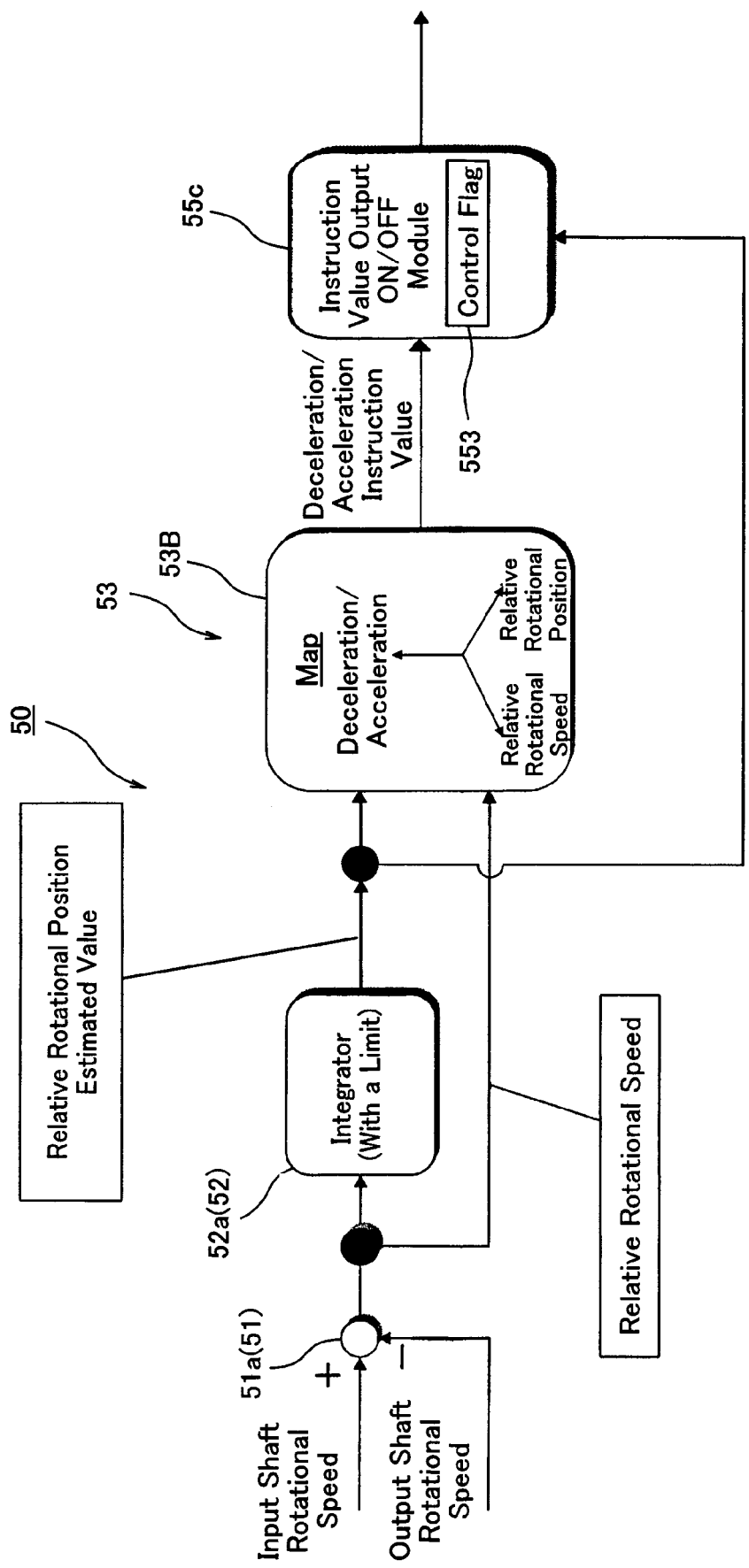
FIG. 47 is a control block diagram showing a configuration of the calculating device of the control apparatus according to the 14th Embodiment, and shows an example of the calculating device when using detection values of both the input shaft rotational speed and the output shaft rotational speed as shown in FIG. 4.

As shown in FIG. 47, the calculating device 50 according to this embodiment includes a differentiator 51a as the relative rotational speed calculating module 51, an integrator 52a as the relative rotational position estimating module 52, a control module 53, and an instruction value output ON/OFF module 55c as the acceleration/deceleration adjusting module.

The differentiator 51a is provided with both the input shaft rotational speed and the output shaft rotational speed. The differentiator 51a calculates a difference between the input shaft rotational speed and the output shaft rotational speed (that is, a relative rotational speed). The calculated relative rotational speed is transmitted to the control module 53 as well as to the integrator 52a. The integrator 52a estimates a relative rotational position by integrating the relative rotational speeds. The estimated relative rotational position is transmitted to the control module 53 and to the instruction value output ON/OFF module 55c.

The control module 53 includes a map 53B which is utilized by the control logic 53A (see FIG. 2). The map 53B (see FIG. 3) typically stores deceleration/acceleration instruction values corresponding to the relative rotational speeds and the relative rotational positions. The control module 53 calculates a deceleration/acceleration instruction value with reference to the map 53B based on the relative rotational speed transmitted from the differentiator 51a and the relative rotational position estimated value transmitted from the integrator 52a. The control module 53 outputs the calculated deceleration/acceleration instruction value through the instruction value output ON/OFF module 55c to the drive device of the spark plug 603a (for example, see FIG. 31) which is the accelerating/decelerating module 60 (see FIG. 2).

In addition to the deceleration/acceleration instruction value from the control module 53, the instruction value output ON/OFF module 55c is provided with a relative rotational position estimated value from the integrator 52a. The instruction value output ON/OFF module 55c includes a control flag memory area 553 configured to store a control flag.

If the control flag stored in the control flag memory area 553 is ON, the instruction value output ON/OFF module 55c passes the deceleration/acceleration instruction value transmitted from the control module 53 therethrough. If the control flag is OFF, the instruction value output ON/OFF module 55c does not allow the deceleration/acceleration instruction value to pass therethrough.

Figure 48:
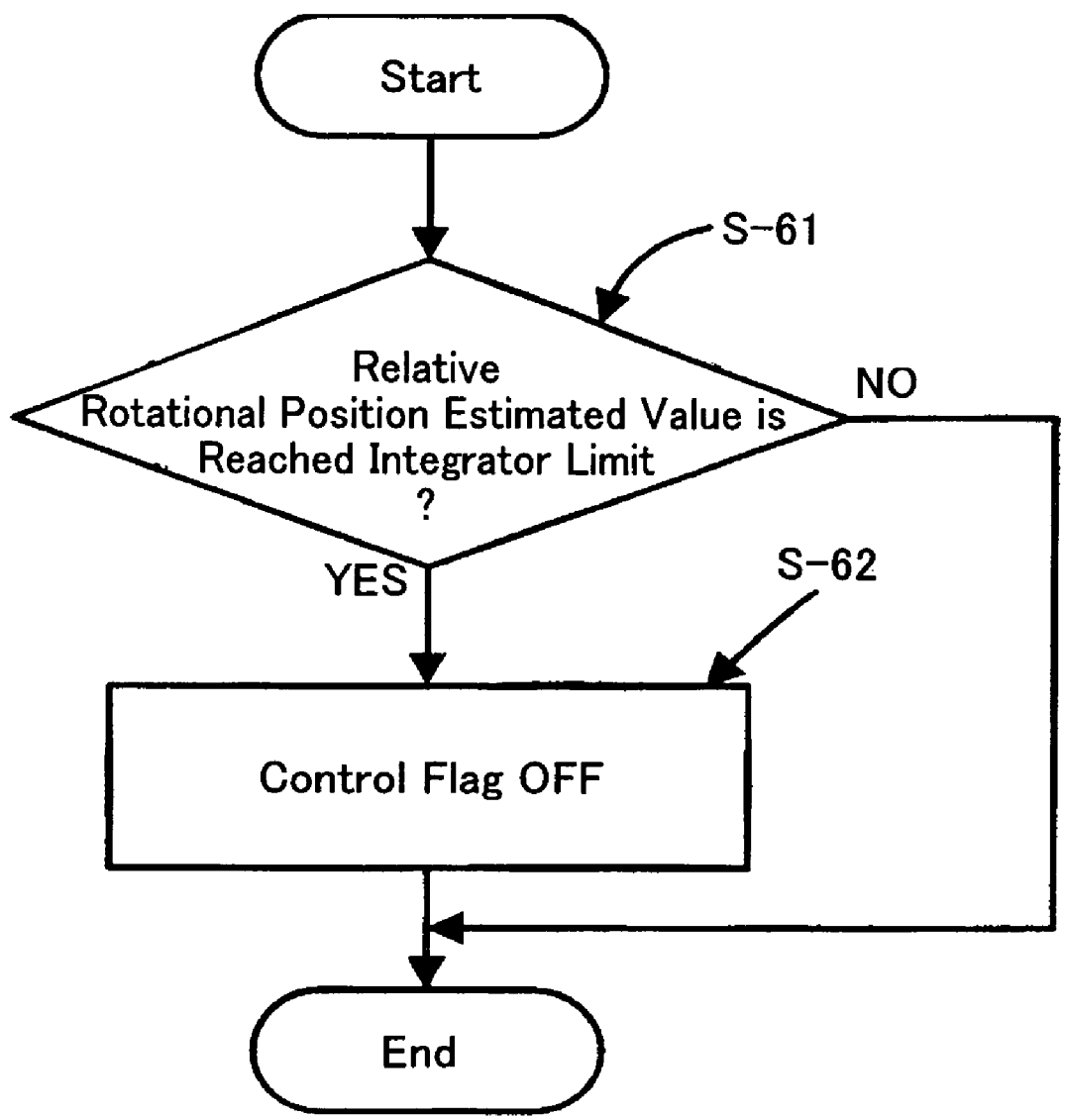
FIG. 48 is a flowchart for explaining an operation of the instruction value output ON/OFF module of the calculating device according to the 14th Embodiment shown in FIG. 47.

Next, an operation of the instruction value output ON/OFF module 55c will be explained referring to a flowchart of FIG. 48. The instruction value output ON/OFF module 55c operates upon an input of the deceleration/acceleration instruction value from the control module 53. First, the instruction value output ON/OFF module 55c determines whether the relative rotational position estimated value transmitted from the integrator 52a reaches an integrator limit (Step S-61).

If the relative rotational position estimated value does not reach the integrator limit ("NO" in Step S-61), the instruction value output ON/OFF module 55c terminates the routine. On the other hand, if the relative rotational position estimated value reaches the integrator limit ("YES" in Step S-61), the instruction value output ON/OFF module 55c sets the control flag stored in the control flag memory area 553 to OFF (Step S-62), and terminates the routine.

15TH EMBODIMENT

Figure 49:
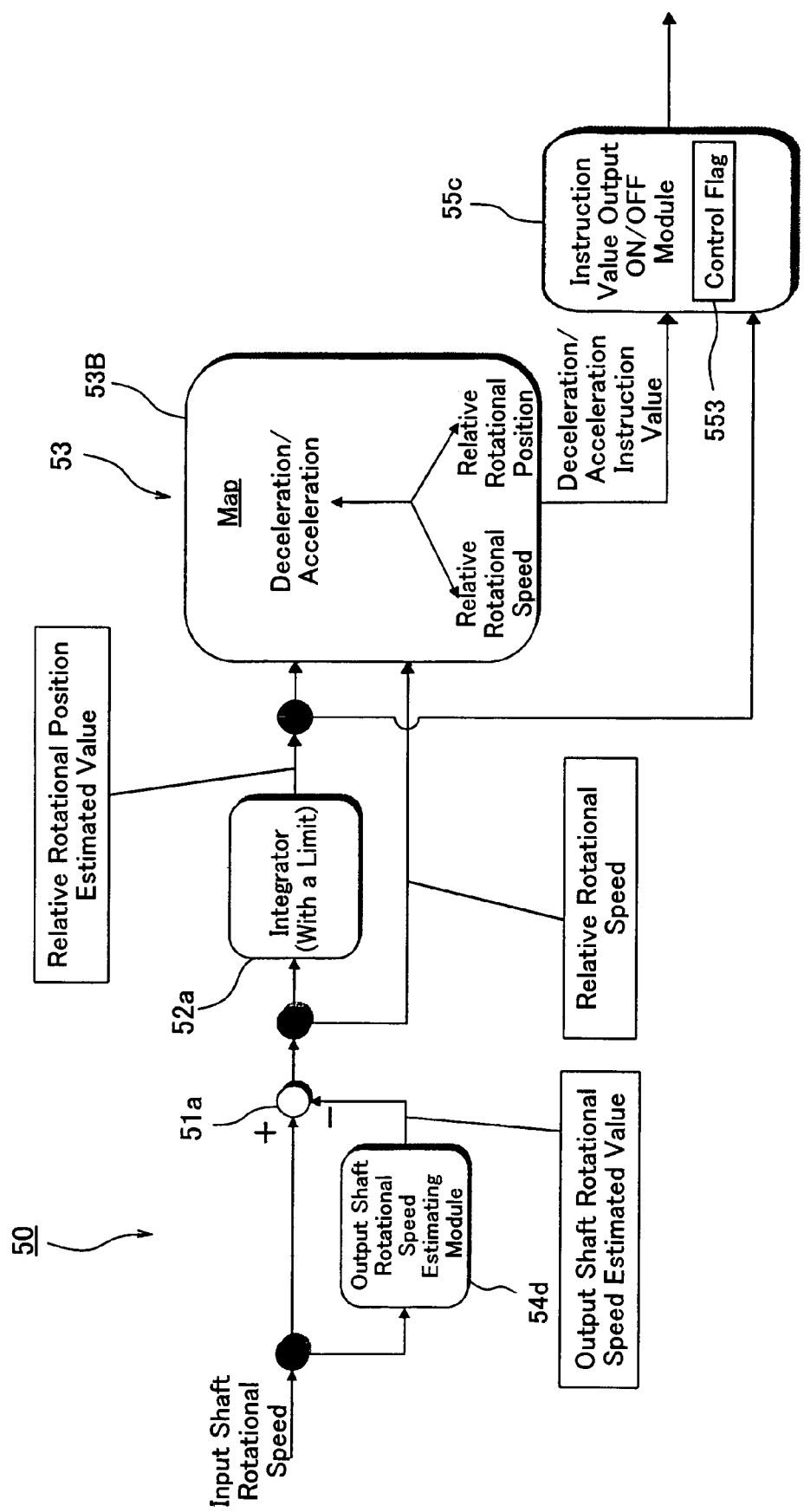
FIG. 49 is a control block diagram showing a configuration of the calculating device of the control apparatus according to a 15th Embodiment, and shows an example in which the configuration of the 14th Embodiment is applied to the calculating device when using a value estimated from the input shaft rotational speed as shown in FIG. 5.

Although a configuration to detect an output shaft rotational speed by the output shaft sensor has been described in the above 14th Embodiment, it is also applicable to a configuration which estimates the output shaft rotational speed from the input shaft rotational speed as shown in FIG. 49 (similar to the configuration in FIG. 5). Therefore, similar reference numerals are assigned to similar portions, and further explanations of other configurations and functions thereof will be omitted.

16TH EMBODIMENT

Figure 50:
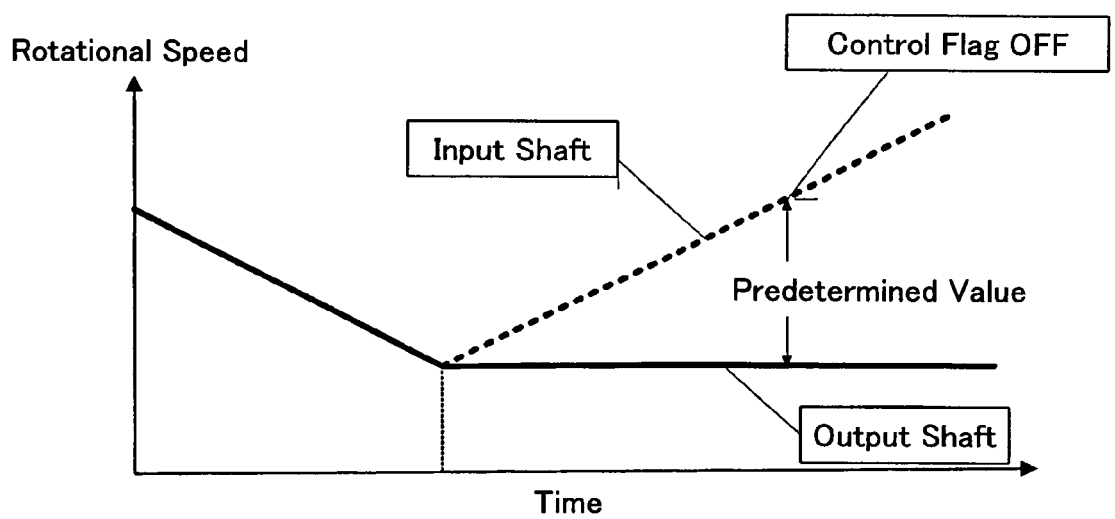
FIG. 50 is a graph for explaining a function of a control apparatus according to a 16th Embodiment, showing a change in rotational speeds of the input shaft and the output shaft when an abnormality in a sensor is occurred during a transition of the input shaft rotational speed from deceleration to acceleration, where the x-axis represents time.

FIG. 50 is a graph showing a relationship between the input shaft rotational speed (shown with a dotted line in FIG. 50) and the output shaft rotational speed (shown with a solid line FIG. 50) with respect to time, when the input shaft rotational speed is shifted from deceleration to acceleration, and shows a state in which an increase in the input shaft rotational speed continues until it reaches an unusually large value, by a clutch operation, etc.

In this embodiment, a continuous execution of the deceleration control according to the present invention is prevented by turning the control flag to OFF, if a value of the relative rotational speed which is impossible for normal acceleration or deceleration of the input shaft when the clutch operation is not performing. Here, only the deceleration control has been described, however, the same is true for the acceleration control.

Figure 51:
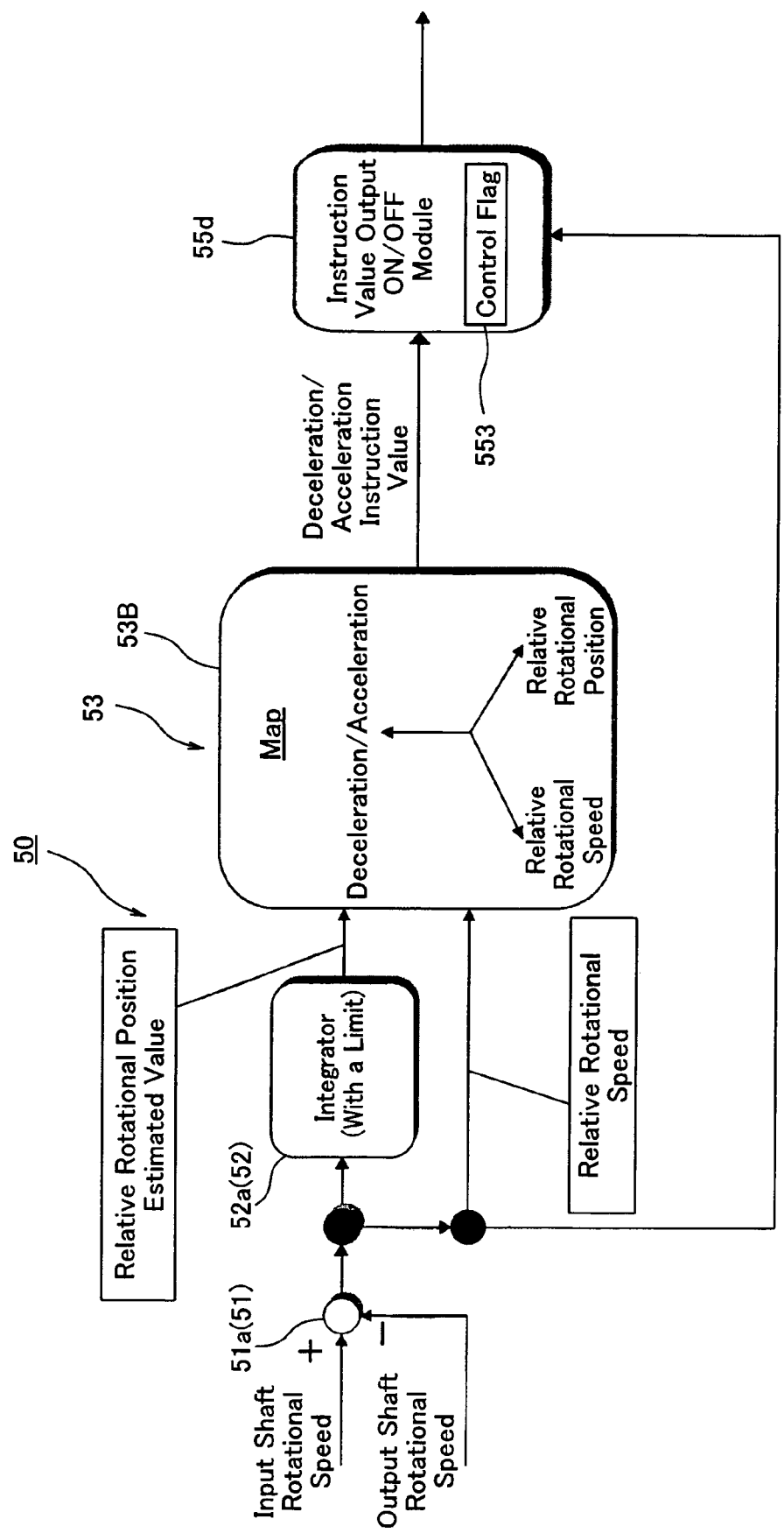
FIG. 51 is a control block diagram showing a configuration of the calculating device of the control apparatus according to the 16th Embodiment, and shows an example of the calculating device when using detection values of both the input shaft rotational speed and the output shaft rotational speed as shown in FIG. 4.

As shown in FIG. 51, the calculating device 50 according to this embodiment includes a differentiator 51a as the relative rotational speed calculating module 51, an integrator 52a as the relative rotational position estimating module 52, a control module 53, and an instruction value output ON/OFF module 55d as the acceleration/deceleration adjusting module.

The differentiator 51a is provided with both the input shaft rotational speed and the output shaft rotational speed. The differentiator 51a calculates a difference between the input shaft rotational speed and the output shaft rotational speed (that is, a relative rotational speed). The calculated relative rotational speed is transmitted to the control module 53 as well as to the integrator 52a. Furthermore, the relative rotational speed is transmitted to the instruction value output ON/OFF module 55d. The integrator 52a estimates a relative rotational position by integrating the relative rotational speeds. The estimated relative rotational position is transmitted to the control module 53.

The control module 53 includes a map 53B which is utilized by the control logic 53A (see FIG. 2). The map 53B typically stores deceleration/acceleration instruction values corresponding to the relative rotational speeds and the relative rotational positions (see FIG. 3). The control module 53 calculates a deceleration/acceleration instruction value with reference to the map 53B based on the relative rotational speed transmitted from the differentiator 51a and the relative rotational position estimated value transmitted from the integrator 52a. The control module 53 outputs the calculated instruction value to an appropriate drive device of the spark plug 603a (for example, see FIG. 31) which is the accelerating/decelerating module 60 (see FIG. 2), through the instruction value output ON/OFF module 55d.

In addition to the deceleration/acceleration instruction value from the control module 53, the instruction value output ON/OFF module 55d is provided with a relative rotational speed from the differentiator 51a. The instruction value output ON/OFF module 55d includes a control flag memory area 553 configured to store a control flag.

If the control flag stored in the control flag memory area 553 is ON, the instruction value output ON/OFF module 55d allows the deceleration/acceleration instruction value transmitted from the control module 53 to pass therethrough. On the other hand, if the control flag is OFF, the instruction value output ON/OFF module 55d does not allow the deceleration/acceleration instruction value to pass therethrough.

Figure 52:
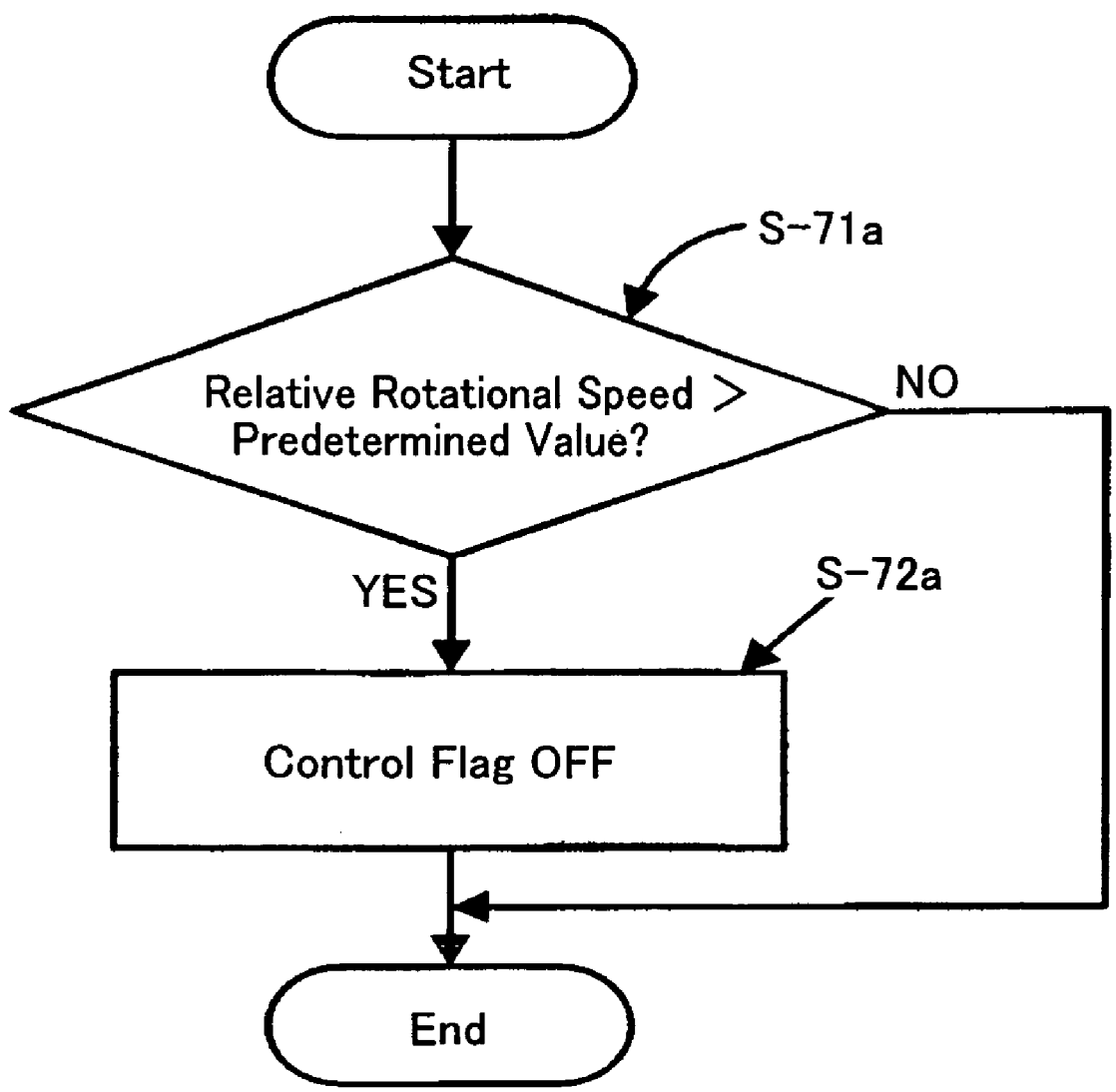
FIG. 52 is a flowchart for explaining an operation of the instruction value output ON/OFF module of the calculating device according to the 16th Embodiment shown in FIG. 51.

Next, an operation of the instruction value output ON/OFF module 55d will be explained referring to a flowchart of FIG. 52. The instruction value output ON/OFF module 55*d* operates upon an input of the deceleration/acceleration instruction value from the control module 53. First, the instruction value output ON/OFF module 55*d* determines whether the relative rotational speed transmitted from the differentiator 51*a* is greater than a predetermined value (Step S-71*a*). This predetermined value is, as mentioned above, a value of the relative rotational speed which is impossible for normal acceleration or deceleration.

If the relative rotational speed is not greater than the predetermined value ("NO" in Step S-71*a*), the instruction value output ON/OFF module 55*d* terminates the routine. On the other hand, if the relative rotational speed is greater than the predetermined value ("YES" in Step S-71*a*), the instruction value output ON/OFF module 55*d* sets the control flag stored in the control flag memory area 553 to OFF (Step S-72*a*), and terminates the routine.

17TH EMBODIMENT

Figure 53:
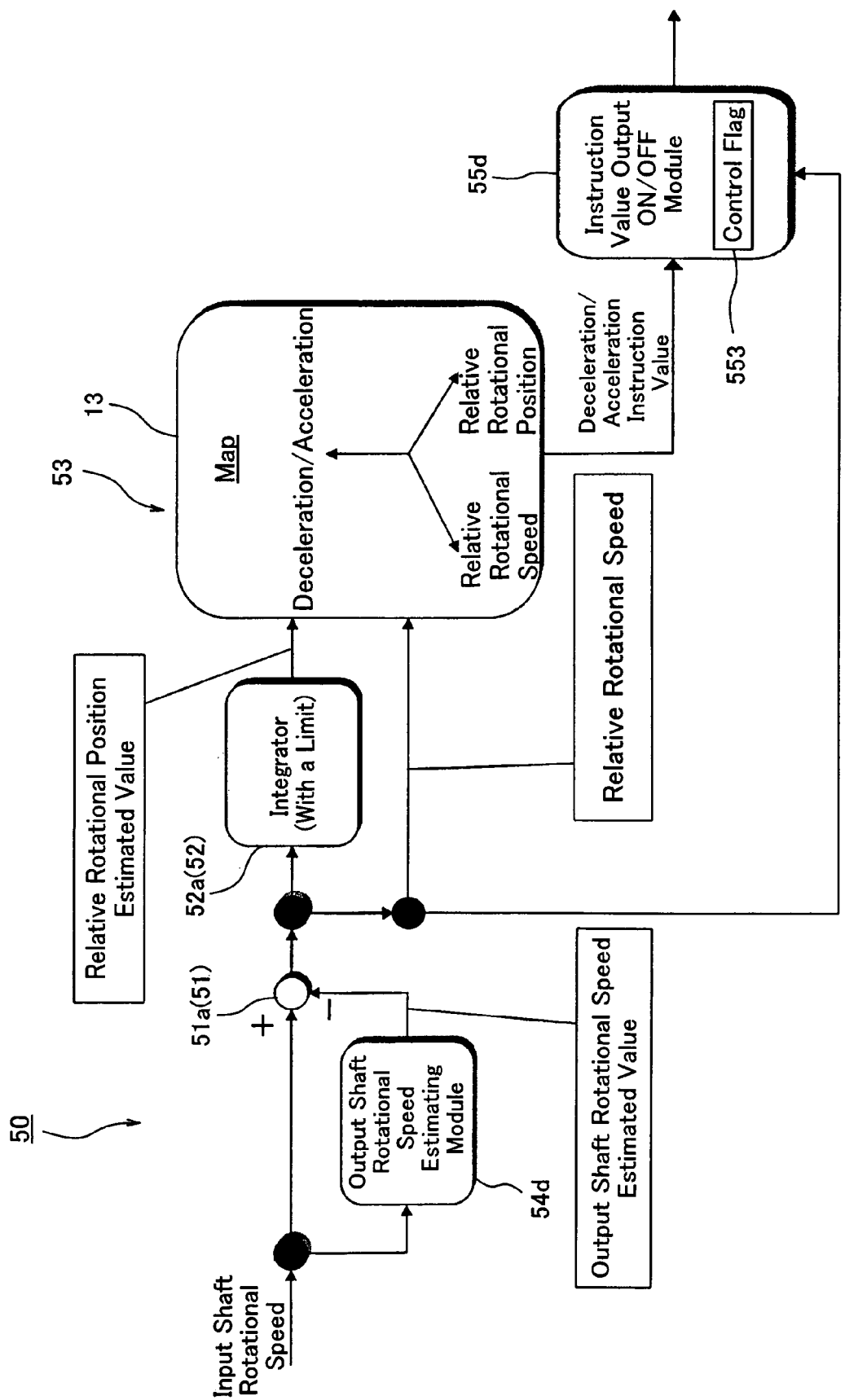
FIG. 53 is a control block diagram showing a configuration of the calculating device of a control apparatus according to a 17th Embodiment, and shows an example in which the configuration of the 16th Embodiment is applied to the calculating device when using a value estimated from the input shaft rotational speed as shown in FIG. 5.

Although a configuration to detect an output shaft rotational speed by the output shaft sensor has been described in the above 16th Embodiment, it is also applicable to a configuration which estimates the output shaft rotational speed from the input shaft rotational speed as shown in FIG. 53 (similar to the configuration in FIG. 5). Therefore, similar reference numerals are assigned to similar portions, and further explanations of other configurations and functions thereof will be omitted.

18TH EMBODIMENT

Figure 54:
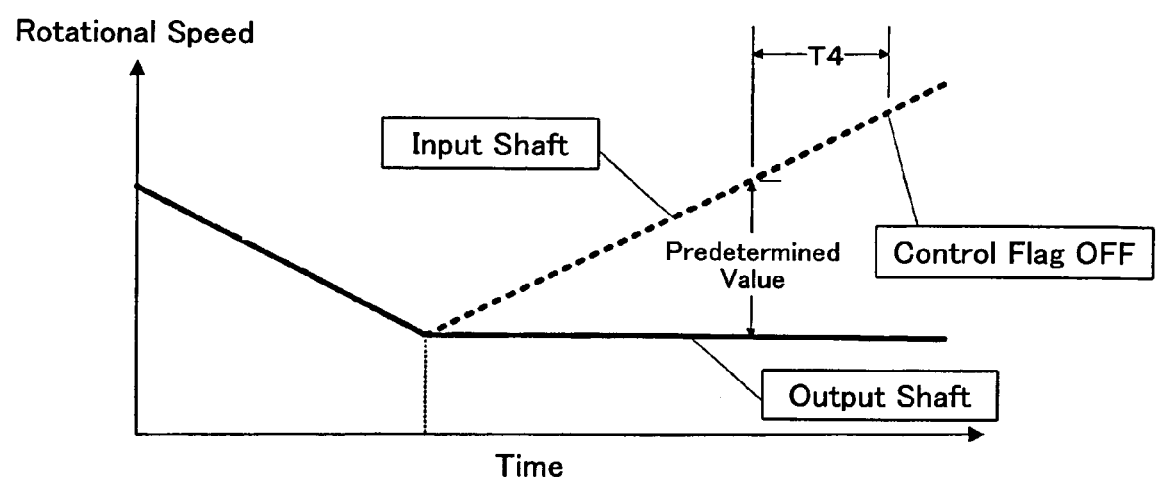
FIG. 54 is a graph for explaining a function of a control apparatus according to an 18th Embodiment, showing rotational speeds of the input shaft and the output shaft when an abnormality in a sensor is occurred during a transition of the input shaft rotational speed from deceleration to acceleration, where the x-axis represents time.

In the 16th and the 17th Embodiments above, it is determined that the clutch operation is performed when the relative rotational speed is greater than the predetermined value, the control flag is turned to OFF. Alternatively in this embodiment, the control flag may be turned to OFF after the relative rotational speed is greater than a predetermined value and after a lapse of the predetermined time T4, as shown in FIG. 54. Here, only the deceleration control has been described, however, the same is true for the acceleration control. In this way, even if the half-clutch operation is continued and a small relative speed is occurred continuously, it is possible to prevent the acceleration/deceleration control from carrying out unnecessary and continuously.

Figure 55:
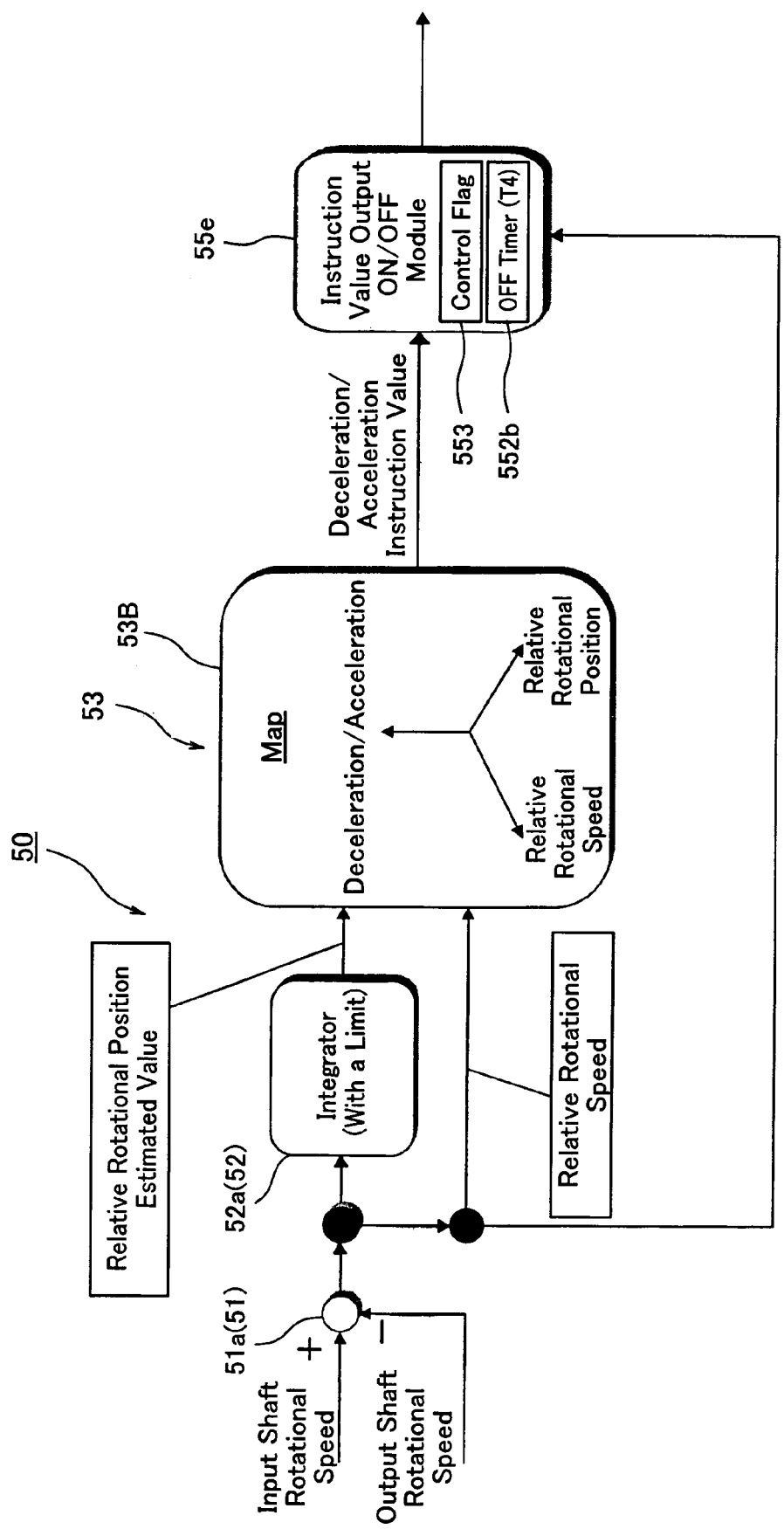
FIG. 55 is a control block diagram showing a configuration of the calculating device of the control apparatus according to the 18th Embodiment, and shows an example of the calculating device when using detection values of both the input shaft rotational speed and the output shaft rotational speed as shown in FIG. 4.

As shown in FIG. 55, the calculating device 50 according to this embodiment includes a differentiator 51*a* as the relative rotational speed calculating module 51, an integrator 52*a* as the relative rotational position estimating module 52, a control module 53, and an instruction value output ON/OFF module 55*e* as the acceleration/deceleration adjusting module.

The differentiator 51*a* is provided with both the input shaft rotational speed and the output shaft rotational speed. The differentiator 51*a* calculates a difference between the input shaft rotational speed and the output shaft rotational speed (that is, a relative rotational speed). The calculated relative rotational speed is transmitted to the control module 53 as well as to the integrator 52*a*. Furthermore, the relative rotational speed is also transmitted to the instruction value output ON/OFF module 55*e*. The integrator 52*a* estimates a relative rotational position by integrating the relative rotational speeds. The estimated relative rotational position is transmitted to the control module 53.

The control module 53 includes a map 53B which is utilized by the control logic 53A (see FIG. 2). The map 53B typically stores deceleration/acceleration instruction values corresponding to the relative rotational speeds and the relative rotational positions (see FIG. 3). The control module 53 calculates a deceleration/acceleration instruction value with reference to the map 53B based on the relative rotational speed transmitted from the differentiator 51*a* and the relative rotational position estimated value transmitted from the integrator 52*a*. The control module 53 outputs the calculated deceleration/acceleration instruction value through the instruction value output ON/OFF module 55*e* to an appropriate drive device of the spark plug 603*a* (for example, see FIG. 31) which is the accelerating/decelerating module 60 (see FIG. 2).

The instruction value output ON/OFF module 55*e* is configured to be given a relative rotational speed from the differentiator 51*a*, in addition to the deceleration/acceleration instruction value from the control module 53. The instruction value output ON/OFF module 55*e* includes a control flag memory area 553 configured to store a control flag, and an OFF-timer 552*b*.

The instruction value output ON/OFF module 55*e* is configured to pass through the deceleration/acceleration instruction value transmitted from the control module 53 if the control flag stored in the control flag memory area 553 is ON, and not to pass through the deceleration/acceleration instruction value if the control flag is OFF.

Figure 56:
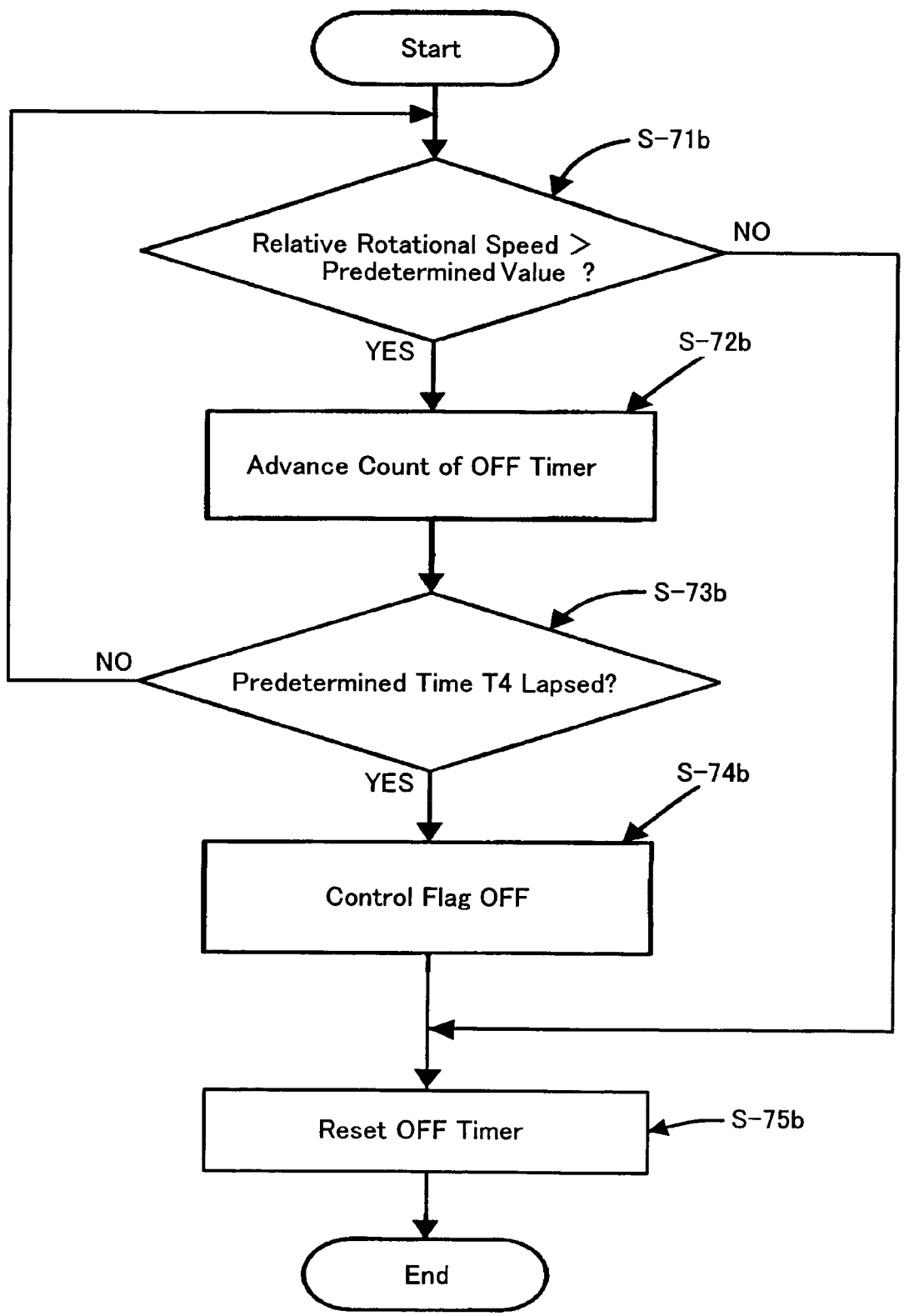
FIG. 56 is a flowchart for explaining an operation of the instruction value output ON/OFF module of the calculating device according to the 18th Embodiment shown in FIG. 55.

Next, an operation of the instruction value output ON/OFF module 55*e* will be explained referring to a flowchart of FIG. 56. The instruction value output ON/OFF module 55*e* from the control module 53 operates upon an input of the deceleration/acceleration instruction value from the control module 53. First, the instruction value output ON/OFF module 55*e* determines whether the relative rotational speed transmitted from the differentiator 51*a* is greater than a predetermined value (Step S-71*b*). As mentioned above, this predetermined value is set as a value of the relative rotational speed which is generated when a clutch operation is performed, for example.

If the relative rotational speed is not greater than the predetermined value ("NO" in Step S-71*b*), the instruction value output ON/OFF module 55*e* resets the OFF-timer 552*b* (Step S-75*b*) and, then, terminates the routine. On the other hand, if the relative rotational speed is greater than the predetermined value ("YES" in Step S-71*b*), the instruction value output ON/OFF module 55*e* counts up the OFF-timer 552*b* (Step S-72*b*).

The instruction value output ON/OFF module 55*e* determines whether the count of the OFF-timer 552*b* lapses a predetermined time T4 (Step S-73*b*). If the predetermined time T4 is not lapsed ("NO" in Step S-73*b*), the instruction value output ON/OFF module 55*e* repeats the routine from Step S-71*b*. On the other hand, if the predetermined time T4 is lapsed ("YES" in Step S-73*b*), the instruction value output ON/OFF module 55*e* sets the control flag stored in the control flag memory area 553 to OFF (Step S-74*b*) and, further, resets the OFF-timer 552*b* (Step S-75*b*), and terminates the routine.

19TH EMBODIMENT

Figure 57:
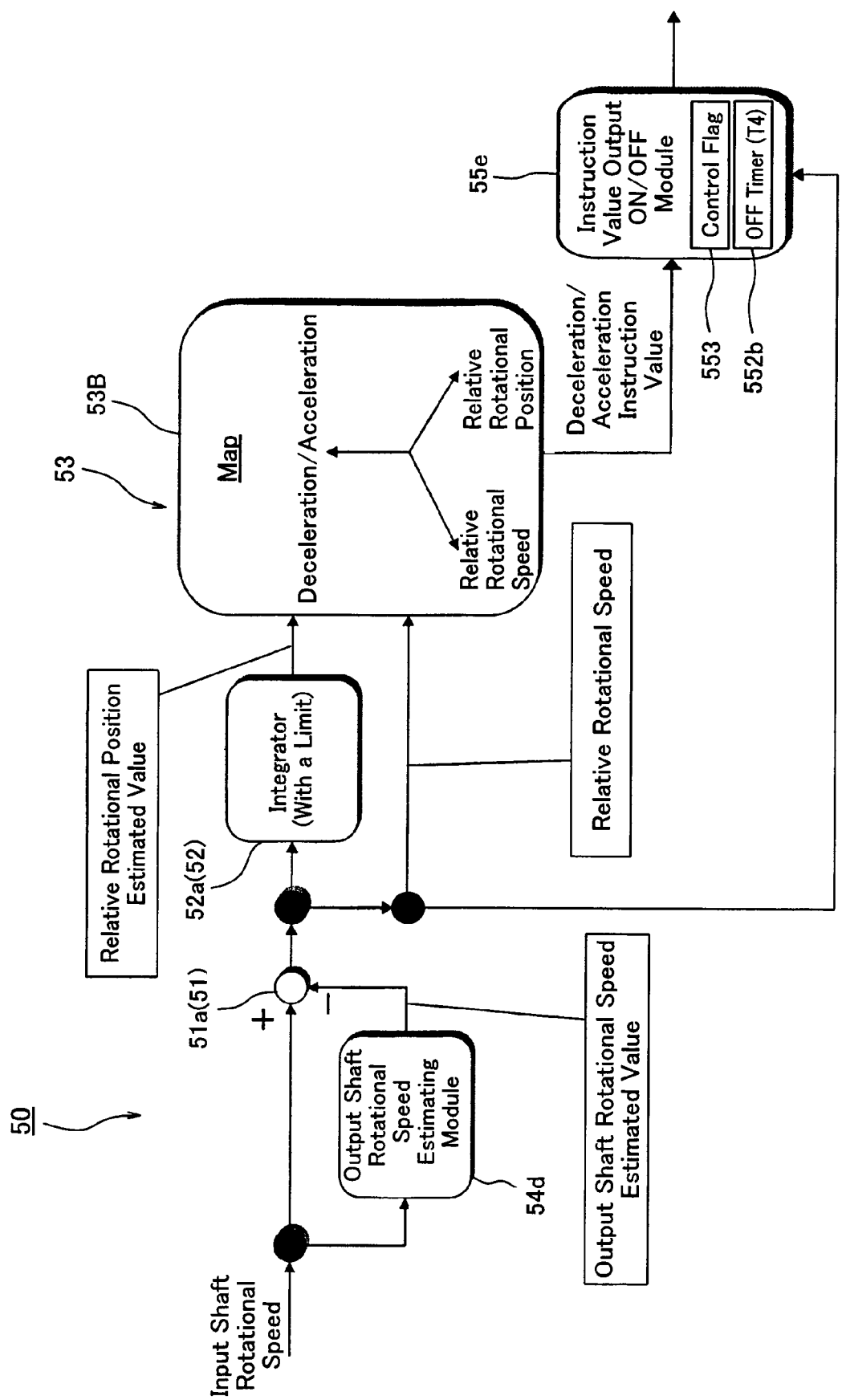
FIG. 57 is a control block diagram showing a configuration of the calculating device of a control apparatus according to a 19th Embodiment, and shows an example in which the configuration of the 18th Embodiment is applied to the calculating device when using a value estimated from the input shaft rotational speed shown in FIG. 5.

Although a configuration to detect an output shaft rotational speed by the output shaft sensor has been described in the above 18th Embodiment, it is also applicable to a configuration which estimates the output shaft rotational speed from the input shaft rotational speed as shown in FIG. 57 (similar to the configuration in FIG. 5). Therefore, similar reference numerals are assigned to similar portions, and further explanations of other configurations and functions thereof will be omitted.

20TH EMBODIMENT

Figure 58A:
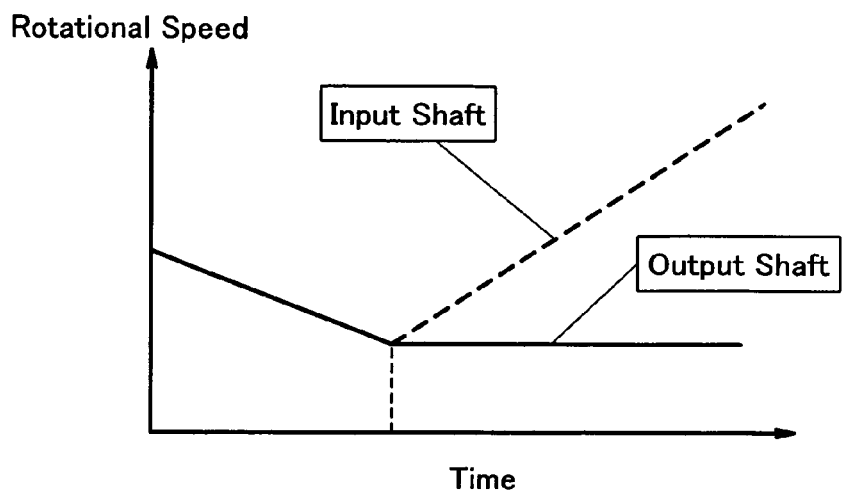
FIG. 58A is a graph for explaining a function of a control apparatus according to a 20th Embodiment, showing a change in rotational speeds of the input shaft and the output shaft when a transition of the input shaft rotational speed from deceleration to acceleration in accordance with a clutch operation takes place.
Figure 58B:
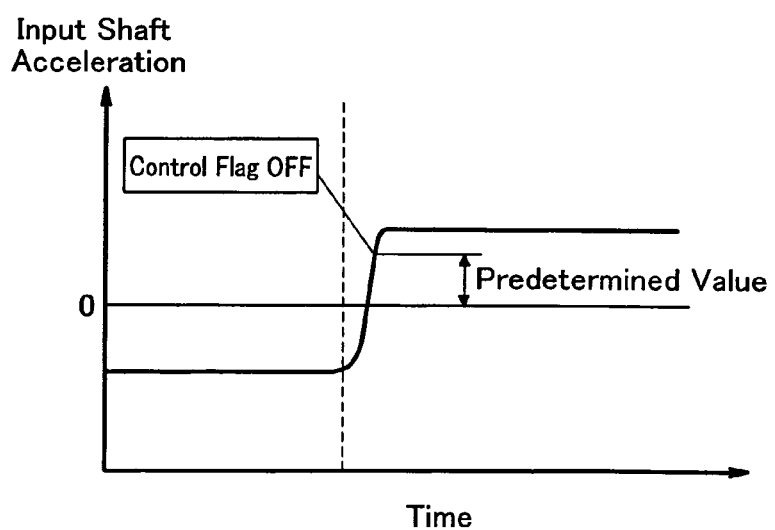
FIG. 58B is a corresponding graph of FIG. 58A, showing a change in a relative rotational acceleration.

In the 16th and the 17th Embodiment above, it is determined that a clutch operation is performed when the relative rotational speed is greater than a predetermined value and, then, the control flag is turned to OFF. Alternatively, in this embodiment, as shown in FIGS. 58A and 58B, the control flag is turned to OFF when the rotational acceleration of the input shaft is greater than a predetermined value. Here, only the deceleration control has been described, however, the same is true for the acceleration control.

Figure 59:
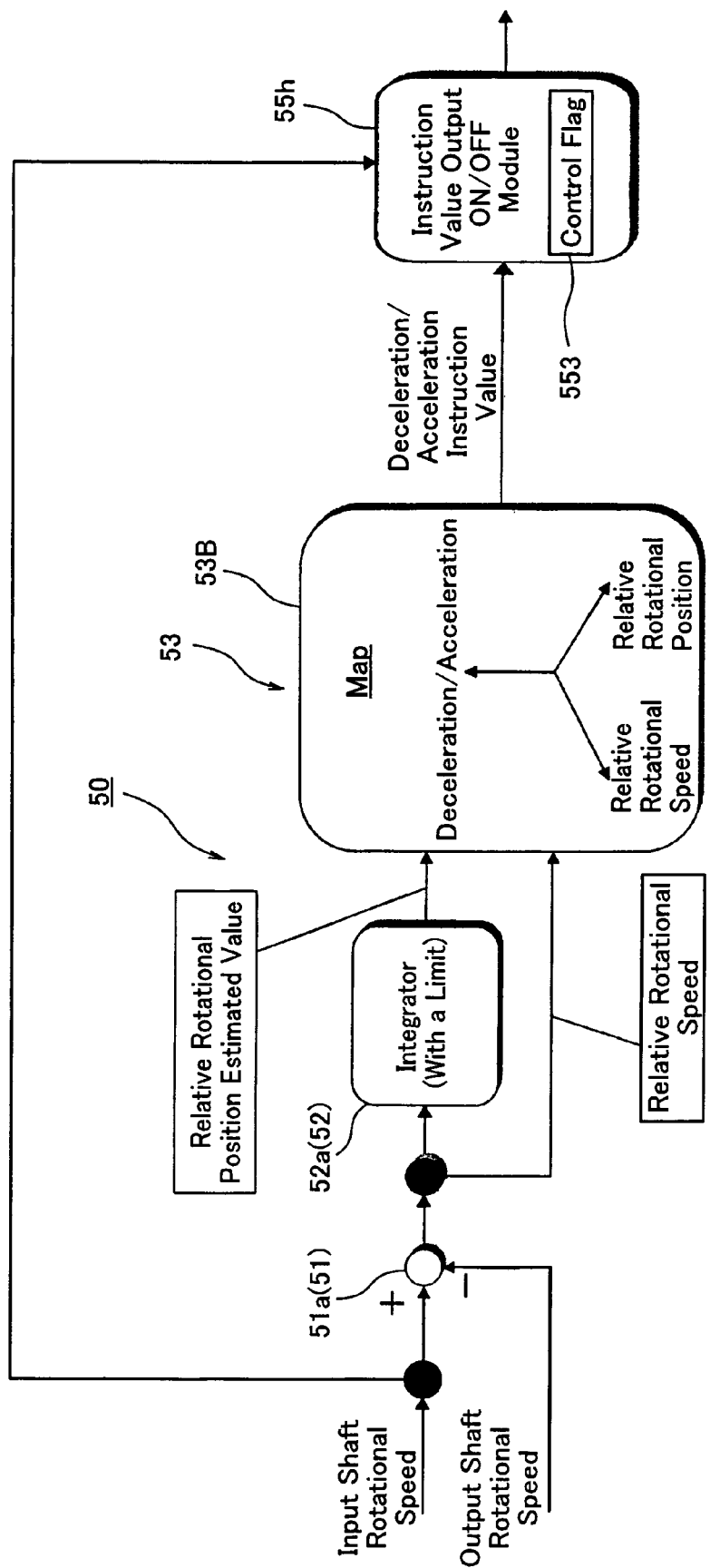
FIG. 59 is a control block diagram showing a configuration of the calculating device of the control apparatus according to the 20th Embodiment, and shows an example of the calculating device when using detection values of both the input shaft rotational speed and the output shaft rotational speed as shown in FIG. 4.

As shown in FIG. 59, the calculating device 50 according to this embodiment includes a differentiator 51a as the relative rotational speed calculating module 51, an integrator 52a as the relative rotational position estimating module 52, a control module 53, and an instruction value output ON/OFF module 55h as the acceleration/deceleration adjusting module.

The differentiator 51a is provided with both the input shaft rotational speed and the output shaft rotational speed. The differentiator 51a calculates a difference between the input shaft rotational speed and the output shaft rotational speed (that is, a relative rotational speed). The calculated relative rotational speed is transmitted to the control module 53 as well as to the integrator 52a. The integrator 52a estimates a relative rotational position by integrating the relative rotational speeds. The estimated relative rotational position is transmitted to the control module 53.

The control module 53 includes a map 53B which is utilized by the control logic 53A (see FIG. 2). The map 53B typically stores deceleration/acceleration instruction values corresponding to the relative rotational speeds and the relative rotational positions (see FIG. 3). The control module 53 calculates a deceleration/acceleration instruction value with reference to the map 53B based on the relative rotational speed transmitted from the differentiator 51a and the relative rotational position estimated value transmitted from the integrator 52a. The calculated deceleration/acceleration instruction value is outputted to an appropriate drive device of the spark plug 603a (for example, see FIG. 31) which is the accelerating/decelerating module 60 (see FIG. 2), through the instruction value output ON/OFF module 55h.

In addition to the deceleration/acceleration instruction value from the control module 53, the instruction value output ON/OFF module 55h is provided with an input shaft rotational speed. The instruction value output ON/OFF module 55h includes a control flag memory area 553 configured to store a control flag. The instruction value output ON/OFF module 55h also includes a function to calculate a rotational acceleration of the input shaft, by differentiating the given input shaft rotational speed.

If the control flag stored in the control flag memory area 553 is ON, the instruction value output ON/OFF module 55h passes the deceleration/acceleration instruction value transmitted from the control module 53 therethrough. If the control flag is OFF, the instruction value output ON/OFF module 55h does not allow the deceleration/acceleration instruction value to pass therethrough.

Figure 60:
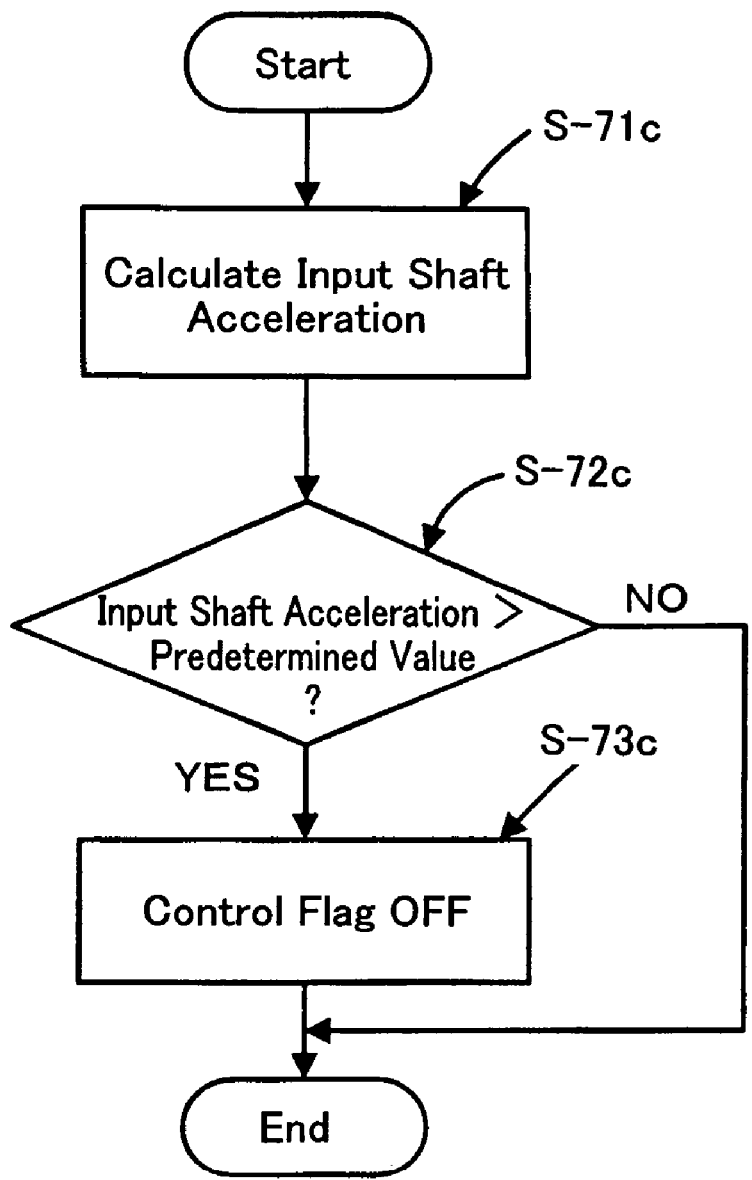
FIG. 60 is a flowchart for explaining an operation of the instruction value output ON/OFF module of the calculating device according to the 20th Embodiment shown in FIG. 59.

Next, an operation of the instruction value output ON/OFF module 55h will be explained referring to a flowchart of FIG. 60. The instruction value output ON/OFF module 55h operates upon an input of the deceleration/acceleration instruction value from the control module 53.

First, the instruction value output ON/OFF module 55h calculates an input shaft rotational acceleration from the input shaft rotational speed being inputted (Step S-71c).

The instruction value output ON/OFF module 55h determines whether the calculated input shaft rotational acceleration is greater than a predetermined value (Step S-72c). This predetermined value is, as mentioned above, a value of the input shaft rotational acceleration which is impossible for normal acceleration or deceleration.

If the input shaft rotational acceleration is not greater than the predetermined value ("NO" in Step S-72c), the instruction value output ON/OFF module 55h terminates the routine. On the other hand, if the input shaft rotational acceleration is greater than the predetermined value ("YES" in Step S-72c), the instruction value output ON/OFF module 55h sets the control flag stored in the control flag memory area 553 to OFF (Step S-73c), and terminates the routine.

21ST EMBODIMENT

Figure 61A:
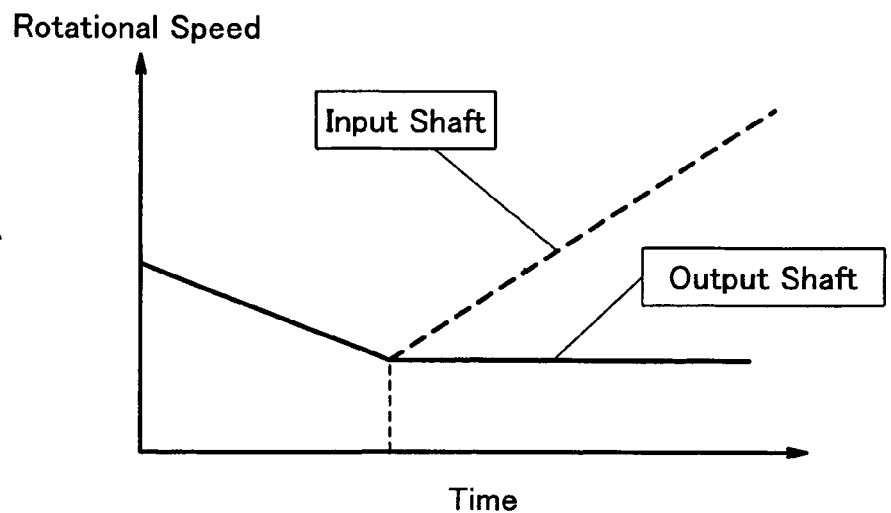
FIG. 61A is a graph for explaining a function of a control apparatus according to a 21st Embodiment, showing a change in rotational speeds of the input shaft and the output shaft when a transition of the input shaft rotational speed from deceleration to acceleration in accordance with a clutch operation takes place.
Figure 61B:
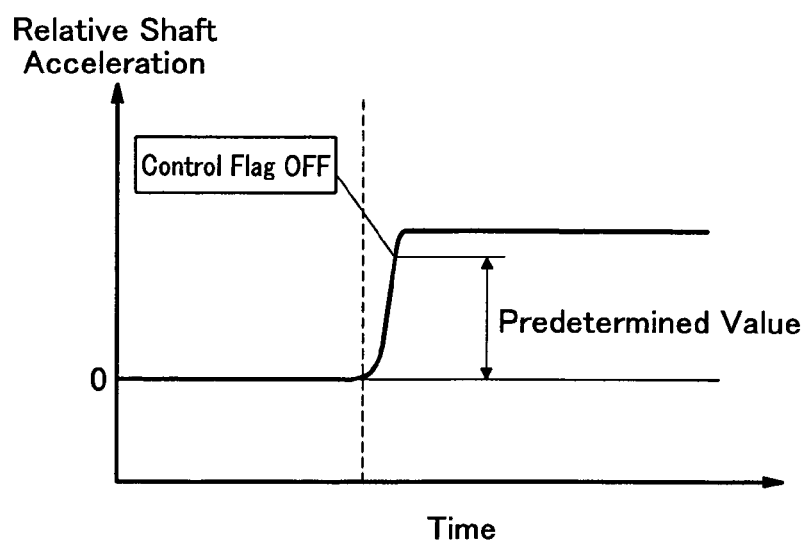
FIG. 61B is a corresponding graph of FIG. 61A, showing a change in a relative rotational acceleration.

In the 16th and the 17th Embodiments, it is considered that the clutch operation is performed when the relative rotational speed is greater than a predetermined value. In such a condition, it is configured so that the control flag is turned to OFF. However, in this embodiment, as shown in FIGS. 61A and 61B, it is configured so that the control flag is turned to OFF, when the relative rotational acceleration is greater than a predetermined value. Here, only the deceleration control has been described, however, the same is true for the acceleration control.

Figure 62:
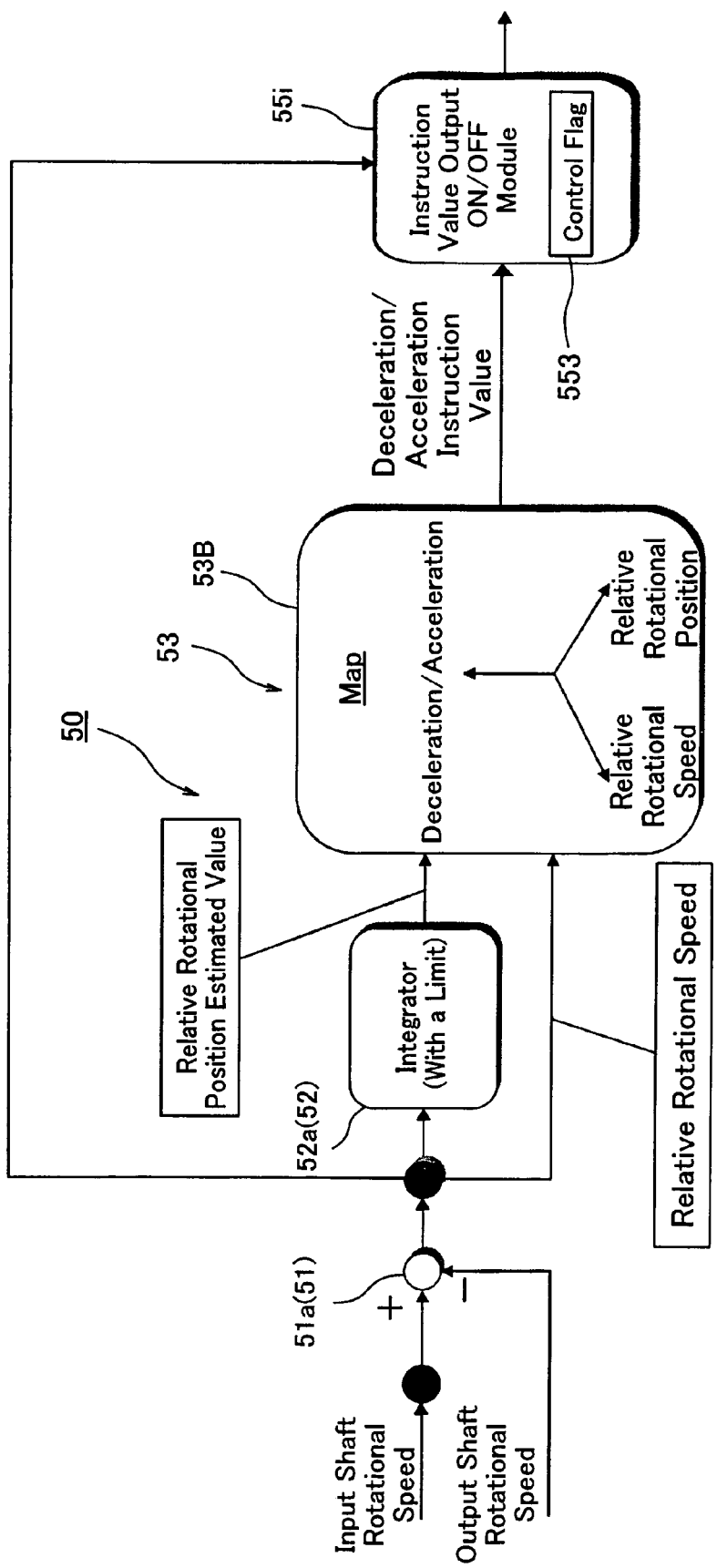
FIG. 62 is a control block diagram showing a configuration of the calculating device of the control apparatus according to the 21st Embodiment, and shows an example of the calculating device when using detection values of both the input shaft rotational speed and the output shaft rotational speed as shown in FIG. 4.

As shown in FIG. 62, the calculating device 50 according to this embodiment includes a differentiator 51a as the relative rotational speed calculating module 51, an integrator 52a as the relative rotational position estimating module 52, a control module 53, and an instruction value output ON/OFF module 55i as the acceleration/deceleration adjusting module.

The differentiator 51a is provided with both the input shaft rotational speed and the output shaft rotational speed. The differentiator 51a calculates a difference between the input shaft rotational speed and the output shaft rotational speed (that is, a relative rotational speed). The calculated relative rotational speed is transmitted to the control module 53 as well as to the integrator 52a. The integrator 52a estimates a relative rotational position by integrating the relative rotational speeds. The estimated relative rotational position is transmitted to the control module 53.

The control module 53 includes a map 53B which is utilized by the control logic 53A (see FIG. 2). The map 53B typically stores deceleration/acceleration instruction values corresponding to the relative rotational speeds and the relative rotational positions (see FIG. 3). The control module 53 calculates a deceleration/acceleration instruction value with reference to the map 53B based on the relative rotational speed transmitted from the differentiator 51a and the relative rotational position estimated value transmitted from the integrator 52a. The control module 53 outputs the calculated deceleration/acceleration instruction value through the instruction value output ON/OFF module 55i to an appropriate drive device of the spark plug 603a (for example, see FIG. 31) which is the accelerating/decelerating module 60 (see FIG. 2).

In addition to the deceleration/acceleration instruction value from the control module 53, the instruction value output ON/OFF module 55i is provided with a relative rotational speed transmitted from the differentiator 51a. The instruction value output ON/OFF module 55i includes a control flag memory area 553 configured to store a control flag. Moreover, the instruction value output ON/OFF module 55*i* includes a function to calculate a relative rotational acceleration by differentiating the relative rotational speed which is given.

If the control flag stored in the control flag memory area 553 is ON, the instruction value output ON/OFF module 55*i* allows the deceleration/acceleration instruction value transmitted from the control module 53 to pass therethrough. If the control flag is OFF, the instruction value output ON/OFF module 55*i* does not allow the deceleration/acceleration instruction value to pass therethrough.

Figure 63:
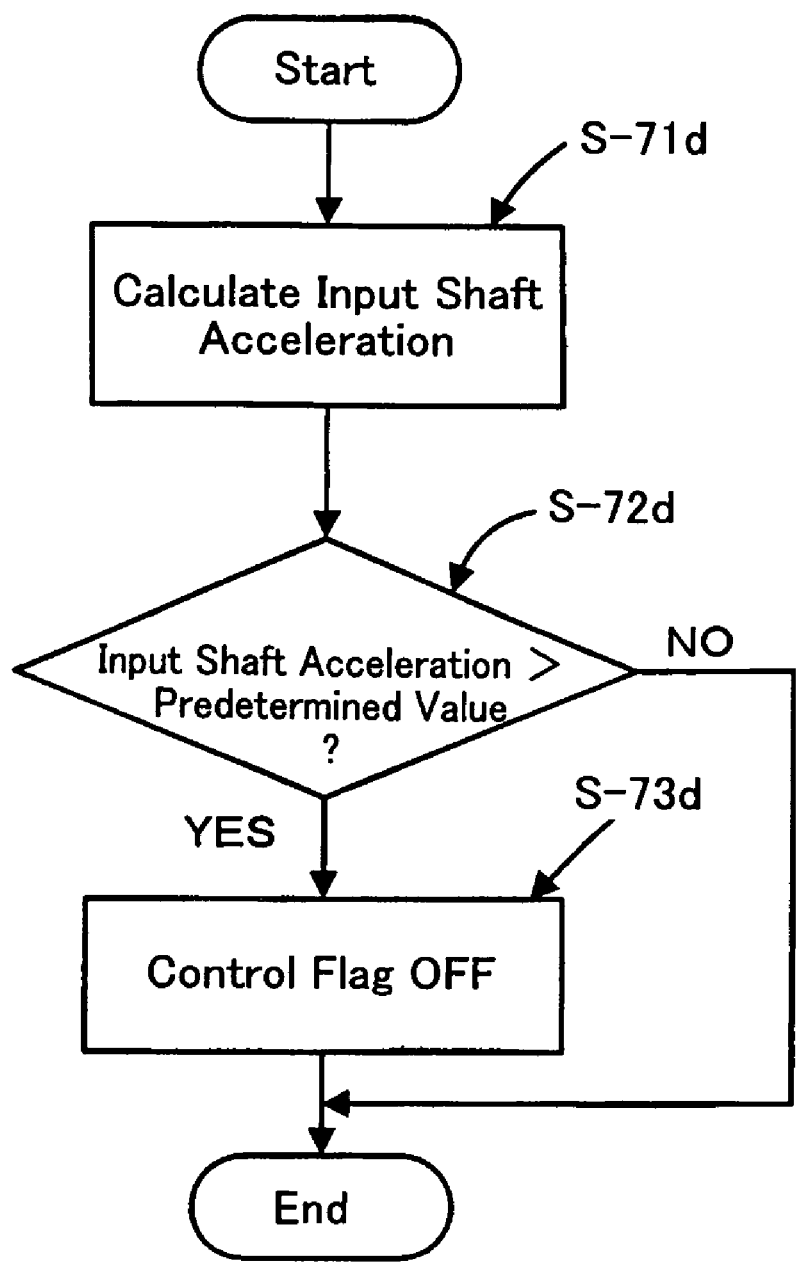
FIG. 63 is a flowchart for explaining an operation of the instruction value output ON/OFF module of the calculating device according to the 21st Embodiment shown in FIG. 62.

Next, an operation of the instruction value output ON/OFF module 55*i* will be explained referring to a flowchart of FIG. 63. The instruction value output ON/OFF module 55*i* operates upon an input of the deceleration/acceleration instruction value from the control module 53 and, first, calculates a relative rotational acceleration from the relative rotational speed which is given (Step S-71*d*).

The instruction value output ON/OFF module 55*i* determines whether the calculated relative rotational acceleration is greater than a predetermined value (Step S-72*d*). This predetermined value is, as mentioned above, a value of the relative rotational acceleration which is impossible for normal acceleration or deceleration.

If the relative rotational acceleration is less than the predetermined value ("NO" in Step S-72*d*), the instruction value output ON/OFF module 55*i* terminates the routine. On the other hand, if the relative rotational acceleration is greater than the predetermined value ("YES" in S-72*d*), the instruction value output ON/OFF module 55*i* sets the control flag stored in the control flag memory area 553 to OFF (Step S-73*d*), and terminates the routine.

22ND EMBODIMENT

Figure 64:
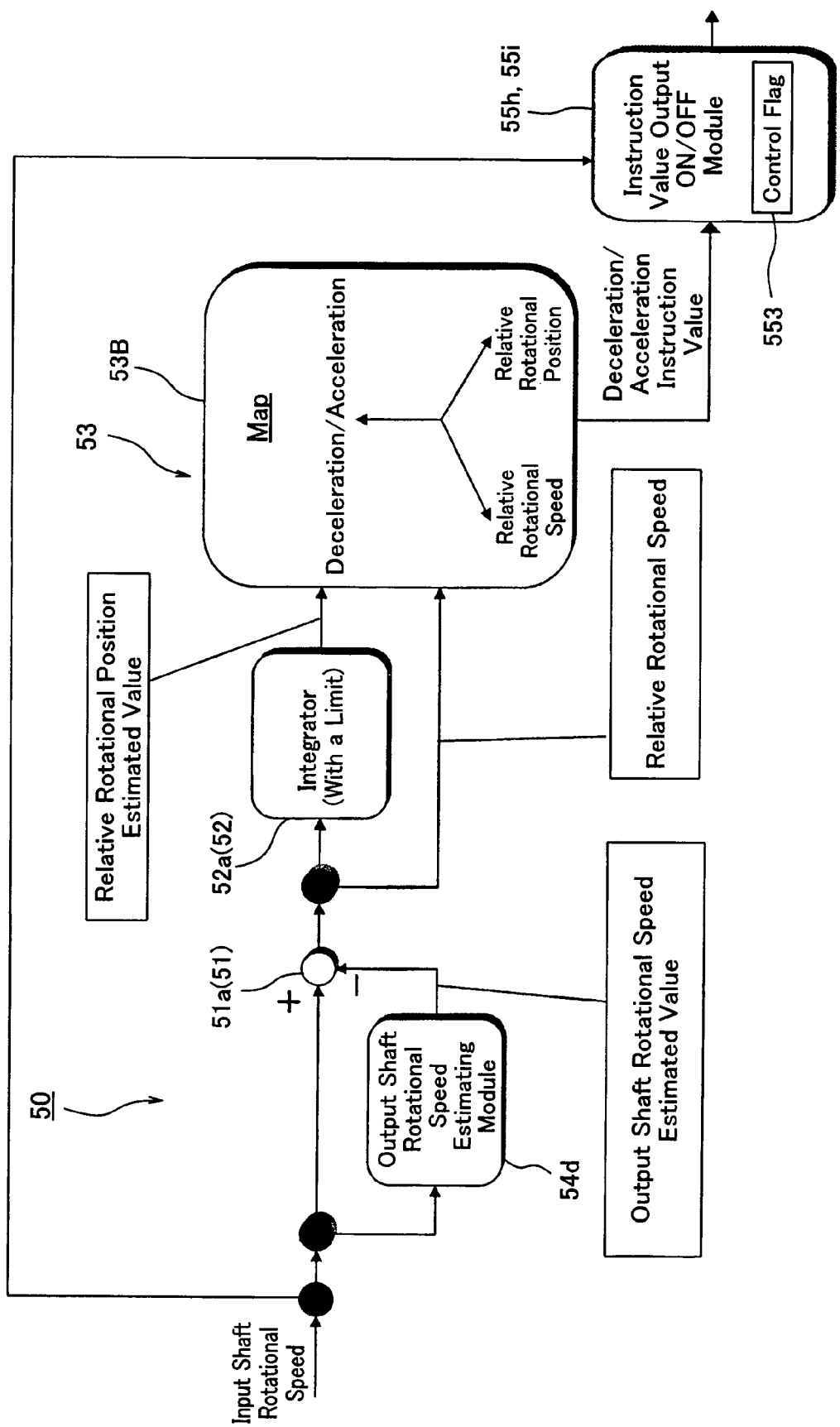
FIG. 64 is a control block diagram showing a configuration of a calculating device of a control apparatus according to a 22nd Embodiment, and shows an example in which the configurations of the 20th and the 21st Embodiments are applied to the calculating device when using a value estimated from the input shaft rotational speed as shown in FIG. 5.

Although a configuration to detect an output shaft rotational speed by the output shaft sensor has been described in the above 20th and the 21st Embodiments, it is also applicable to a configuration which estimates the output shaft rotational speed from the input shaft rotational speed as shown in FIG. 64 (similar to the configuration in FIG. 5). Therefore, similar reference numerals are assigned to similar portions, and further explanations of other configurations and functions thereof will be omitted.

23RD EMBODIMENT

Figure 66:
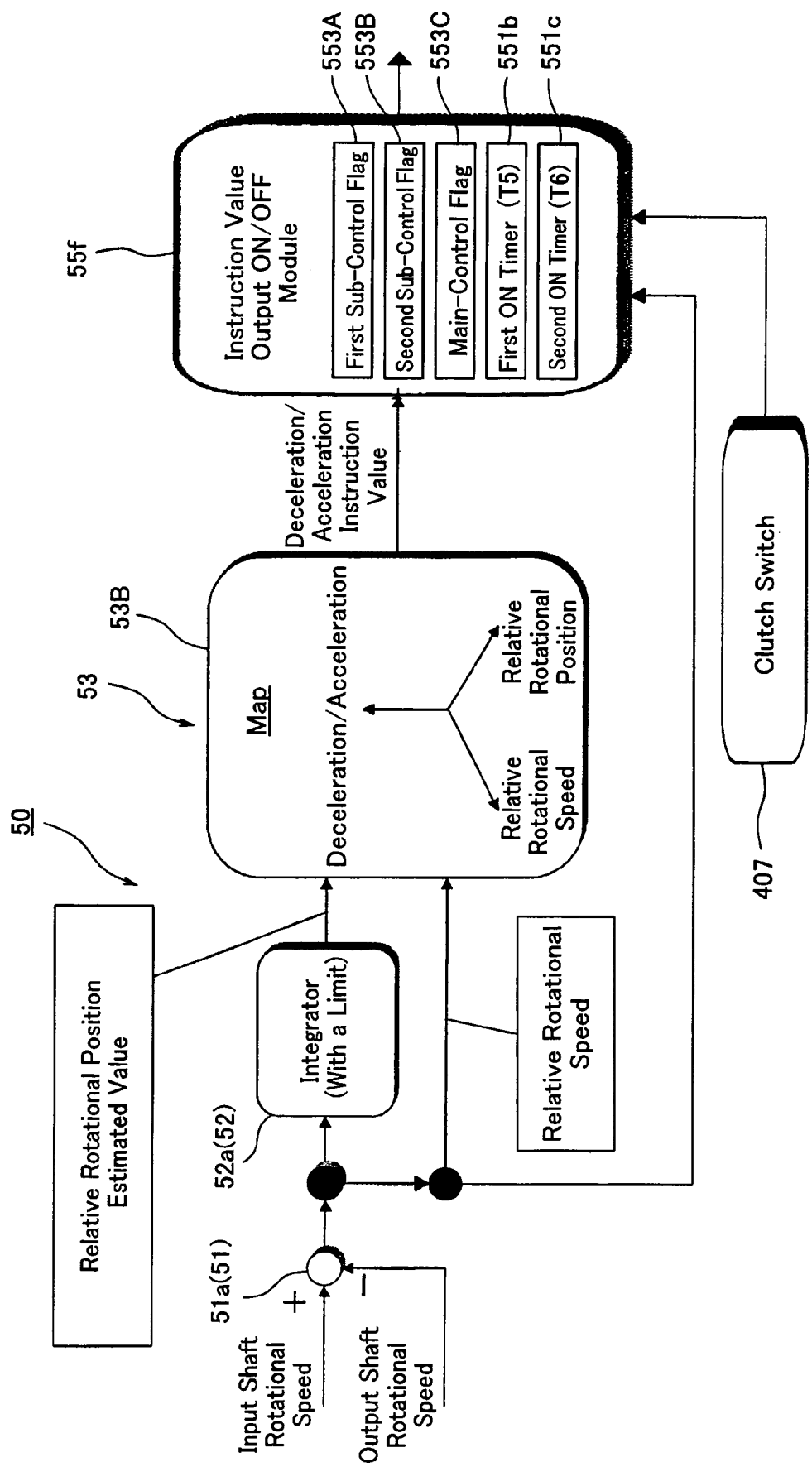
FIG. 66 is a control block diagram showing a configuration of a calculating device of a control apparatus according to a 23rd Embodiment, and shows an example of the calculating device when using detection values of both the input shaft rotational speed and the output shaft rotational speed as shown in FIG. 4.

As described in the 10th and the 11th Embodiment above, the ON/OFF of the clutch is detected by the clutch switch 407 (for example, see FIG. 66). If the clutch is located in the power transmission path between the input shaft and the output shaft, in fact, the input shaft rotational speed and the output shaft rotational speed do not become the same value immediately, that is, the clutch slips, even if the clutch switch 407 detects the OFF/ON of the clutch as it being connected from the disconnected state, respectively, such as at the time of start of the vehicle.

Figure 65A:
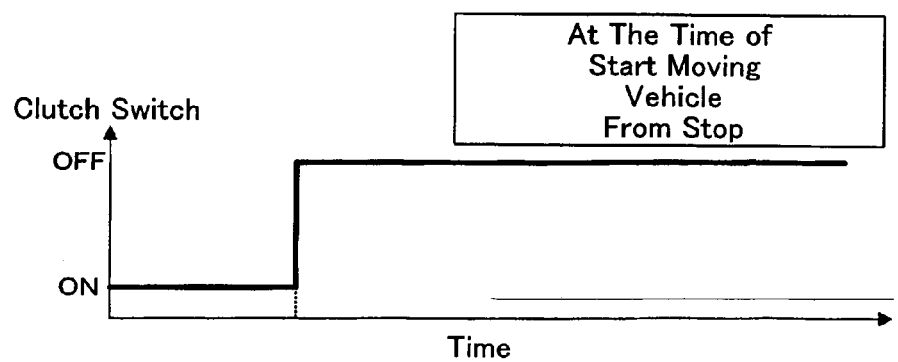
FIG. 65A is a graph for explaining a function of a control apparatus according to a 23rd Embodiment, showing a change in an ON/OFF-state of the clutch at the time of start the vehicle.
Figure 65B:
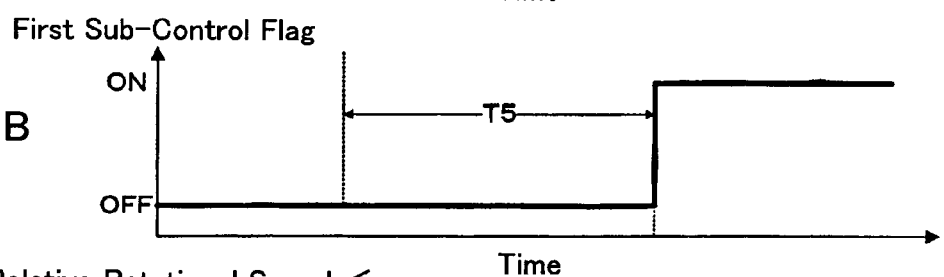
FIG. 65B is a corresponding graph of FIG. 65A, showing a change in an ON/OFF-state of the first sub-control flag stored in the instruction value output ON/OFF module.
Figure 65C:
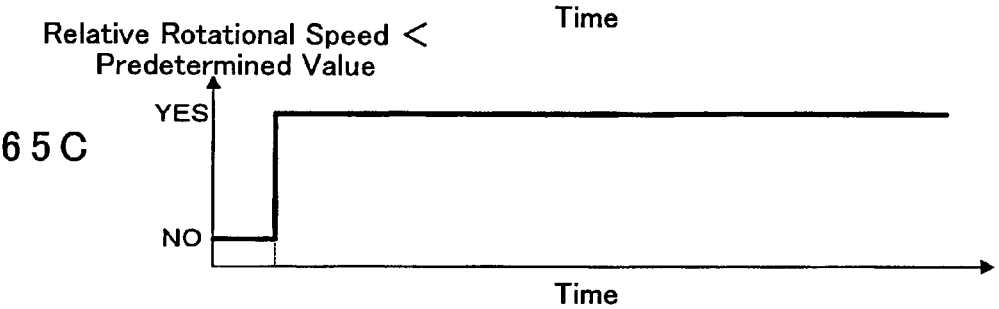
FIG. 65C is a corresponding graph of FIG. 65A, and shows whether a relative rotational speed is less than a predetermined value.
Figure 65D:
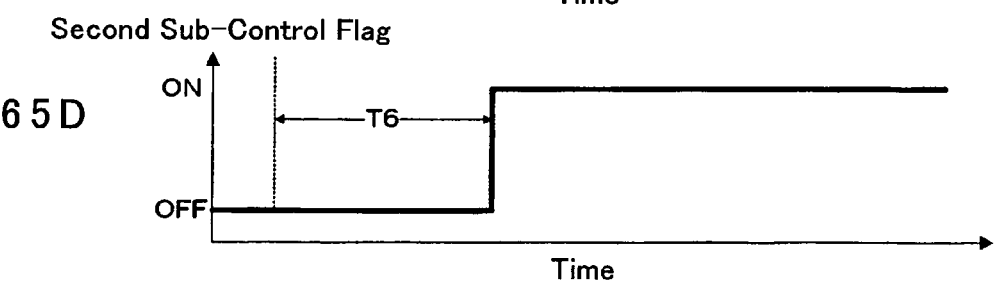
FIG. 65D is a corresponding graph of FIG. 65a, and shows an ON/OFF-state of the second sub-control flag stored in the instruction value output ON/OFF module.
Figure 65E:
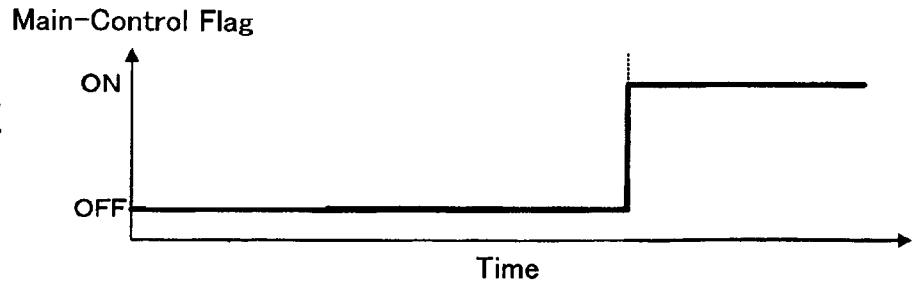
FIG. 65E is a corresponding graph of FIG. 65A, and shows an ON/OFF-state of the main-control flag stored in the instruction value output ON/OFF module.

When the control according to the present invention is performed in such a situation, it becomes malfunction. Therefore, in this embodiment, as shown in FIGS. 65A and 65E, roughly, if the clutch switch 407 is ON, the control flag (in this embodiment, the main-control flag) is set to OFF. Then, the control flag may be returned to ON when the predetermined time T5 is lapsed since the clutch switch 407 is turned to OFF from ON and, thus, it is determined that a slippage of the clutch is apparently gone and the input shaft rotational speed and the output shaft rotational speed become the same speed.

More particularly, in FIG. 66, the calculating device 50 according to this embodiment includes a differentiator 51*a* as the relative rotational speed calculating module 51, an integrator 52*a* as the relative rotational position estimating module 52, a control module 53, and an instruction value output ON/OFF module 55*f* as the acceleration/deceleration adjusting module.

The differentiator 51 is provided with both the input shaft rotational speed from the input shaft sensor 404 (see FIG. 31) and the output shaft rotational speed from the output shaft sensor 405 (see FIG. 31). The differentiator 51*a* calculates a difference between the input shaft rotational speed and the output shaft rotational speed (that is, a relative rotational speed). The calculated relative rotational speed is transmitted to the control module 53 as well as to the integrator 52*a*. The integrator 52*a* estimates a relative rotational position by integrating the relative rotational speeds. The estimated relative rotational position is transmitted to the control module 53.

The control module 53 includes a map 53B which is utilized by the control logic 53A (see FIG. 2). The map 53B typically stores deceleration/acceleration instruction values corresponding to the relative rotational speeds and the relative rotational positions (see FIG. 3). The control module 53 calculates a deceleration/acceleration instruction value with reference to the map 53B based on the relative rotational speed transmitted from the differentiator 51*a* and the relative rotational position estimated value transmitted from the integrator 52*a*. The control module 53 outputs the calculated deceleration/acceleration instruction value to an appropriate drive device of the spark plug 603*a* (see FIG. 31) which is the accelerating/decelerating module 60 (see FIG. 2) through the instruction value output ON/OFF module 55*f*.

Besides the deceleration/acceleration instruction value from the control module 53 mentioned above, the instruction value output ON/OFF module 55*f* is provided with a detection result from the clutch switch 407 indicating that the clutch 202 is connected (the clutch switch 407 is OFF) or is disconnected (the clutch switch 407 is ON). Moreover, the instruction value output ON/OFF module 55*f* is provided with a relative rotational speed from the differentiator 51*a*. The instruction value output ON/OFF module 55*f* includes control flag memory areas 553A, 553B, and 553C which store the first sub-control flag, the second sub-control flag, and the main-control flag, respectively. The instruction value output ON/OFF module 55*f* also includes a first ON-timer 551*b*, and a 2nd ON-timer 551*c*.

Figure 69:
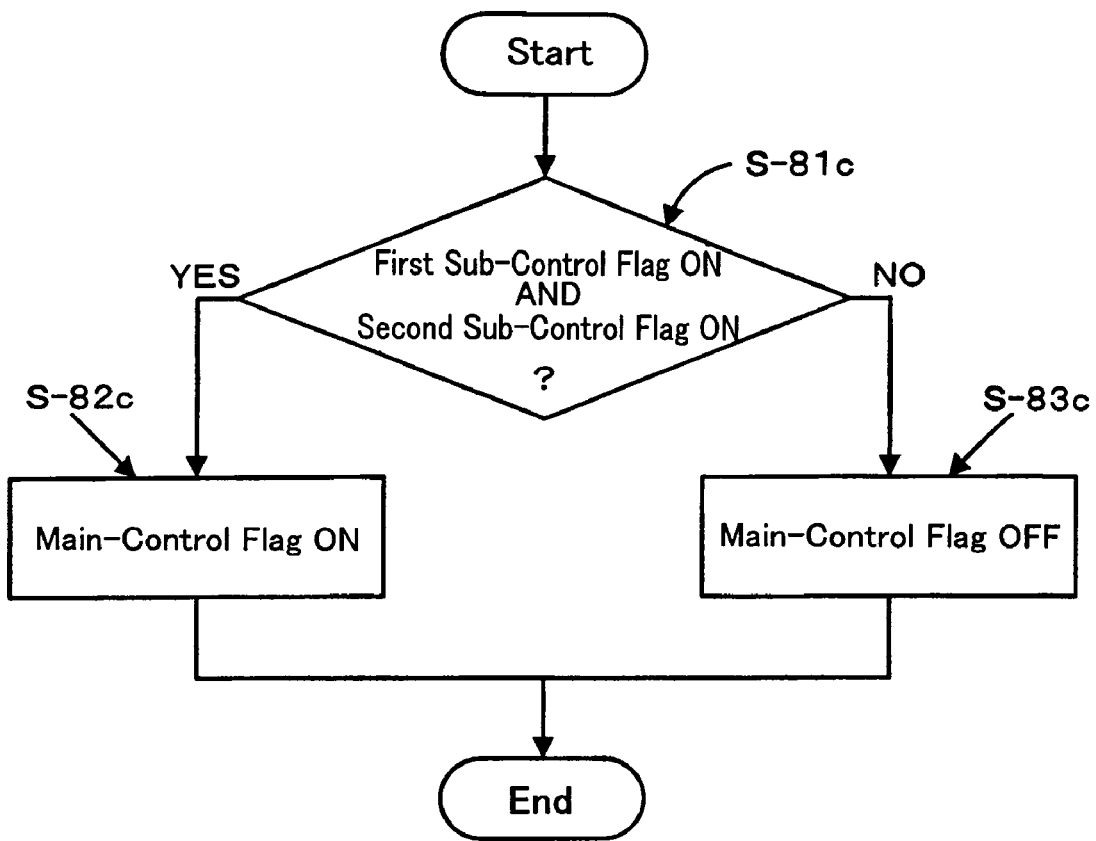
FIG. 69 is a flowchart for explaining an operation of the instruction value output ON/OFF module of the calculating device according to the 23rd Embodiment shown in FIG. 66.

If the main-control flag stored in the main-control flag memory area 553C is ON, the instruction value output ON/OFF module 55*f* allows the deceleration/acceleration instruction value transmitted from the control module 53 to pass therethrough. If the control flag is OFF, the instruction value output ON/OFF module 55*f* does not allow the deceleration/acceleration instruction value to pass therethrough. Furthermore, as will be mention hereinafter, the main-control flag is set to ON only if both the first sub-control flag and the second sub-control flag are ON (see the flowchart of FIG. 69).

Next, an operation of the instruction value output ON/OFF module 55*f* will be explained referring to a flowchart of FIG. 67. The instruction value output ON/OFF module 55*f* operates upon an input of the deceleration/acceleration instruction value from the control module 53.

First, the instruction value output ON/OFF module 55*f* determines whether the clutch switch 407 is in the OFF-state based on the information transmitted from the clutch switch 407 (Step S-81*a*).

If the clutch switch 407 is in the OFF-state ("YES" in Step S-81*a*), the instruction value output ON/OFF module 55*f* sets the first sub-control flag stored in the first sub-control flag memory area 553A to OFF (Step S-82*a*). Then, the instruction value output ON/OFF module 55*f* advances the count of the first ON-timer 551*b* (Step S-83*a*).

Then, the instruction value output ON/OFF module 55*f* determines whether the count of the first ON-timer 551*b* lapses the predetermined time T5 (Step S-84*a*). If the predetermined time T5 is not lapsed ("NO" in Step S-84*a*), the instruction value output ON/OFF module 55*f* repeats the routine from Step S-81*a*.

On the other hand, if the predetermined time T5 is lapsed ("YES" in Step S-84*a*), the instruction value output ON/OFF module 55*f* returns the first sub-control flag to ON (Step S-85*a*).

If the clutch switch 407 is in the ON-state in Step S-85*a* and Step S-81*a* ("NO" in Step S-81*a*), the instruction value output ON/OFF module 55*f* resets the first ON-timer 551*b* (Step S-86*a*), and terminates the routine.

Figure 67:
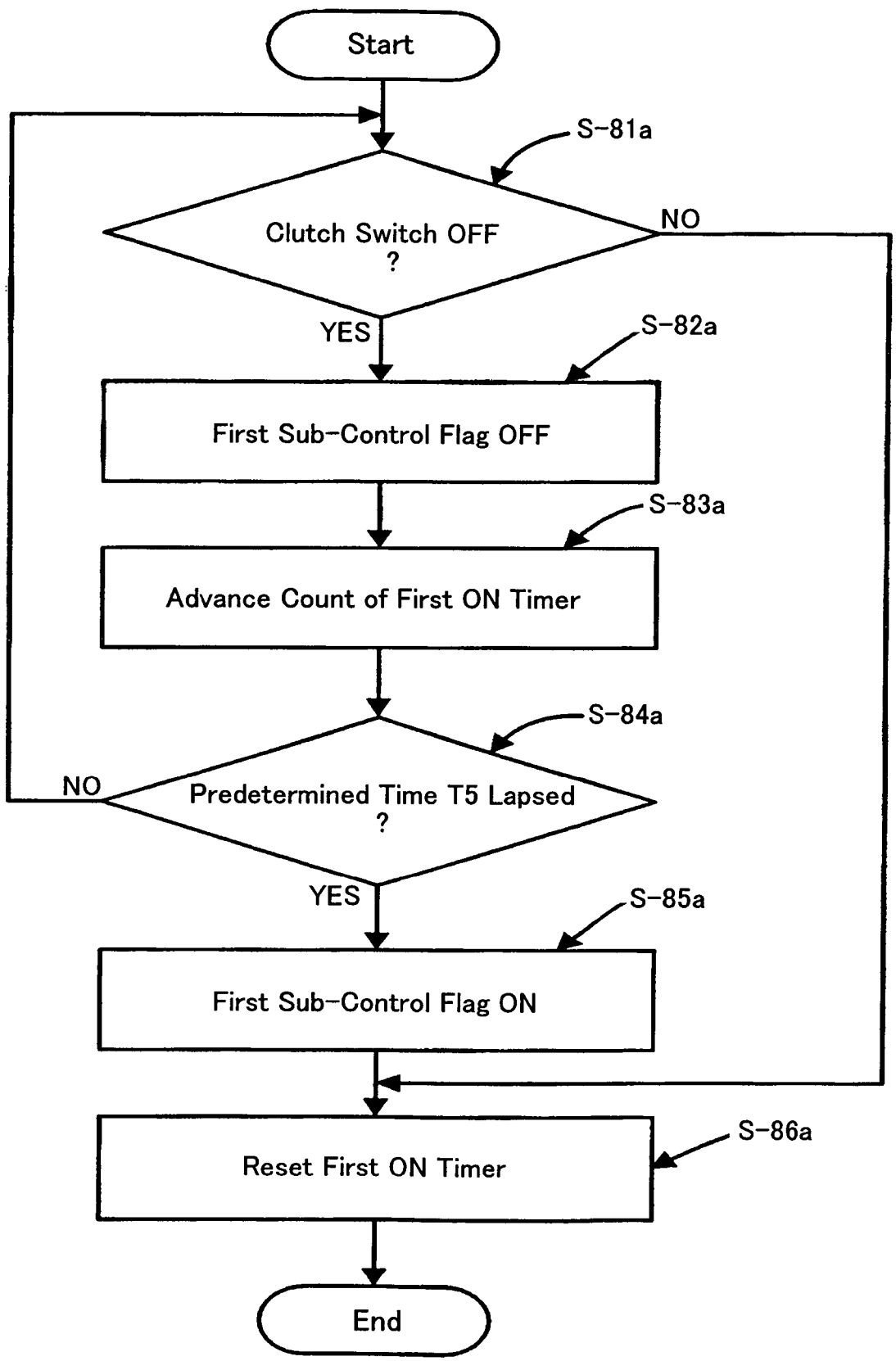
FIG. 67 is a flowchart for explaining an operation of the instruction value output ON/OFF module of the calculating device according to the 23rd Embodiment shown in FIG. 66.
Figure 68:
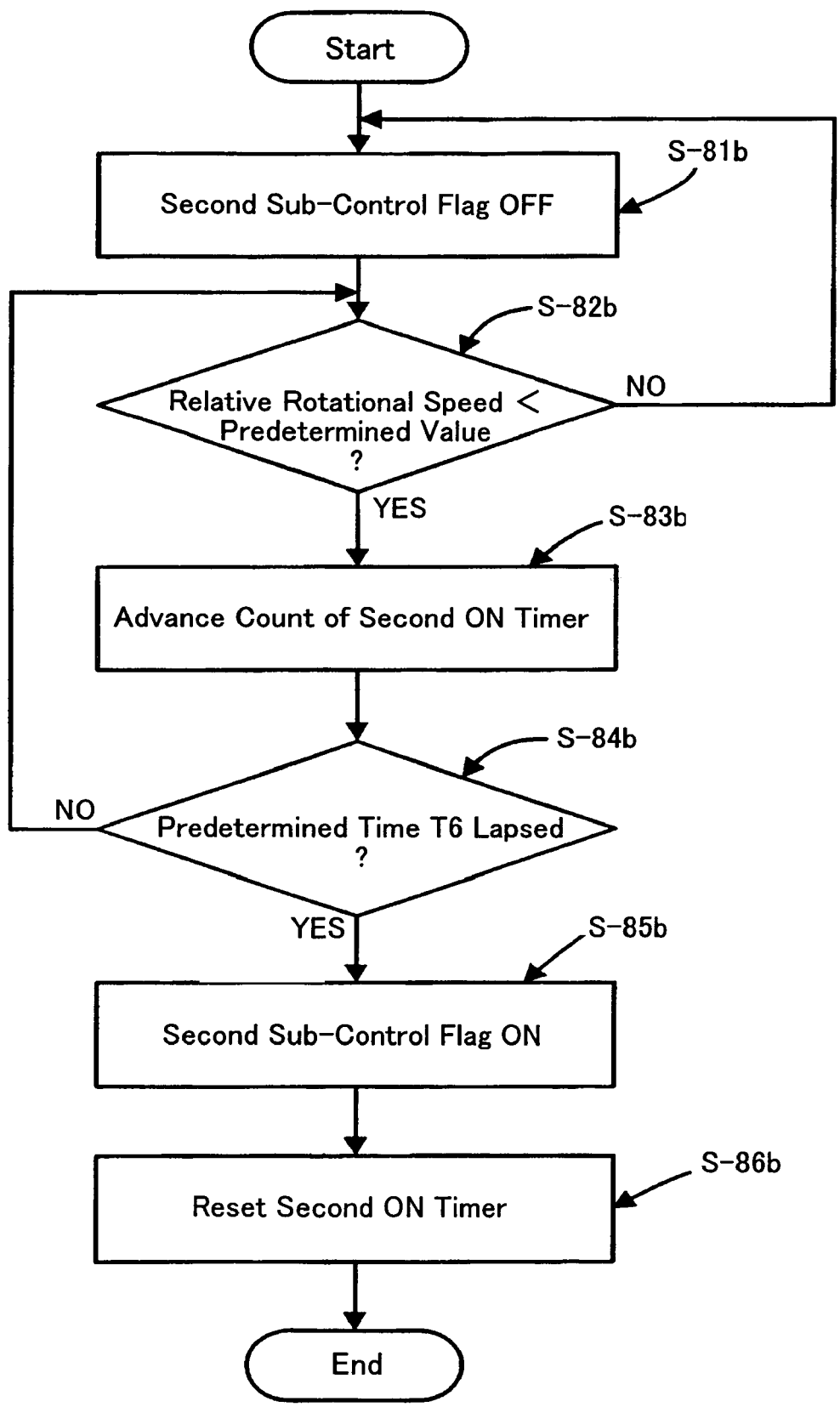
FIG. 68 is a flowchart for explaining an operation of the instruction value output ON/OFF module of the calculating device according to the 23rd Embodiment shown in FIG. 66.

Moreover, as a parallel routine of the routine shown in FIG. 67, the instruction value output ON/OFF module 55*f* operates upon an input of the deceleration/acceleration instruction value from the control module 53, as shown in the flowchart of FIG. 68. The instruction value output ON/OFF module 55*f* first sets the second sub-control flag stored in the second control flag memory area 553B to OFF (Step S-81*b*) and, then, determines whether the relative rotational speed is less than a predetermined value based on the information transmitted from the differentiator 51*a* (Step S-82*b*).

If the relative rotational speed is greater than the predetermined value ("NO" in Step S-82*b*), the instruction value output ON/OFF module 55*f* repeats the routine from Step S-81*b*. On the other hand, if the relative rotational speed is less than the predetermined value ("YES" in Step S-82*b*), the instruction value output ON/OFF module 55*f* advances the count of the 2nd ON-timer 551*c* (Step S-83*b*).

Then, the instruction value output ON/OFF module 55*f* determines whether the count of the 2nd ON-timer 551*c* lapses the predetermined time T6 (Step S-84*b*). If the predetermined time T6 is not lapsed ("NO" in Step S-84*b*), the instruction value output ON/OFF module 55*f* repeats the routine from Step S-82*b*.

On the other hand, if the predetermined time T6 is lapsed ("YES" in Step S-84*b*), the instruction value output ON/OFF module 55*f* sets so that the second sub-control flag is returned to ON (Step S-85*b*), resets the 2nd ON-timer 551*c* (Step S-86*b*), and terminates the routine.

As mentioned above, the main control flag 553C is configured to be ON only when both the first sub-control flag and the second sub-control flag are ON. The instruction value output ON/OFF module 55*f* operates upon an input of the deceleration/acceleration instruction value from the control module 53. As shown in a flowchart of FIG. 69, the instruction value output ON/OFF module 55*f* first refers to the first and the second sub-control flags stored in the first sub-control flag memory area 553A and the second sub-control flag memory area 553B, respectively, and determines whether both of the sub-control flags are in the ON-state (Step S-81*c*).

If both of the sub-control flags are in the ON-state ("YES" in Step S-81*c*), the instruction value output ON/OFF module 55*f* turns the main-control flag stored in the main-control flag memory area 553C to ON (Step S-82*c*). On the other hand, if both of the sub-control flags are in the OFF-state, or if only one of the sub-control flags is in the ON-state ("NO" in Step S-81*c*), the instruction value output ON/OFF module 55*f* turns the main-control flag stored in the main-control flag memory area 553C to OFF (Step S-83*c*).

By the above operation of the instruction value output ON/OFF module 55*f*, as shown in FIGS. 65A-65E, when the clutch 202 is disconnected and the clutch switch 407 is in the ON-state, the first sub-control flag is turned to OFF. When the clutch 202 is connected and the clutch switch 407 changes into the OFF-state, the count of the predetermined time T5 by the first ON-timer 551*b* is started. Upon the lapse of the predetermined time T5, the first sub-control flag is turned to ON.

On the other hand, when it is detected that the relative rotational speed is less than the predetermined value, the count of the predetermined time T6 by the 2nd ON-timer 551*c* is then started. Upon the lapse of the predetermined time T6, the second sub-control flag is turned to ON.

The main-control flag has been set to OFF since the clutch 202 is disconnected and the clutch switch 407 changes into the ON-state. As mentioned above, only when the both sub-control flags are turned to ON, the main-control flag is turned to ON and, the passing through of the deceleration/acceleration instruction value becomes possible.

In this embodiment, the predetermined times T5 and T7 have been shown as fixed values, however, instead, they may be variable values. If the variable values are used, the instruction value output ON/OFF module 55*f* may adjust the predetermined times T5 and T7 according to a traveling speed of the vehicle. That way, different values at the time of stop and traveling of the vehicle may be used for the predetermined times T5 and T7. For example, a longer time may be used at the time of stop of the vehicle, to prevent an unintentional operation of the acceleration/deceleration control according to the present invention even when a clutch operation takes place slowly. Otherwise, a shorter time may be used for a quick clutch operation when changing gears during traveling, because it is possible to reliably perform the acceleration/deceleration control according to the present invention even if an acceleration takes place shortly after connecting the clutch.

24TH EMBODIMENT

Figure 70:
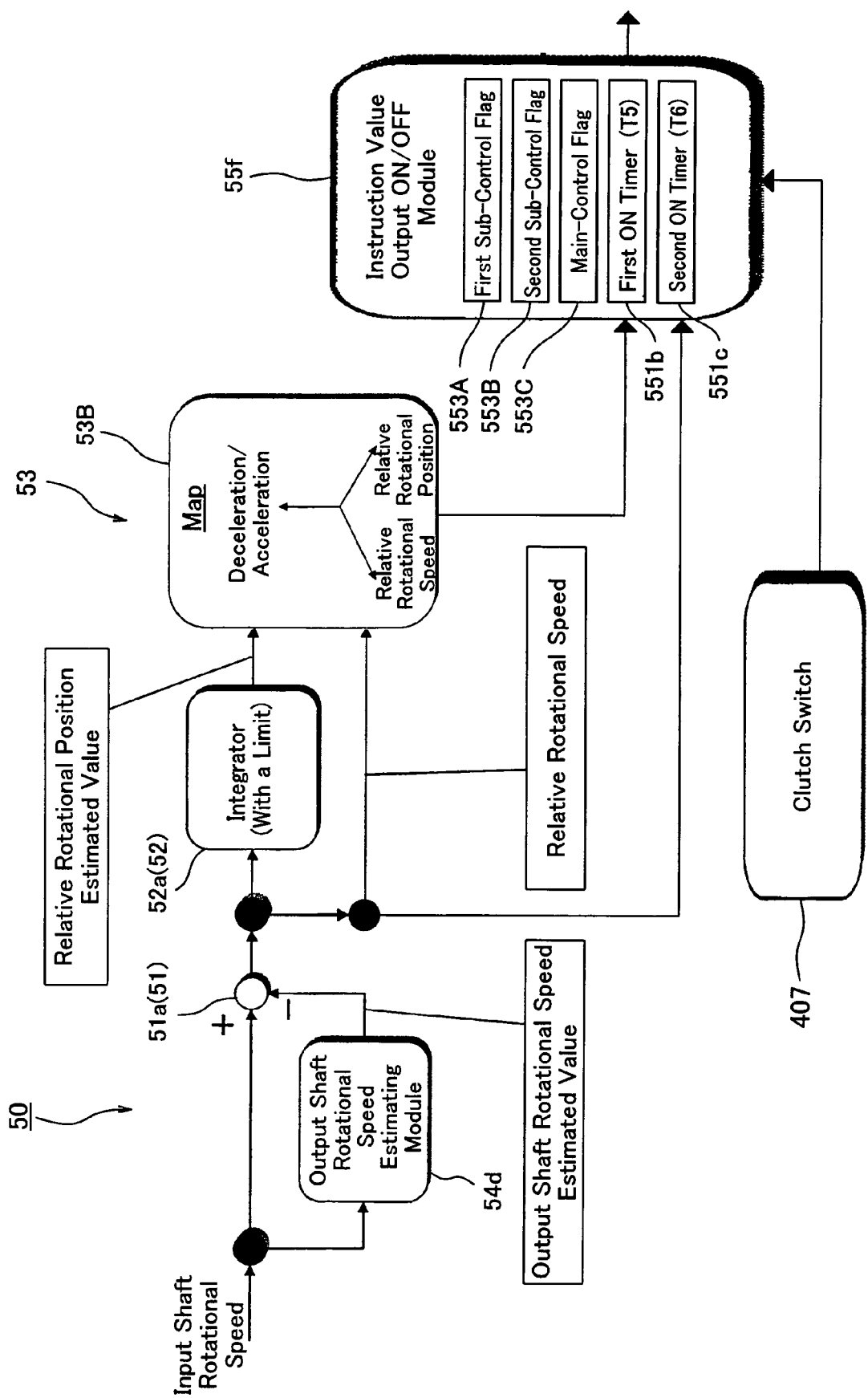
FIG. 70 is a control block diagram showing a configuration of a calculating device of a control apparatus according to a 24th Embodiment, and shows an example in which the configuration of the 23rd Embodiment is applied to the calculating device when using a value estimated from the input shaft rotational speed as shown in FIG. 5.

Although a configuration to detect an output shaft rotational speed by the output shaft sensor has been described in the above 23rd Embodiment, it is also applicable to a configuration which estimates the output shaft rotational speed from the input shaft rotational speed as shown in FIG. 70 (similar to the configuration in FIG. 5). Therefore, similar reference numerals are assigned to similar portions in FIG. 70, and further explanations of other configurations and functions thereof will be omitted.

25TH EMBODIMENT

Figure 71A:
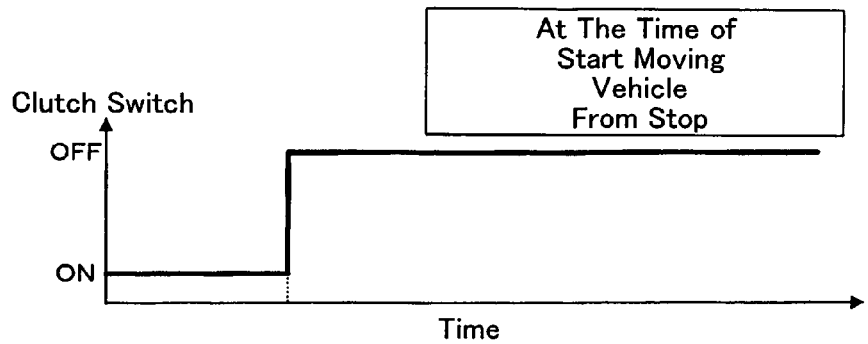
FIG. 71A is a graph for explaining a function of a control apparatus according to a 25th Embodiment, and shows an ON/OFF-state of the clutch at the time of start the vehicle on y-axis with respect to time on x-axis.
Figure 71B:
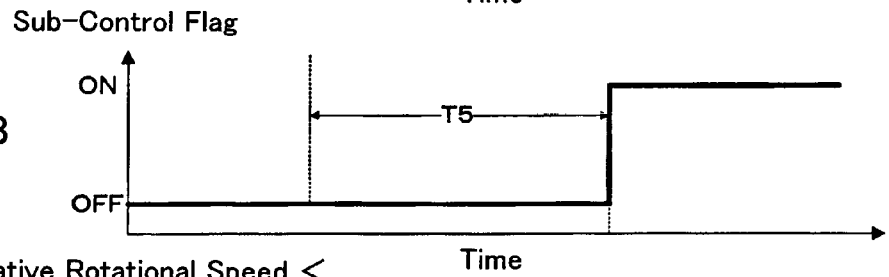
FIG. 71B is a corresponding graph of FIG. 71A, showing a change in an ON/OFF-state of the sub-control flag stored in the instruction value output ON/OFF module.
Figure 71C:
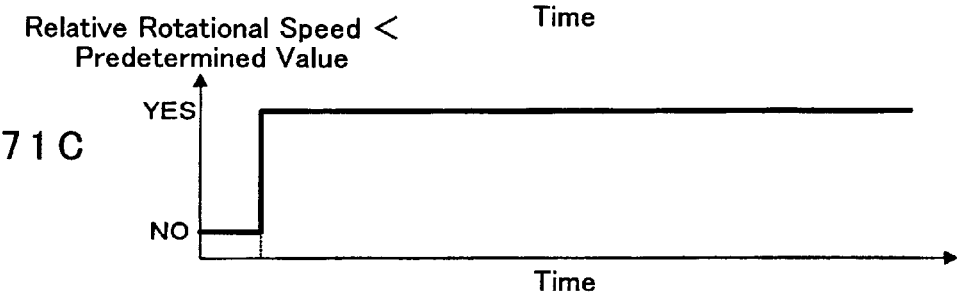
FIG. 71C is a corresponding graph of FIG. 71A, and shows whether a relative rotational speed is less than a predetermined value.
Figure 71D:
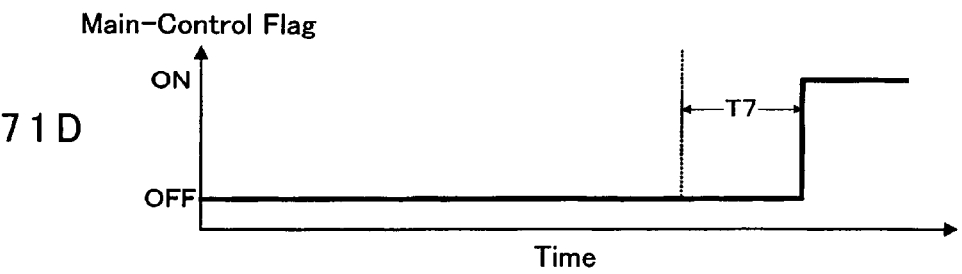
FIG. 71D is a corresponding graph of FIG. 71A, showing a change in an ON/OFF-state of the main-control flag stored in the instruction value output ON/OFF module.

In the 23rd and the 24th Embodiment above, it is configured so that the main-control flag may be turned to ON when the predetermined time T5 is lapsed, depending on the case, as shown in FIG. 65. However, in this embodiment, as shown in FIGS. 71A, 71B, and 71D, after the sub-control flag is turned to ON and, then, after the predetermined time T7 is lapsed, it is configured so that the main-control flag is turned to ON. With such configuration, as compared with the 23rd Embodiment, the number of the timers which operate simultaneously can be reduced from two to one, and, thus, load of the calculating modules can be reduced.

Figure 72:
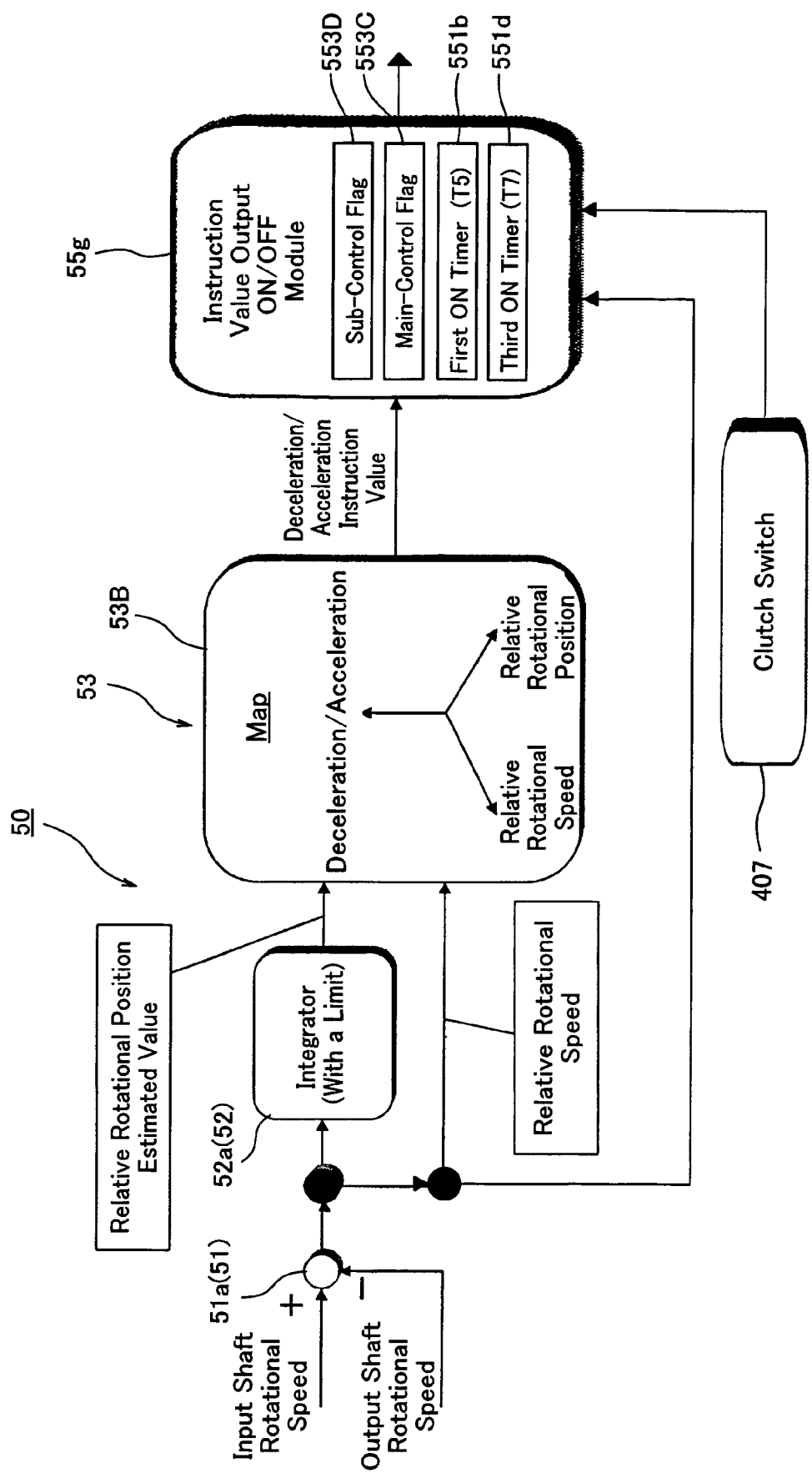
FIG. 72 is a control block diagram showing a configuration of the calculating device of a control apparatus at the time of acceleration/deceleration of the vehicle according to the 25th Embodiment, particularly showing an example of the calculating device using detection values of both the input shaft rotational speed and the output shaft rotational speed as shown in FIG. 4.

As shown in FIG. 72, the calculating device 50 of this embodiment includes a differentiator 51a as the relative rotational speed calculating module 51, an integrator 52a as the relative rotational position estimating module 52, a control module 53, and an instruction value output ON/OFF module 55g as the acceleration/deceleration adjusting module.

The differentiator 51a is provided with both the input shaft rotational speed from the input shaft sensor 404 (see FIG. 31) and the output shaft rotational speed from the output shaft sensor 405 (see FIG. 31). The differentiator 51a calculates a difference between the input shaft rotational speed and the output shaft rotational speed (that is, a relative rotational speed). The calculated relative rotational speed is transmitted to the control module 53 as well as to the integrator 52a. The integrator 52a estimates a relative rotational position by integrating the relative rotational speeds. The estimated relative rotational position is transmitted to the control module 53.

The control module 53 includes a map 53B (see FIG. 3) which is utilized by the control logic 53A (see FIG. 2). The map 53B typically stores deceleration/acceleration instruction values corresponding to a relative rotational speed and a relative rotational position. The control module 53 calculates a deceleration/acceleration instruction value with reference to the map 53B based on the relative rotational speed transmitted from the differentiator 51a and the relative rotational position estimated value transmitted from the integrator 52a. The control module 53 outputs the calculated deceleration/acceleration instruction value to an appropriate drive device of the spark plug 603a (see FIG. 31) which is the accelerating/decelerating module 60 (see FIG. 2) through the instruction value output ON/OFF module 55g.

Besides the deceleration/acceleration instruction value from the control module 53 as mentioned above, the instruction value output ON/OFF module 55g is provided with a detection result from the clutch switch 407 indicating that the clutch 202 is connected (the clutch switch 407 is OFF) or is disconnected (the clutch switch 407 is ON). The instruction value output ON/OFF module 55g is also provided with an input of the relative rotational speed from the differentiator 51a. The instruction value output ON/OFF module 55g includes control flag memory areas 553D and 553C which store a sub-control flag and a main-control flag, respectively. The instruction value output ON/OFF module 55g includes a first ON-timer 551b, and a third ON-timer 551d.

If the main-control flag stored in the main-control flag memory area 553C is ON, the instruction value output ON/OFF module 55g lets the deceleration/acceleration instruction value transmitted from the control module 53 pass therethrough, and if the control flag is OFF, the instruction value output ON/OFF module 55g does not let the deceleration/acceleration instruction value pass therethrough. Furthermore, the main-control flag is set to ON only if the sub-control flag is ON as being mentioned later (see a flowchart of FIGS. 73 and 74).

Figure 73:
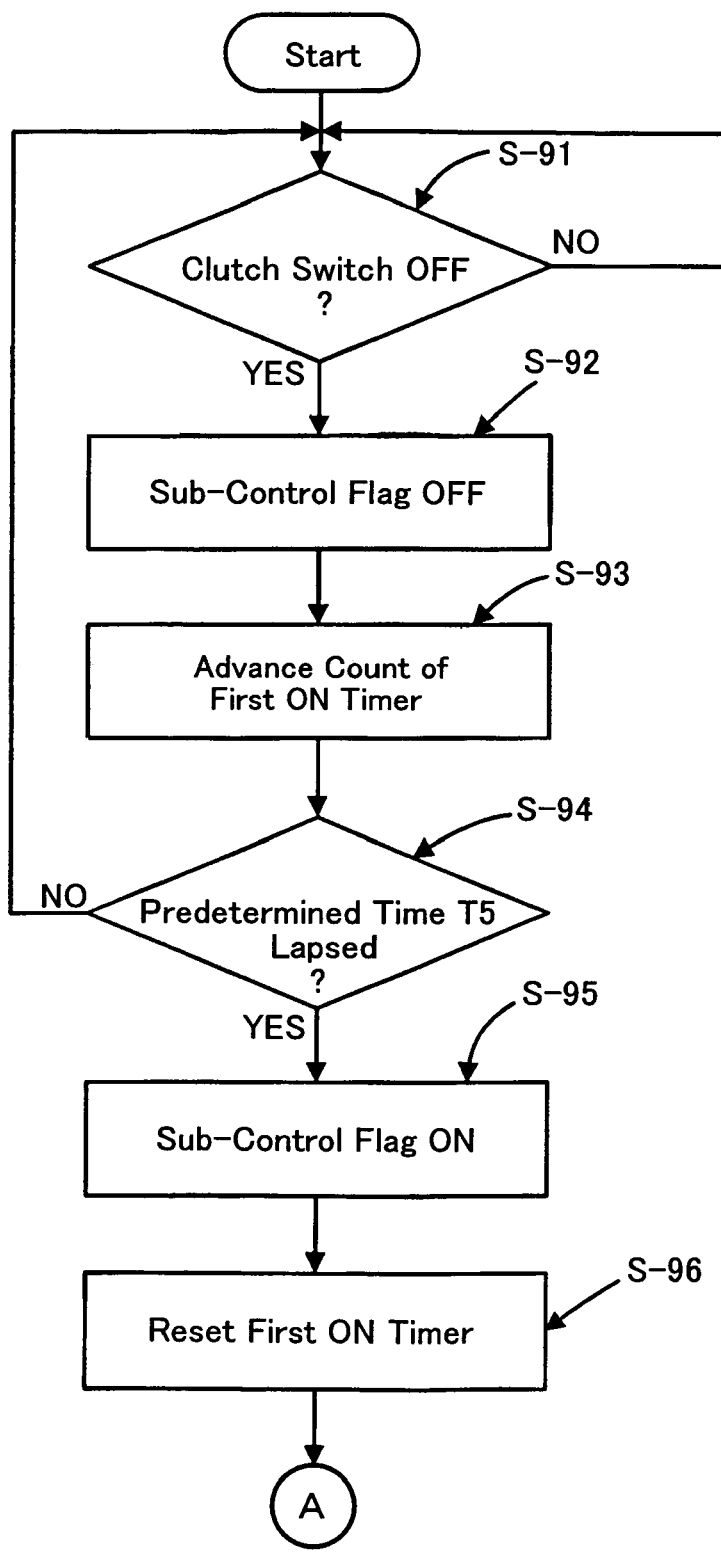
FIG. 73 is a flowchart for explaining an operation of the instruction value output ON/OFF module of the calculating device according to the 25th Embodiment shown in FIG. 72.
Figure 74:
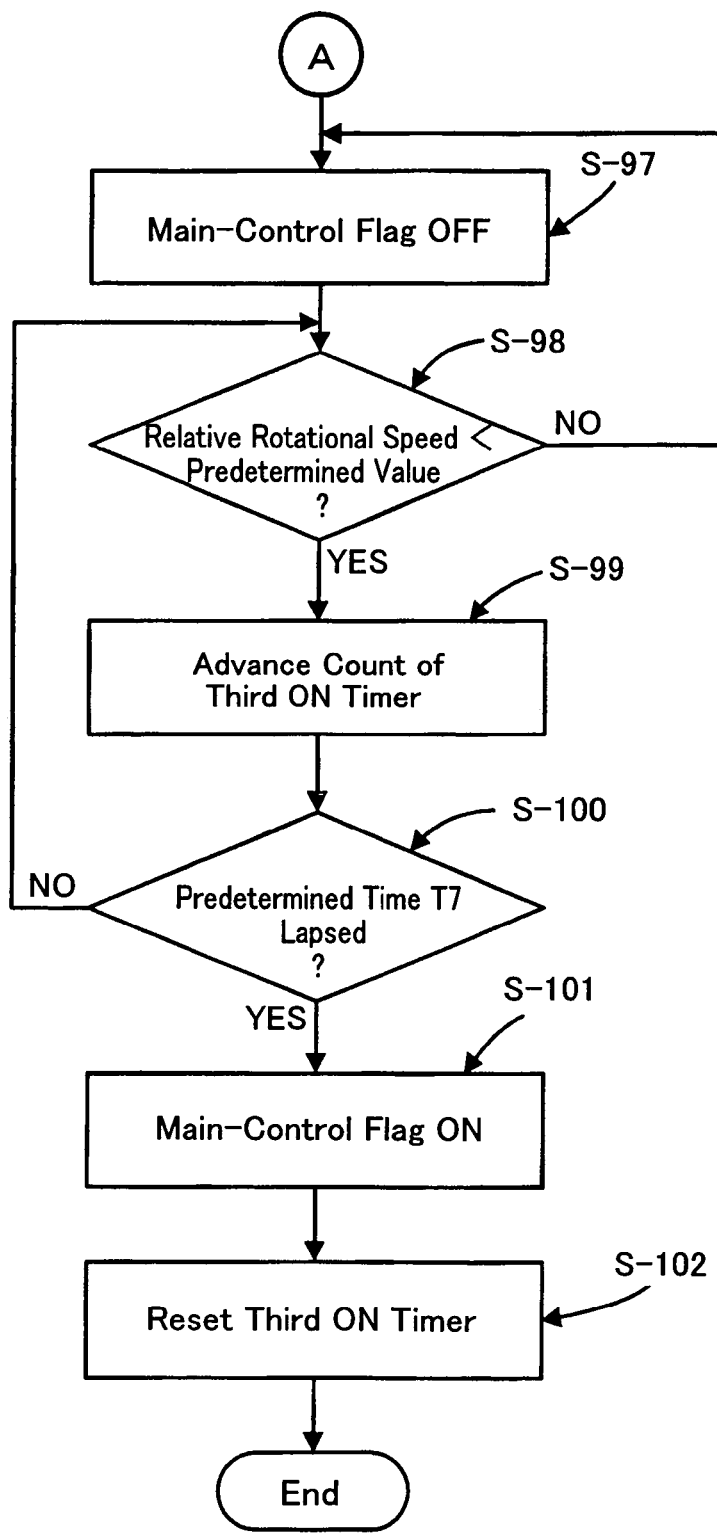
FIG. 74 is a flowchart for explaining an operation of the instruction value output ON/OFF module of the calculating device according to the 25th Embodiment shown in FIG. 72.

Next, an operation of the instruction value output ON/OFF module 55g will be explained referring to a flowchart of FIGS. 73 and 74. The instruction value output ON/OFF module 55g operates upon an input of the deceleration/acceleration instruction value from the control module 53. First, the instruction value output ON/OFF module 55g determines whether the clutch switch 407 is in an OFF-state based on the information transmitted from the clutch switch 407 (Step S-91).

If the clutch switch 407 is in the OFF-state ("YES" in Step S-91), the instruction value output ON/OFF module 55g sets the sub-control flag stored in the sub-control flag memory area 553D to OFF (Step S-92), and advances the count of the first ON-timer 551b (Step S-93). If the clutch switch 407 is in the ON-state ("NO" in Step S-91), the instruction value output ON/OFF module 55g repeatedly performs the determination until it will be in the OFF-state.

Then, the instruction value output ON/OFF module 55g determines whether the count of the first ON-timer 551b is lapsed a predetermined time T5 (Step S-94). If the predetermined time T5 is not lapsed ("NO" in Step S-94), the instruction value output ON/OFF module 55g repeats the routine from Step S-91.

On the other hand, if the predetermined time T5 is lapsed ("YES" in Step S-94), the instruction value output ON/OFF module 55g sets so that the sub-control flag being returned to ON (Step S-95).

And the instruction value output ON/OFF module 55g resets the first ON-timer 551b (Step S-96).

Then, the instruction value output ON/OFF module 55g sets the main-control flag stored in the main-control flag memory area 553C to OFF (Step S-97), further, determines whether the relative rotational speed is less than a predetermined value based on the information transmitted from the differentiator 51a (Step S-98).

If the relative rotational speed is greater than a predetermined value ("NO" in Step S-98), the instruction value output ON/OFF module 55g repeats the routine from Step S-97. On the other hand, if the relative rotational speed is less than the predetermined value ("YES" in Step S-98), the instruction value output ON/OFF module 55g advances the count of the count of the third ON-timer 551d (Step S-99).

Then, the instruction value output ON/OFF module 55g determines whether the count of the third ON-timer 551d lapsed a predetermined time T7 (Step S-100). If the predetermined time T7 is not lapsed ("NO" in Step S-100), the instruction value output ON/OFF module 55g returns to Step S-98.

On the other hand, when the predetermined time T7 is lapsed ("YES" in Step S-100), the instruction value output ON/OFF module 55g sets so that the main-control flag returns to ON-state (Step S-101), resets the third ON-timer 551d (Step S-102), and terminates the routine.

By the operation of the instruction value output ON/OFF module 55g as described above, as shown in FIGS. 71A-71D, when the clutch 202 is disconnected and, therefore, the clutch switch 407 is in the ON-state, the sub-control flag is turned to OFF. Further, when the clutch 202 is connected and, therefore, the clutch switch 407 shifts into the OFF-state, the count of the predetermined time T5 by the first ON-timer 551b is started. After the predetermined time T5 lapsed, the first sub-control flag is turned to ON.

When that the relative rotational speed is less than the predetermined value is detected, further from this point, a count for a predetermined time T7 by the third ON-timer 551d is started. If the predetermined time T7 is lapsed, the main-control flag is turned to ON and, it will be possible to pass through the deceleration/acceleration instruction value.

In this embodiment, the predetermined times T5 and T7 have been shown as fixed values, however, instead, they may be variable values. If the variable values are used, the instruction value output ON/OFF module 55f may adjust the predetermined times T5 and T7 according to a traveling speed of the vehicle. That way, different values at the time of stop and traveling of the vehicle may be used for the predetermined times T5 and T7. For example, a longer time may be used at the time of stop of the vehicle, to prevent an unintentional operation of the acceleration/deceleration control according to the present invention even when a clutch operation takes place slowly. Otherwise, a shorter time may be used for a quick clutch operation when changing gears during traveling, because it is possible to reliably perform the acceleration/deceleration control according to the present invention even if an acceleration takes place shortly after connecting the clutch.

26TH EMBODIMENT

Figure 75:
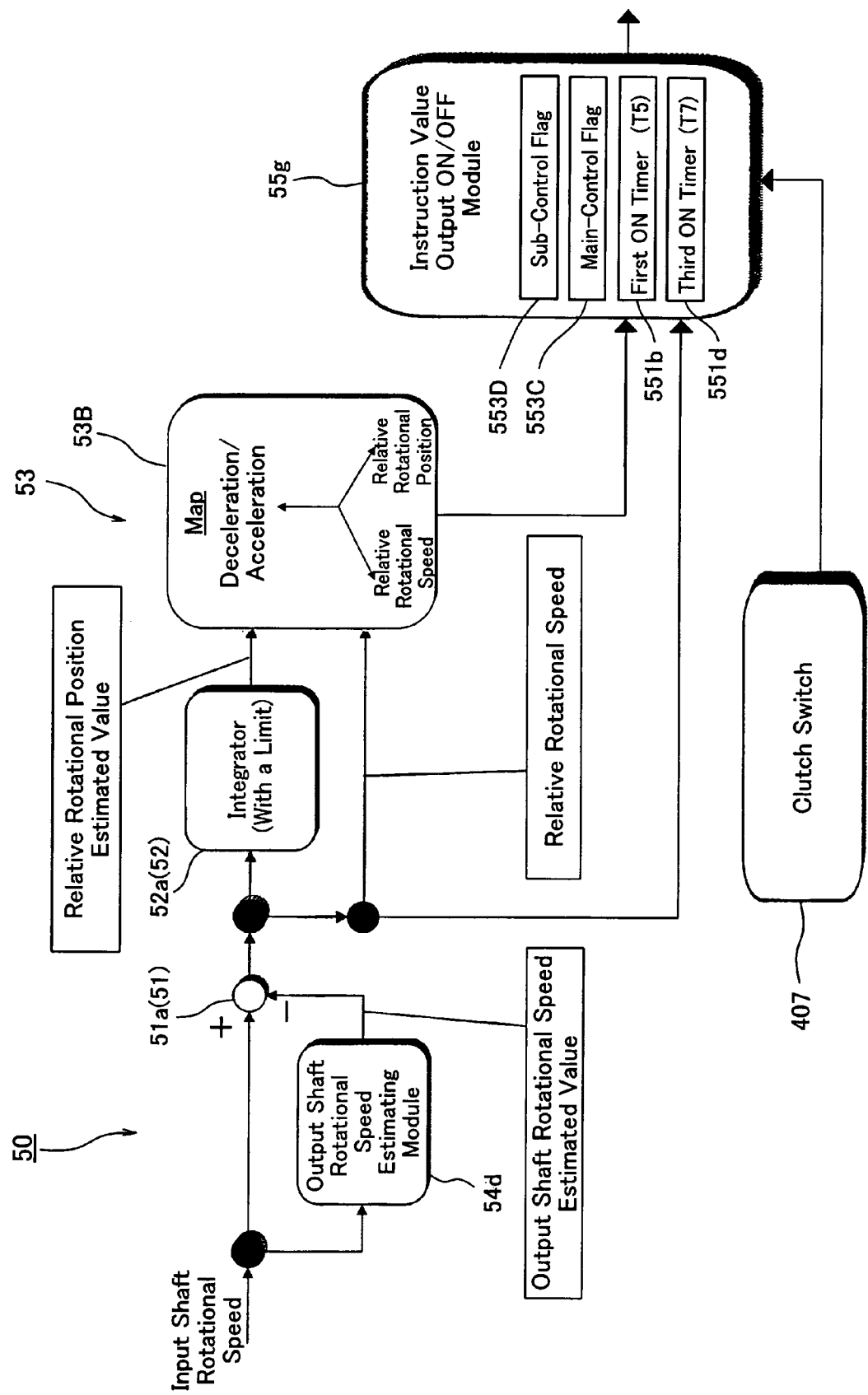
FIG. 75 is a control block diagram showing a configuration of the calculating device of a control apparatus at the time of acceleration/deceleration of the vehicle according to the 26th Embodiment which is an example in which the configuration of the 25th Embodiment is applied to the calculating device using a value estimated from the input shaft rotational speed as shown in FIG. 5.

Although a configuration to detect an output shaft rotational speed by the output shaft sensor has been described in the above 25th Embodiment, it is also applicable to a configuration which estimates the output shaft rotational speed from the input shaft rotational speed as shown in FIG. 75 (similar to the configuration in FIG. 5). Therefore, similar reference numerals are assigned to similar portions, and further explanations of other configurations and functions thereof will be omitted.

In the 3rd through 26th Embodiments, although it has been described mainly for a vehicle which is equipped with an internal combustion engine as a drive source, the principle of these Embodiments can also apply to a vehicle which is equipped with an electric motor as the drive source, such as disclosed in the 2nd Embodiment.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

The invention claimed is:

1. A method of reducing at least one of a contact speed and a transmitting torque between power transmission members, when a slack between the power transmission members in a power transmission path from a drive source to a wheel is apparently gone upon an acceleration or deceleration of the drive source or the wheel, the method comprising the steps of:
    detecting an information relating to a rotational speed of an input shaft of a controlled section in the power transmission path, the controlled section being defined as to be reduced in the at least one of the contact speed and the transmitting torque;
    calculating a relative rotational position between the input shaft and an output shaft of the controlled section based on the detected information relating to the rotational speed of the input shaft; and
    accelerating or decelerating at least one of the input shaft and the output shaft so as to reduce the at least one of the contact speed and the transmitting torque between the power transmission members based on the calculated relative rotational position.

2. An apparatus for reducing at least one of a contact speed and a transmitting torque between power transmission members, when a slack between the power transmission members in a power transmission path from a drive source to a wheel is apparently gone upon an acceleration or deceleration of the drive source or the wheel, the apparatus comprising:
    an input shaft sensor configured to detect an information relating to a rotational speed of an input shaft of a controlled section in the power transmission path, the controlled section being defined as to be reduced in the at least one of the contact speed and the transmitting torque;
    a relative rotational position calculating module configured to calculate a relative rotational position between the input shaft and an output shaft of the controlled section based on the information relating to the rotational speed of the input shaft detected by the input shaft sensor; and
    an accelerating/decelerating module configured to accelerate or decelerate at least one of the input shaft and the output shaft so as to reduce the at least one of the contact speed and the transmitting torque between the power transmission members based on the relative rotational position calculated by the relative rotational position calculating module.

3. The apparatus of claim 2, further comprising an output shaft sensor configured to detect an information relating to a rotational speed of the output shaft of the controlled section,
    wherein the relative rotational position calculating module is configured to calculate the relative rotational position between the input shaft and the output shaft based on the information relating to the rotational speed of the input shaft detected by the input shaft sensor and the information relating to the rotational speed of the output shaft detected by the output shaft sensor.

4. The apparatus of claim 3, wherein the drive source is an internal combustion engine;
    wherein the input shaft sensor is configured to detect information relating to the rotational speed of the crankshaft of the internal combustion engine; and
    wherein the output shaft sensor is configured to detect information relating to the rotational speed of an output shaft of a transmission device included in the controlled section.

5. The apparatus of claim 3 wherein the output shaft sensor is configured to detect information relating to a rotational speed of a drive wheel of a vehicle.

6. The apparatus of claim 3, wherein the output shaft sensor is configured to detect information relating to a rotational speed of a driven sprocket of a drive wheel of a vehicle, which is coupled to a drive sprocket attached to an output shaft of a transmission device through a chain.

7. The apparatus of claim 2, further comprising an output shaft estimating module configured to estimate an information relating to the rotational speed of the output shaft based on the information relating to the rotational speed of the input shaft detected by the input shaft sensor,
    wherein the relative rotational position calculating module is configured to calculate the relative rotational position between the input shaft and the output shaft based on the information relating to the rotational speed of the input shaft detected by the input shaft sensor and the information relating to the rotational speed of the output shaft estimated by the output shaft estimating module.

8. The apparatus of claim 7, wherein the output shaft estimating module is configured to store the rotational speed of the input shaft detected by the input shaft sensor and estimate the rotational speed of the output shaft at the stored rotational speed of the input shaft, while the slack between the power transmission members apparently exists.

9. The apparatus of claim 7, wherein the output shaft estimating module is configured to store the rotational speed of the input shaft detected by the input shaft sensor as a minimum value when it is determined that the power transmission members are in a state in which they are in contact with each other on the side as a vehicle is decelerated based on the relative rotational position calculated by the relative rotational position calculating module;

wherein the output shaft estimating module is configured to restrict storing of a newly detected rotational speed of the input shaft and hold an old stored rotational speed as the minimum value when the newly detected rotational speed is greater than the old stored rotational speed; and wherein the output shaft estimating module is configured to estimate the rotational speed of the output shaft at the minimum value when it is determined that the power transmission members are in a transition to a state in which they are in contact with each other on the side as the vehicle is accelerated based on the relative rotational position calculated by the relative rotational position calculating module.

10. The apparatus of claim 9, wherein the output shaft estimating module is configured to determine that the power transmission members are in a state in which they are in contact with each other on the side as the vehicle is decelerated when a deceleration of the rotational speed of the input shaft detected by the input shaft sensor is continued for a predetermined time.

11. The apparatus of claim 7, wherein the output shaft estimating module is configured to store the rotational speed of the input shaft detected by the input shaft sensor as a maximum value when it is determined that the power transmission members are in a state in which they are in contact with each other on the side as a vehicle is accelerated based on the relative rotational position calculated by the relative rotational position calculating module;

wherein the output shaft estimating module is configured to restrict storing of a newly detected rotational speed of the input shaft and hold an old stored rotational speed as the maximum value when the newly detected rotational speed is less than the old stored rotational speed; and wherein the output shaft estimating module is configured to estimate the rotational speed of the output shaft at the maximum value when it is determined that the power transmission members are in a transition to a state in which they are in contact with each other on the side as the vehicle is decelerated based on the relative rotational position calculated by the relative rotational position calculating module.

12. The apparatus of claim 11, wherein the output shaft estimating module is configured to determine that the power transmission members are in a state in which they are in contact with each other on the side as the vehicle is accelerated when an acceleration of the rotational speed of the input shaft detected by the input shaft sensor is continued for a predetermined time.

13. The apparatus of claim 7, wherein the output shaft estimating module is a low-path filter with a large time constant.

14. The apparatus of claim 2, further comprising a relative rotational speed calculating module configured to calculate a relative rotational speed between the input shaft and the output shaft based on the information relating to the rotational speed of the input shaft detected by the input shaft sensor, and wherein the accelerating/decelerating module is configured to accelerate or decelerate the at least one of the input shaft and the output shaft so as to reduce the at least one of the contact speed and the transmitting torque between the power transmission members based on the relative rotational speed calculated by the relative rotational speed calculating module and the relative rotational position calculated by the relative rotational position calculating module.

15. The apparatus of claim 14, wherein the relative rotational speed calculating module is a differentiator.

16. The apparatus of claim 14, further comprising:

a neutral detecting module configured to detect that a transmission device included in the controlled section is in a neutral position;

an acceleration/deceleration adjusting module configured to permit or restrict the acceleration or deceleration of the at least one of the input shaft and the output shaft by the accelerating/decelerating module, based on the detection result from the neutral detecting module and the relative rotational speed calculated by the relative rotational speed calculating module.

17. The apparatus of claim 16, wherein the acceleration/deceleration adjusting module is configured to restrict the acceleration or deceleration of the at least one of the input shaft and the output shaft by the accelerating/decelerating module, when the neutral detecting module detects that the transmission device is in the neutral position.

18. The apparatus of claim 17, wherein the acceleration/deceleration adjusting module is configured to permit the acceleration or deceleration of the at least one of the input shaft and the output shaft by the accelerating/decelerating module, when a state in which the relative rotational speed calculated by the relative rotational speed calculating module becomes less than a predetermined value continues for a predetermined time, after the acceleration or deceleration of at least one of the input shaft and the output shaft by the acceleration/decelerating module is restricted in response to a detection that the transmission module is in a neutral position, the detection being made by the neutral detecting module.

19. The apparatus of claim 18, wherein the acceleration/deceleration adjusting module is configured to keep permitting the acceleration or deceleration of the at least one of the input shaft and the output shaft by the accelerating/decelerating module for a predetermined time once after the acceleration or deceleration of the at least one of the input shaft and the output shaft is permitted.

20. The apparatus of claim 16, wherein the acceleration/deceleration adjusting module includes a control flag;

wherein the acceleration/deceleration adjusting module is configured to permit the acceleration or deceleration of the at least one of the input shaft and the output shaft by the accelerating/decelerating module when the control flag is in an ON-state, while being configured to restrict the acceleration or deceleration of the at least one of the input shaft and the output shaft by the accelerating/decelerating module when the control flag is in an OFF-state; and wherein the acceleration/deceleration adjusting module is configured to have the control flag in an OFF-state when the neutral detecting module detects that the transmission device is in the neutral position, and to have the control flag in an ON-state when a state in which the relative rotational speed calculated by the relative rotational speed calculating module becomes less than a predetermined value continues a first predetermined time.

21. The apparatus of claim 20, the acceleration/deceleration adjusting module is configured to maintain the control flag in an ON-state for a second predetermined time once the acceleration or deceleration of the at least one of the input shaft and the output shaft by the accelerating/decelerating module is started.

22. The apparatus of claim 14, further comprising an acceleration/deceleration adjusting module configured to restrict the acceleration or deceleration of the at least one of the input shaft and the output shaft by the accelerating/decelerating module, when the relative rotational position calculated by the relative rotational position calculating module which includes an integrator with a limit reaches an integration limit of the integrator.

23. The apparatus of claim 14, further comprising:
an input shaft rotational acceleration calculating module configured to calculate a rotational acceleration of the input shaft based on the rotational speed of the input shaft detected by the input shaft sensor;
a relative rotational acceleration calculating module configured to calculate a relative rotational acceleration based on the relative rotational speed calculated by the relative rotational speed calculating module; and
an acceleration/deceleration adjusting module configured to restrict the acceleration or deceleration of the at least one of the input shaft and the output shaft by the accelerating/decelerating module, when the relative rotational speed calculated by the relative rotational speed calculating module, the rotational acceleration of the input shaft calculated by the input shaft rotational acceleration calculating module, or the relative rotational acceleration calculated by relative rotational acceleration calculating module exceeds a predetermined value.

24. The apparatus of claim 14, further comprising an acceleration/deceleration adjusting module configured to restrict the acceleration or deceleration of the at least one of the input shaft and the output shaft by the accelerating/decelerating module, when a state in which the relative rotational speed calculated by the relative rotational speed calculating module exceeded a predetermined value continues for a predetermined time.

25. The apparatus of claim 14, further comprising:
a clutch connection/disconnection detecting module intervened between the input shaft and the output shaft in the power transmission path, and configured to detect a connection/disconnection of the clutch which connects/disconnects the power transmission path; and
an acceleration/deceleration adjusting module configured to permit the acceleration or deceleration of the at least one of the input shaft and the output shaft by the accelerating/decelerating module when the connection of the clutch is detected by the clutch connection/disconnection detecting module, while being configured to restrict the acceleration or deceleration of the at least one of the input shaft and the output shaft by the accelerating/decelerating module when the disconnection of the clutch is detected by the clutch connection/disconnection detecting module;
wherein the acceleration/deceleration adjusting module is configured to permit the acceleration or deceleration of the at least one of the input shaft and the output shaft by the accelerating/decelerating module, when conditions of passing of a predetermined time after a detection of the connection of the clutch by the clutch connection/disconnection detecting module is made and passing of a predetermined time after the relative rotational speed calculated by the relative rotational speed calculating module becomes less than a predetermined value are both met.

26. The apparatus of claim 14, further comprising:
a clutch connection/disconnection detecting module intervened between the input shaft and the output shaft in the power transmission path, and configured to detect a connection/disconnection of the clutch which connects/disconnects the power transmission path; and
an acceleration/deceleration adjusting module configured to permit the acceleration or deceleration of the at least one of the input shaft and the output shaft by the accelerating/decelerating module when the connection of the clutch is detected by the clutch connection/disconnection detecting module, while being configured to restrict the acceleration or deceleration of the at least one of the input shaft and the output shaft by the accelerating/decelerating module when the disconnection of the clutch is detected by the clutch connection/disconnection detecting module;
wherein the acceleration/deceleration adjusting module is configured to permit the acceleration or deceleration of the at least one of the input shaft and the output shaft by the accelerating/decelerating module, after passing of a predetermined time from the detection of the connection of the clutch by the clutch connection/disconnection detecting module, and when the predetermined time is passed after the relative rotational speed calculated by the relative rotational speed calculating module becomes less than a predetermined value.

27. The apparatus of claim 2, wherein the relative rotational position calculating module is an integrator or an integrator with a limit.

28. The apparatus of claim 2, wherein the drive source is an internal combustion engine of forced-ignition type, and the accelerating/decelerating module is configured to accelerate or decelerate the input shaft by advancing/retarding an ignition timing of the engine.

29. The apparatus of claim 2, wherein the drive source is an electric motor, and the accelerating/decelerating module is configured to accelerate or decelerate the input shaft by increasing or decreasing a supply current to the electric motor.

30. The apparatus of claim 2, wherein the accelerating/decelerating module includes an accelerating/decelerating device coupled to at least one of the input shaft and the output shaft.

31. The apparatus of claim 30, wherein the accelerating/decelerating module further includes a control module configured to output an instruction to the accelerating/decelerating device, and the instruction includes a timing to start the deceleration or acceleration, and at least one of an amount of deceleration or acceleration and a timing to end the deceleration or acceleration.

32. The apparatus of claim 31, wherein the control module is configured to calculate the timing to start the deceleration or acceleration based on the relative rotational position calculated by the relative rotational position calculating module.

33. The apparatus of claim 31, wherein the control module is configured to calculate the at least one of the amount of the deceleration or acceleration and a timing to end the deceleration or acceleration, based on at least one of a relative rotational position between the input shaft and the output shaft, a rotational speed of the input shaft and/or the output shaft, an increase/decrease rate of the rotational speed, a rotational speed difference between the input shaft and the output shaft, an increase/decrease rate of the rotational speed difference, and an opening of the throttle which is configured to adjust an output of the drive source, and an increase/decrease rate of the opening of the throttle.

34. The apparatus of claim 2, wherein the relative rotational position calculating module is configured to estimate the relative rotational position at a state in which the power transmission members are in contact with each other on the side as the vehicle is decelerated or accelerated, when the relative rotational speed between the input shaft and the output shaft is less than a predetermined value based on the information relating to the rotational speed of the input shaft detected by the input shaft sensor, or when a deceleration or acceleration of rotation of the input shaft detected by the input shaft sensor continues for a predetermined time.

35. The apparatus of claim 2, further comprising:
  a path connecting/disconnecting module intervened between the input shaft and the output shaft in the power transmission path, and configured to connect/disconnect the power transmission path; and
  an acceleration/deceleration adjusting module configured to restrict the acceleration or deceleration of the at least one of the input shaft and the output shaft by the accelerating/decelerating module, when the power transmission path is disconnected by the path connecting/disconnecting module.

36. The apparatus of claim 35, wherein the path connecting/disconnecting module includes a transmission device having a neutral position, or a clutch.

37. The apparatus of claim 2, further comprising:
  a clutch connection/disconnection detecting module intervened between the input shaft and the output shaft in the power transmission path, and configured to detect a connection/disconnection of the clutch which connects/disconnects the power transmission path; and
  an acceleration/deceleration adjusting module configured to permit the acceleration or deceleration of the at least one of the input shaft and the output shaft by the accelerating/decelerating module when the connection of the clutch is detected by the clutch connection/disconnection detecting module, while being configured to restrict the acceleration or deceleration of the at least one of the input shaft and the output shaft by the accelerating/decelerating module when the disconnection of the clutch is detected by the clutch connection/disconnection detecting module.

38. The apparatus of claim 37, wherein the acceleration/deceleration adjusting module is configured to restrict the acceleration or deceleration of the at least one of the input shaft and the output shaft by the accelerating/decelerating module until it passes a predetermined time after a detection of the connection of the clutch by the clutch connection/disconnection detecting module is made.

39. The apparatus of claim 38, wherein the acceleration/deceleration adjusting module is configured to change the predetermined time according to the traveling speed of the vehicle.

40. The apparatus of claim 37, further comprising a relative rotational speed calculating module configured to calculate the relative rotational speed between the input shaft and the output shaft based on the information relating to the rotational speed of the input shaft detected by the input shaft sensor;
  wherein the acceleration/deceleration adjusting module includes a first sub-control flag, a second sub-control flag, and a main-control flag;
  wherein the acceleration/deceleration adjusting module is configured to permit the acceleration or deceleration of the at least one of the input shaft and the output shaft by the accelerating/decelerating module when the main-control flag is in an ON-state, while being configured to restrict the acceleration or deceleration of the at least one of the input shaft and the output shaft by the accelerating/decelerating module when the main-control flag is in an OFF-state;
  wherein the acceleration/deceleration adjusting module is configured to have the main-control flag in the ON-state when both the first sub-control flag and the second sub-control flag are in an ON-state, while being configured to have the main-control flag in the OFF-state when either of the sub-control flags are in an OFF-state;
  wherein the acceleration/deceleration adjusting module is configured to have the first sub-control flag in an OFF-state until it passes a predetermined time after a detection of the connection of the clutch by the clutch connection/disconnection detecting module is made and, to have the first sub-control flag in an ON-state after a lapse of the predetermined time;
  wherein the acceleration/deceleration adjusting module is configured to have the second sub-control flag in an OFF-state until it passes a predetermined time after the relative rotational speed calculated by the relative rotational speed calculating module becomes less than a predetermined value and, then, to have the second sub-control flag in an ON-state.

41. The apparatus of claim 37, further comprising a relative rotational speed calculating module configured to calculate the relative rotational speed between the input shaft and the output shaft based on the information relating to the rotational speed of the input shaft detected by the input shaft sensor,
  wherein the acceleration/deceleration adjusting module includes a sub-control flag and a main-control flag;
  wherein the acceleration/deceleration adjusting module is configured to have the sub-control flag in an OFF-state until it passes a predetermined time after a detection of the connection of the clutch by the clutch connection/disconnection detecting module and, then, to have the sub-control flag in an ON-state;
  wherein the acceleration/deceleration adjusting module is configured to have the main-control flag in an OFF-state if the relative rotational speed calculated by the relative rotational speed calculating module is less than a predetermined value when the sub-control flag becomes in the ON-state, until it passes a predetermined time since then, and to have the main-control flag in an ON-state.
  wherein the acceleration/deceleration adjusting module is configured to permit the acceleration or deceleration of the at least one of the input shaft and the output shaft by the accelerating/decelerating module when the main-control flag is in an OFF-state, while being configured to restrict the acceleration or deceleration of the at least one of the input shaft and the output shaft by the accelerating/decelerating module when the main-control flag is in an ON-state.

42. The apparatus of claim 2, wherein the accelerating/decelerating module includes:
  a deceleration/acceleration instruction value pattern memory module configured to store a time-sequential pattern of accelerating or decelerating the at least one of the input shaft and the output shaft; and a deceleration/acceleration instruction value calculating module configured to refer to the deceleration/acceleration instruction value pattern memory module based on the information relating to the rotational speed of the input shaft detected by the input shaft sensor and the relative rotational position calculated by the relative rotational position calculating module, and to calculate an amount of acceleration or deceleration of the at least one of the input shaft and the output shaft;

wherein the accelerating/decelerating module is configured to accelerate or decelerate the at least one of the input shaft and the output shaft based on the amount of acceleration or deceleration calculated by the deceleration/acceleration instruction value calculating module.

43. The apparatus of claim 42, wherein the deceleration/acceleration instruction value calculating module further includes:

a rotational speed pattern memory module configured to store a time-sequential pattern of the information relating to the rotational speed of the input shaft;

a relative rotational position pattern memory module configured to store a time-sequential pattern of the relative rotational position; and a simulation model which simulates a configuration of the vehicle to take the amount of acceleration or deceleration of the at least one of the input shaft and the output shaft as an input value, and output the rotational speed of the input shaft and the relative rotational position based on the input value;

wherein the deceleration/acceleration instruction value calculating module is configured to calculate an information relating to the rotational speed of the input shaft, based on the pattern stored in the deceleration/acceleration instruction value pattern memory module;

wherein the deceleration/acceleration instruction value calculating module is configured to optimize the pattern stored in the deceleration/acceleration instruction value pattern memory module so that the information relating to the calculated rotational speed and the rotational position approaches the patterns stored in the rotational speed pattern memory module and the relative rotational position pattern memory module, respectively.

44. The apparatus of claim 2, further comprising:

a suspension displacement sensor configured to detect a displacement of a suspension; and a slack calculating module configured to calculate a slack in a chain or a belt which drives a drive wheel based on the displacement of the suspension detected by the suspension displacement sensor, wherein the accelerating/decelerating module is configured to accelerate or decelerate at least one of the input shaft and the output shaft so as to reduce the at least one of the contact speed and the transmitting torque between the power transmission members based on the relative rotational position calculated by the relative rotational position calculating module and the slack in the chain or belt calculated by slack calculating module.

45. A vehicle, comprising:

an apparatus for reducing at least one of a contact speed and a transmitting torque between power transmission members, when a slack between the power transmission members in a power transmission path from a drive source to a wheel is apparently gone upon an acceleration or deceleration of the drive source or the wheel, the apparatus includes:

an input shaft sensor configured to detect an information relating to a rotational speed of an input shaft of a controlled section in the power transmission path, the controlled section being defined as to be reduced in the at least one of the contact speed and the transmitting torque;

a relative rotational position calculating module configured to calculate a relative rotational position between the input shaft and an output shaft of the controlled section based on the information relating to the rotational speed of the input shaft detected by the input shaft sensor; and an accelerating/decelerating module configured to accelerate or decelerate at least one of the input shaft and the output shaft so as to reduce the at least one of the contact speed and the transmitting torque between the power transmission members based on the relative rotational position calculated by the relative rotational position calculating module.

* * * * *